(12) United States Patent
Wittenbreder

(10) Patent No.: US 6,437,999 B1
(45) Date of Patent: Aug. 20, 2002

(54) POWER ELECTRONIC CIRCUITS WITH RIPPLE CURRENT CANCELLATION

(75) Inventor: Ernest H. Wittenbreder, Flagstaff, AZ (US)

(73) Assignee: Technical Witts, Inc., Flagstaff, AZ (US)

( * ) Notice: Subject to any disclaimer, the term of this patent is extended or adjusted under 35 U.S.C. 154(b) by 0 days.

(21) Appl. No.: 09/853,561

(22) Filed: May 12, 2001

(51) Int. Cl.[7] .................................................. H02M 1/12
(52) U.S. Cl. ........................................... 363/39; 363/41
(58) Field of Search ............................ 363/39, 40, 41, 363/42, 43, 16, 17

(56) References Cited

U.S. PATENT DOCUMENTS

| | | | |
|---|---|---|---|
| 5,402,329 A | * 3/1995 | Wittenbreder, Jr. | 363/16 |
| 5,410,467 A | * 4/1995 | Smith et al. | 363/131 |
| 5,659,464 A | * 8/1997 | Esser | 363/41 |
| 5,946,208 A | * 8/1999 | Yamamoto et al. | 363/132 |
| 5,977,754 A | * 11/1999 | Cross | 323/222 |
| 6,144,565 A | * 11/2000 | Lethellier | 363/16 |
| 6,222,742 B1 | * 4/2001 | Schlecht | 363/16 |
| 6,304,065 B1 | * 10/2001 | Wittenbreder | 323/259 |

* cited by examiner

Primary Examiner—Adolf Deneke Berhane

(57) ABSTRACT

PWM DC to DC converter circuits which accomplish ripple cancellation at one or more terminals are revealed. Four or more inductors are required in each case, however, in all cases multiple inductors can be combined into a single simple coupled inductor to accomplish the ripple cancellation. Some of the circuits revealed accomplish ripple cancellation at all terminals and some also provide zero voltage switching and galvanic load isolation. The non-isolated DC to DC converter networks revealed accomplish buck, boost, buck boost (flyback), buck complement, boost complement, or flyback complement conversion using a simple circuit requiring only two switches, one of which may be a simple diode rectifier, two or more capacitors, and four or more inductors, which may be co-located on a single common magnetic core. The isolated converters revealed provide continuous and discontinuous forward converter and continuous flyback converter transfer functions. Also revealed are techniques to accomplish isolation, high order (quadrature) transfer functions, zero ripple tapped inductor topologies, and methodology for generalizing the process of changing three terminal networks with pulsating terminal currents into three terminal networks with zero ripple terminal currents.

32 Claims, 141 Drawing Sheets

POWER ELECTRONIC CIRCUITS WITH RIPPLE CURRENT CANCELLATION

BACKGROUND OF THE INVENTION

1. Field of the Invention

The subject invention generally pertains to electronic power conversion circuits, and more specifically to high frequency, switched mode power electronic converter circuits.

2. Description of Related Art

Power conversion circuits, in general, create either a pulsed current wave form or a continuous triangular wave form at the terminals of the circuit. To provide an electromagnetically compatible interface filters are often provided at the terminals. The size and cost of the filters depends on the frequency content and magnitude of the AC ripple components of the terminal currents. A terminal with a pulsed current wave form almost always requires a filter and a triangular terminal current wave form may require a filter although one much smaller than would be required by a pulsating current. In addition to the terminal filtering schemes there are ripple current steering schemes that add windings to the chokes and transformers and capacitors to provide a preferred path for AC currents away from the terminals. New techniques for changing converters with pulsating terminal currents to equivalent circuits with non-pulsating terminal currents have recently been revealed. The process for converting a three terminal power conversion network with pulsed terminal currents to an equivalent network with non-pulsating terminal currents is illustrated in FIG. 1. A new process has been developed which further converts a three terminal network with pulsating terminal currents into a three terminal network with ripple current cancellation at each terminal. This new process is the subject matter of this invention. The new process revealed here eliminates to a first order approximation all the ripple current thereby providing a circuit with high electromagnetic compatibility.

The process illustrated in FIG. 1 applies to all three terminal networks in which there is an inductor in series with one of the three terminals in which the terminal containing the inductor is non-pulsating which is always the case when the inductor is uncoupled. FIG. 25 illustrates a tapped inductor three terminal network which has a coupled winding in series with one terminal. Applying the process illustrated in FIG. 1 to the tapped inductor cell yields the networks illustrated in FIGS. 26 and 27 in which the terminal currents are all pulsating and there is no improvement. We will show how the FIG. 27 network can be transformed into a network in which the terminal currents are non-pulsating at all three terminals and the terminal ripple current is canceled at all three terminals.

FIG. 41 illustrates a three terminal network which has one inductor but the inductor is not connected to any network terminal. This network has pulsating current at all three terminals. A generalization of the FIG. 1 process can yield a network with non-pulsating current at all three terminals and ripple cancellation at one of the three terminals.

Isolated active reset circuits with zero voltage switching have been known for some time, but all of these circuits suffer from pulsating input terminal current. Isolated active reset circuits that achieve zero voltage switching use the reversal of the magnetizing current in the main transformer or coupled inductor or a series inductance in the form of leakage inductance or a discrete series choke to drive the resonant transitions. By splitting the windings and rearranging the primary circuits these also can be made to have zero input terminal current ripple.

OBJECTS AND ADVANTAGES

One object of the subject invention is to provide simple DC to DC power conversion circuits with both ripple free input current and ripple free output current using a single simple magnetically coupled inductor.

Another object of the subject invention is to provide a simple non-inverting ripple free step down DC to DC power conversion circuit.

Another object of the subject invention is to provide a simple non-inverting ripple free step up DC to DC power conversion circuit.

Another object of the subject invention is to provide a simpler circuit topology that can achieve zero ripple at all terminals with buck, boost, or buck boost (flyback) transfer functions, thereby enabling converters with smaller cheaper inductors and capacitors and converters with superior transient response and superior EMI performance using a single coupled inductor.

Another object of the subject invention is to provide single active switch quadrature converters with ripple free terminal currents for applications with wide input or output voltage ranges.

Another object of the subject invention is to provide boost complement, flyback complement, and buck complement converters with ripple free terminal currents using a single coupled inductor.

Another object of the subject invention is to provide tapped inductor buck, boost, and flyback converters with ripple free terminal currents for applications with very small or very large duty cycles using a single coupled inductor.

Another object of the subject invention is to provide isolated active reset converter circuits with input terminal current ripple cancellation.

BRIEF DESCRIPTION OF THE DRAWINGS

The present invention is illustrated by reference to the drawings.

FIG. 119 illustrates a second phase of a turn on transition of the FIG. 108 circuit.

FIG. 120 illustrates a third phase of a turn on transition of the FIG. 108 circuit.

FIG. 121 illustrates a fourth phase of a turn on transition of the FIG. 108 circuit.

FIG. 122 illustrates a fifth phase of a turn on transition of the FIG. 108 circuit.

FIG. 123 illustrates the FIG. 108 circuit with all four primary inductors coupled on a single common core and with all four switches implemented using mosfets.

FIG. 124 illustrates the FIG. 108 circuit with a diode added to clamp ringing associated with the primary inductors and the circuits parasitic capacitances.

FIG. 125 illustrates the FIG. 124 circuit with the transformer primary winding split into four windings and relocated to enhance the ripple cancellation and with the secondary switches implemented with diodes.

FIG. 126 illustrates the FIG. 125 circuit with capacitors to enhance the ripple cancellation.

FIG. 127 illustrates an active reset forward converter with only primary side inductors arranged to cancel the input current ripple.

FIG. 128 illustrates voltage and current wave forms of the FIG. 127 circuit.

FIG. 129 illustrates additional voltage and current wave forms of the FIG. 127 circuit.

FIG. 130 illustrates an on state of the FIG. 127 circuit.

Figure 127:
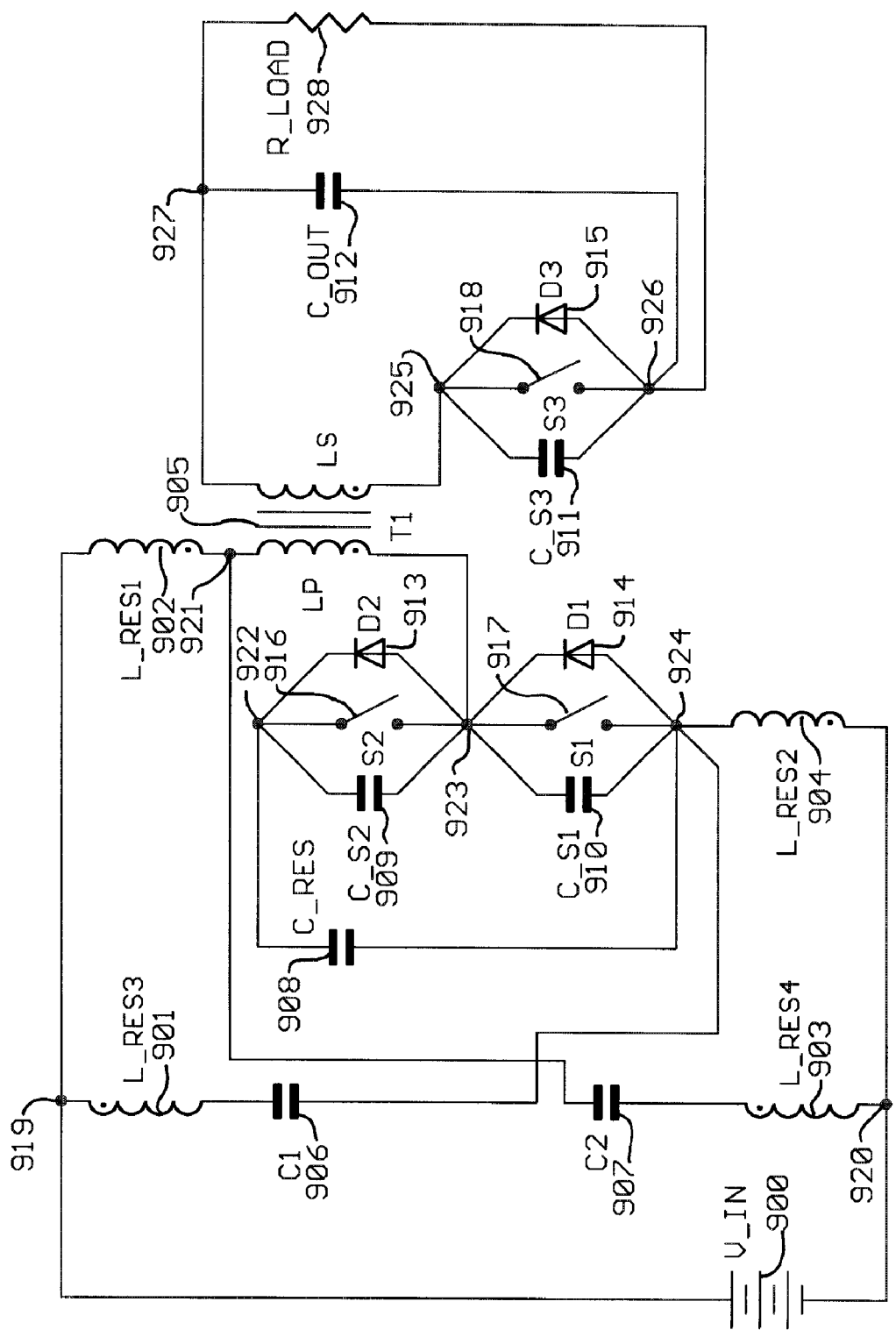
Figure 131:
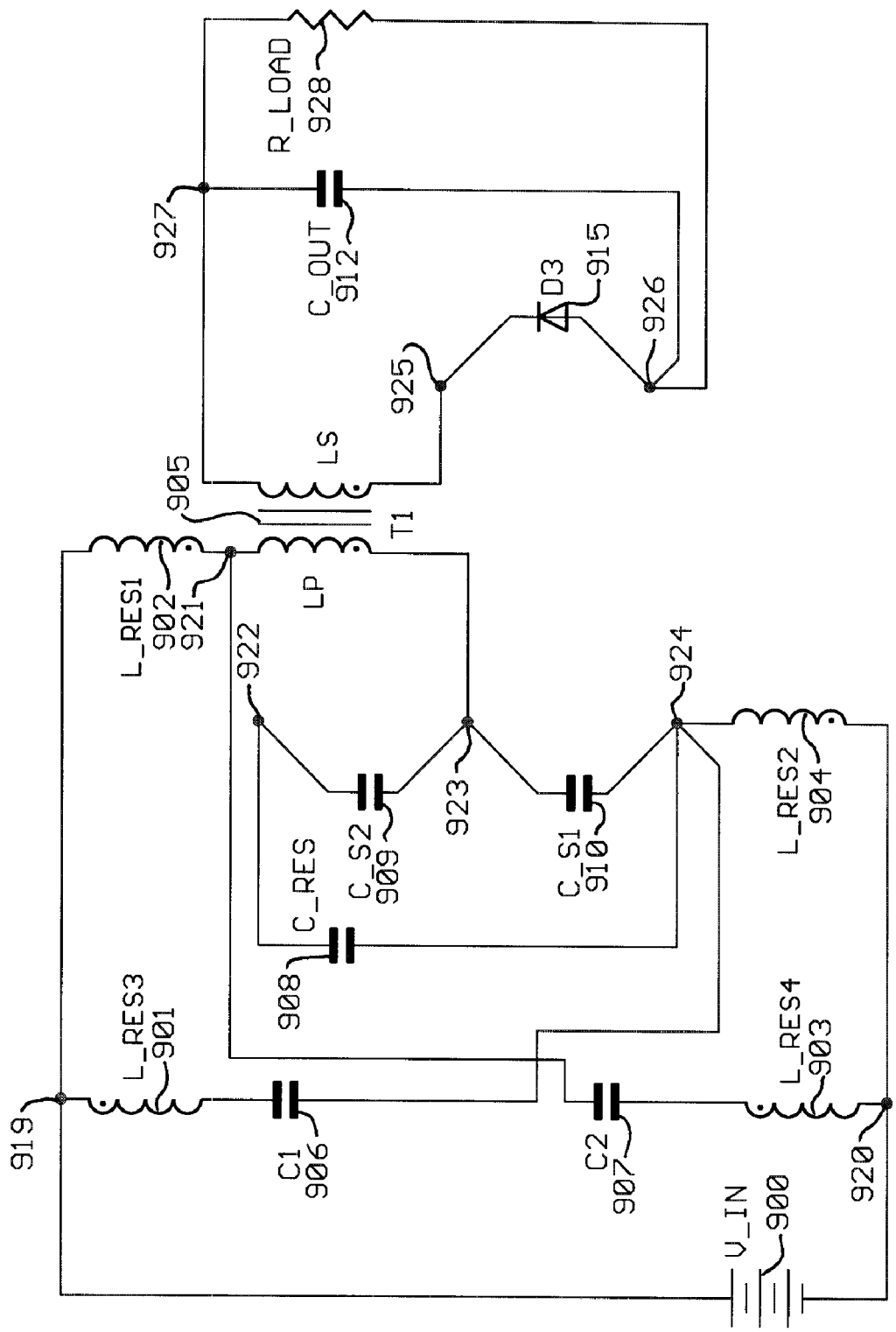

FIG. 131 illustrates a first phase of a turn off transition of the FIG. 127 circuit.

Figure 132:
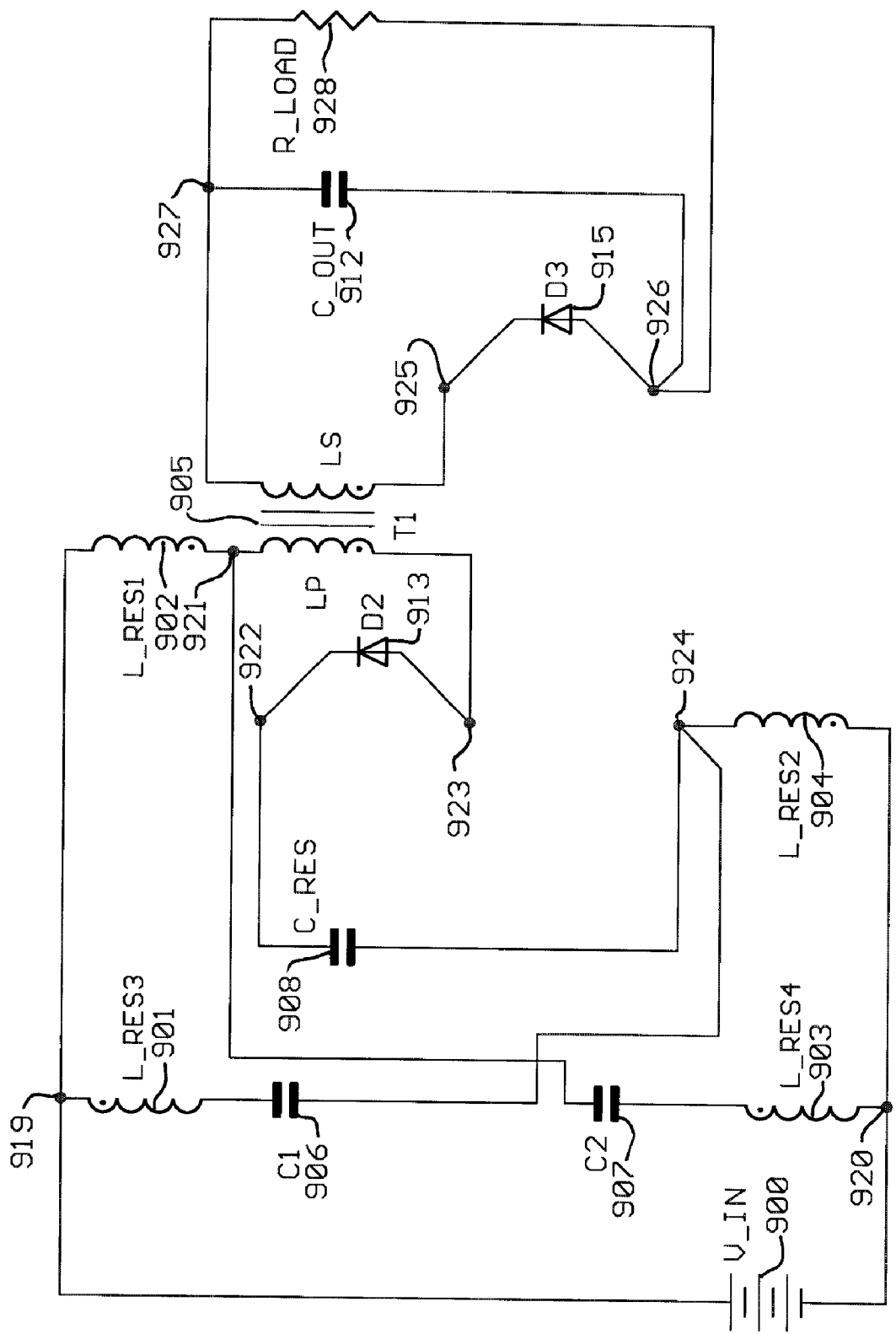

FIG. 132 illustrates a second phase of a turn off transition of the FIG. 127 circuit.

Figure 133:
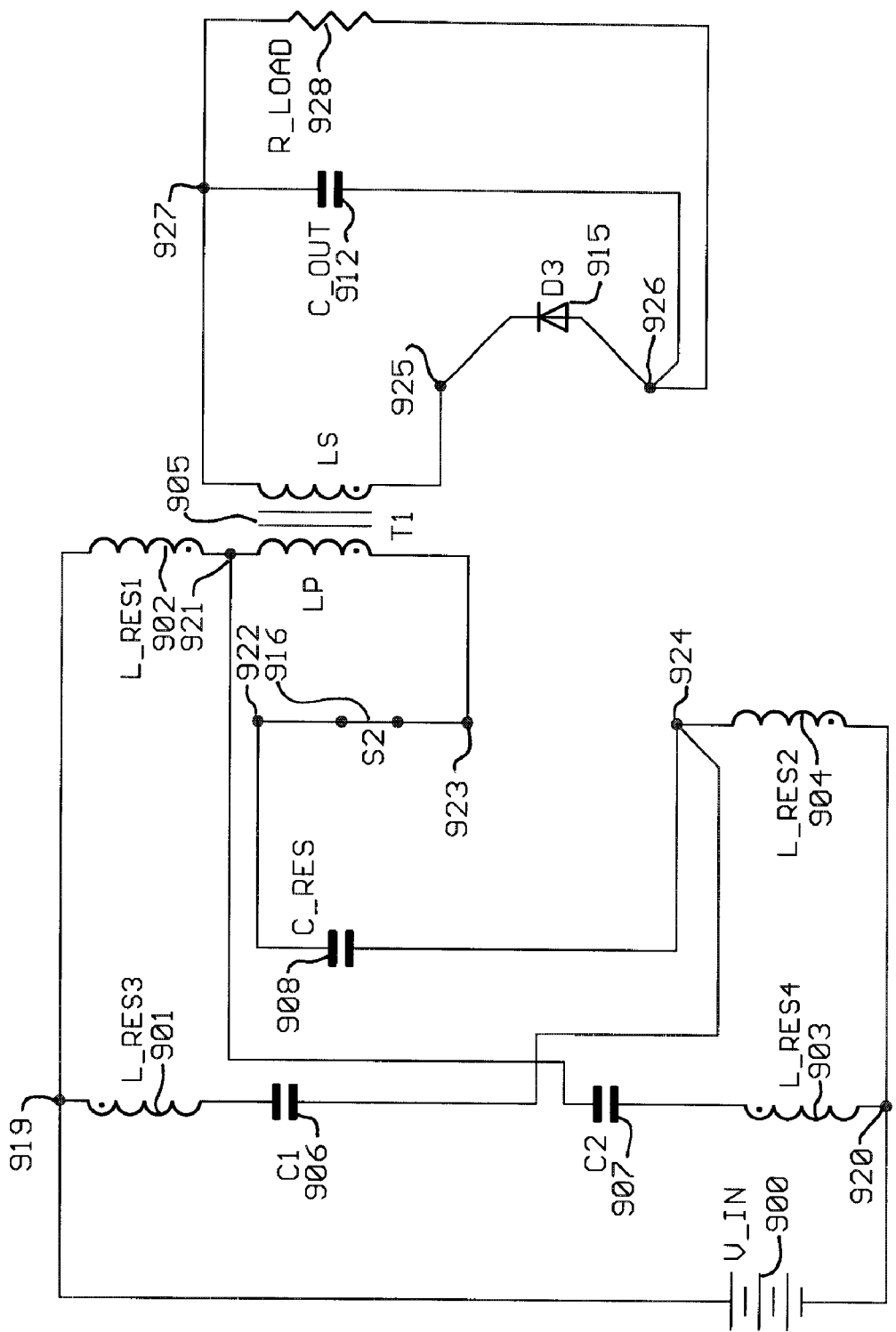

FIG. 133 illustrates a third phase of a turn off transition of the FIG. 127 circuit.

Figure 134:
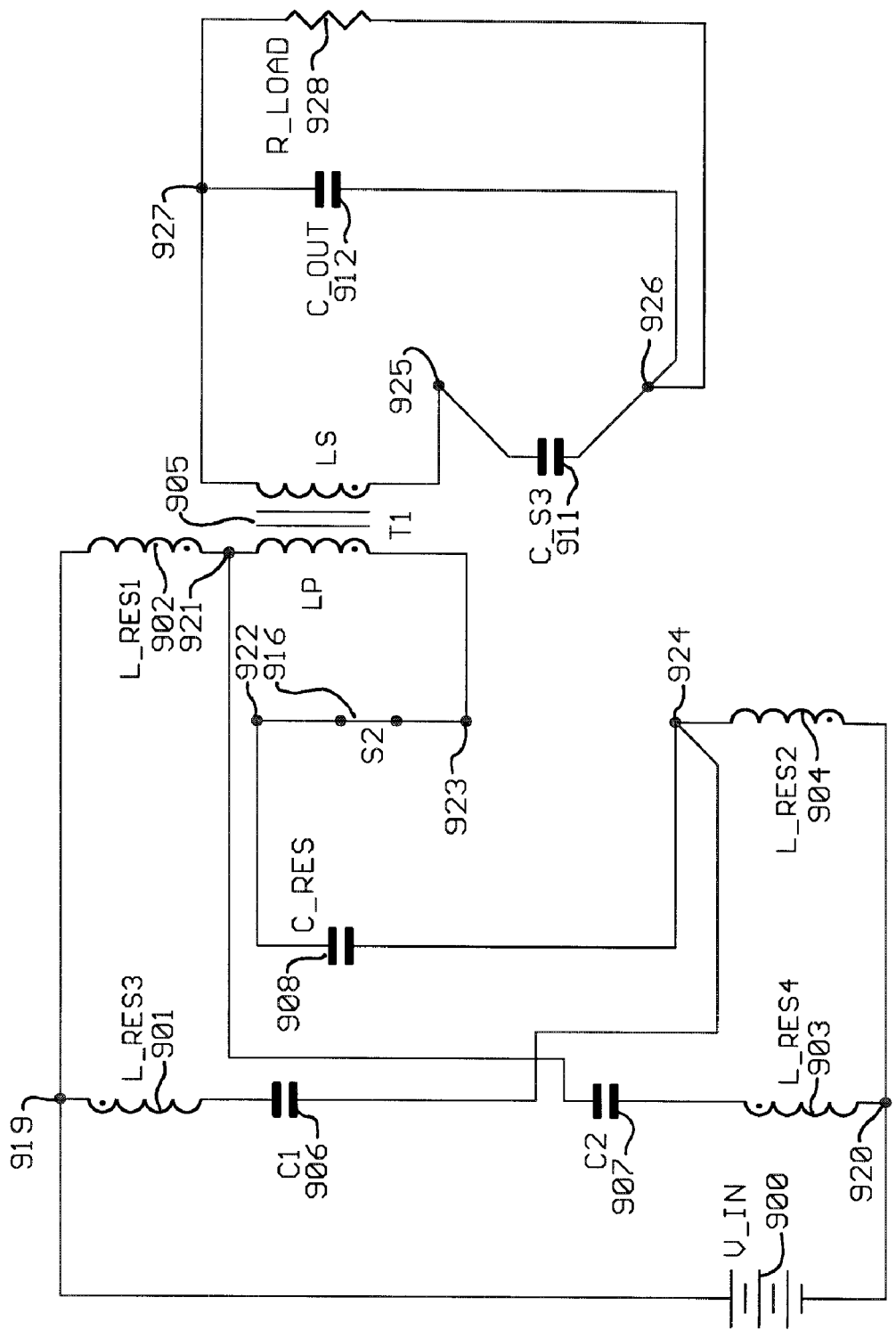

FIG. 134 illustrates a fourth phase of a turn off transition of the FIG. 127 circuit.

Figure 135:
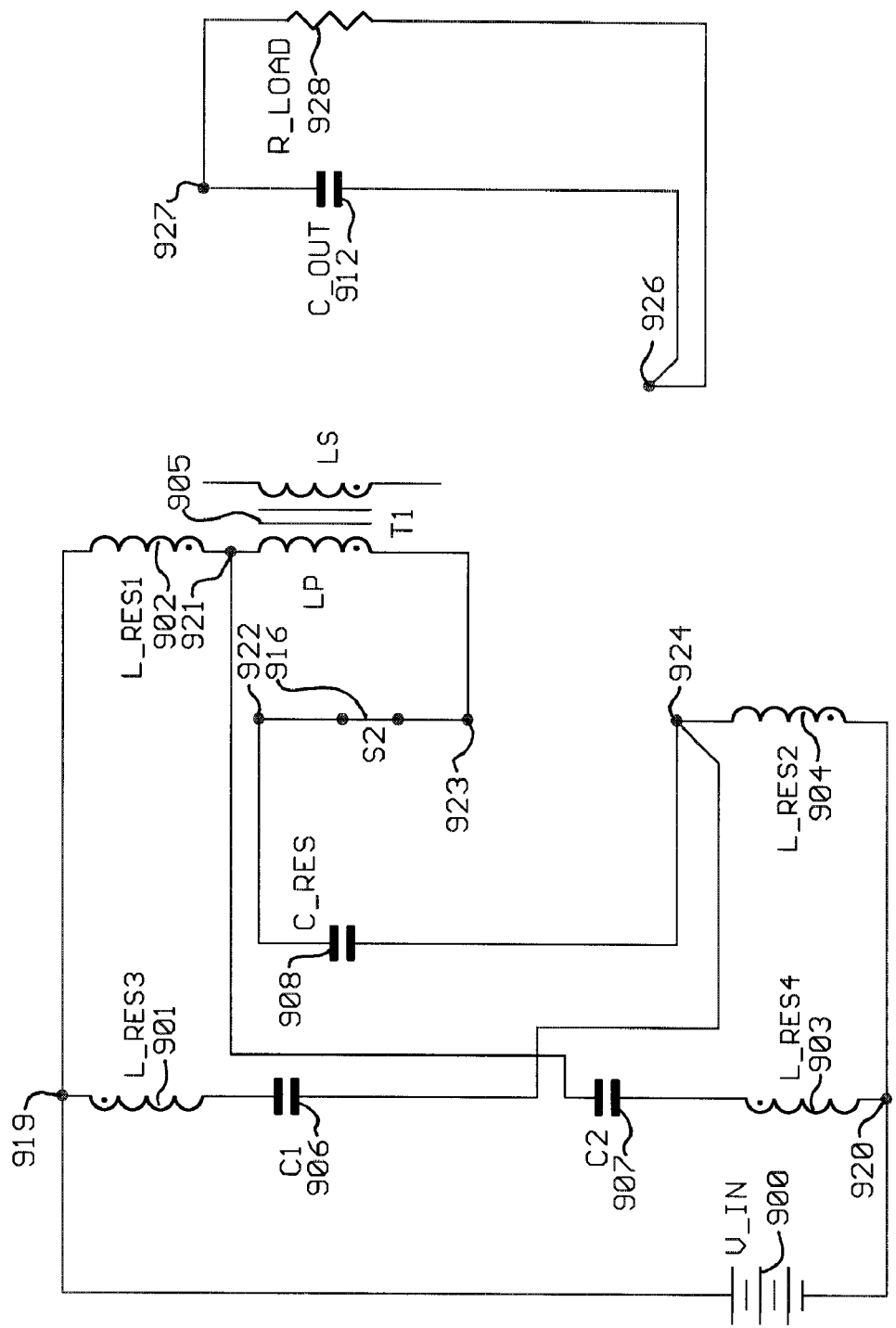

FIG. 135 illustrates an off state of the FIG. 127 circuit.

Figure 136:
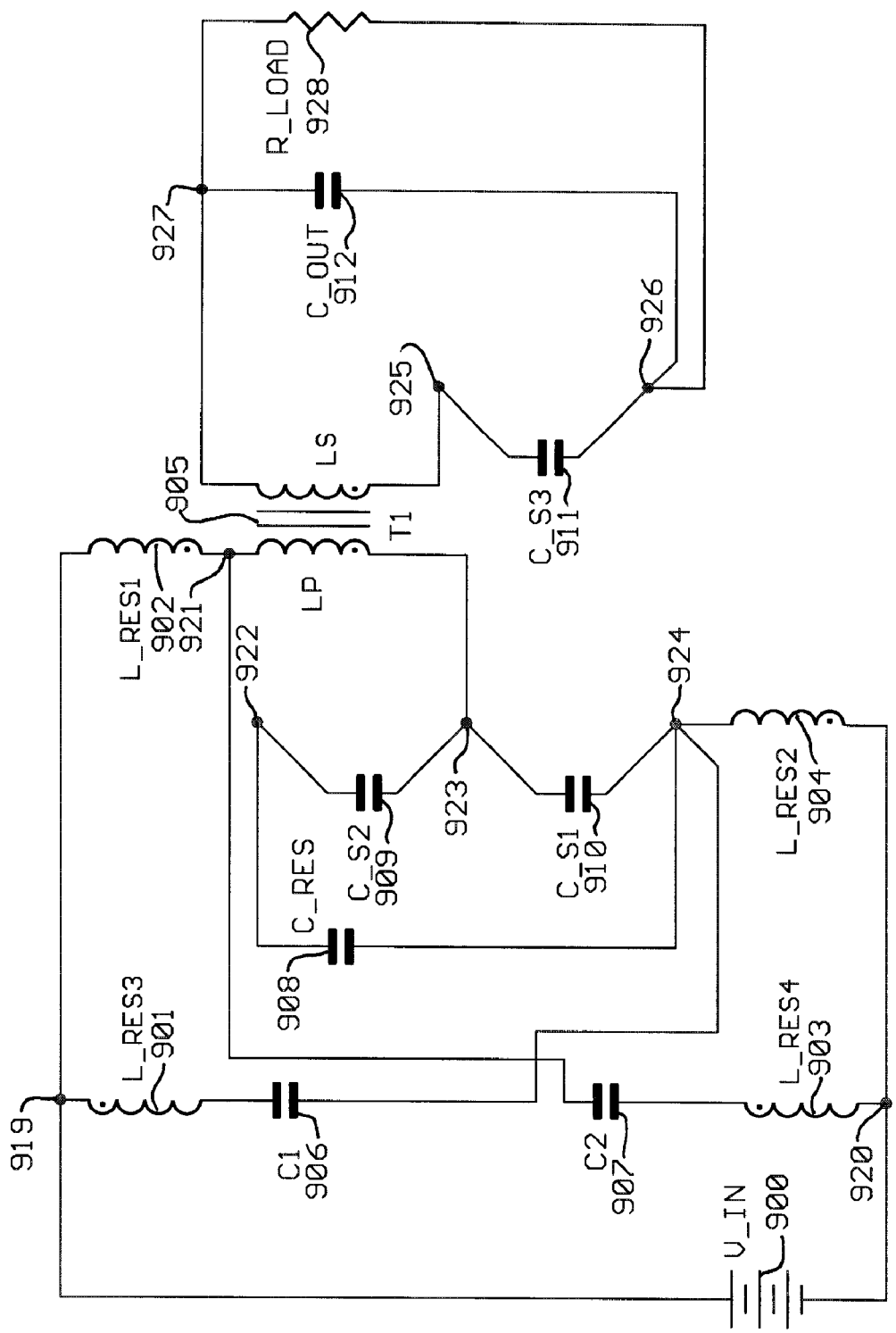

FIG. 136 illustrates a first phase of a turn on transition of the FIG. 127 circuit.

Figure 137:
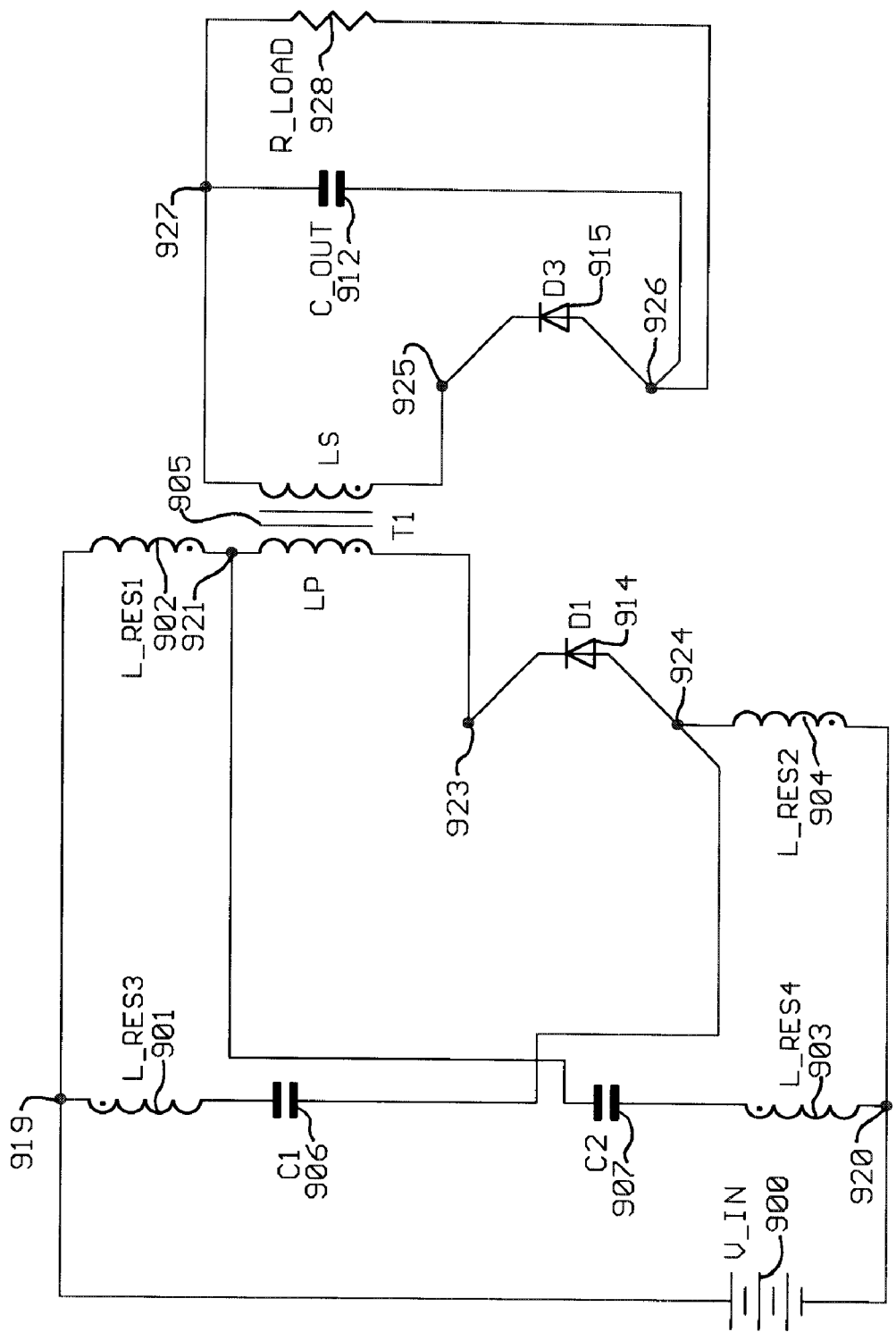

FIG. 137 illustrates a second phase of a turn on transition of the FIG. 127 circuit.

Figure 138:
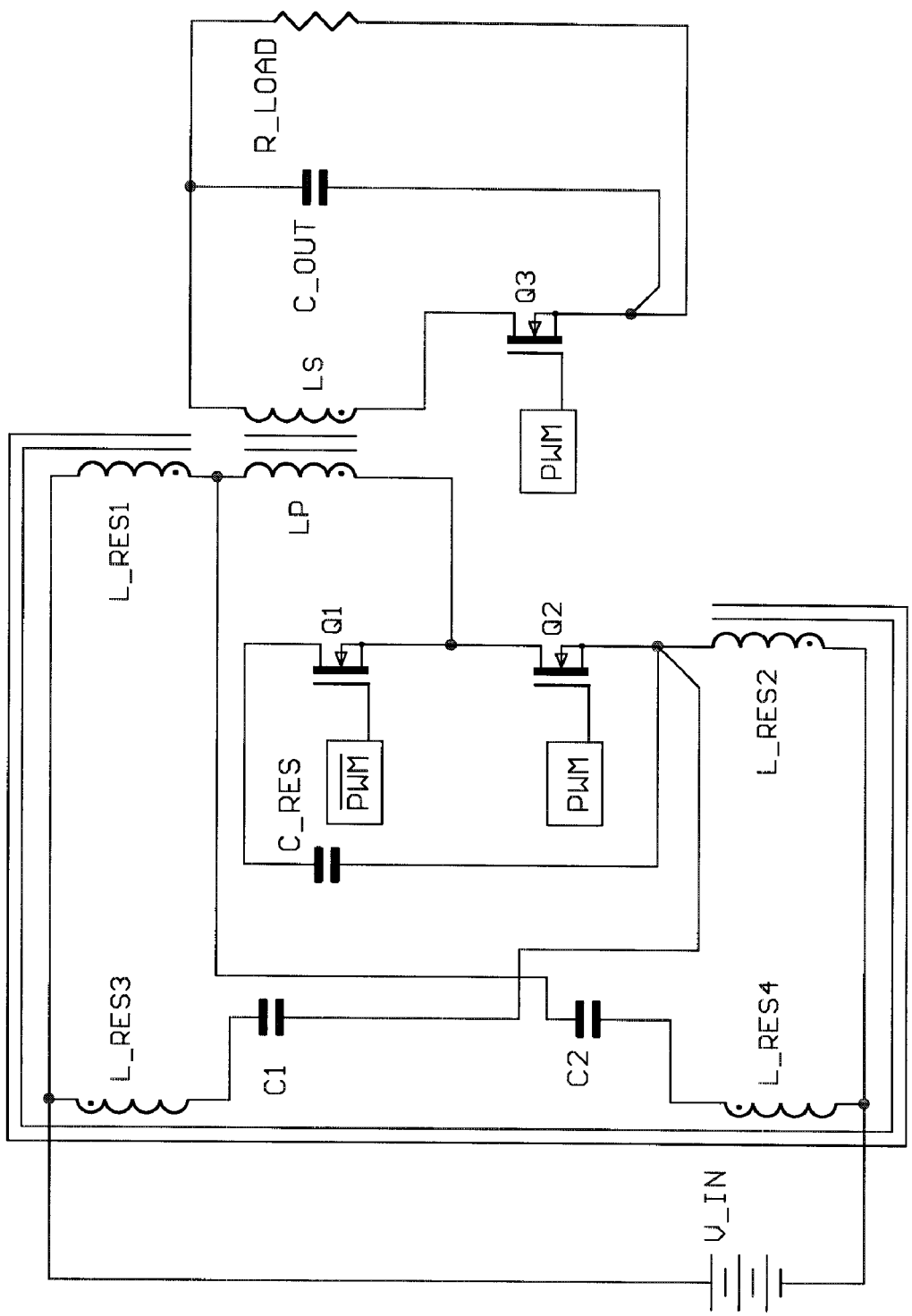

FIG. 138 illustrates the FIG. 127 circuit with all four primary inductors coupled on a single common core and with all three switches implemented using mosfets.

Figure 139:
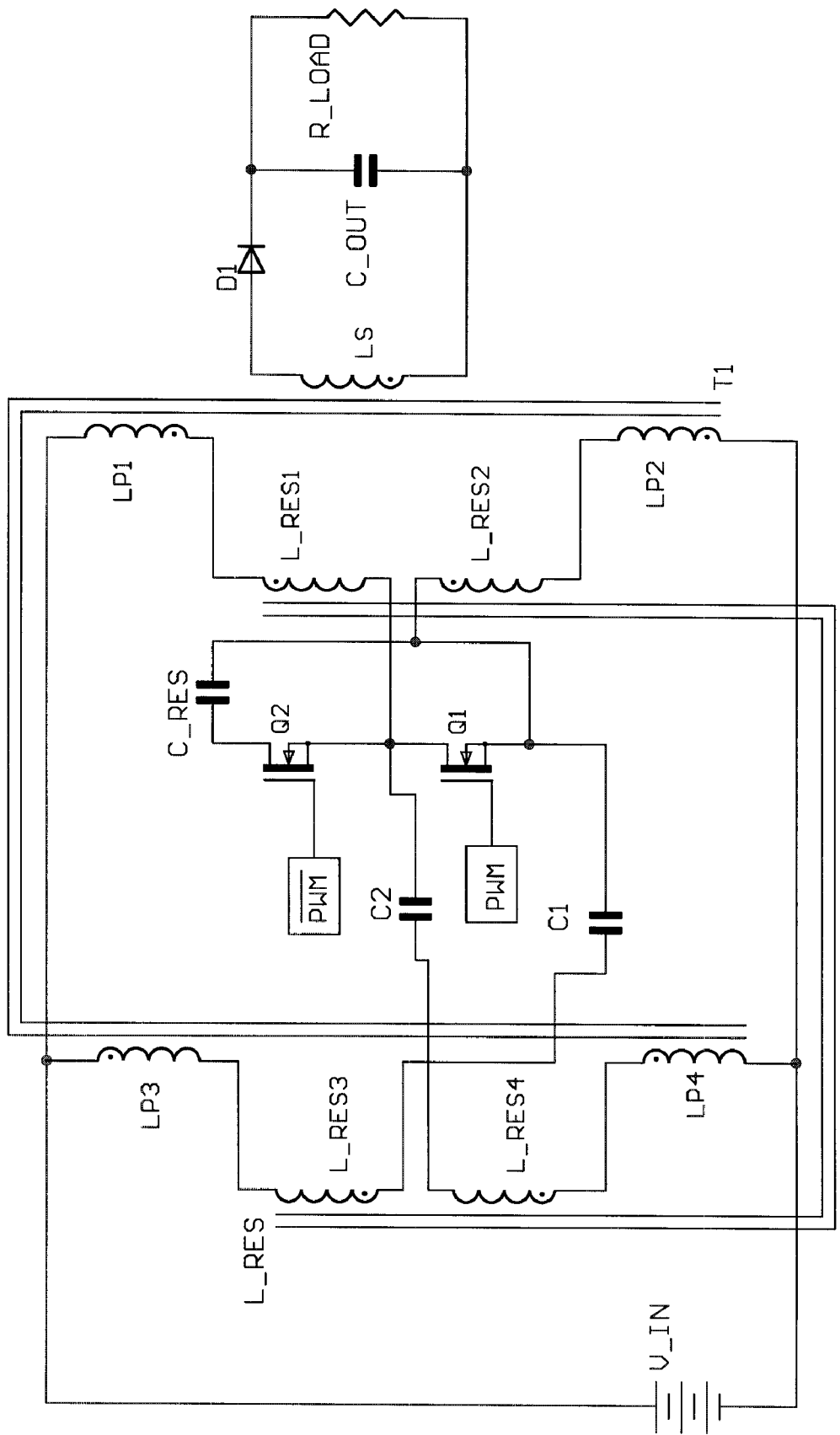

FIG. 139 illustrates the FIG. 138 circuit with the transformer primary winding split into four windings relocated to enhance the ripple cancellation and with the secondary switch implemented with a diode.

Figure 140:
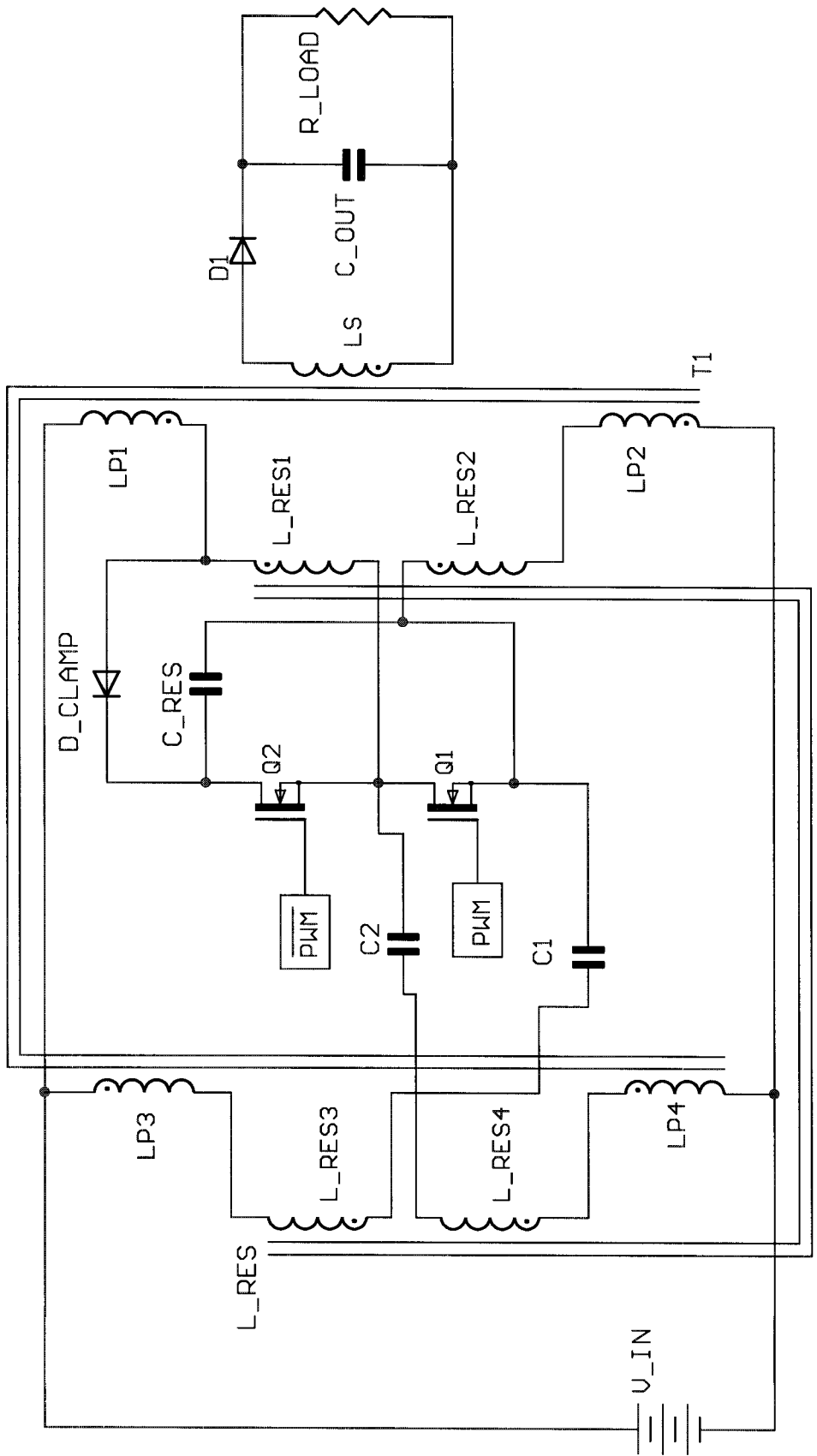

FIG. 140 illustrates the FIG. 139 circuit with a diode added to clamp ringing associated with the primary inductors and the circuit parasitic capacitors.

Figure 141:
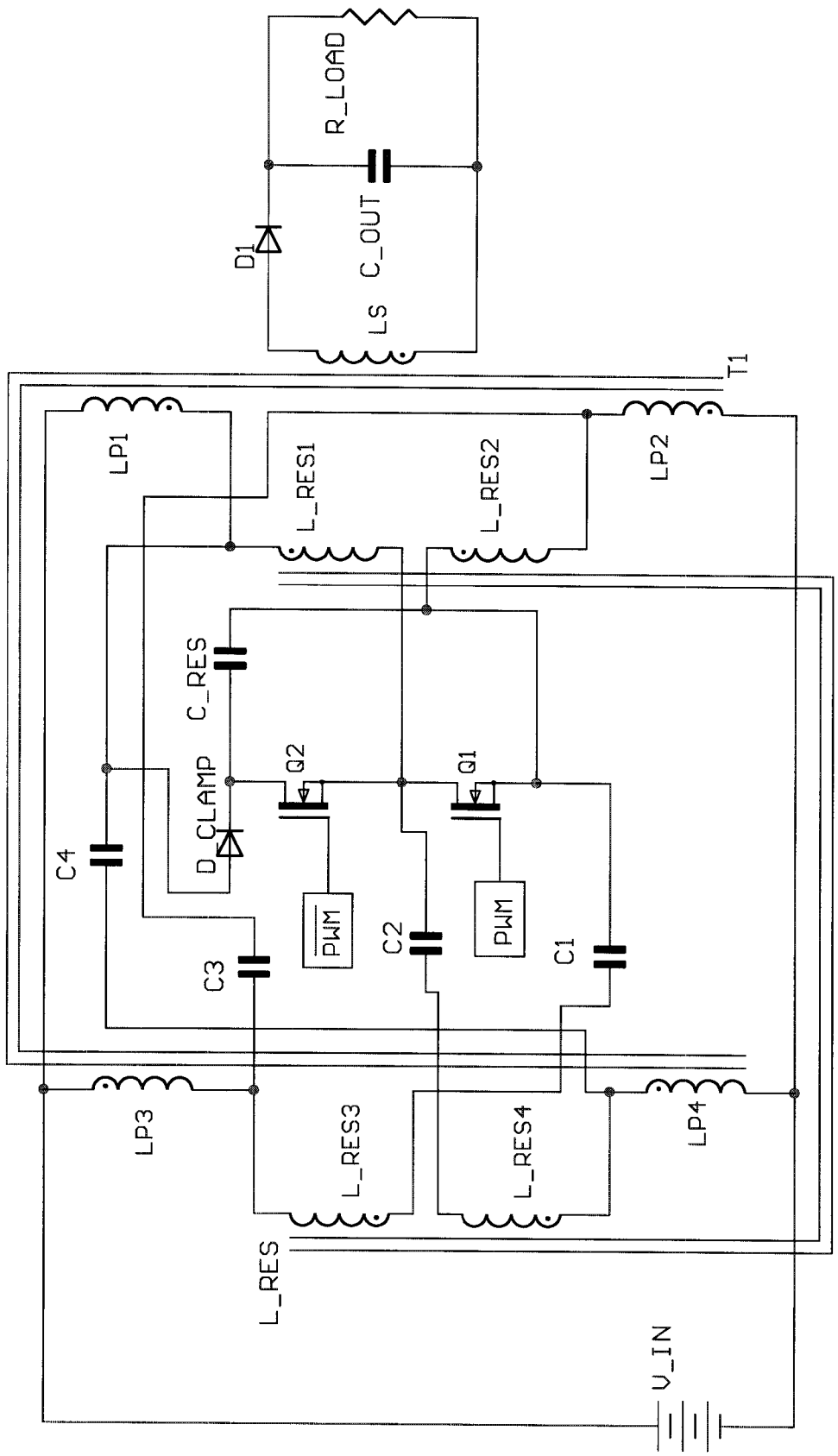

FIG. 141 illustrates the FIG. 140 circuit with capacitors added to enhance the ripple cancellation.

| Reference Numerals | | | |
|---|---|---|---|
| 100 | terminal | 101 | terminal |
| 102 | terminal | 103 | inductor |
| 104 | inductor | 105 | inductor |
| 106 | inductor | 107 | inductor |
| 108 | inductor | 109 | capacitor |
| 110 | capacitor | 111 | capacitor |
| 112 | capacitor | 113 | switch |
| 114 | switch | 115 | node |
| 116 | node | 117 | node |
| 118 | node | 119 | node |
| 120 | node | 121 | node |
| 200 | terminal | 201 | terminal |
| 202 | terminal | 203 | inductor |
| 204 | inductor | 205 | inductor |
| 206 | inductor | 207 | inductor |
| 208 | inductor | 209 | inductor |
| 210 | switch | 211 | switch |
| 212 | capacitor | 213 | capacitor |
| 214 | capacitor | 215 | capacitor |
| 216 | capacitor | 217 | node |
| 218 | node | 218 | node |
| 219 | node | 220 | node |
| 221 | node | 222 | node |
| 223 | node | 300 | terminal |
| 301 | terminal | 302 | terminal |
| 303 | inductor | 304 | inductor |
| 305 | inductor | 306 | inductor |
| 307 | inductor | 308 | inductor |
| 309 | inductor | 310 | switch |

| Reference Numerals (continued) | | | |
|---|---|---|---|
| 311 | switch | 312 | capacitor |
| 313 | capacitor | 314 | capacitor |
| 315 | capacitor | 316 | node |
| 317 | node | 318 | node |
| 319 | node | 320 | node |
| 321 | node | 322 | node |
| 400 | terminal | 401 | terminal |
| 402 | terminal | 403 | inductor |
| 404 | inductor | 405 | inductor |
| 406 | inductor | 407 | capacitor |
| 408 | capacitor | 409 | switch |
| 410 | switch | 411 | node |
| 412 | node | 413 | node |
| 414 | node | 500 | source |
| 501 | transformer | 502 | inductor |
| 503 | inductor | 504 | inductor |
| 505 | inductor | 506 | capacitor |
| 507 | capacitor | 508 | capacitor |
| 509 | capacitor | 510 | capacitor |
| 511 | capacitor | 512 | capacitor |
| 513 | switch | 514 | switch |
| 515 | switch | 516 | diode |
| 517 | diode | 518 | diode |
| 519 | load | 520 | node |
| 521 | node | 522 | node |
| 523 | node | 524 | node |
| 525 | node | 526 | node |
| 527 | node | 528 | node |
| 600 | source | 601 | inductor |
| 602 | inductor | 603 | inductor |
| 604 | inductor | 605 | transformer |
| 606 | capacitor | 607 | capacitor |
| 608 | capacitor | 609 | capacitor |
| 610 | capacitor | 611 | capacitor |
| 612 | capacitor | 613 | load |
| 614 | diode | 615 | diode |
| 616 | diode | 617 | switch |
| 618 | switch | 619 | switch |
| 620 | node | 621 | node |
| 622 | node | 623 | node |
| 624 | node | 625 | node |
| 626 | node | 627 | node |
| 700 | source | 701 | transformer |
| 702 | transformer | 703 | inductor |
| 704 | inductor | 705 | inductor |
| 706 | inductor | 707 | capacitor |
| 708 | capacitor | 709 | capacitor |
| 710 | capacitor | 711 | capacitor |
| 712 | capacitor | 713 | capacitor |
| 714 | capacitor | 715 | load |
| 716 | diode | 717 | diode |
| 718 | diode | 719 | diode |
| 720 | switch | 721 | switch |
| 722 | switch | 723 | switch |
| 724 | node | 725 | node |
| 726 | node | 727 | node |
| 728 | node | 729 | node |
| 730 | node | 731 | node |
| 732 | node | 733 | node |
| 734 | node | 735 | node |
| 800 | source | 801 | inductor |
| 802 | inductor | 803 | inductor |
| 804 | inductor | 805 | inductor |
| 806 | transformer | 807 | capacitor |
| 808 | capacitor | 809 | capacitor |
| 810 | capacitor | 811 | capacitor |
| 812 | capacitor | 813 | capacitor |
| 814 | capacitor | 815 | load |
| 816 | diode | 817 | diode |
| 818 | diode | 819 | diode |
| 820 | switch | 821 | switch |
| 822 | switch | 823 | switch |
| 824 | node | 825 | node |
| 826 | node | 827 | node |
| 828 | node | 829 | node |
| 830 | node | 831 | node |
| 832 | node | 833 | node |

-continued

Reference Numerals

| 834 | node | 835 | lead |
|---|---|---|---|
| 900 | source | 901 | inductor |
| 902 | inductor | 903 | inductor |
| 904 | inductor | 905 | transformer |
| 906 | capacitor | 907 | capacitor |
| 908 | capacitor | 909 | capacitor |
| 910 | capacitor | 911 | capacitor |
| 912 | capacitor | 913 | diode |
| 914 | diode | 915 | diode |
| 916 | switch | 917 | switch |
| 918 | switch | 919 | node |
| 920 | node | 921 | node |
| 922 | node | 923 | node |
| 924 | node | 925 | node |
| 926 | node | 927 | node |
| 928 | node | | |

SUMMARY

The subject invention uses multiple inductors or a coupled multiple winding inductor arranged so that AC ripple current cancellation is achieved from a pair of inductors or windings connected at the same network terminal. The subject networks can provide cancellation at one or more network terminals using networks with two or more switches. Buck, boost, flyback, buck complement, boost complement, flyback complement, tapped inductor, and isolated converters using the ripple current cancellation techniques and processes are revealed. Isolated converters with zero voltage switching and zero ripple input source current are also revealed. The most preferred embodiments couple the inductors on a common core so that only one or two magnetic circuit elements are required.

DESCRIPTION OF THE PREFERRED EMBODIMENTS

Figure 1:
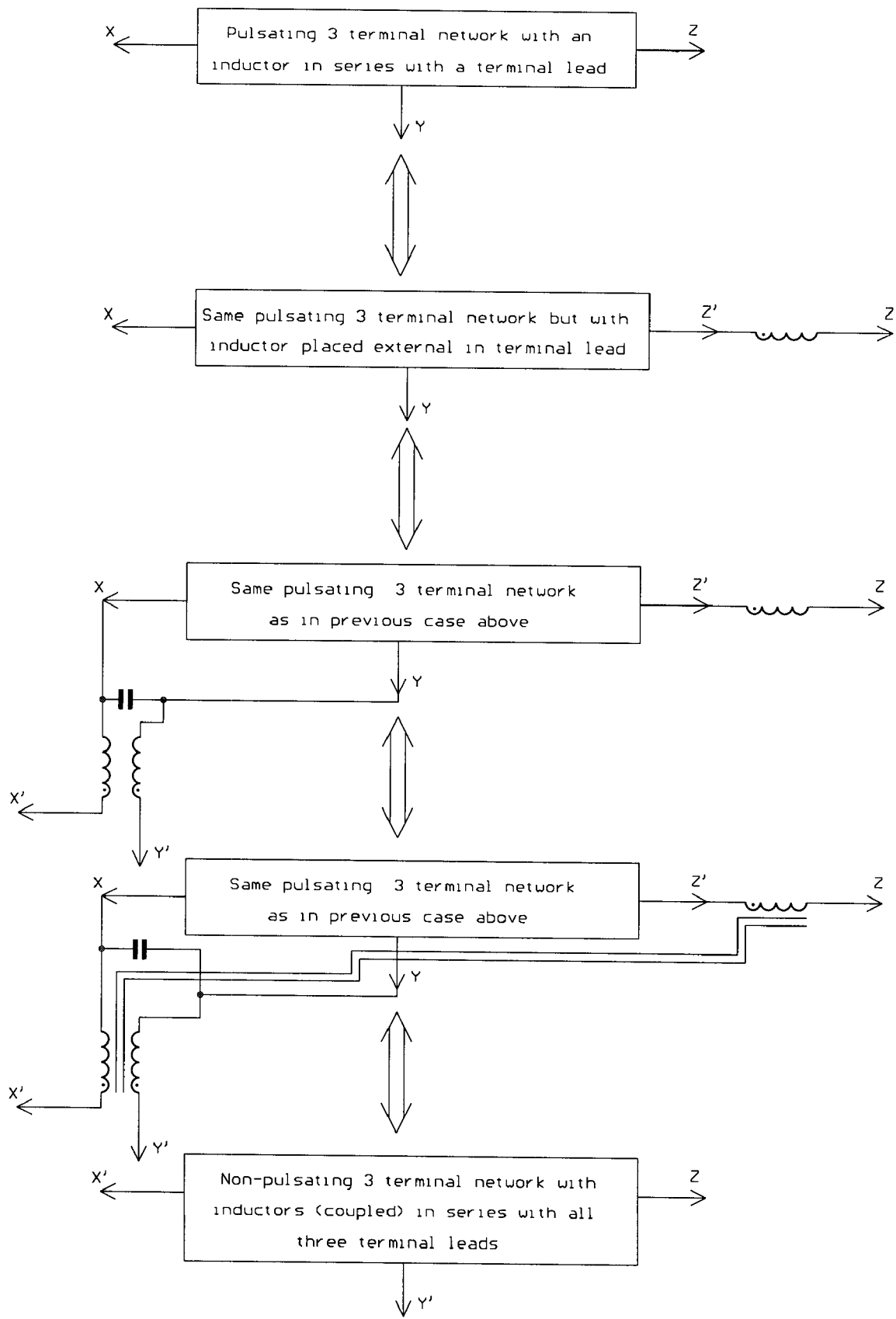
FIG. 1 illustrates a generalized methodology for transforming pulsating three terminal networks with an inductor in series with one of the terminal leads to equivalent non-pulsating three terminal networks with inductors in series with all three terminal leads.
Figure 2:
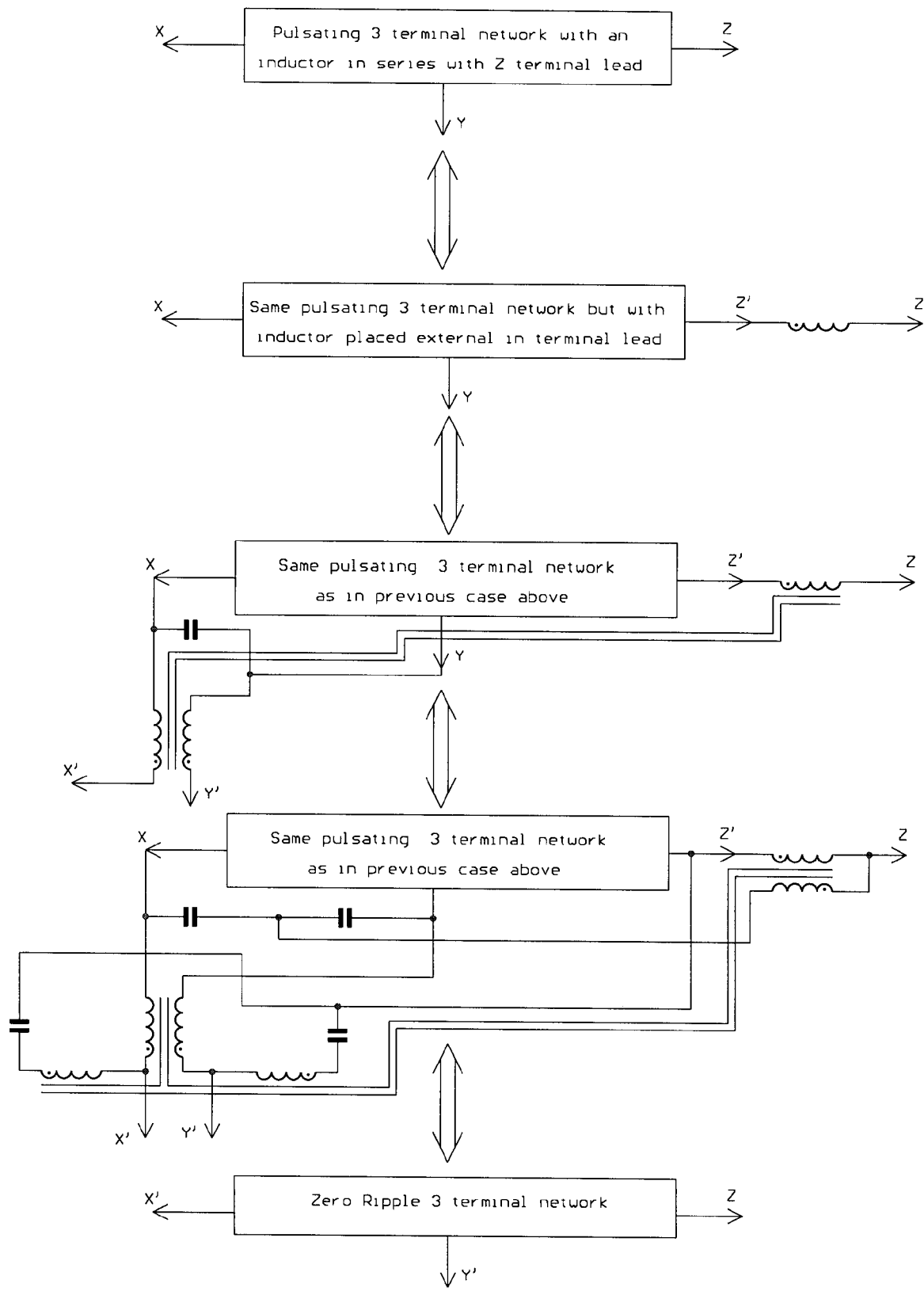
FIG. 2 illustrates a generalized methodology for transforming pulsating three terminal networks with an inductor in series with one of the terminal leads to equivalent ripple free three terminal networks with ripple cancellation mechanism at all three terminal leads.

FIG. 2 illustrates a process similar to the process illustrated in FIG. 1. The process illustrated in FIG. 2 yields a three terminal network in which the terminal currents at all three terminals are zero. FIG. 2 provides two windings at each network terminal. The ripple current at each terminal has a contribution from each of the two windings and, as can be seen by the winding polarities, the ramp slope of the two windings at a network terminal are opposite in sign. If the winding slopes are equal in magnitude then the cancellation will be complete and the net ripple current slope at the terminal will be zero. The process illustrated by FIG. 2 accomplishes zero ripple current slope without adding extra switches. No complex coupling schemes or complex winding ratio schemes are required. The process illustrated can accomplish the desired results using 6 windings of equal turns wound on a simple toroid or a core of any common shape.

PWM SPDT Three Terminal Network With Six Inductors

Figure 3:
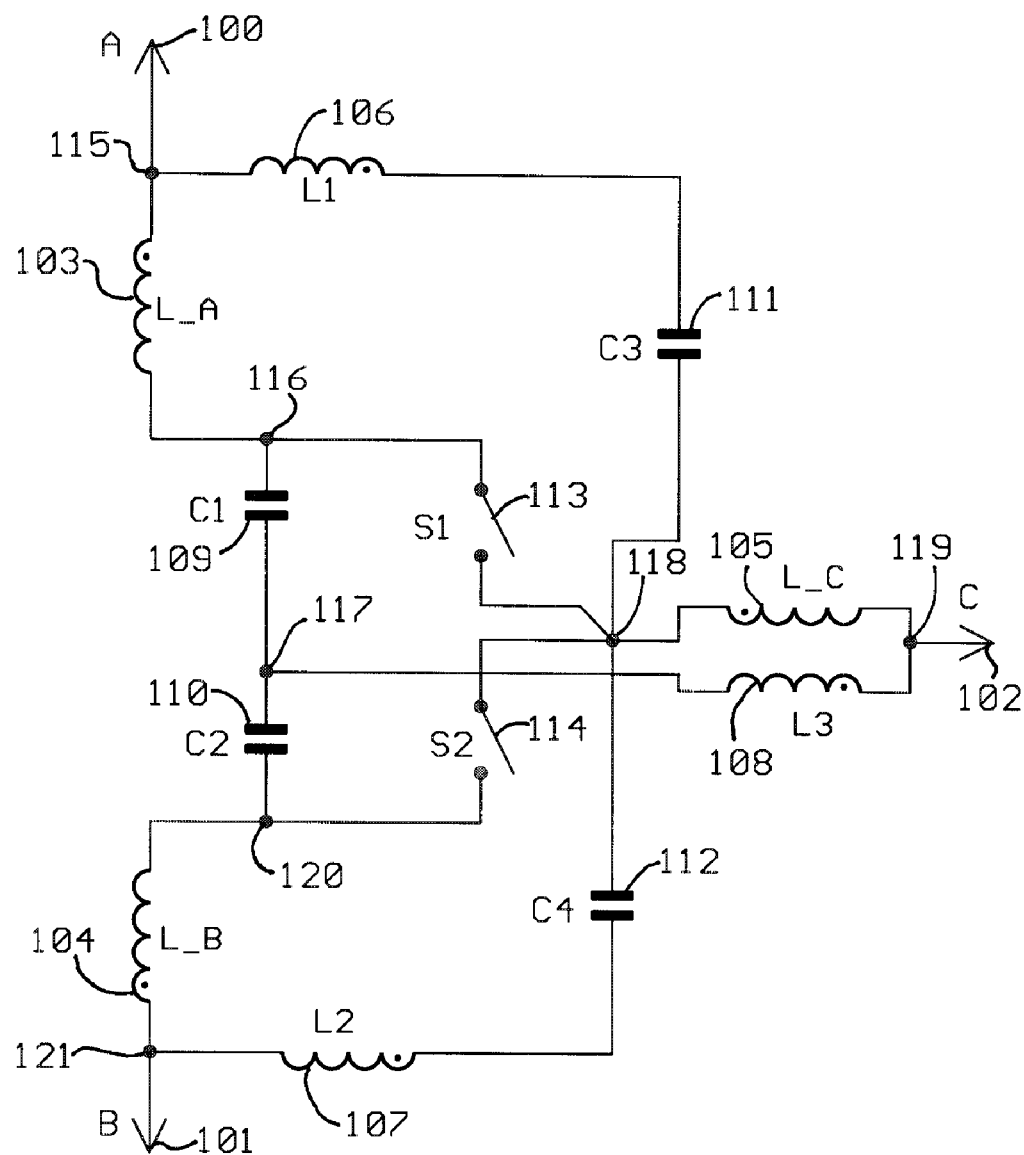
FIG. 3 illustrates a simple pulse width modulated (PWM) single pole double throw (SPDT) switching cell according to the subject invention with ripple cancellation mechanism at each terminal.

FIG. 3 illustrates a three terminal network which is a PWM SPDT power conversion network to which the unified PWM SPDT transfer function applies, given by $$V_C = V_B + D \cdot (V_A - V_B). \quad (1)$$

Equation (1) applies to single inductor circuits such as the buck, boost, and flyback converters as well as to multiple inductor variations of these basic converters such as the Cuk converter. In general, if properly implemented adding inductors improves the terminal current properties. Using a six inductor network all three terminal currents can be made to have zero ripple using a ripple cancellation technique. Six inductors may at first seem to be a high price to pay for achieving zero ripple current at all terminals except for the fact that the six inductors can have equal AC winding voltages and can be combined onto a single common core about the same size or only marginally larger than a single inductor equivalent from a single inductor equivalent circuit with pulsating terminal currents.

The conversion network contains six inductors, four capacitors, and two switches that function as a single PWM SPDT switch. The circuit achieves zero ripple currents for all terminals. This fact is apparent based on the fact that each terminal is connected to a pair of inductors with opposite ripple current slope. The three terminals are connected to two voltage sources and a load. One of the voltage sources may be ground. No restrictions are imposed on which terminals are connected to which sources or which terminal is connected to the load.

Referring to FIG. 3 there is shown a three terminal PWM SPDT power conversion network in which input DC voltages are converted into an output DC voltage. The circuit requires two input sources, one of which may be ground, of substantially DC voltage, six inductors, four capacitors, and two switches. For purposes of the operational state analysis, it is assumed that the capacitors are sufficiently large that the voltage developed across the capacitor is approximately constant over a switching interval. Also, for purposes of the operational state analysis, it is assumed that the inductance of each inductor is the same for all six inductors. Also, for purposes of the operational state analysis, it is assumed that the input DC voltage sources have sufficiently low source impedance that the voltages developed across the input DC voltage sources are approximately constant over a switching interval. It will finally be assumed that the power switches are ideal, that is, lossless and able to carry current in either direction.

Structure

The structure of the circuit of the subject invention is shown in FIG. 3. A first network terminal 100 is connected to a node 115. The node 115 is connected to a dotted terminal of an inductor 103 and to an undotted terminal of an inductor 106. An undotted terminal of inductor 103 is connected to a node 116. A dotted terminal of inductor 106 is connected to a first terminal of a capacitor 111. The node 116 is connected to a first terminal of a capacitor 109 and to a first terminal of a switch 113. A second terminal of switch 113 is connected to a node 118. A second terminal of capacitor 109 is connected to a node 117. A first terminal of a switch 114 is connected to node 118. A second terminal of switch 114 is connected to a node 120. A first terminal of a capacitor 110 is connected to node 117. A second terminal of capacitor 110 is connected to node 120. A second terminal of capacitor 111 is connected to node 118. An undotted terminal of an inductor 104 is connected to node 120. A dotted terminal of inductor 104 is connected to a node 121. The node 121 is connected to a second network terminal 101. A dotted terminal of an inductor 105 is connected to the node 118. An undotted terminal of inductor 105 is connected to a node 119. The node 119 is connected to a third network terminal 102. An undotted terminal of an inductor 107 is connected to the node 121. A dotted terminal of inductor 107 is connected to a first terminal of a capacitor 112. A second terminal of capacitor 112 is connected to the node 118. A dotted terminal of an inductor 108 is connected to node 119. An undotted terminal of inductor 108 is connected to node 117.

Operation

Figure 4:
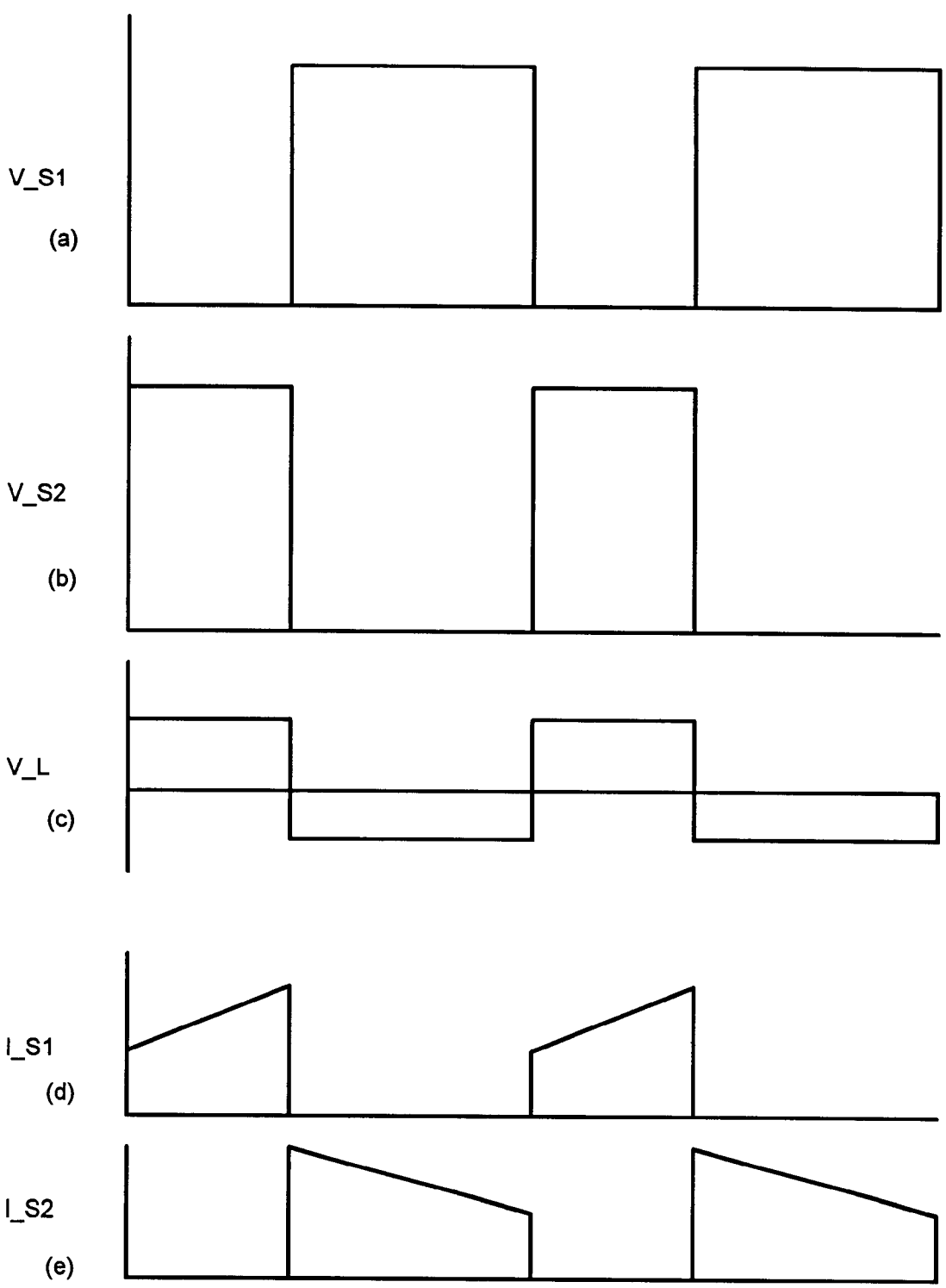
FIG. 4 illustrates the switch voltage and current wave forms and the inductor voltage wave form for the FIG. 3 network.
Figure 5:
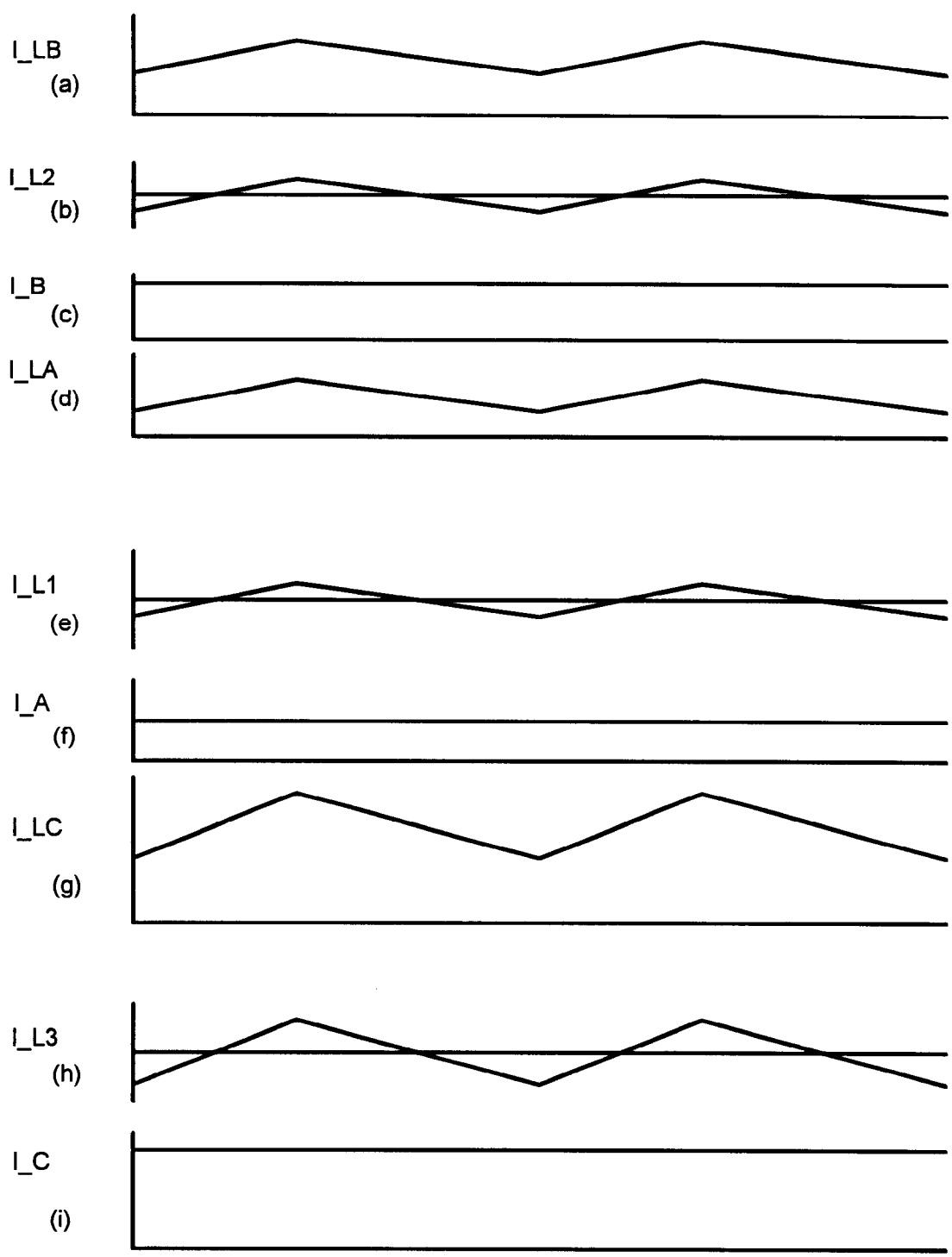
FIG. 5 illustrates inductor current wave forms for the FIG. 3 network.
Figure 6:
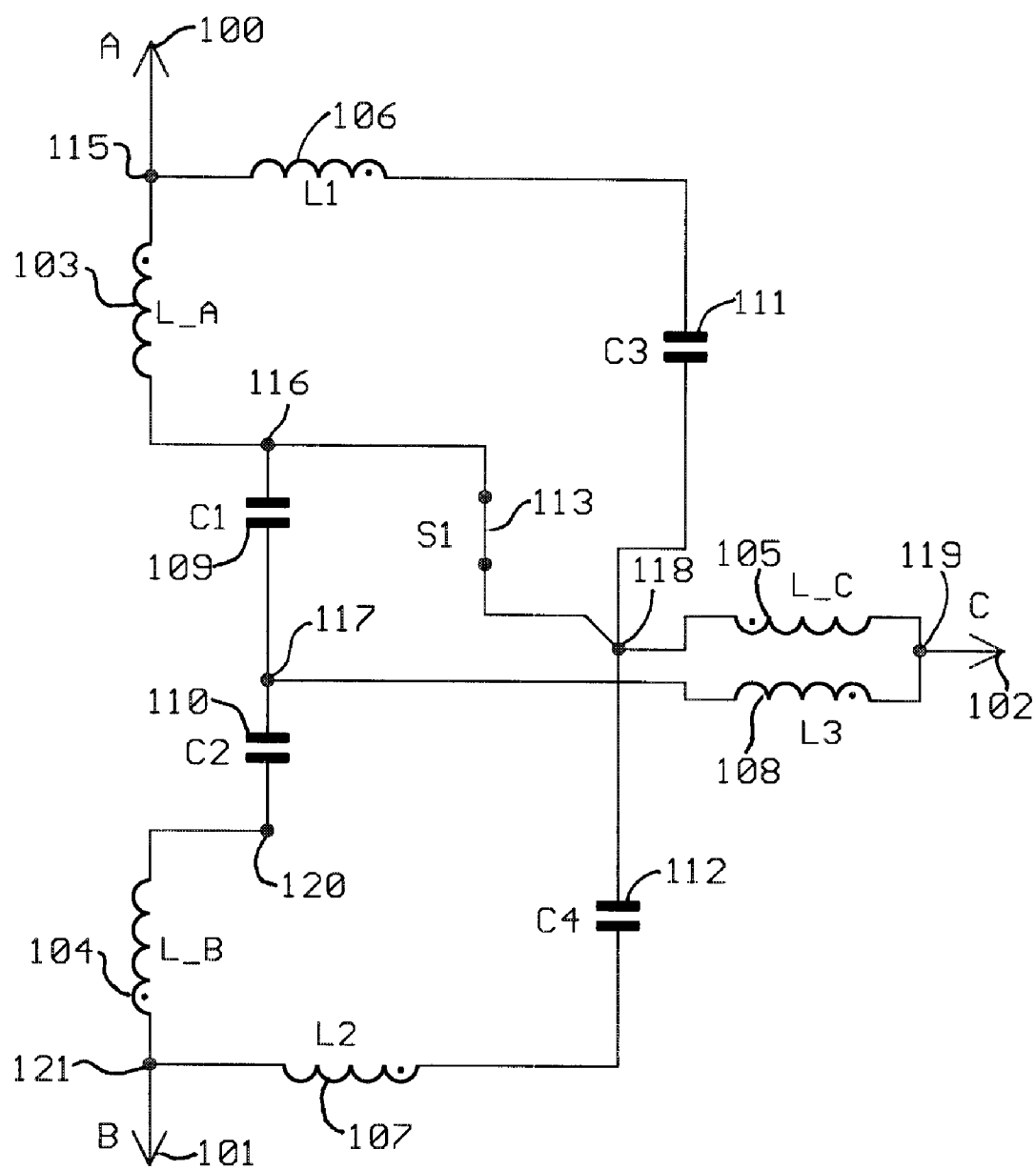
FIG. 6 illustrates the on state of the FIG. 3 network.

It is assumed in this analysis that the system has reached a settled operating condition. Except for the short, but finite, switching intervals there are two states of the circuit of FIG. 3, an on state and an off state. We will assume for the operational state analysis that the A first network terminal 100 voltage is more positive than the C third network terminal 102 voltage is greater than the B second terminal 101 voltage. The applied voltage to the capacitors 109 and 111 will be equal to the voltage difference between the A first network terminal 100 voltage, $V_A$ and the C third terminal 102 voltage, $V_C$, or $V_{C1} = V_{C3} = V_A - V_C$. This results from the fact that the terminals of the capacitors 109 and 111 are connected to the first and third network terminals 100 and 102 through inductors 103, 105, 108, and 106, whose average applied voltage is zero. By the same argument we can show that the applied voltage for capacitors 110 and 112 is given by $V_{C2} = V_{C4} = V_C - V_B$. Consider an initial condition as illustrated in FIG. 6. The initial condition represents the on state. During the initial condition the switch 113 is on (closed) and the switch 114 is off (open). The wave forms for each switch and inductor are illustrated in FIGS. 4 and 5. The current in the inductor 103, $I_{LA}$, is flowing from top to bottom into the dotted terminal and out of the undotted terminal. The current in the inductor 104, $I_{LB}$, is flowing from bottom to top into the dotted terminal and out of the undotted terminal. The current in the inductor 105, $I_{LC}$, is flowing from left to right into the dotted terminal and out of the undotted terminal. The currents in the inductors 106, 107, and 108 will be near zero because only AC currents can flow in these inductors due to the capacitors in series with these inductors. The current in all the inductors will be increasing in value during the on state. For all of the inductors the dotted terminal will be positive with respect to the undotted terminal so that the current is increasing in all six inductors. For the node 115 and the terminal 100 the current flowing towards the dotted terminal of inductor 103 will be increasing while at the same time the current flowing from the undotted terminal of inductor 106 towards the node 115 and the terminal 100 will be increasing. During the on state the applied voltage to each inductor will be $$V_L = \frac{1}{2} \cdot (V_A - V_C).$$

Since the inductors all have the same inductance and the same applied voltage the slope of the current ramp in the inductors 103 and 106 will be equal. We can express the result mathematically using Lenz's Law, $$V_L = L \cdot \frac{di_L}{dt} \text{ or } \frac{di_L}{dt} = \frac{V_L}{L}.$$

The current slope in the terminal 100 will be equal to the difference in the current slopes of the inductors 103 and 106 or zero.

$$\frac{dI_A}{dt} = \frac{dI_{LA}}{dt} - \frac{dI_{LI}}{dt} = \frac{V_L}{L} - \frac{V_L}{L} = 0.$$

The current slopes of the inductors 103 and 106 cancel precisely. At each of the other two terminals the ripple current slopes of the two inductors connected to the subject terminal are equal and opposite so that the ripple currents cancel precisely.

Figure 7:
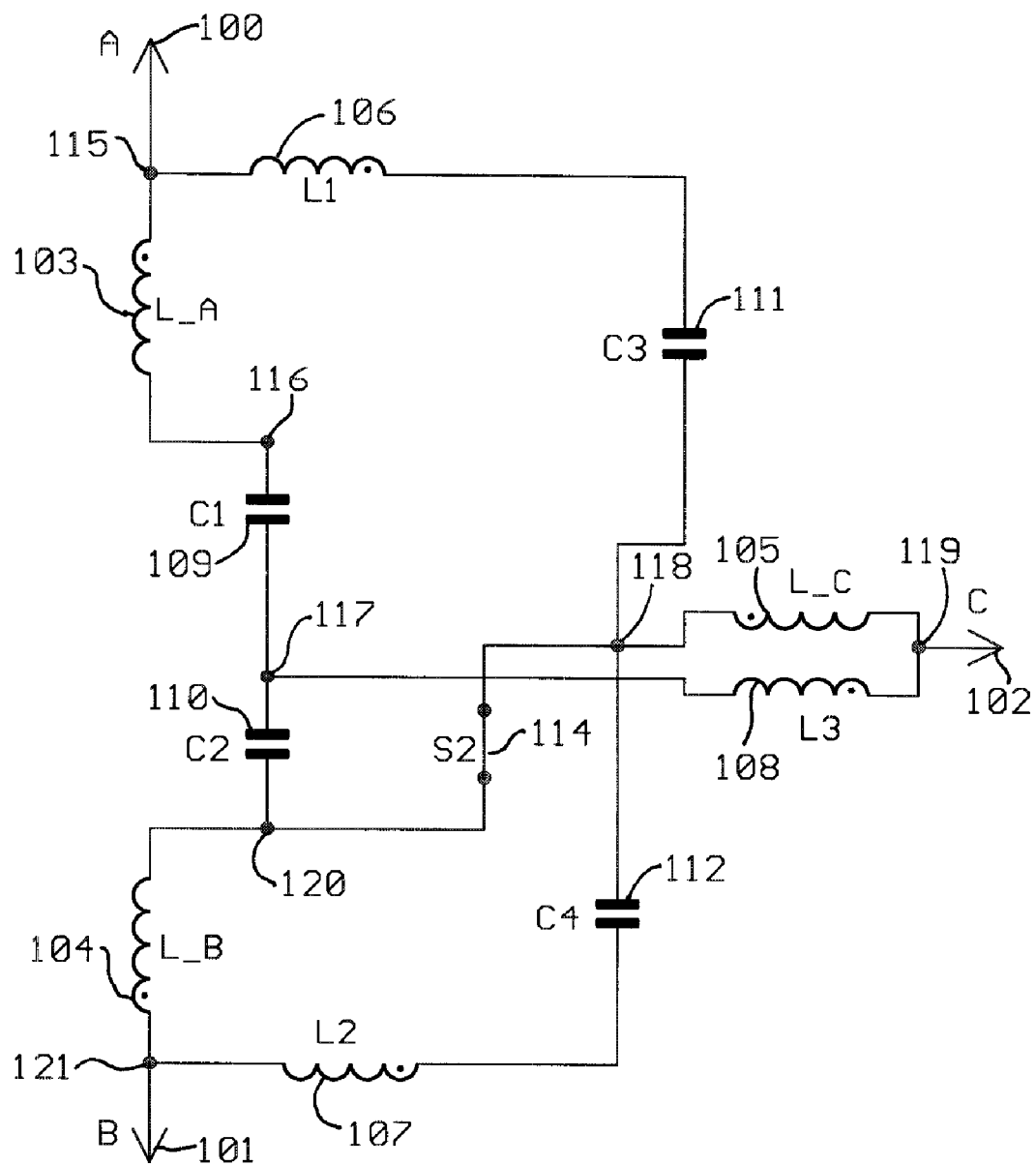
FIG. 7 illustrates the off state of the FIG. 3 network.

At a time determined by the control circuit the switches change state so that the S1 switch 113 is off (open) and the S2 switch 114 is on (closed) and the network enters the off state illustrated in FIG. 7. During the off state the applied voltage to each inductor will be $$V_L = \frac{1}{2} \cdot (V_B - V_C).$$

During the off state the current in each inductor will decrease. Since the inductors are equal in inductance and each inductor has the same applied voltage the current slope will be the same in each inductor. As a result of the equal current slopes and the inductor connection at each terminal the net current slope at each terminal will be zero since the current slopes from the two inductors cancel precisely. The terminal current slope cancellation is illustrated in FIG. 5. When the inductors currents have ramped down to their values at the beginning of the on state the switches 113 and 114 change state again and the cycle repeats.

In general the inductances and inductor voltages need not be equal in order to achieve zero ripple. In general the result is achieved when the ratios of inductor voltage to inductance are equal.

One can prove that the unified PWM SPDT transfer function, equation (1), applies by applying Faraday's Law to any of the six inductors which requires that the volt second product sum for any inductor is zero over a full switching cycle. For any one of the six inductors $$\frac{1}{2} \cdot (V_A - V_C) \cdot D + \frac{1}{2} \cdot (V_B - V_C) \cdot (1 - D) = 0, \tag{2}$$

where D is the duty cycle of the switch 113. By solving equation (2) for $V_C$ the result of equation (1) is obtained.

Related Embodiments

Figure 8:
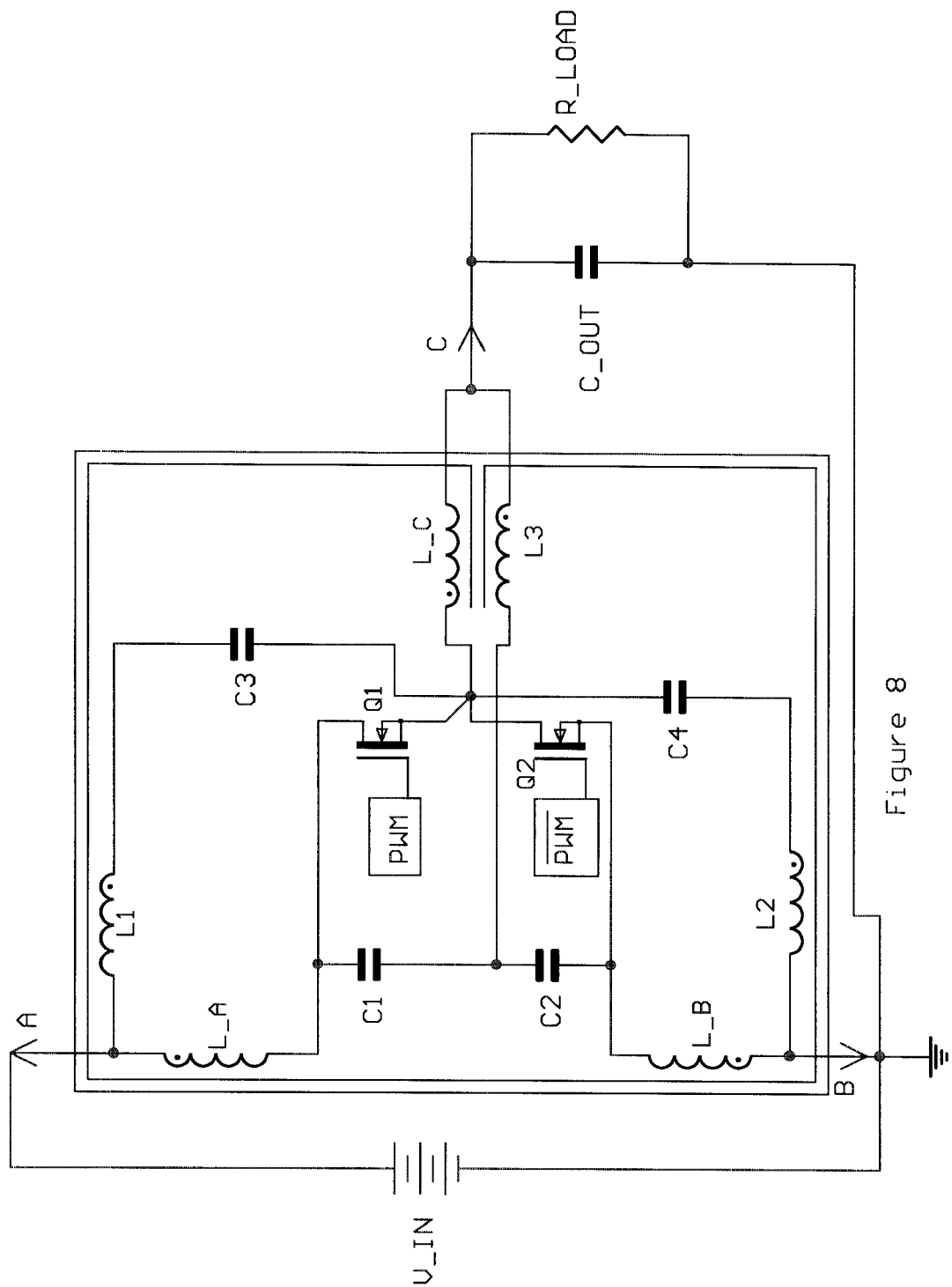
FIG. 8 illustrates a synchronous rectifier buck form of the subject invention.

FIG. 8 illustrates a buck embodiment of the FIG. 3 circuit in which the S1 switch 113 and the S2 switch 114 are implemented with power mosfets and all six inductors are loosely coupled on a single magnetic core. In general, inductors in the same circuit which have AC winding voltages that are proportional to their turns at all times can be coupled on a common core. This is the case with all six FIG. 3 inductors. With the six inductors coupled on a common core a single magnetic circuit element roughly equivalent in size and performance to the inductor of a conventional buck converter is realized. To accommodate the inductors which carry no DC current the window area must be increased slightly to provide the space needed for these extra three windings, but because these extra three windings carry no DC current the amount of extra window area needed is small. A conventional buck converter usually employs input and output capacitors. The FIG. 8 circuit has three additional capacitors which are required to achieve ripple current cancellation. The operation of loosely coupling the inductors on a common core reduces the amount of ripple cancellation, in general. The amount of cancellation is related to the degree of coupling so that windings that are loosely coupled will, in general, provide better ripple cancellation than tightly coupled windings. In the case of a transformer, as might be used in a forward or flyback circuit, tight coupling is essential for efficient noise free operation, however, for a coupled inductor as used here and as might be used for the coupled output choke of a multi-output forward converter the degree of coupling does not have a negative impact on the efficiency or noise performance, in fact a loosely coupled magnetic performs better, in general. In the case of the FIG. 8 circuit there is no penalty to be paid for loose coupling of the windings and the benefit of excellent ripple cancellation is achieved.

Figure 9:
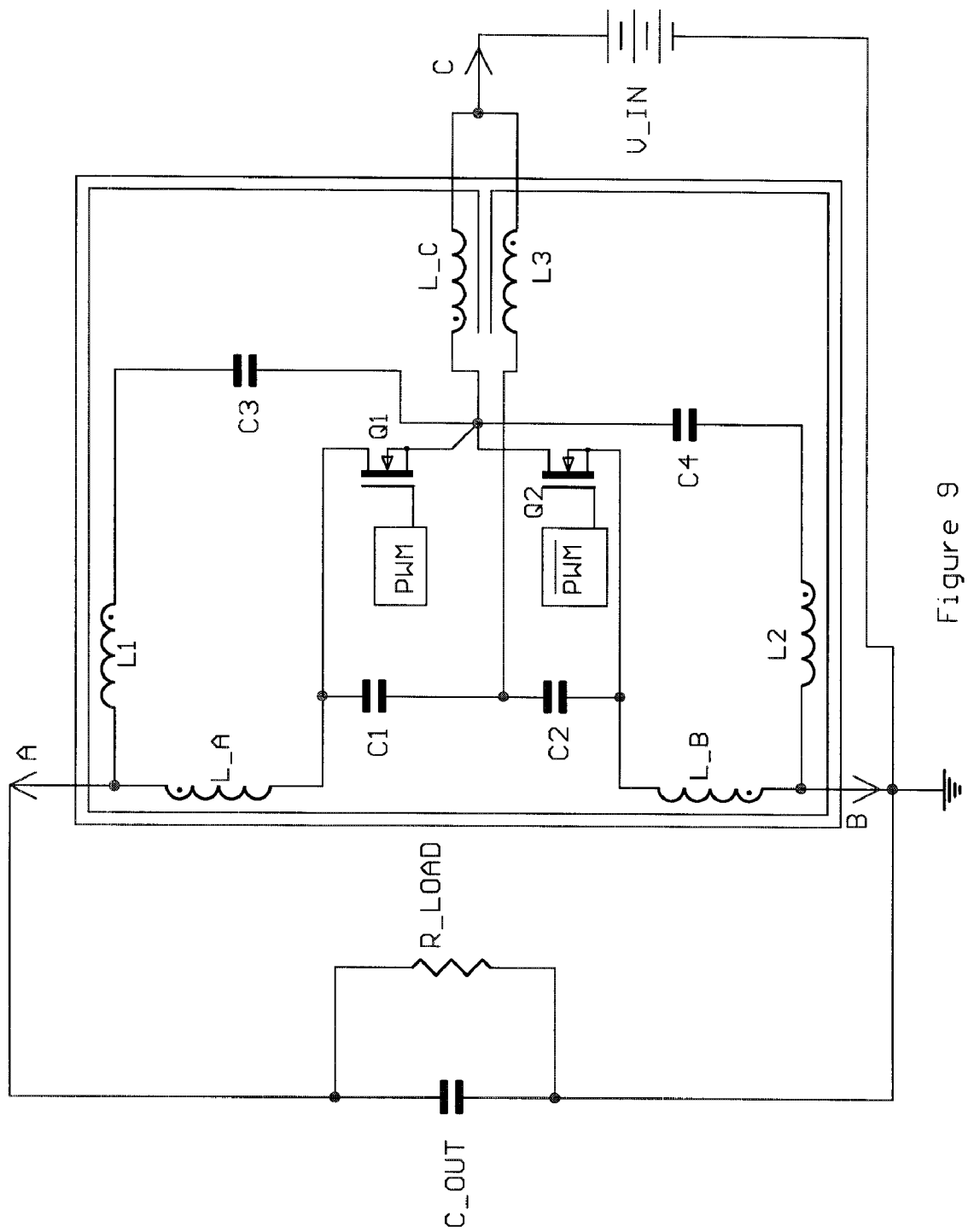
FIG. 9 illustrates a synchronous rectifier boost form of the subject invention.

FIG. 9 is similar to the FIG. 8 embodiment but the terminals are connected to the source and load to form a boost converter.

Figure 10:
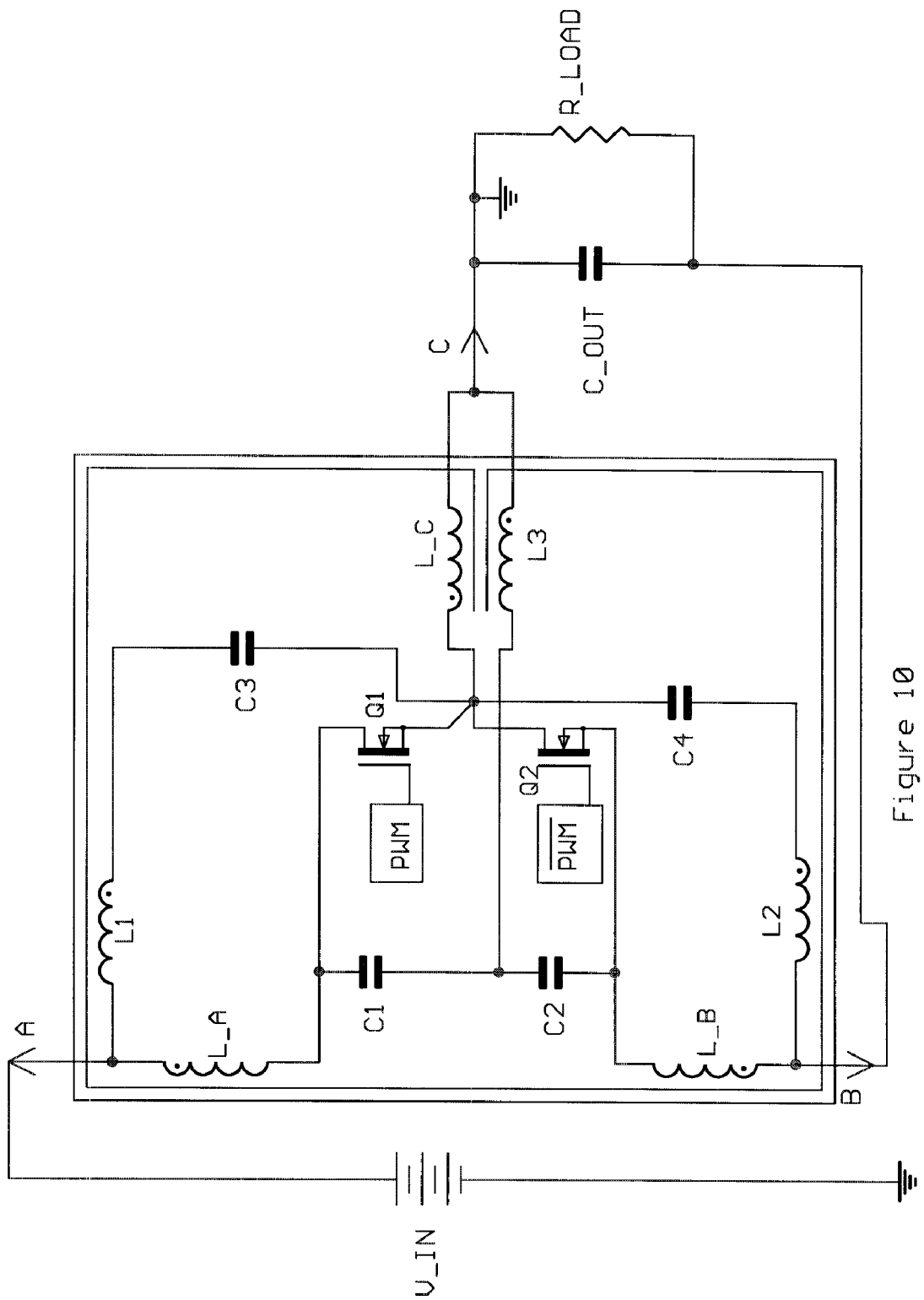
FIG. 10 illustrates a synchronous rectifier flyback form of the subject invention.

FIG. 10 is a flyback or buck boost form of the same network illustrated in the last two figures.

Figure 11:
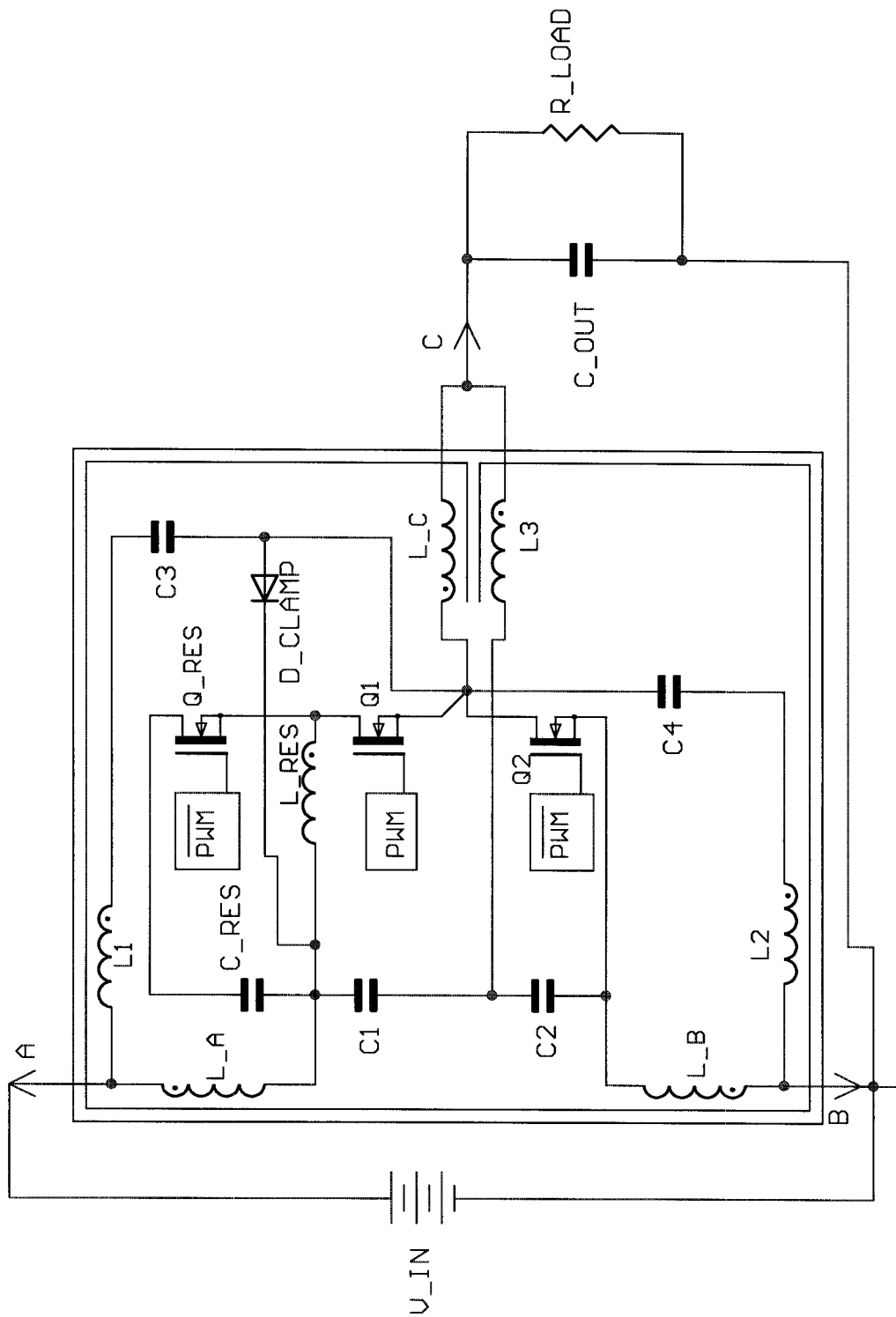
FIG. 11 illustrates a synchronous rectifier buck form of the subject invention with zero voltage switching.

FIG. 11 illustrates a zero voltage switching embodiment of the subject invention in buck form. FIG. 11 adds a switch, diode, capacitor, and inductor to the FIG. 8 embodiment to accomplish zero voltage switching. FIG. 11 illustrates application of a universal zero voltage transition switching cell to the zero ripple buck converter of FIG. 8.

Figure 12:
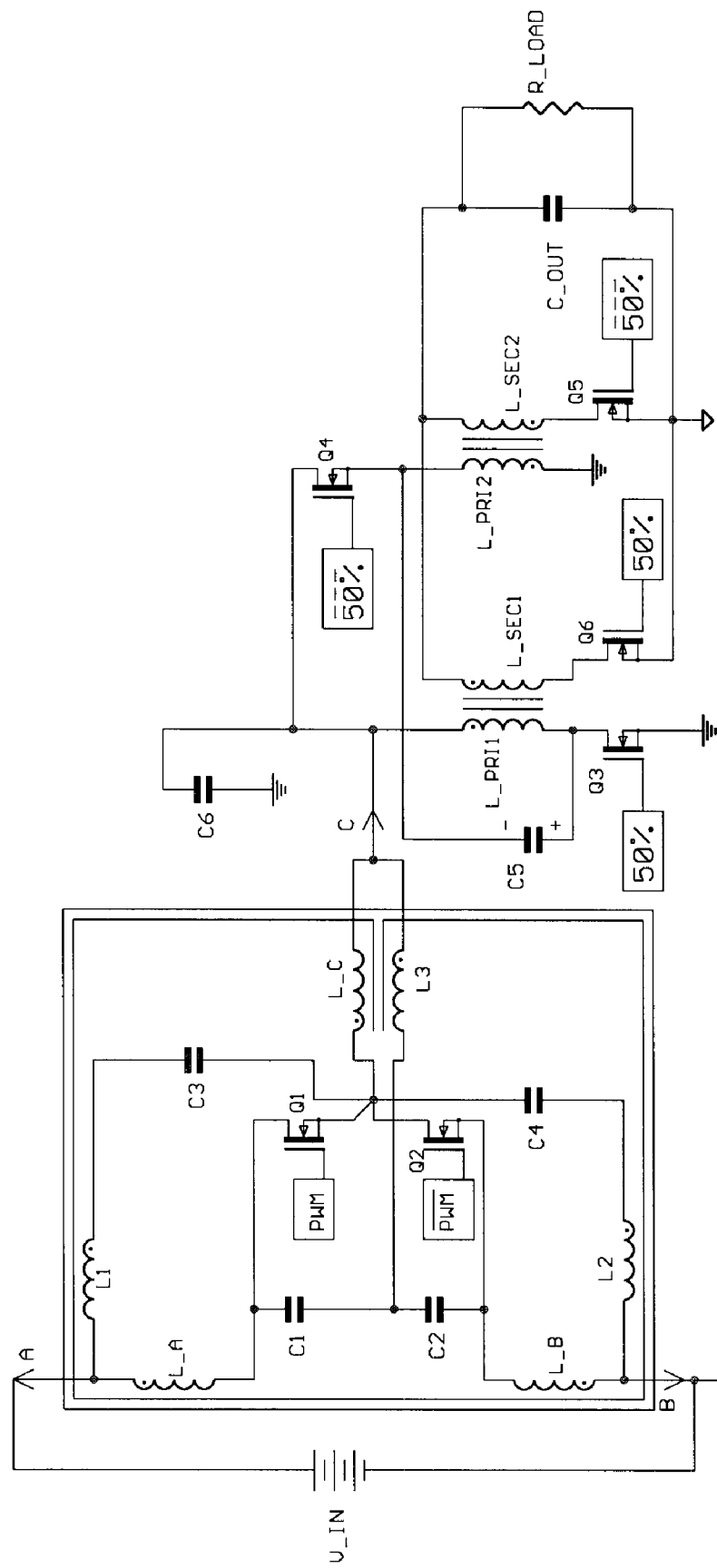
FIG. 12 illustrates a synchronous rectifier buck form of the subject invention with transformer isolation.

FIG. 12 illustrates a buck embodiment of the subject invention with a DC/DC transformer circuit added to provide galvanic isolation.

Figure 13:
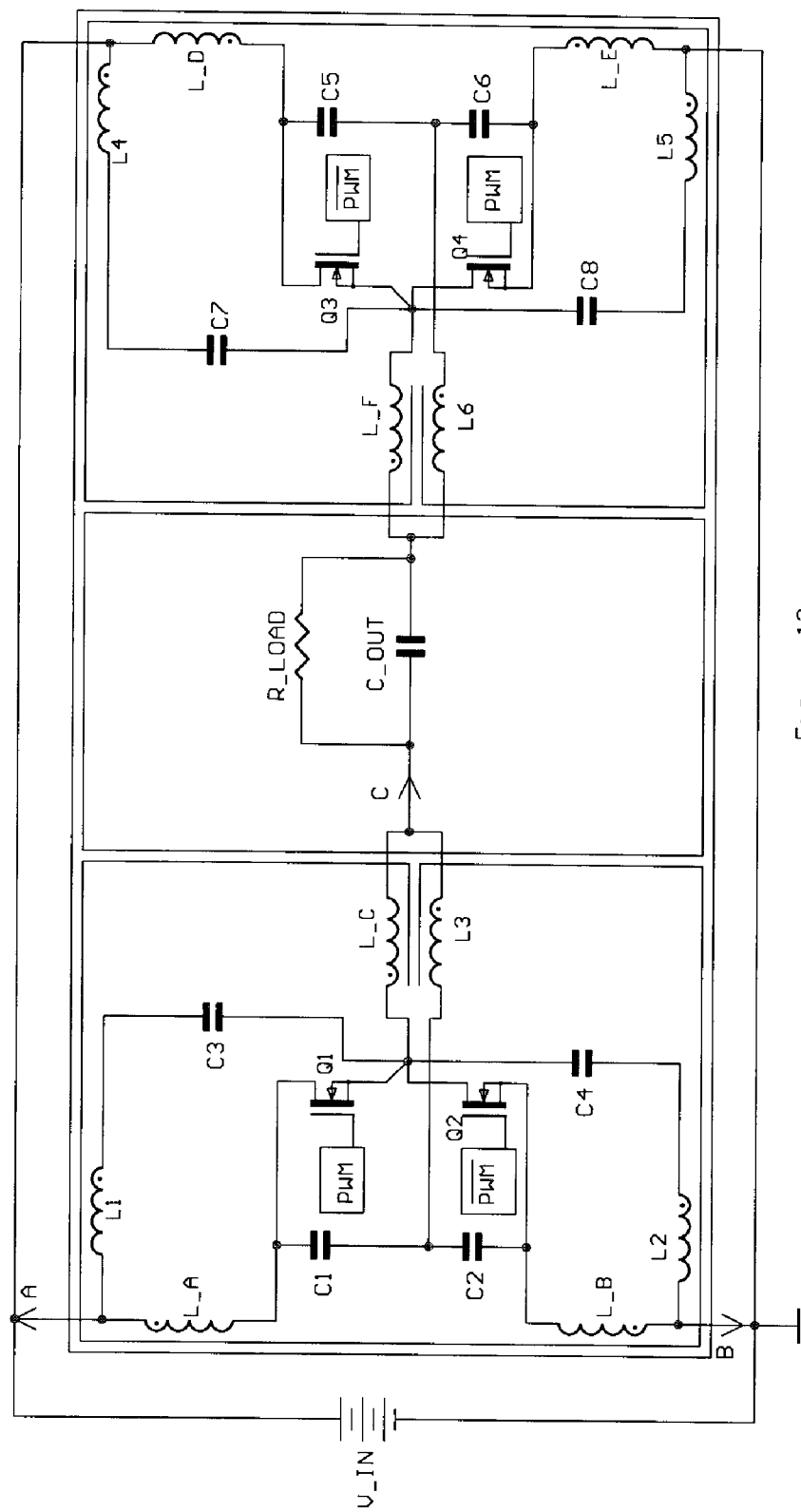
FIG. 13 illustrates a full bridge synchronous rectifier buck form of the subject invention for amplifier applications.

FIG. 13 illustrates a full bridge amplifier embodiment of the FIG. 8 circuit in which two of the FIG. 8 circuits are combined in a full bridge configuration with all twelve inductors loosely coupled on a single common core. The FIG. 13 embodiment provides four quadrant outputs with zero ripple at all terminals.

Figure 14:
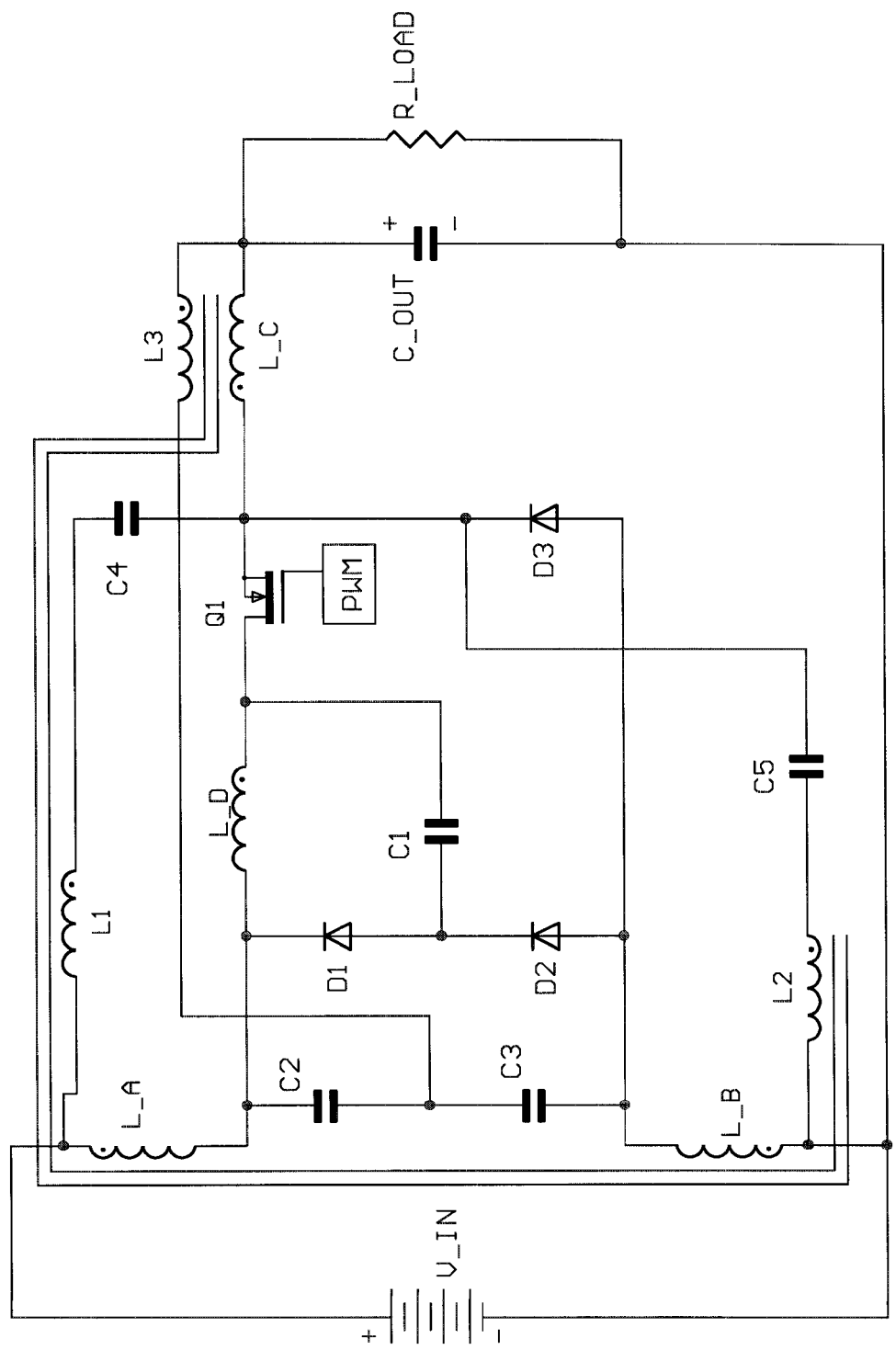
FIG. 14 illustrates a single active switch quadrature buck form of the subject invention.

FIG. 14 illustrates a single active switch quadrature converter with a buck converter of the FIG. 8 form embedded within it. This quadrature converter provides a $D^2$ input to output transfer function.

Figure 15:
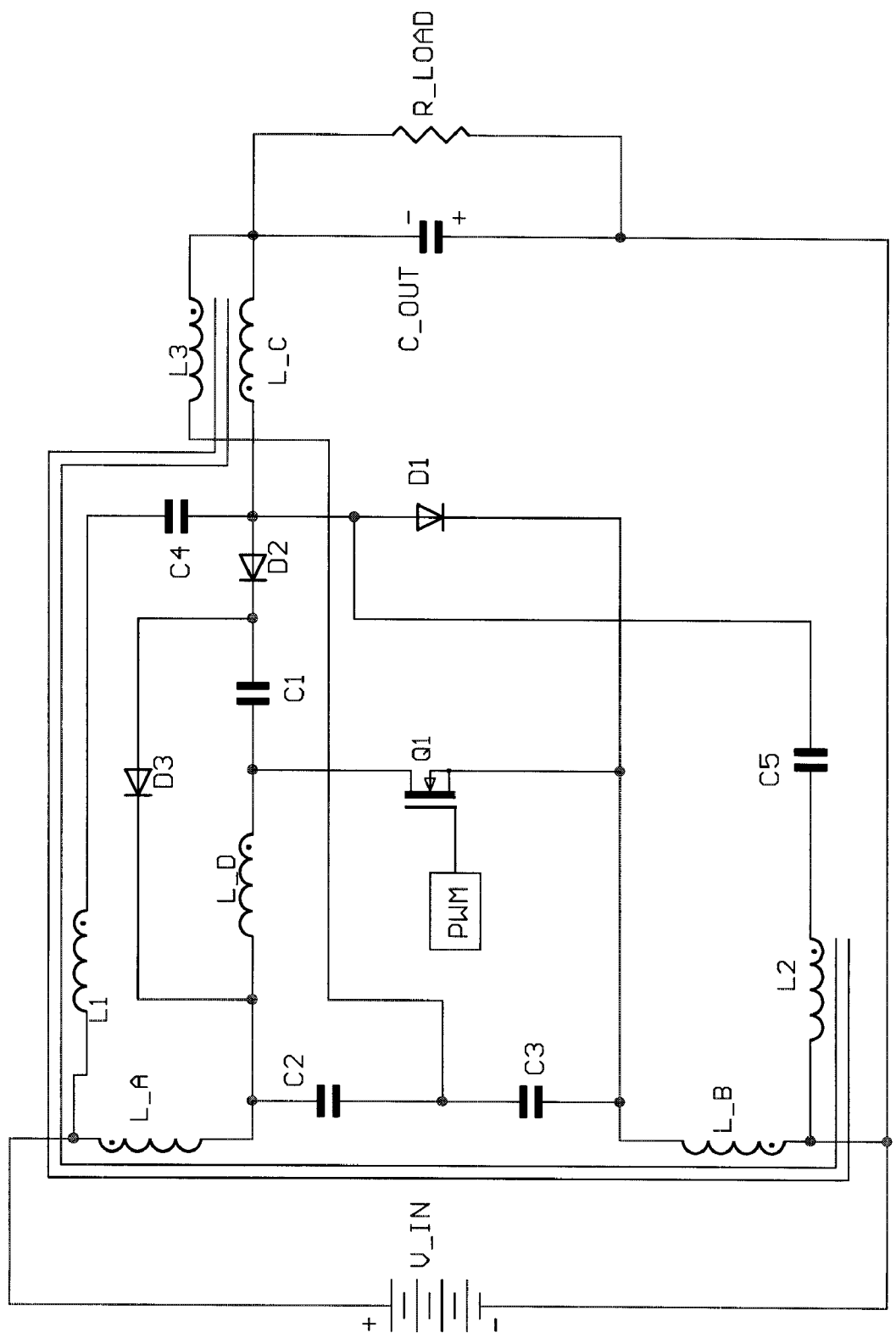
FIG. 15 illustrates a single switch quadrature buck boost form of the subject invention.

FIG. 15 illustrates another single active switch quadrature converter with zero ripple terminal currents. This quadrature converter provides a $$-\frac{D^2}{(1-D)}$$

input to output transfer function.

PWM SPDT Complement Three Terminal Network With Seven Inductors

Figure 16:
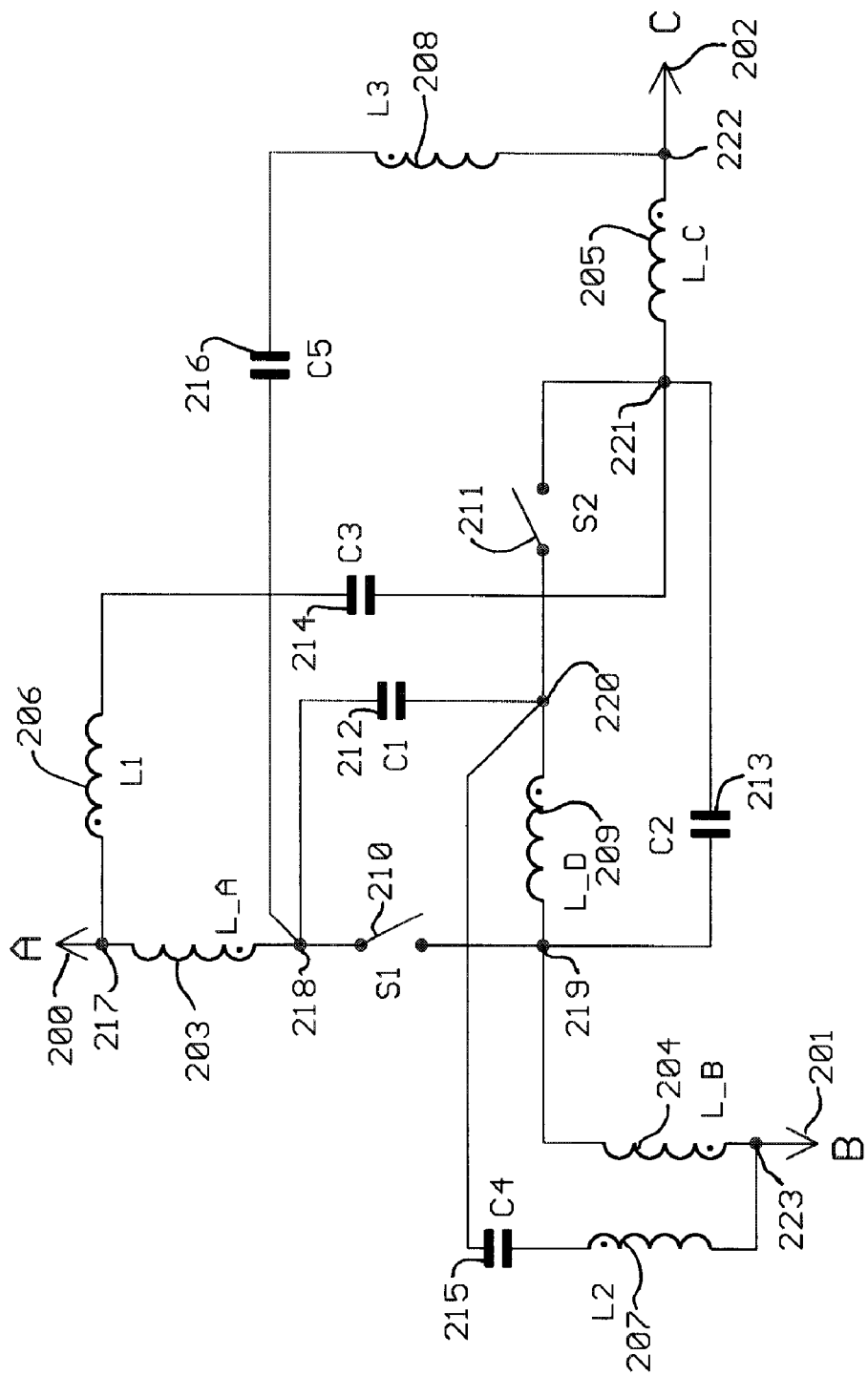
FIG. 16 illustrates a PWM SPDT complement converter form of the subject invention.

FIG. 16 illustrates a three terminal network which is a PWM SPDT complement power conversion network to which the unified PWM SPDT complement transfer function applies. This transfer function is given by $$V_C = V_B + \frac{D}{1-D} \cdot (V_A - V_B). \quad (3)$$

We call the converters that are formed from the three terminal network complement converters because the output voltage ranges are the complements of the buck, boost, and flyback output voltage ranges. The conversion network contains seven inductors, five capacitors, and two switches. The circuit achieves zero ripple terminal currents for all terminals. This result is apparent based on the fact that there are two oppositely oriented inductors connected to each of the three terminals so that the ripple currents will cancel at each terminal. The three terminals are connected to two voltage sources and a load. One of the voltage sources may be ground. No restrictions are imposed on which terminals are connected to which sources or which terminal is connected to the load.

Referring to FIG. 16 there is shown a three terminal PWM SPDT complement power conversion network in which input DC voltages are converted into an output DC voltage. The circuit requires two input sources, one of which may be ground, of substantially DC voltage, seven inductors, two switches, and five capacitors coupling the inductors and the switches. For purposes of the operational state analysis, it is assumed that the capacitors are sufficiently large that the voltages developed across the capacitors are approximately constant over a switching interval and equal to the differences in voltage between two of the terminal voltages. Also, for purposes of the operational state analysis, it is assumed that the input DC voltage sources have sufficiently low source impedance that the voltages developed across the input DC voltage sources are approximately constant over a switching interval. It will finally be assumed that the power switches are ideal, that is, lossless and able to carry current in either direction. We will also assume for purposes of the operational state analysis that all seven inductors are equal in inductance value except the inductor 209 which will have inductance equal to four times the value of the other six inductors.

Structure

The structure of the circuit of the subject invention is shown in FIG. 16. A first network terminal 200 is connected to a node 217. The node 217 is connected to an undotted terminal of an inductor 203 and to a dotted terminal of an inductor 206. A dotted terminal of inductor 203 is connected to a node 218. An undotted terminal of inductor 206 is connected to a first terminal of a capacitor 214. A second terminal of capacitor 214 is connected to a node 221. A first terminal of a switch 210 is connected to node 218. A second terminal of switch 210 is connected to a node 219. A first terminal of a capacitor 212 is connected to the node 218 and a second terminal of capacitor 212 is connected to a node 220. A first terminal of a capacitor 216 is connected to node 218 and a second terminal of capacitor 216 is connected to a dotted terminal of an inductor 208. An undotted terminal of inductor 208 is connected to a node 222. A first terminal of a second switch 211 is connected to node 220 and a second terminal of switch 211 is connected to node 221. An undotted terminal of an inductor 209 is connected to node 219 and a dotted terminal of inductor 209 is connected to node 220. An undotted terminal of an inductor 204 is connected to node 219 and a dotted terminal of inductor 204 is connected to a node 223. A first terminal of a capacitor 215 is connected to node 220 and a second terminal of capacitor 215 is connected to a dotted terminal of an inductor 207. An undotted terminal of inductor 207 is connected to node 223. A second network terminal 201 is connected to node 223. A first terminal of a capacitor 213 is connected to node 219 and a second terminal of capacitor 213 is connected to node 221. An undotted terminal of an inductor 205 is connected to node 221. A dotted terminal of inductor 205 is connected to node 222. The node 222 is connected to a third network terminal 202.

Operation

Figure 17:
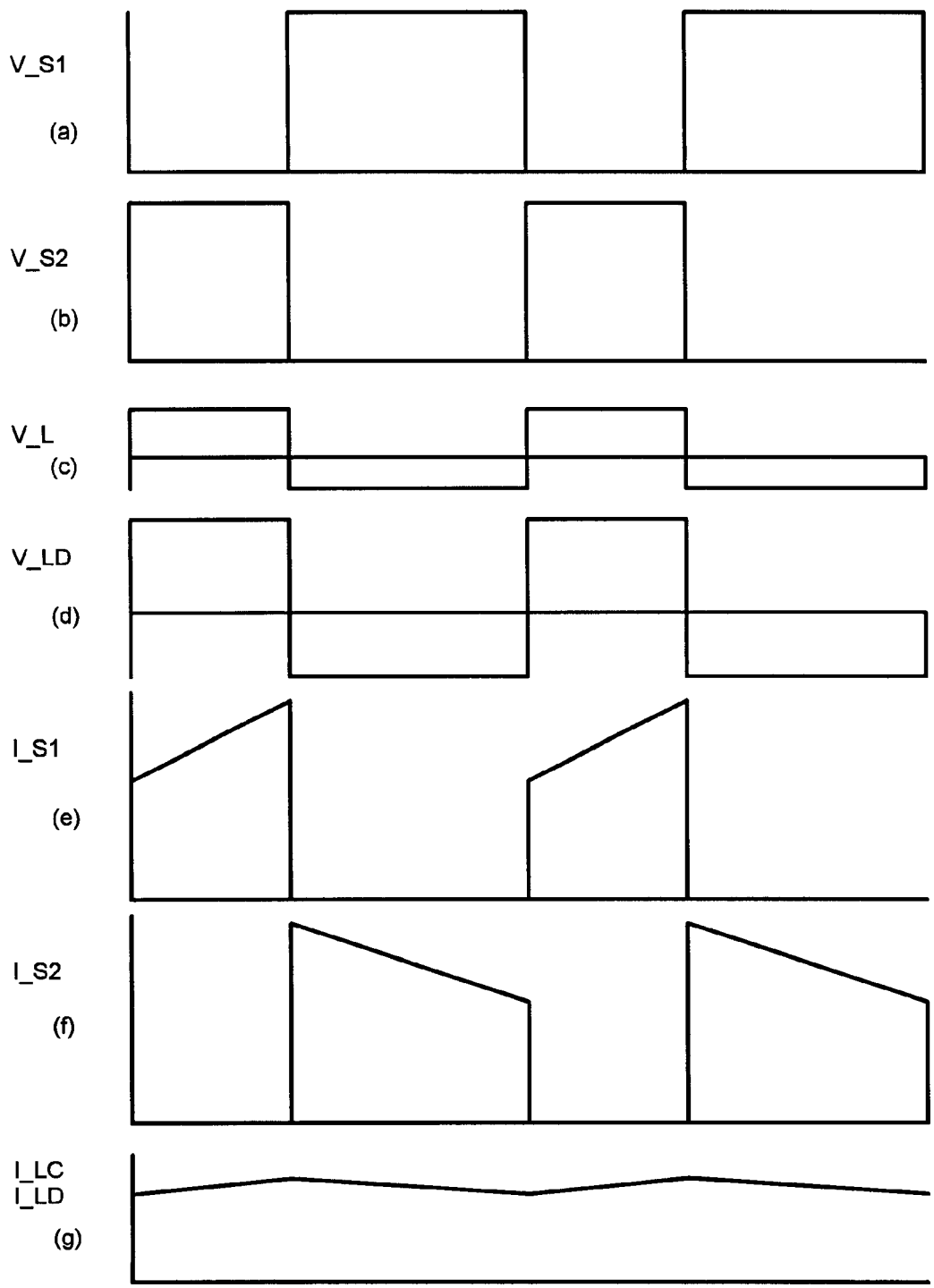
FIG. 17 illustrates voltage and current wave forms of the FIG. 16 circuit.
Figure 18:
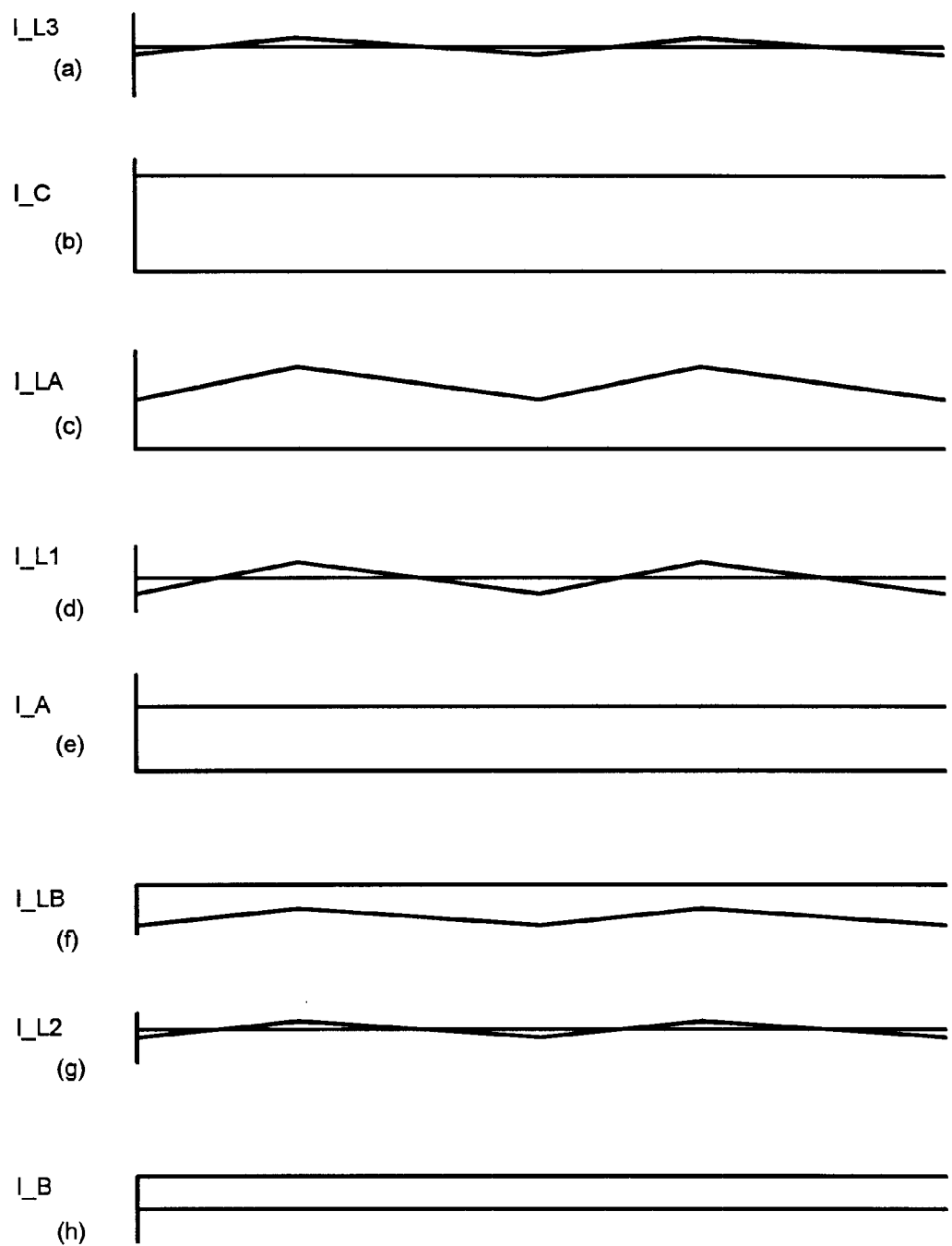
FIG. 18 illustrates inductor and terminal current wave forms of the FIG. 16 circuit.
Figure 19:
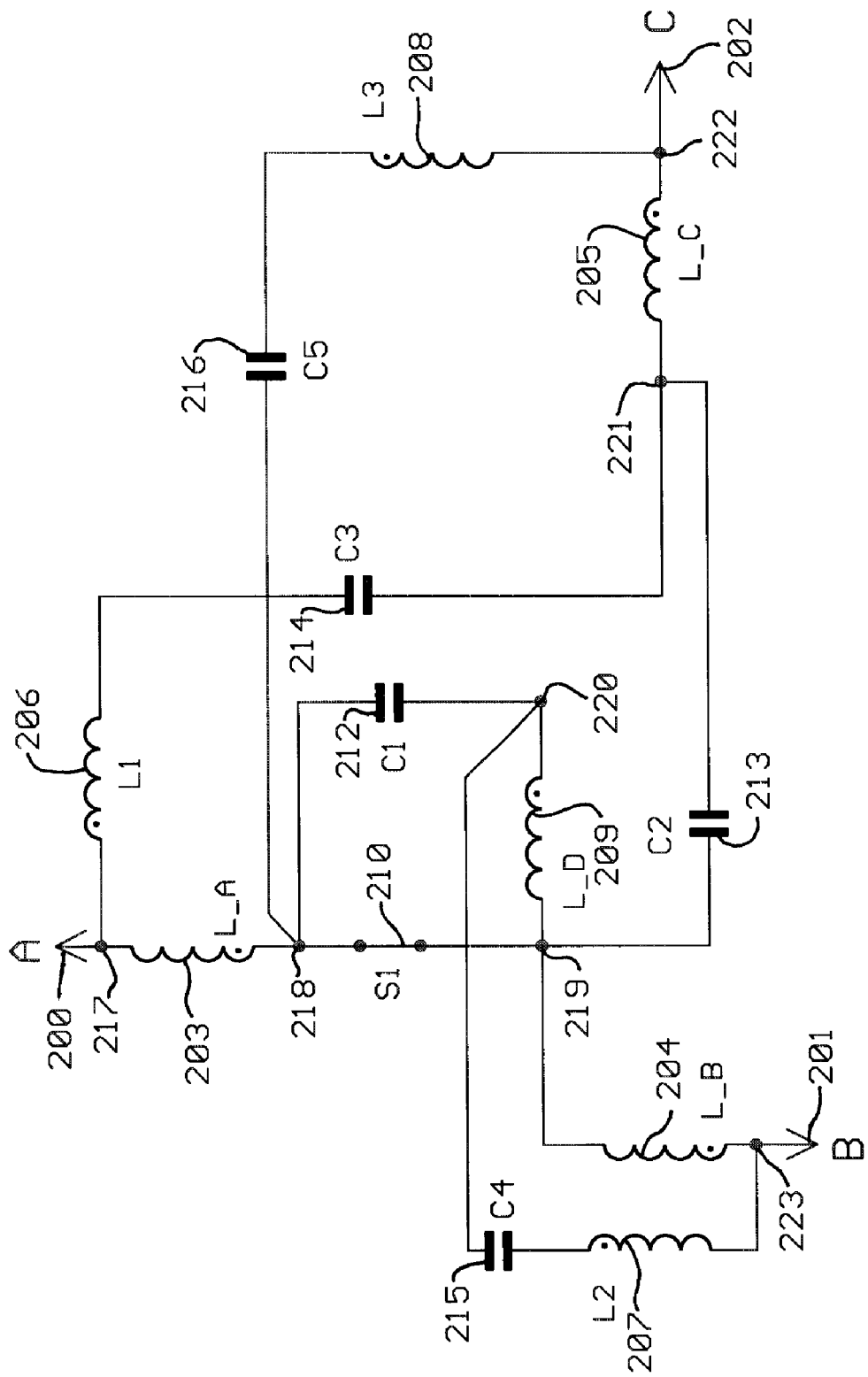
FIG. 19 illustrates an on state of the FIG. 16 circuit.

It is assumed in this analysis that the system has reached a settled operating condition. Except for the short, but finite, switching intervals there are two states of the circuit of FIG. 16, an on state and an off state. We will assume for the operational state analysis that the A first network terminal 200 voltage is more positive than the B second network terminal 201 voltage and that the C third network terminal 202 voltage is more positive than the B second network terminal 201 voltage. The applied voltage to the capacitor 212, $V_{C1}$ will be equal to the voltage difference between the A first network terminal 200 voltage, $V_A$ and the B second network terminal 201 voltage, $V_B$, or $V_{C1}=V_A-V_B$. This results from the fact that a first terminal of the capacitor 212 is connected to the A first network terminal 200 through an inductor 203 and a second terminal of the capacitor 212 is connected to the B second network terminal 201 through inductors 204 and 209 and the average applied voltages to the inductors are zero. The applied voltage to the capacitor 213, $V_{C2}$, will be equal to the voltage difference between the C third network terminal 202 voltage, $V_C$ and the B second network terminal 201 voltage, $V_B$, or $V_{C2}=V_C-V_B$. This results from the fact that the terminals of the capacitor 213 are connected to the B second network terminal 201 through an inductor 204 and to the C third network terminal 202 through the inductor 205, whose average applied voltages are zero. Consider an initial condition as illustrated in FIG. 19. The initial condition represents the on state. During the initial condition the switch 210 is on (closed) and the switch 211 is off (open). The voltage and current wave forms are illustrated in FIGS. 17 and 18. The current in the inductor 203, $I_{LA}$, is flowing from top to bottom into the undotted terminal and out of the dotted terminal. The current in the inductor 204, $I_{LB}$, is flowing from bottom to top into the dotted terminal and out of the undotted terminal. The current in the inductor 205, $I_{LC}$, is flowing from left to right into the undotted terminal and out of the dotted terminal. The current in the inductor 209, $I_{LD}$, is flowing from left to right into the undotted terminal and out of the dotted terminal. The current in all four inductors, 203, 204, 205, and 209, will be becoming more positive in value during the on state, where the positive direction is into the undotted terminal and out of the dotted terminal. The currents in the inductors 206, 207, and 208 are strictly AC, since the inductors are series connected to capacitors, but these currents will also be rising or becoming more positive during the on state. At any one of the three network terminals one inductor will increase the current into the network terminal and another inductor will decrease the current into the network terminal by the same amount so that the ramp slopes of the two inductors connected at any of the network terminals will cancel resulting in zero ripple current slope for the net network terminal current.

Figure 20:
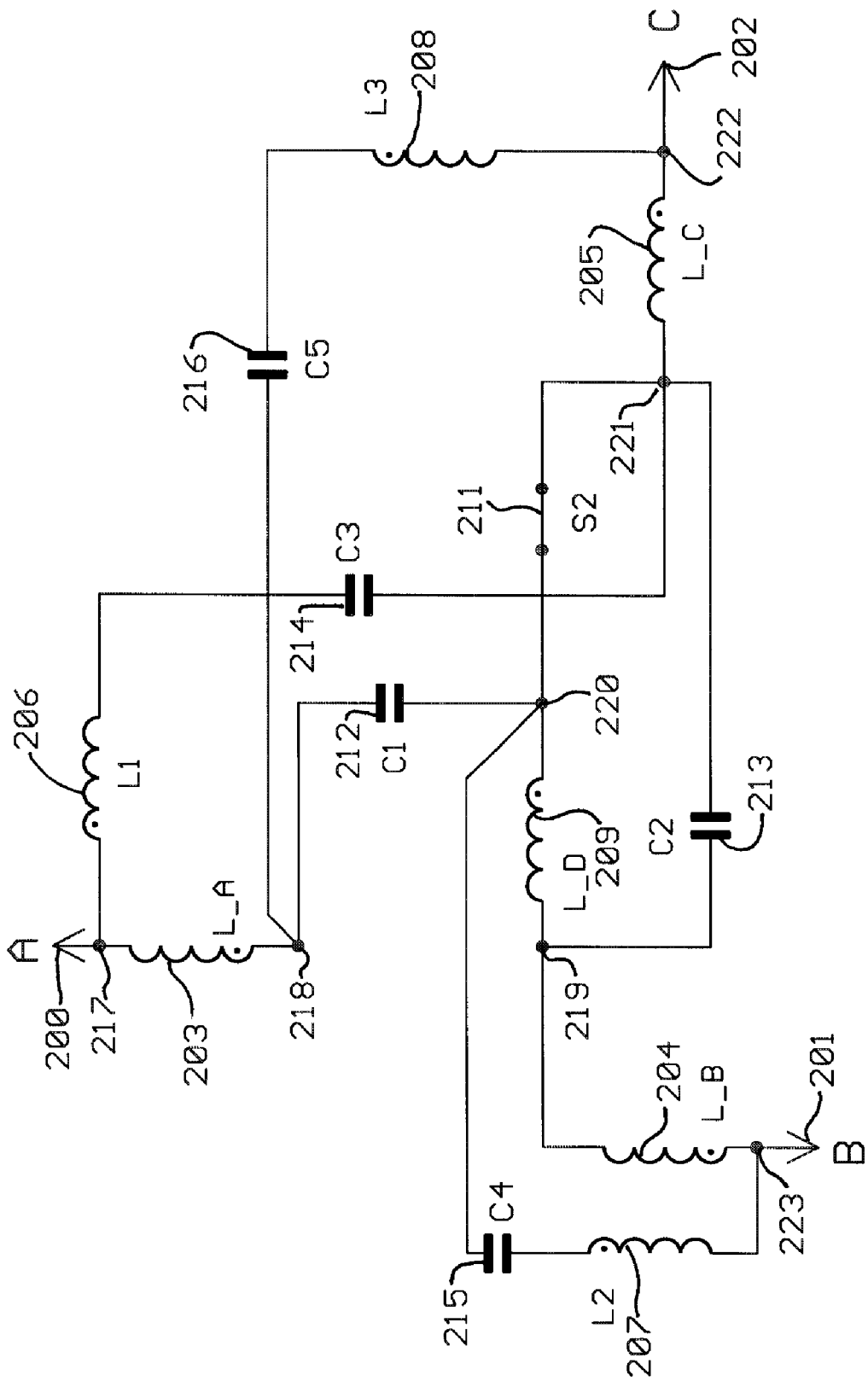
FIG. 20 illustrates an off state of the FIG. 16 circuit.

At a time determined by the control circuit the switch 210 is turned off (opened) and the switch 211 is turned on (closed) marking the beginning of the off state, illustrated in FIG. 20. During the off state the current in each inductor falls or becomes more negative. The inductor current slopes at any one of the network terminals will cancel resulting in zero current slope for the net network terminal current. During both the off state and the on state the network terminal currents are DC with zero AC component. Since the network current cannot change significantly during the brief switching transitions the current at each of the three network terminals is constant or DC for the entire switching cycle. When the inductors currents have ramped down to their values at the beginning of the on state the switches 206 and 207 change state again and the cycle repeats.

Related Embodiments

Figure 21:
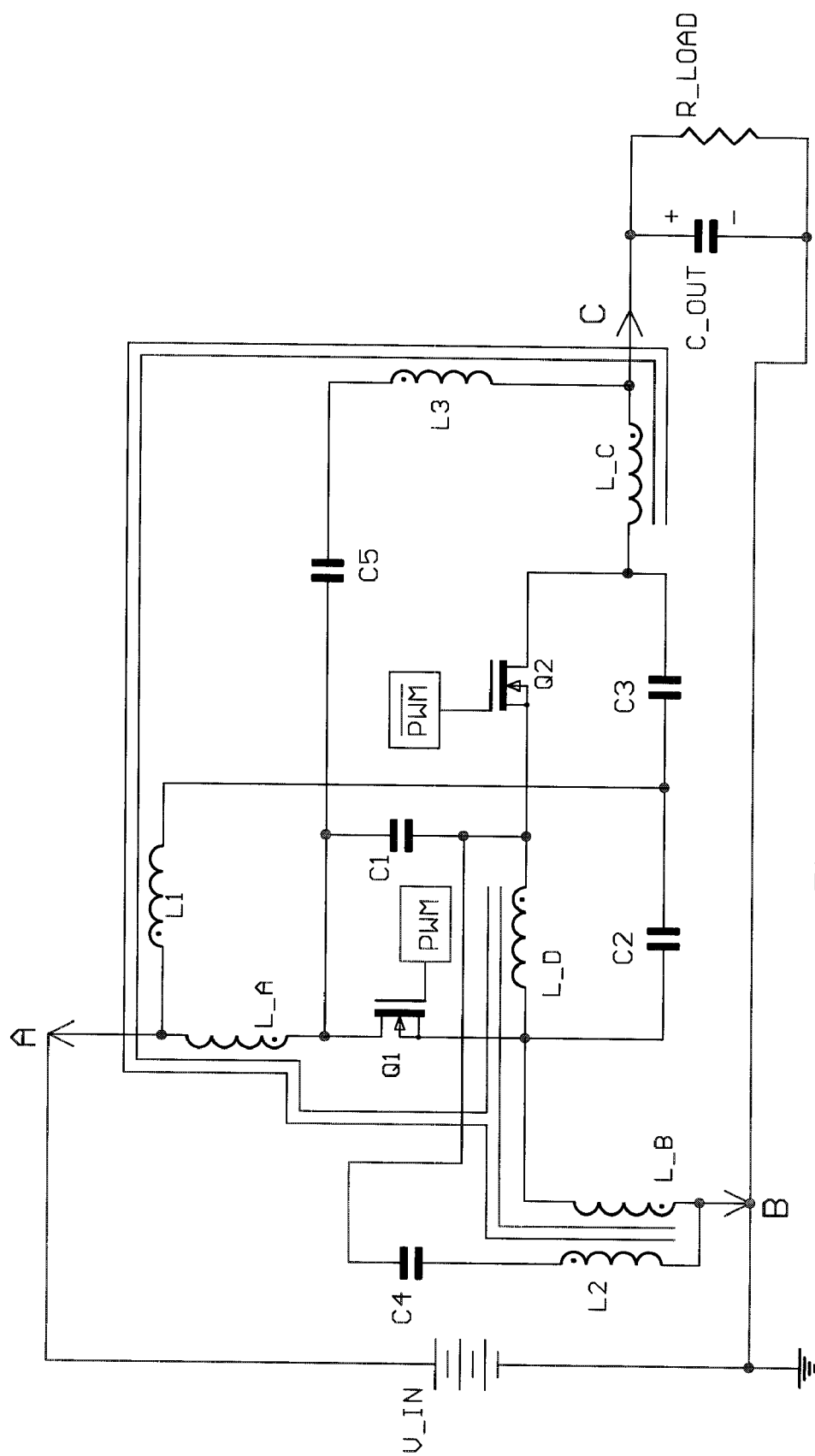
FIG. 21 illustrates a synchronous rectifier flyback complement form of the subject invention.

FIG. 21 illustrates an embodiment of the FIG. 16 network in which all seven inductors are loosely coupled on a single common core. The FIG. 21 circuit is a flyback complement implementation of the FIG. 16 circuit which will be recognized as a zero ripple implementation of a SEPIC converter. Applying the unified PWM SPDT complement transfer function, equation (3), with $V_B=0$, $V_A=V_{IN}$, and $V_C=V_{OUT}$ yields the transfer function for the SEPIC converter $$V_{OUT} = \frac{D}{1-D} \cdot V_{IN}. \tag{4}$$

The equation (4) transfer function is exactly equal to the negative of the transfer function for a flyback or buck boost converter. The output voltage range of the flyback is from zero to negative infinity. The output voltage range for the flyback complement is from zero to positive infinity. The FIG. 21 implementation uses a mosfet for the S1 switch 210 and a diode for the S2 switch 211.

Figure 22:
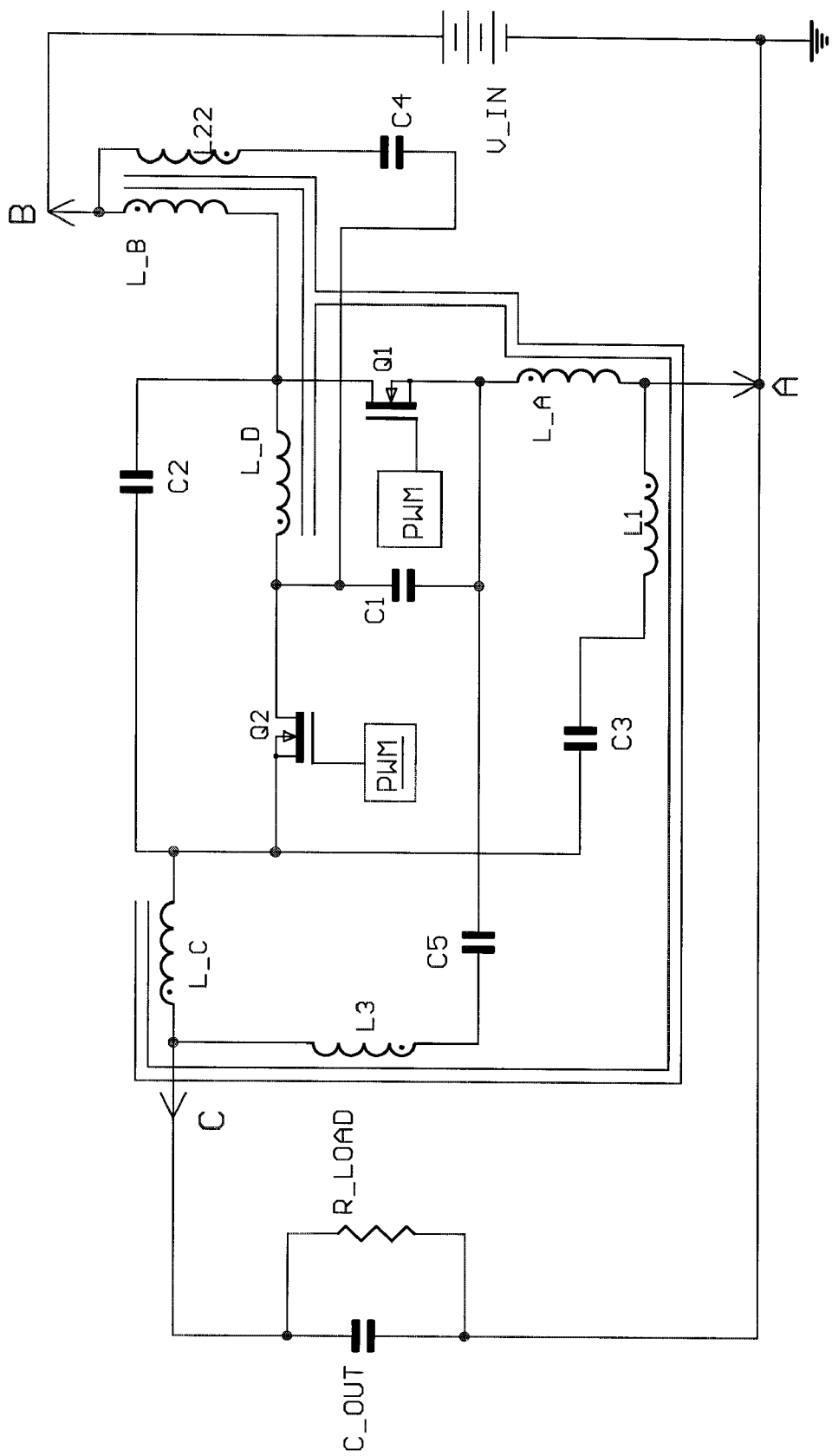
FIG. 22 illustrates a synchronous rectifier boost complement form of the subject invention.

FIG. 22 illustrates a boost complement implementation of the FIG. 16 network. Both switches are implemented with mosfets so that power flow in two directions is possible. In this case $V_A=0$, $V_B=V_{IN}$, and $V_C=V_{OUT}$. By making these substitutions in the unified PWM SPDT complement transfer function we get the transfer function $$V_{OUT} = \frac{1-2 \cdot D}{1-D} \cdot V_{IN}. \tag{5}$$

This function yields $V_{OUT}=V_{IN}$ for D=0, $V_{OUT}=0$, for D=0.5, and $V_{OUT}=-\infty$ for D=1. Since the output voltage range of a boost converter is $V_{IN}$ to positive infinity one can see how this is a boost complement. This circuit has the unique ability to convert a positive voltage to either a positive or a negative voltage and to generate an AC output wave form from a positive supply with DC coupling using only two switches, one magnetic, and five capacitors with the property of zero ripple terminal currents at all terminals.

Figure 23:
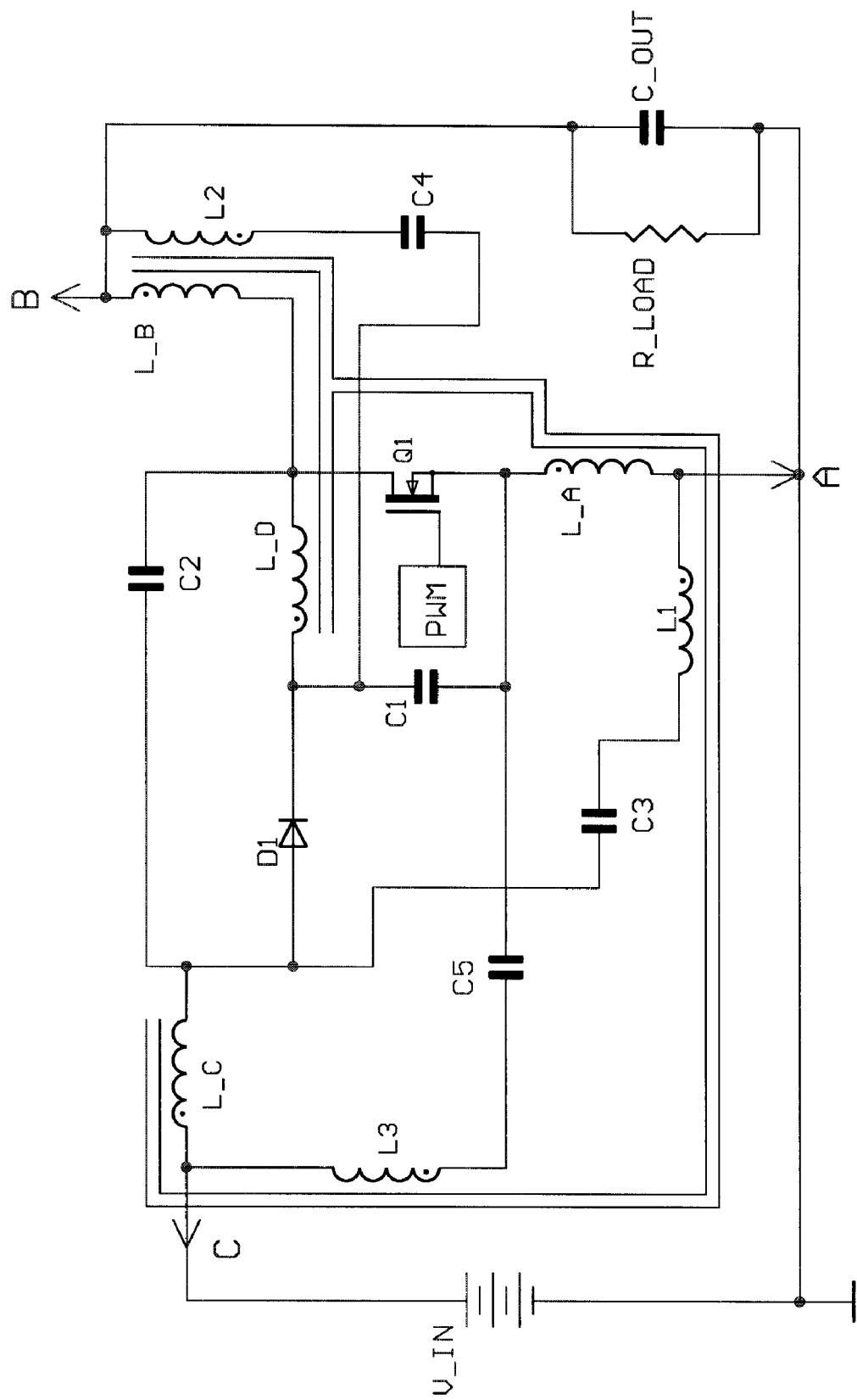
FIG. 23 illustrates a positive output buck complement form of the subject invention.

FIG. 23 illustrates the FIG. 16 network configured as a positive output buck complement converter with all terminal currents ripple free. Applying the unified PWM SPDT complement transfer function with $V_A=V_{IN}$, $V_B=V_{OUT}$, and $V_C=0$ yields $$V_{OUT} = \frac{1-D'}{1-2 \cdot D'} \cdot V_{IN}, \tag{6}$$

where D'=1−D is the duty cycle of the S2 switch, which is implemented here with a mosfet while the S1 switch is implemented with a diode. The output voltage is greater than the input voltage for D'≦0.5. At D'=0.5 the output voltage goes to infinity and changes sign so the FIG. 23 circuit is intended for operation at duty cycles less than one half.

Figure 24:
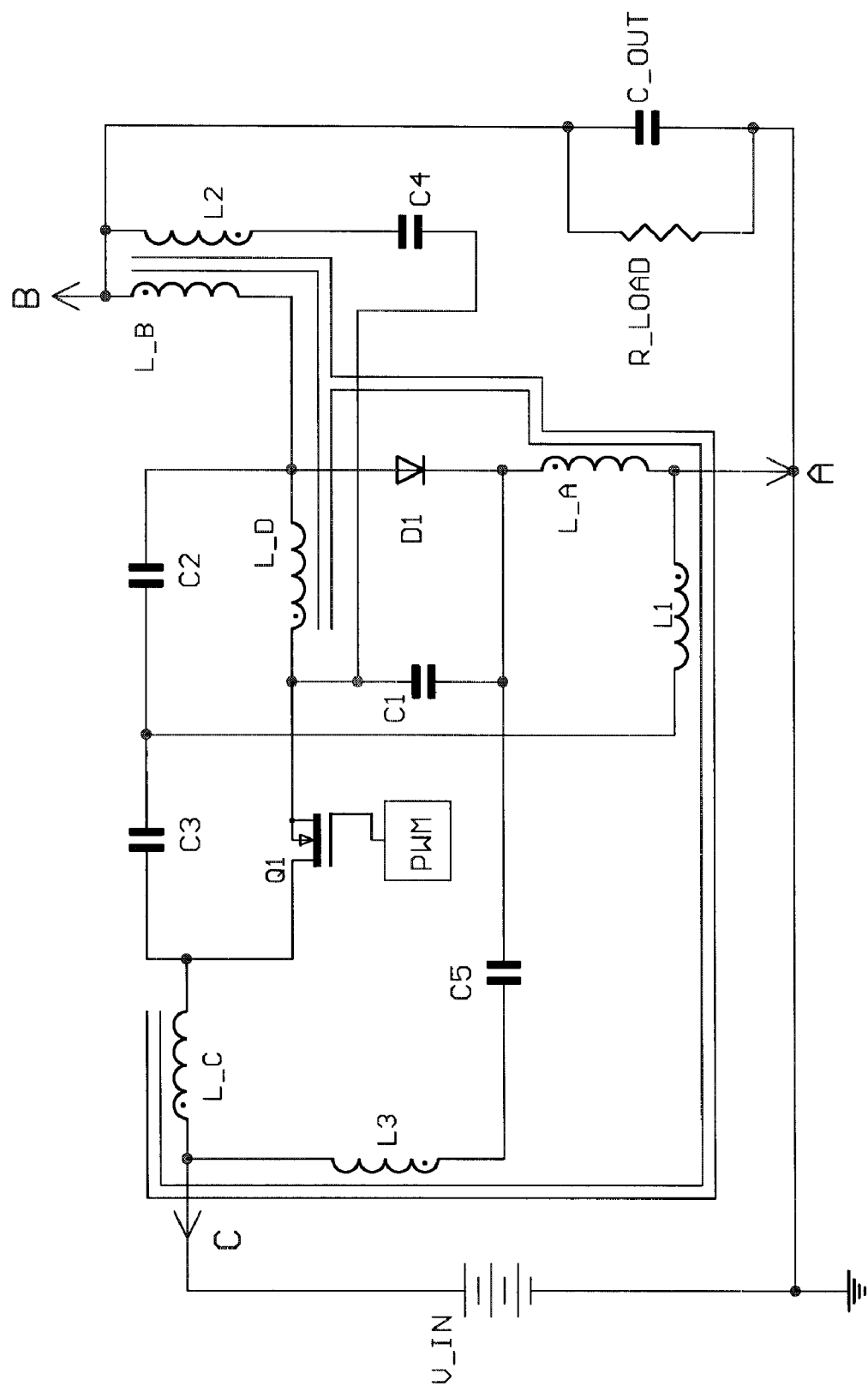
FIG. 24 illustrates a negative output buck complement form of the subject invention.

FIG. 24 illustrates the FIG. 16 network configured as a negative output buck complement converter with all terminal currents non-pulsating. The transfer function is $$V_{OUT} = \frac{-D}{1-2 \cdot D} \cdot V_{IN}. \tag{7}$$

The output voltage range is zero to negative infinity for duty cycles less than one half. The FIG. 24 circuit is implemented with a mosfet for the S1 switch and a diode for the S2 switch.

PWM Tapped Inductor Three Terminal Network with Ripple Cancellation

Figure 25:
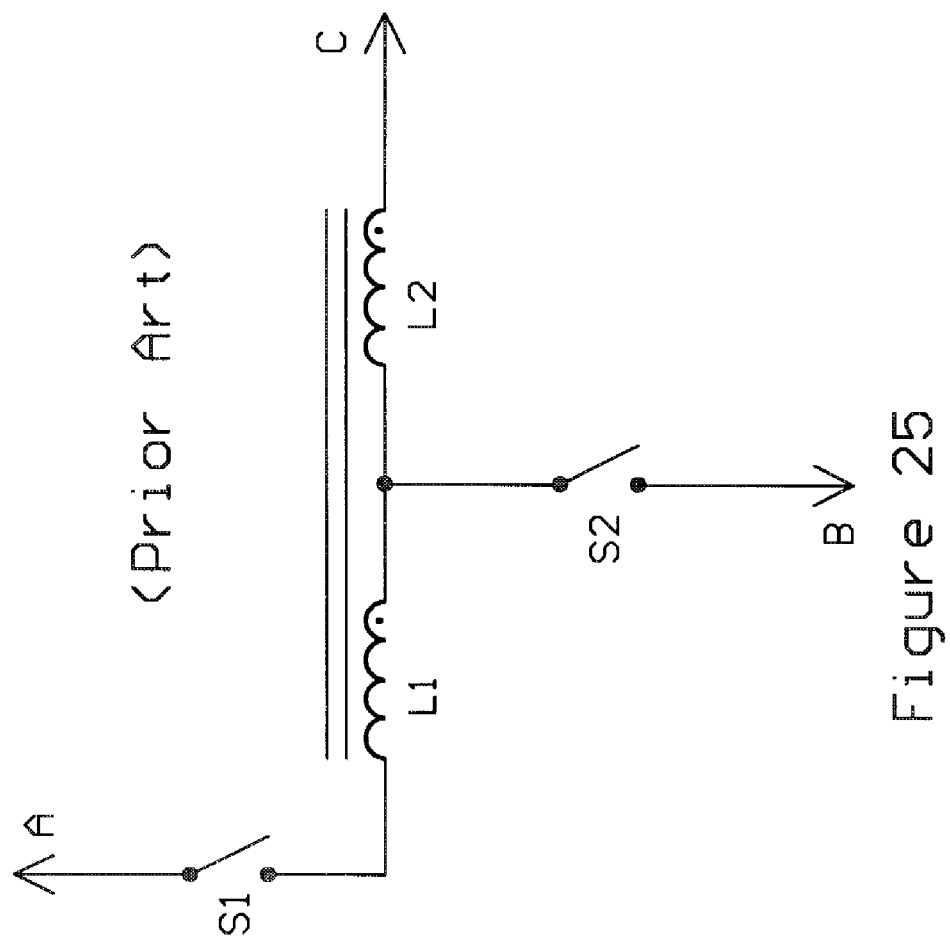
FIG. 25 illustrates a three terminal tapped inductor power conversion network.

FIG. 25 illustrates a tapped inductor three terminal network which is a modified PWM SPDT power conversion network. The conversion network contains a single tapped inductor and two switches. The circuit achieves non-pulsating terminal currents for no terminals. The circuit is sometimes used for buck converters with high step down ratios or boost converters with high step up ratios. Tapping the inductor in a high step down ratio buck converter increases the duty cycle of the S1 switch and simultaneously decreases the current in the S1 switch and increases the current in the S2 switch. The decreased current in the S1 switch results in a reduction of conduction and switching losses in the S1 switch with a simultaneous increase in conduction losses in the S2 switch. For high step down applications the net result is usually a decrease in total switch losses. The popularity of the approach is diminished by the fact that all three terminal currents are pulsating. Let the number of turns of the L2 winding be $N_2$, and let the number of turns of the L1 winding be $N_1$. When the switch S1 is on the voltage applied to the L2 winding voltage is $$V_{L2} = \frac{N_2 \cdot (V_A - V_C)}{(N_1 + N_2)}.$$

When the S2 switch is on the L2 winding voltage is $V_{L2}=(V_B-V_C)$. We can determine the transfer function for the network by applying Faraday's Law to the L2 winding so that the volt second products for a full cycle in steady state add to zero. Applying Faraday's Law we get $$\frac{N_2 \cdot (V_A - V_C) \cdot D \cdot T}{(N_1 + N_2)} + (V_B - V_C) \cdot (1 - D) \cdot T = 0, \quad (8)$$

where D is the duty cycle of the S1 switch and T is the switching period. By solving equation (8) for $V_C$ we get the transfer function for the network of FIG. 25 in the common form. The result is $$V_C = \frac{V_B + D \cdot (R \cdot V_A - V_B)}{1 + D \cdot (R - 1)} \quad (9)$$

where $$R = \frac{N_2}{N_1 + N_2}.$$

For a buck converter $V_B=0$. For a buck converter in which the inductor is tapped at the center and the duty cycle is 0.5 the result of equation (9) is $$V_C = \frac{V_A}{3}.$$

Without the inductor tap we would have $$V_C = \frac{V_A}{2}.$$

Figure 26:
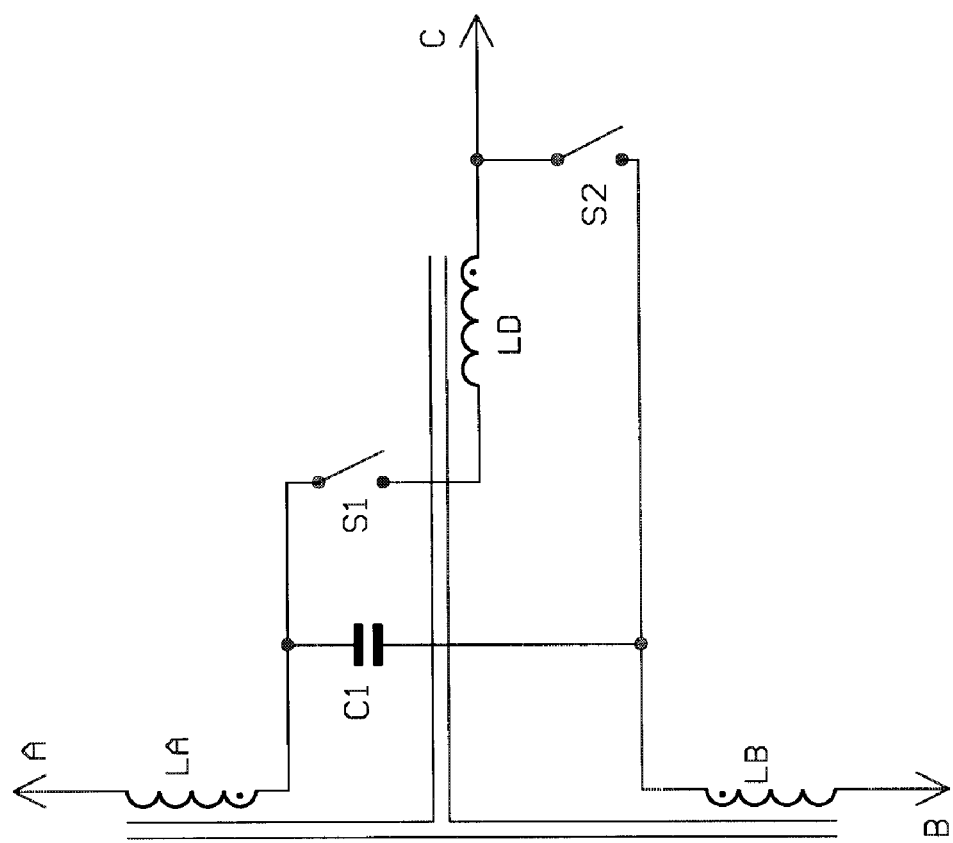
FIG. 26 illustrates a transformation of the FIG. 25 network where the C terminal winding is moved to the A and B terminals.
Figure 27:
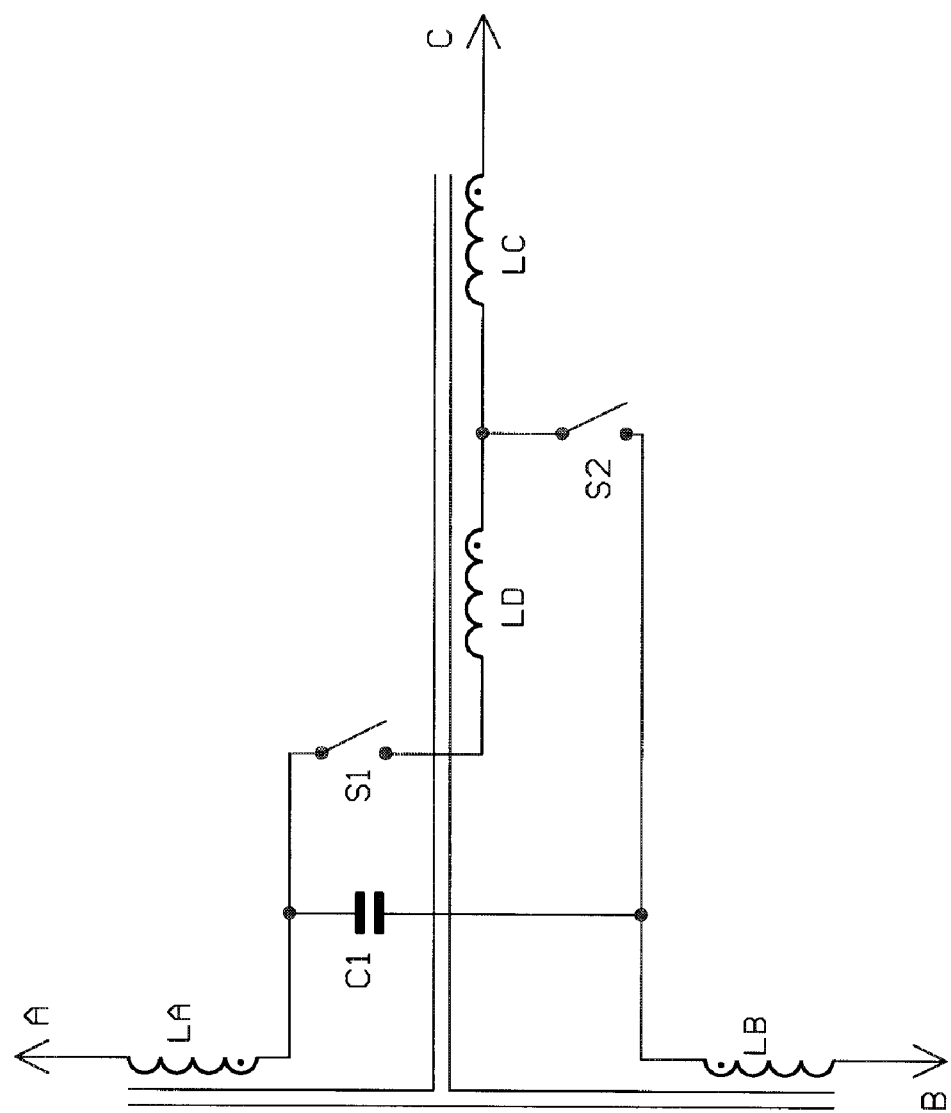
FIG. 27 illustrates the transformation of the FIG. 25 network according to the process illustrated in FIG. 1.
Figure 28:
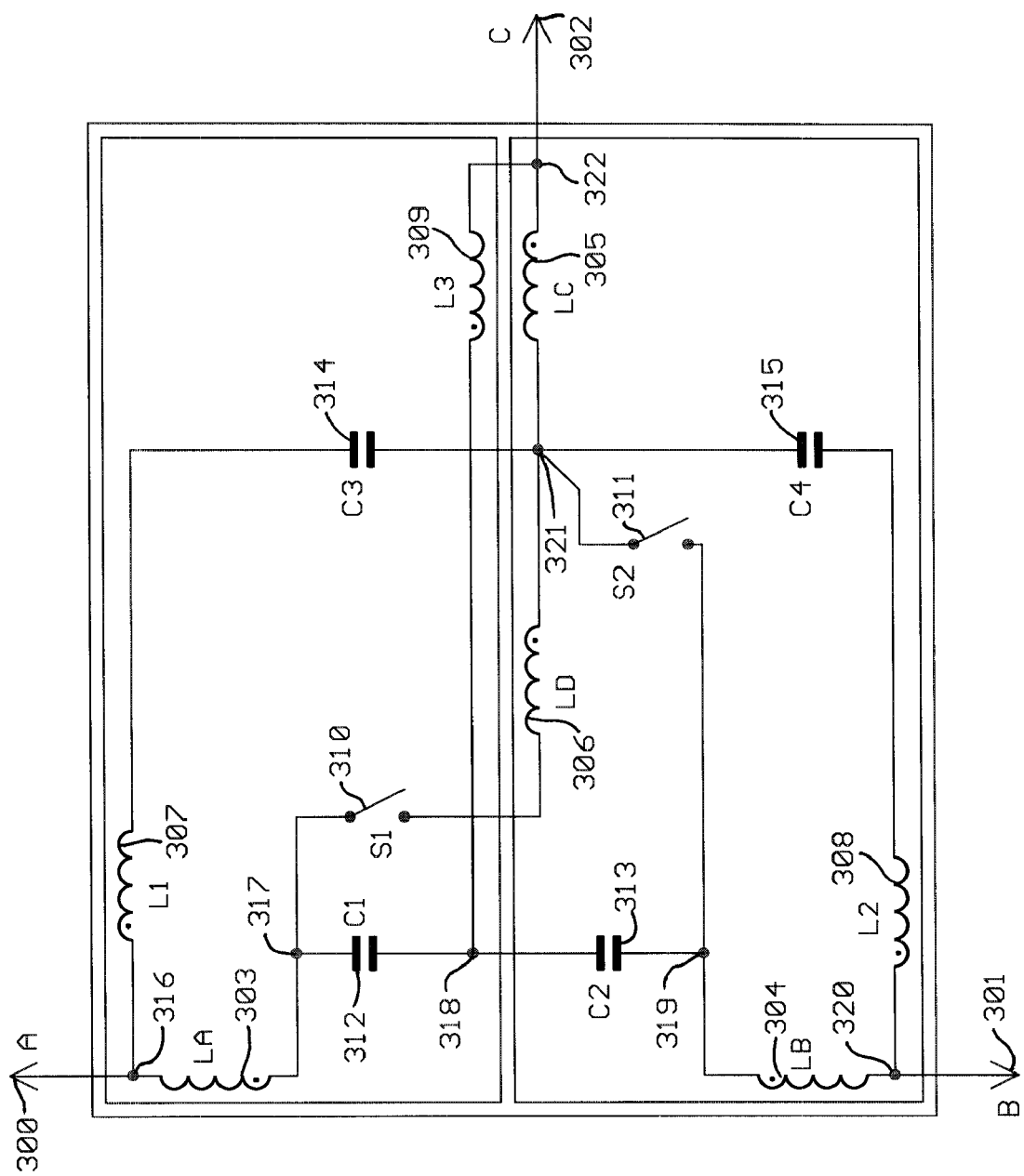
FIG. 28 illustrates the transformation of the FIG. 25 network according to the process illustrated in FIG. 2.

We can apply the process illustrated in FIG. 1 to the FIG. 25 network to attempt an improvement in terminal current properties, but we get the networks illustrated in FIGS. 26 and 27 which do not achieve the goal of non-pulsating terminal currents. By applying the process illustrated in FIG. 2 to the FIG. 27 network we not only achieve the desired result of non-pulsating terminal currents at each network terminal, but the terminal currents are also ripple free. The resulting network with all network terminal currents ripple free is illustrated in FIG. 28. Unlike the previous networks the ripple free result is only achieved when all the inductors are coupled on a single common core.

Referring to FIG. 28 there is shown a three terminal PWM SPDT tapped inductor power conversion network in which input DC voltages are converted into an output DC voltage. The circuit requires two input sources, one of which may be ground, of substantially DC voltage, seven inductors coupled together on a single common core, two switches, and four capacitors coupling the inductor windings and the switches. For purposes of the operational state analysis, it is assumed that the capacitors are sufficiently large that the voltages developed across the capacitors are approximately constant over a switching interval and equal to the differences in voltage between two of the terminal voltages. Also, for purposes of the operational state analysis, it is assumed that the input DC voltage sources have sufficiently low source impedance that the voltages developed across the input DC voltage sources are approximately constant over a switching interval. It will finally be assumed that the power switches are ideal, that is, lossless and able to carry current in either direction.

Structure

The structure of the circuit of the subject invention is shown in FIG. 28. A first network terminal 300 is connected to a node 316. The node 316 is connected to an undotted terminal of an inductor 303 and to the dotted terminal of an inductor 307. A dotted terminal of the inductor 303 is connected to a node 317. An undotted terminal of the inductor 307 is connected to a first terminal of a capacitor 314. A second terminal of the capacitor 314 is connected to a node 321. The node 317 is connected to a first terminal of a switch 310 and to a first terminal of a capacitor 312. A second terminal of switch 310 is connected to an undotted terminal of an inductor 306. A second terminal of capacitor 312 is connected to a node 318. A dotted terminal of inductor 306 is connected to the node 321. A first terminal of a capacitor 313 is connected to node 318. A second terminal of capacitor 313 is connected to a node 319. A first terminal of a switch 311 is connected to the node 321. A second terminal of switch 311 is connected to node 319. A dotted terminal of an inductor 309 is connected to node 318. An undotted terminal of inductor 309 is connected to a node 322. An undotted terminal of an inductor 305 is connected to node 321. A dotted terminal of inductor 305 is connected to node 322. A first terminal of a capacitor 315 is connected to node 321. A second terminal of capacitor 315 is connected to an undotted terminal of an inductor 308. A dotted terminal of inductor 308 is connected to a node 320. A dotted terminal of an inductor 304 is connected to node 319. An undotted terminal of inductor 304 is connected to node 320. A second network terminal 301 is connected to node 320. A third network terminal 302 is connected to node 322.

Operation

Figure 29:
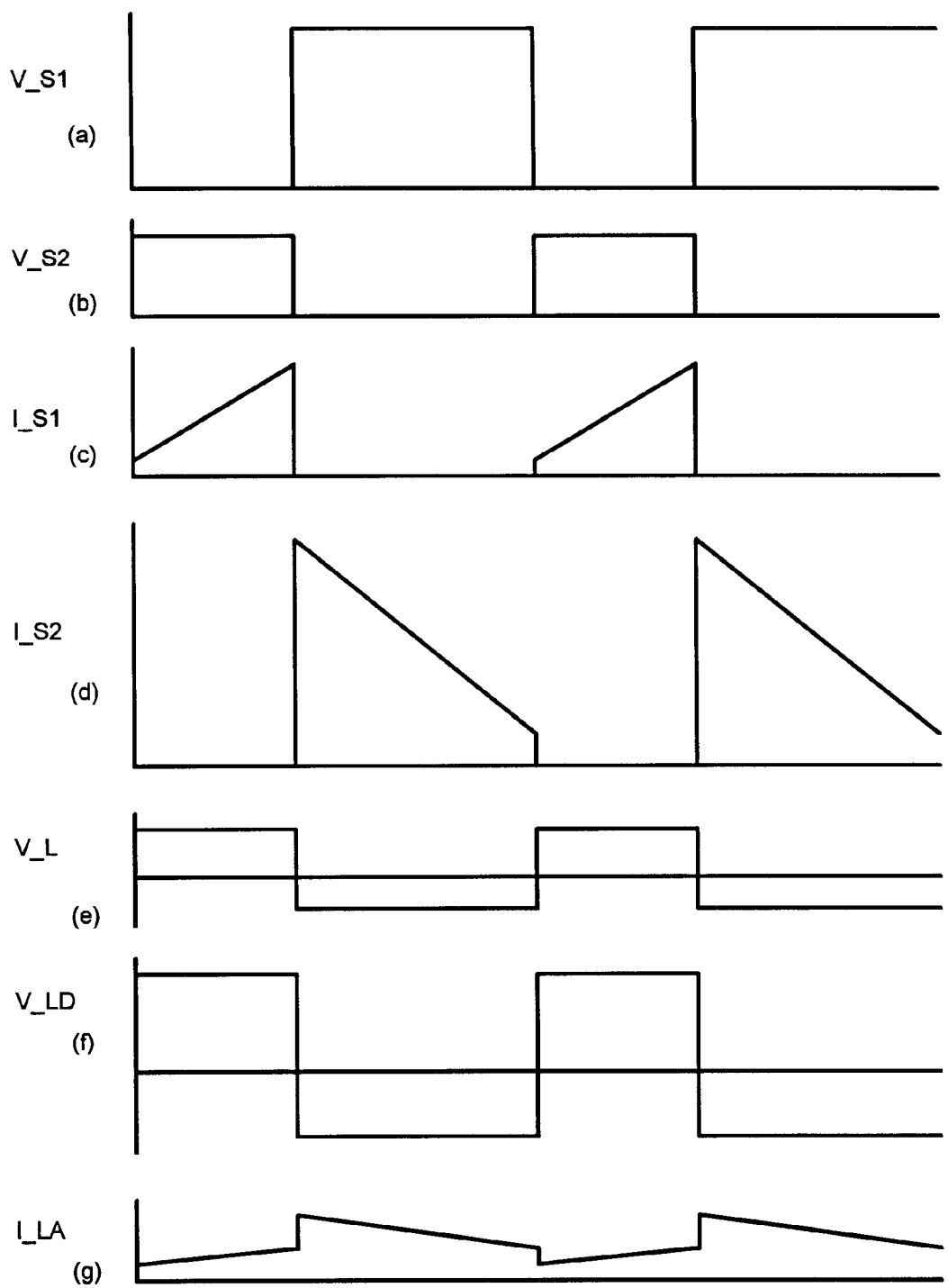
FIG. 29 illustrates voltage and current wave forms of the FIG. 28 network.
Figure 30:
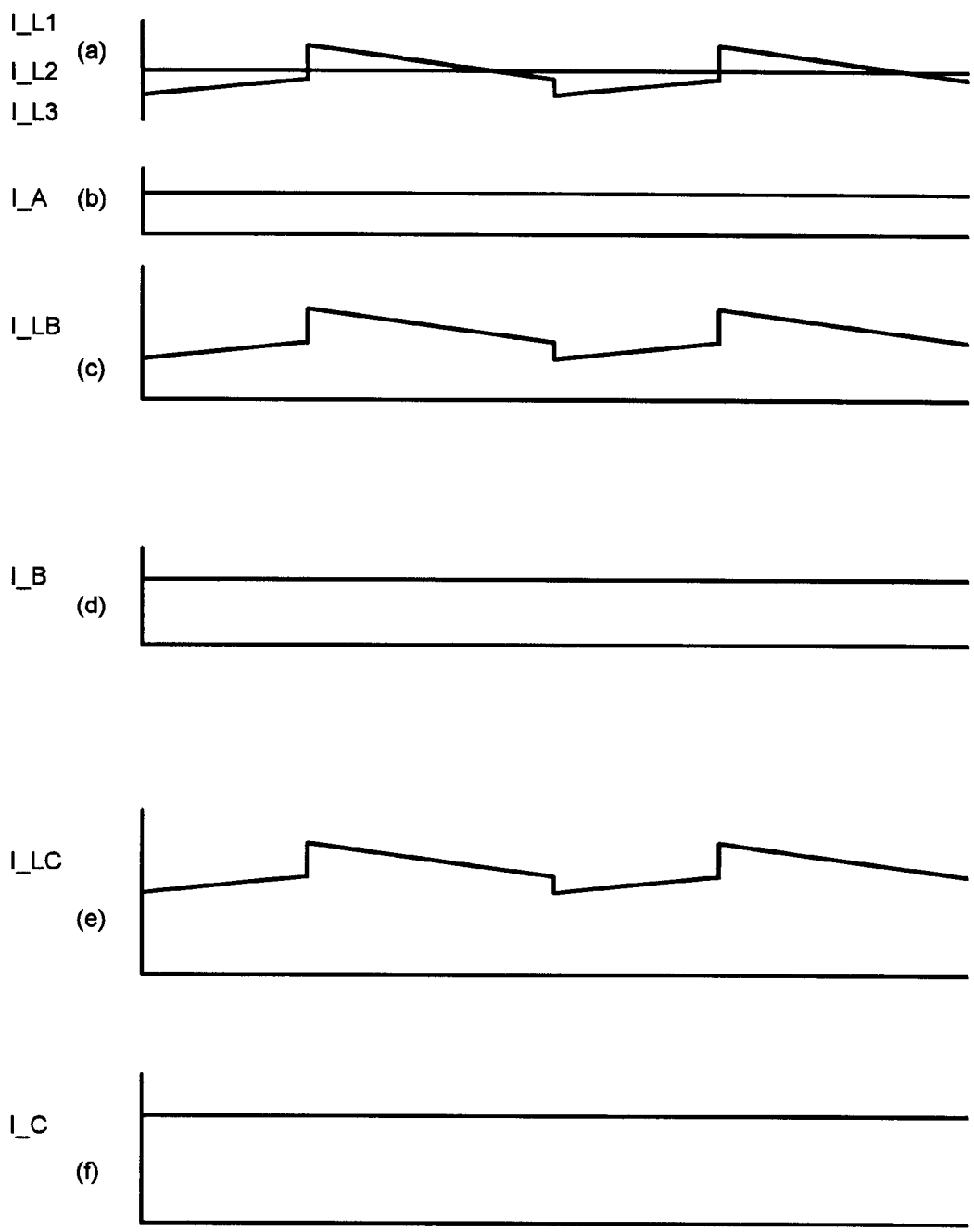
FIG. 30 illustrates inductor and terminal current wave forms of the FIG. 28 network.
Figure 31:
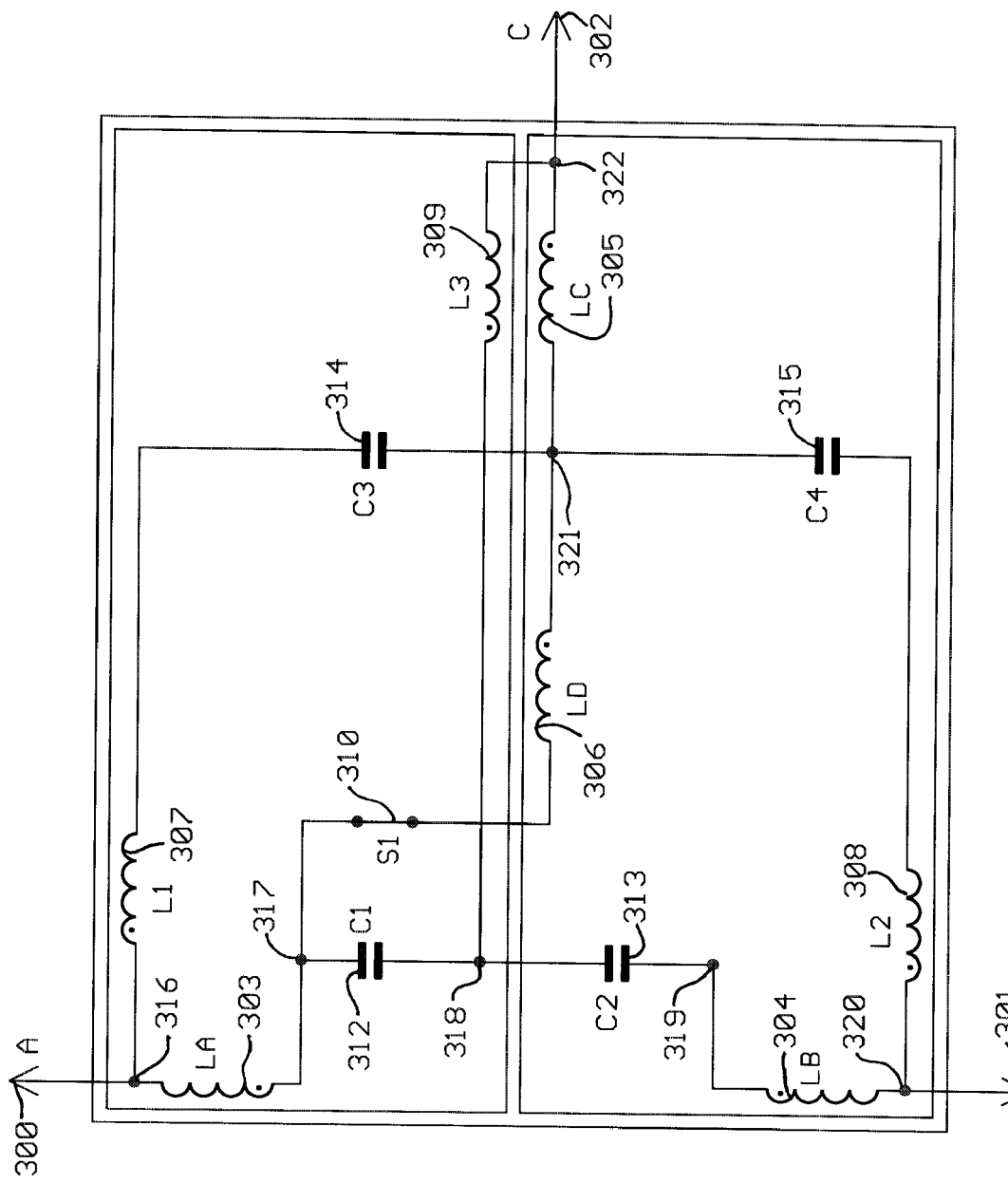
FIG. 31 illustrates an on state of the FIG. 28 network.

It is assumed in this analysis that the system has reached a settled operating condition. Except for the short, but finite, switching intervals there are two states of the circuit of FIG. 28, an on state and an off state. We will assume for the operational state analysis that the A first network terminal 300 voltage is more positive than the C third network terminal 302 is more positive than the B second network terminal 301 voltage. The applied voltage to the capacitor 312, $V_{C1}$, will be equal to the voltage difference between the A first network terminal 300 voltage, $V_A$, and the C third network terminal 302 voltage, $V_C$, or $V_{C1}=V_A-V_C$. This results from the fact that both terminals of the capacitor 312 are connected to the network terminals 300 and 302 through inductors 303 and 309, respectively, whose average applied voltages are zero. The applied voltage to the capacitor 313, $V_{C2}$, will be equal to the voltage difference between the C third network terminal 302 voltage, $V_C$, and the B second network terminal 301 voltage, $V_B$, or $V_{C2}=V_C-V_B$. This results from the fact that the terminals of the capacitor 313 are connected to the B second network terminal 301 through an inductor 304 and to the C third network terminal 302 through the inductor 309, whose average applied voltages are zero. The applied voltage to the capacitor 314, $V_{C3}$, will be equal to the voltage difference between the A first network terminal 300 voltage, $V_A$, and the C third network terminal 302 voltage, $V_C$, or $V_{C3}=V_A-V_C$. This results from the fact that both terminals of the capacitor 314 are connected to the network terminals 300 and 302 through inductors 307 and 305, respectively, whose average applied voltages are zero. The applied voltage to the capacitor 315, $V_{C4}$, will be equal to the voltage difference between the C third network terminal 302 voltage, $V_C$, and the B second network terminal 301 voltage, $V_B$, or $V_{C4}=V_C-V_B$. This results from the fact that the terminals of the capacitor 315 are connected to the B second network terminal 301 through an inductor 308 and to the C third network terminal 302 through the inductor 305, whose average applied voltages are zero. Consider an initial condition as illustrated in FIG. 31. The initial condition represents the on state. During the initial condition the switch 310 is on (closed) and the switch 311 is off (open). The voltage and current wave forms for the components are illustrated in FIGS. 29 and 30. The current in the inductor 303, $I_{LA}$, is flowing from top to bottom into the undotted terminal and out of the dotted terminal. The current in the inductor 304, $I_{LB}$, is flowing from bottom to top into the undotted terminal and out of the dotted terminal. The current in the inductor 305, $I_{LC}$, is flowing from left to right into the undotted terminal and out of the dotted terminal. The current in the inductor 306, $I_{LD}$, is flowing from left to right into the undotted terminal and out of the dotted terminal. The currents in the other inductors are AC since each of the other inductors has a capacitor in series with the inductor blocking DC current flow. The currents in all seven inductors will be becoming more positive in value during the on state, where the positive direction is into the undotted terminal and out of the dotted terminal. For each inductor during the on state the undotted terminal will be more positive than the dotted terminal. Consider the current at the node 316. Current is flowing away from the node 316 at an increasing rate into the undotted terminal of inductor 303 while at the same time current is flowing at an increasing rate towards the node 316 from the dotted terminal of the inductor 307. If the rates of the increasing current flow in inductors 303 and 307 are equal then the rate of change of current flow out of the node 316 is zero and the rate of change of A terminal 300 current flow is zero. By the same argument we can show that the terminal current slopes at the B terminal 301 and C terminal 302 are also zero.

Figure 32:
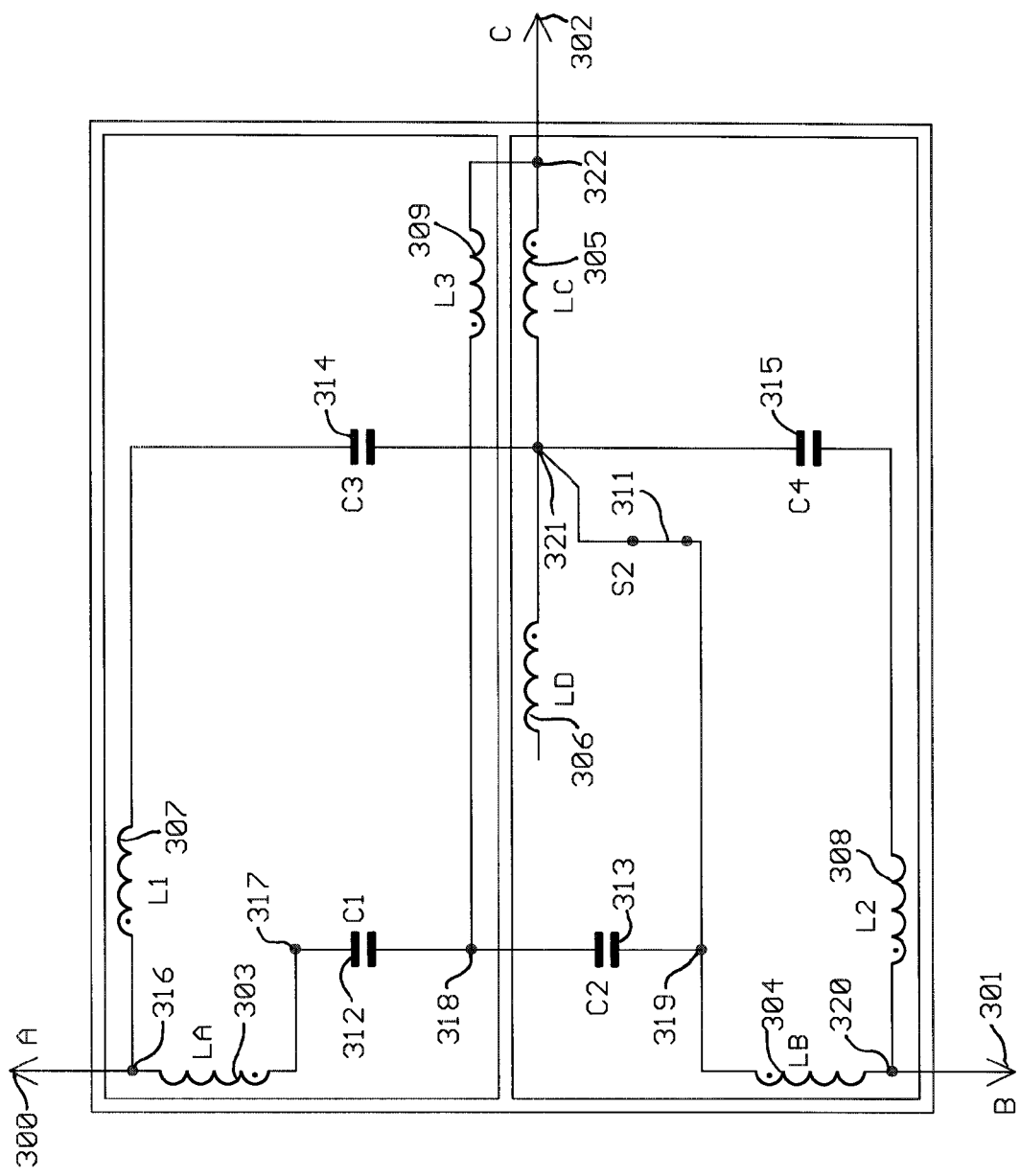
FIG. 32 illustrates an off state of the FIG. 28 network.

At a time determined by the control circuit the switches change state so that the S1 switch 310 is off (open) and the S2 switch 311 is on (closed) and the network enters the off state illustrated in FIG. 32. During the off state the currents in all seven inductors decrease, except that the current in the inductor 306 drops immediately to zero as the S1 switch 310 turns off. With the S1 switch 310 opens the inductor 306 current, $I_{LD}$, flows in the other six inductors. The energy associated with the inductor 306 current appears as increased current flowing from undotted terminal to dotted terminal in each of the other six inductors during the off state. The effect of the current step on the terminal currents is zero since there is simultaneously a step increase in inductor current flowing out of the terminal from one inductor and an equal step decrease in inductor current flowing into the terminal in the other inductor connected to the same terminal for a net zero result. During the off state the current flowing from node 316 to the undotted terminal of inductor 303 is decreasing as the current flowing from the dotted terminal of inductor 307 to the node 316 is decreasing so that the net current flowing from the node 316 is unchanged. As a result the current slope of the A network terminal 300 current is zero during the off state. The same conditions apply at the other two network terminals so that the net current slope of all three terminal currents is zero. When the inductors currents have ramped down to their values at the beginning of the on state the switches 310 and 311 change state again and the cycle repeats.

Related Embodiments

Figure 33:
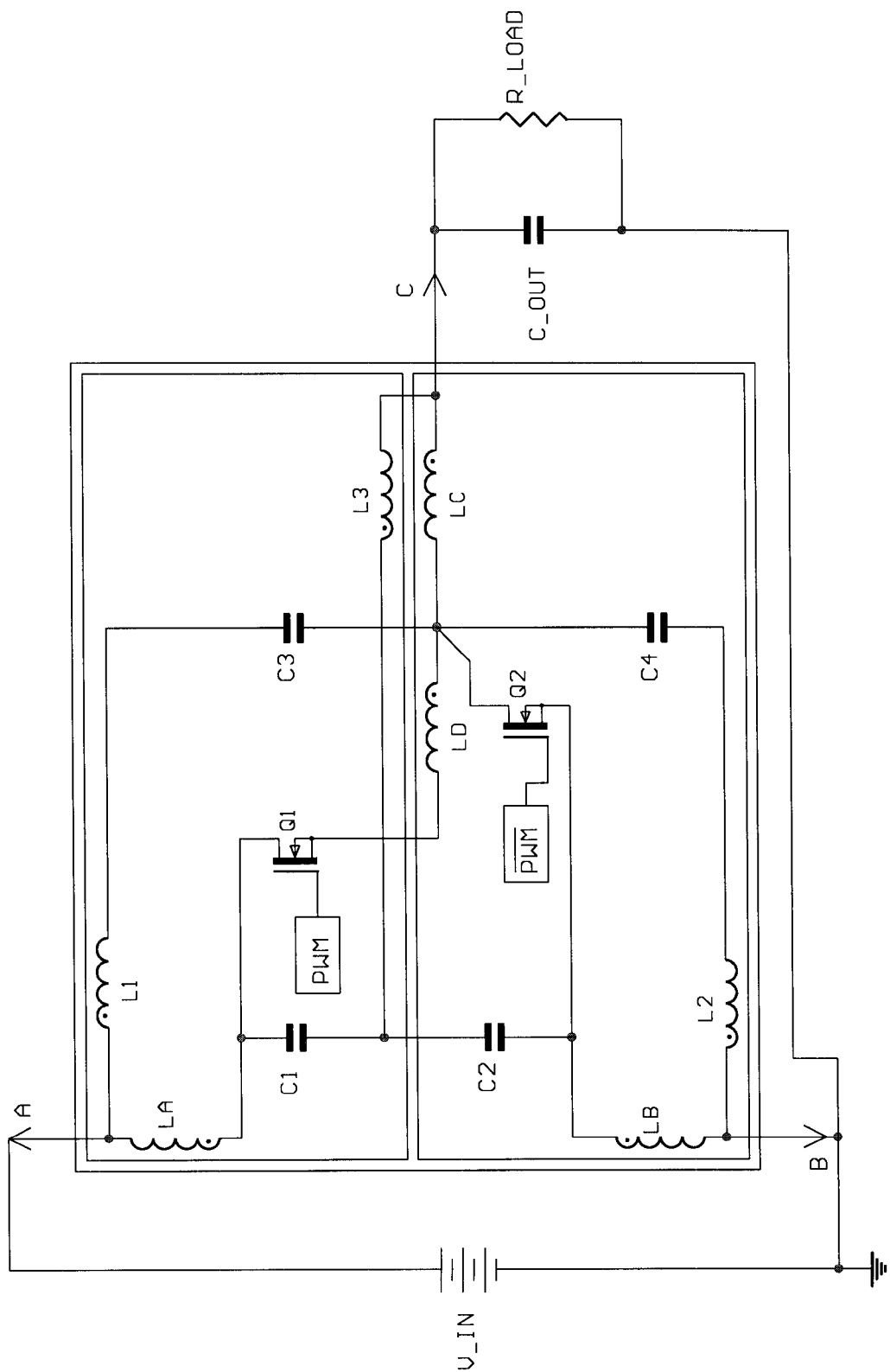
FIG. 33 illustrates a synchronous rectifier buck form of the FIG. 28 network with step down tapped inductor.

FIG. 33 illustrates a buck embodiment of the FIG. 28 network in which the switches are implemented using mosfets. The transfer function for the buck form is given by $$V_{OUT} = \frac{R \cdot D \cdot V_{IN}}{1 + D \cdot (R - 1)}. \quad (10)$$

where we assume that $N_A=N_B$ and $$R = \frac{N_A + N_C}{N_A + N_C + N_D}.$$

This buck form is most suitable to applications with high step down ratios.

Figure 34:
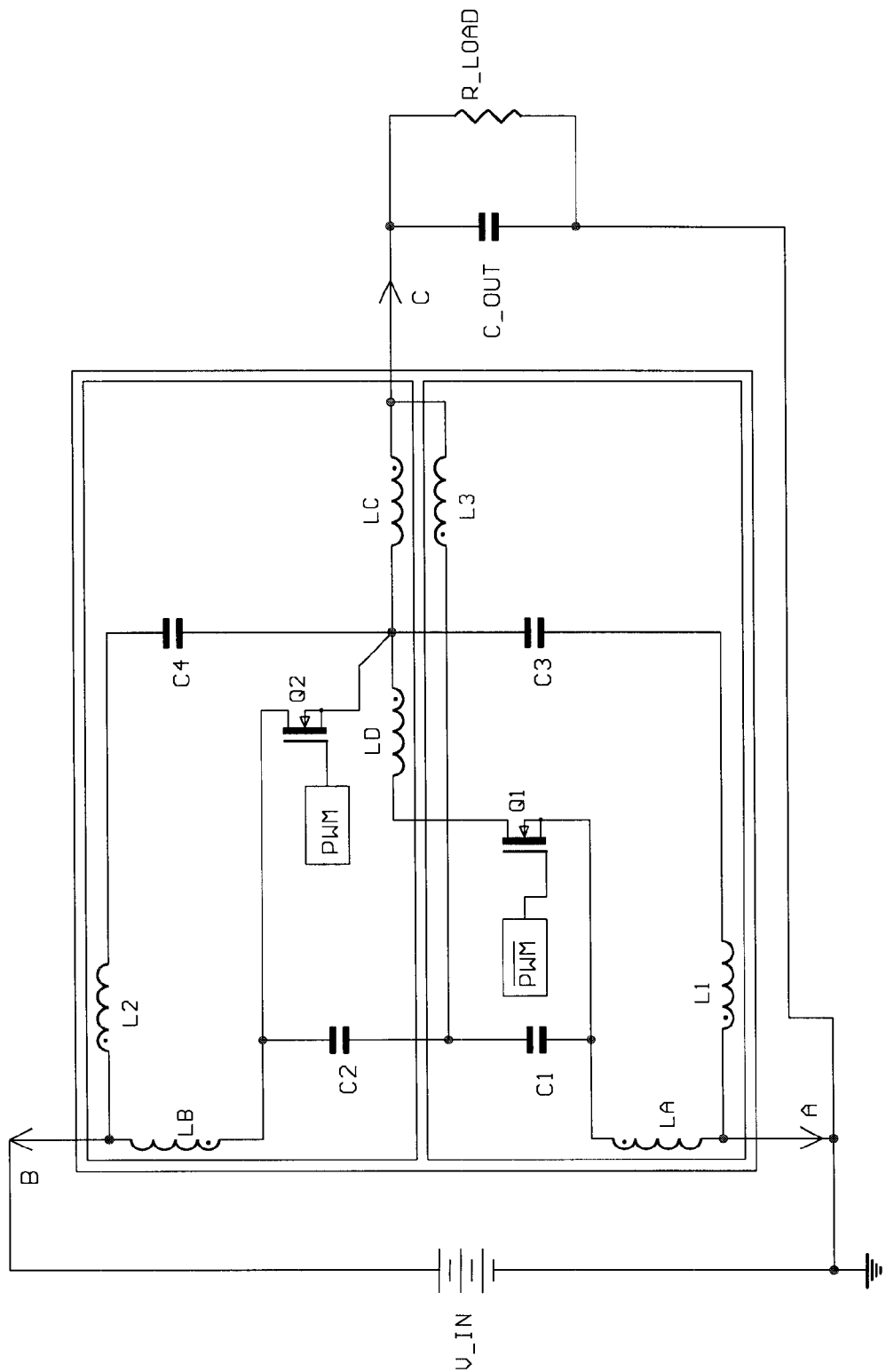
FIG. 34 illustrates a synchronous rectifier buck form of the FIG. 28 network with step up tapped inductor.

FIG. 34 illustrates another buck form similar to the FIG. 33 form but in which the A terminal is ground or zero volts and the B terminal is connected to the input power source. This form is most suitable to applications with near unity step down ratios.

Figure 35:
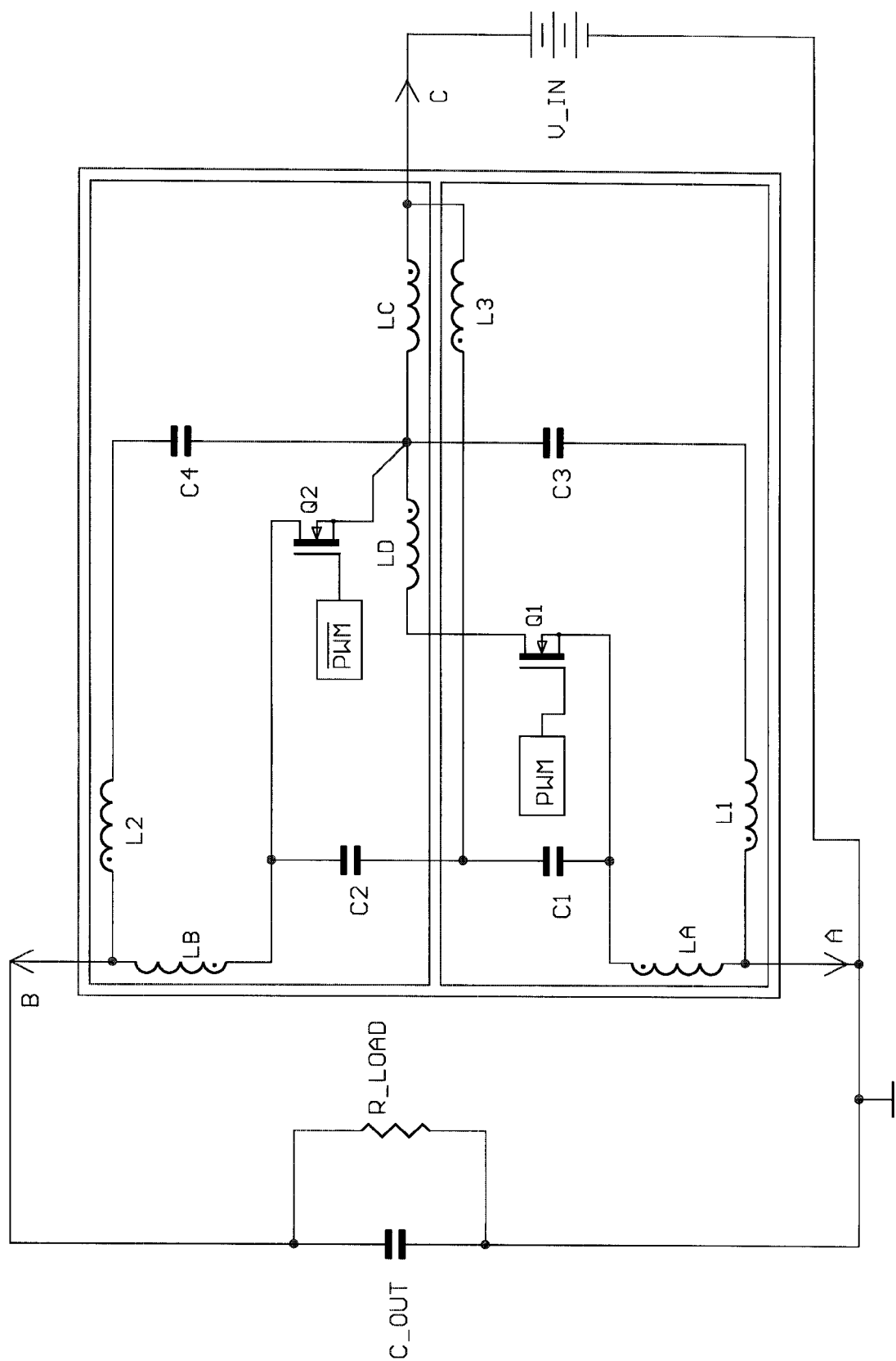
FIG. 35 illustrates a synchronous rectifier boost form of the FIG. 28 network with step down tapped inductor.

FIG. 35 illustrates a boost form of the FIG. 28 network suitable to applications with near unity step up ratio.

Figure 36:
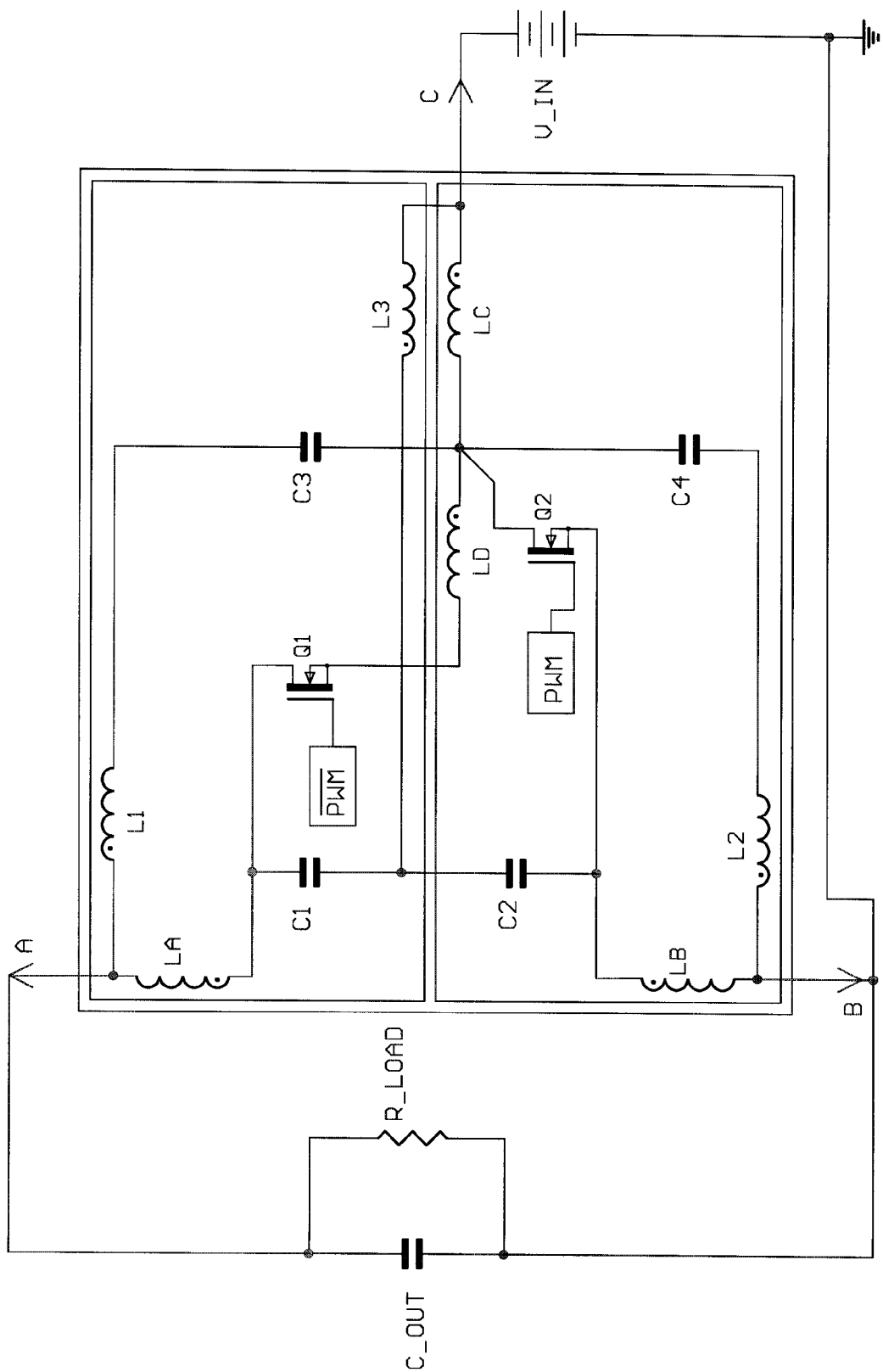
FIG. 36 illustrates a synchronous rectifier boost form of the FIG. 28 network with step up tapped inductor.

FIG. 36 illustrates a boost form of the FIG. 28 network suitable to applications with high step up ratios.

Figure 37:
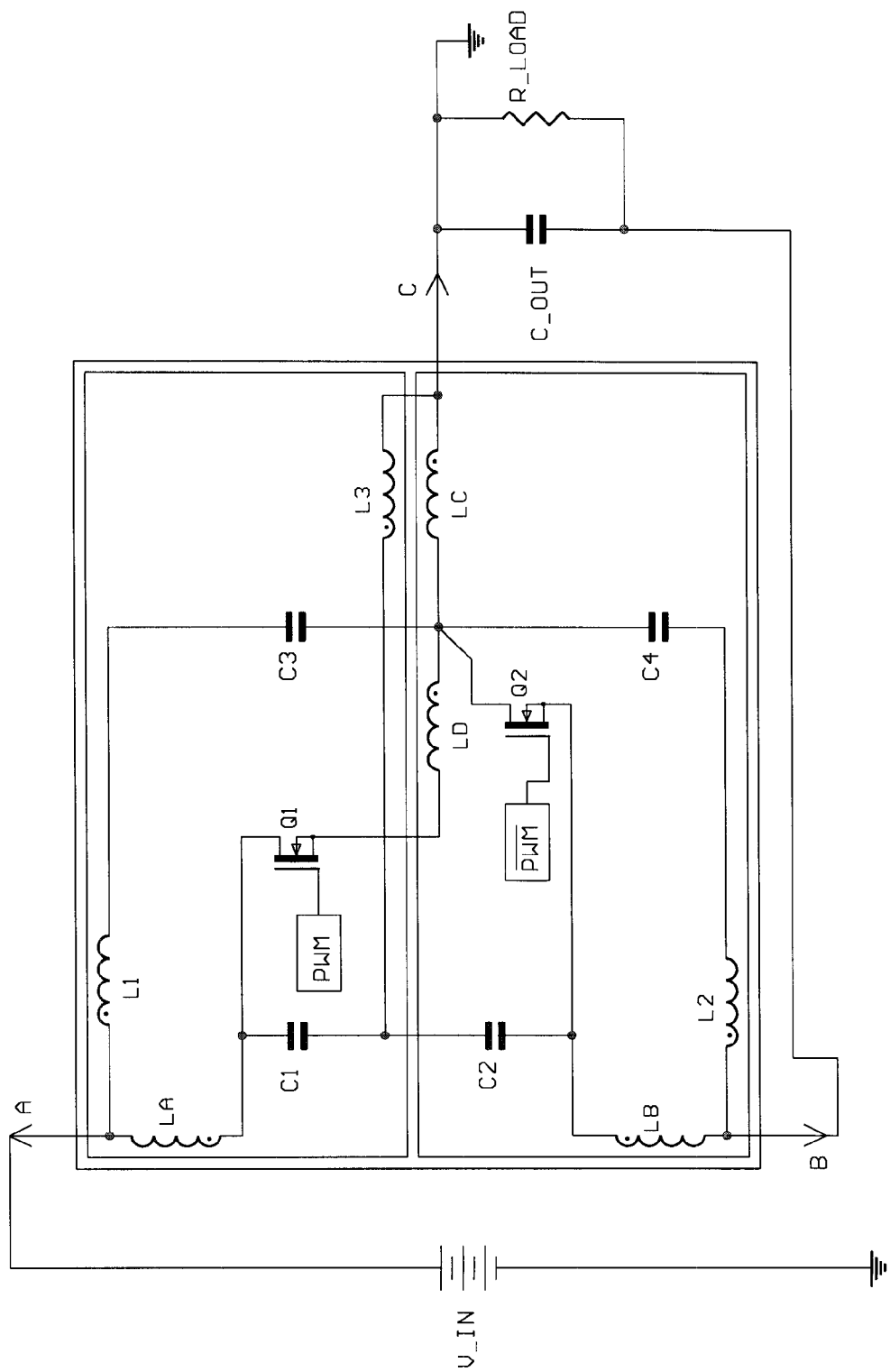
FIG. 37 illustrates a synchronous rectifier flyback form of the FIG. 28 network with step down tapped inductor.

FIG. 37 illustrates a flyback form of the FIG. 28 network suitable to applications with high ratios of input to output voltage.

Figure 38:
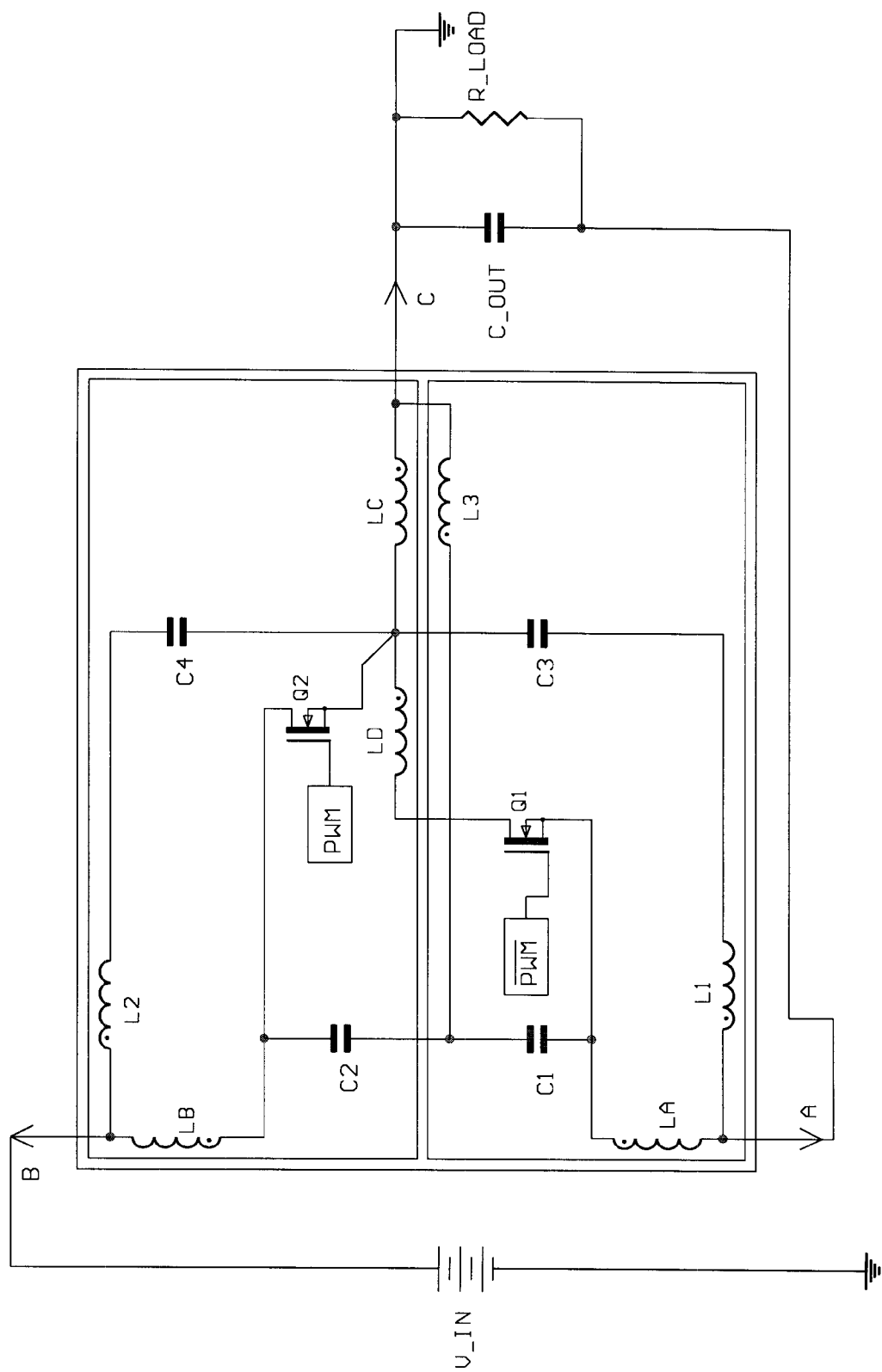
FIG. 38 illustrates a synchronous rectifier flyback form of the FIG. 28 network with step up tapped inductor.

FIG. 38 illustrates a flyback form of the FIG. 28 network suitable to applications with high ratios of output to input voltage.

Figure 39:
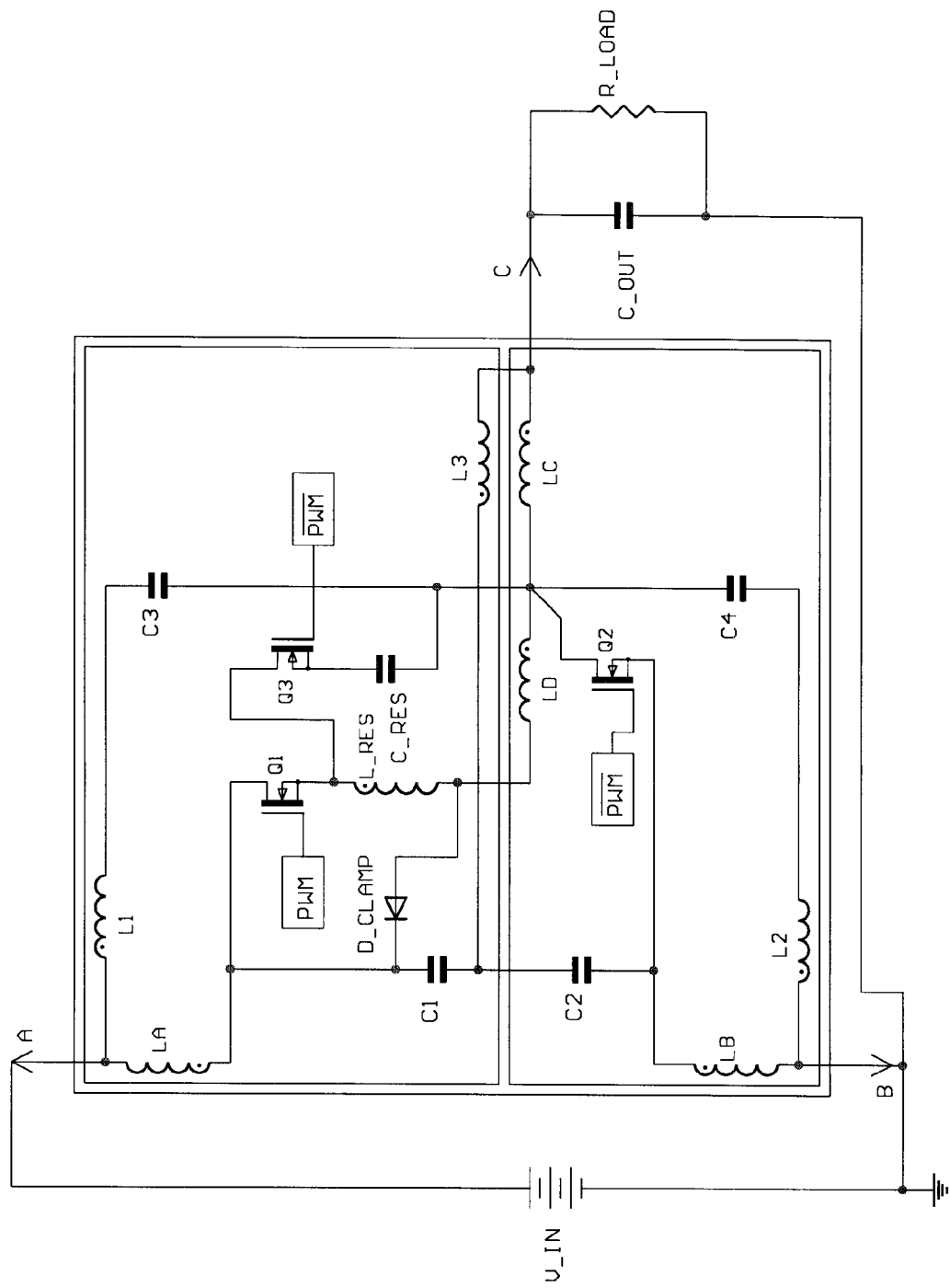
FIG. 39 illustrates a synchronous rectifier buck form of the FIG. 28 network with step down tapped inductor and active clamp zero voltage switching.

FIG. 39 illustrates a buck form of the FIG. 28 network with the addition of an active clamp network which simultaneously accomplishes voltage clamping and zero voltage switching. The active clamp network consists of the Q3 switch, a clamp diode, a capacitor, and a small choke for providing energy to drive the zero voltage switching (ZVS) transition. The additional diode clamps ringing associated with the L_RES choke and circuit parasitic capacitances. The circuit can also benefit from a second clamp diode connected with the anode of the diode connected to the source of Q3 and with the cathode connected to the anode of the diode shown. This additional diode (not shown) clamps ringing associated with the leakage inductance of LD. By comparison to FIG. 11 the FIG. 39 circuit accomplishes zero voltage switching with much lower conduction losses in the circuitry added to accomplish zero voltage switching. This is a result of the reduced current and increased duty cycle in the switch 310 due to the inductor tap which reduces both the current in and the duty cycle of the third switch used to accomplish zero voltage switching.

Figure 40:
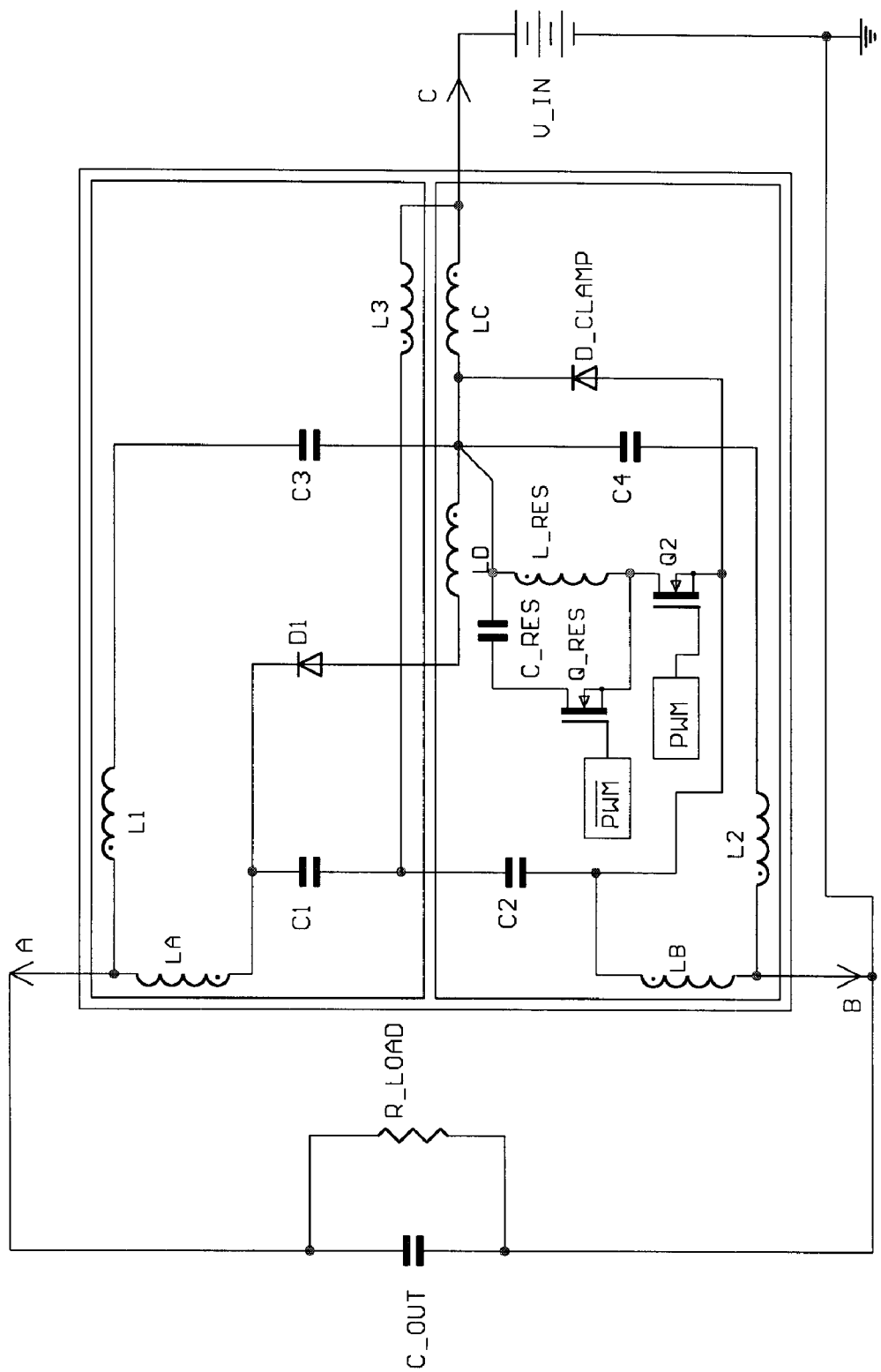
FIG. 40 illustrates a boost form of the FIG. 28 network with step up tapped inductor and active clamp zero voltage switching.

FIG. 40 is a ZVS boost version of the FIG. 39 circuit but with a different C_RES connection. The connection provided in FIG. 40 allows reduced switch current stress by comparison to the FIG. 39 circuit but does not provide a clamp for LD.

PWM Cross Switch Complement Conversion
Network with Ripple Current Cancellation

Figure 41:
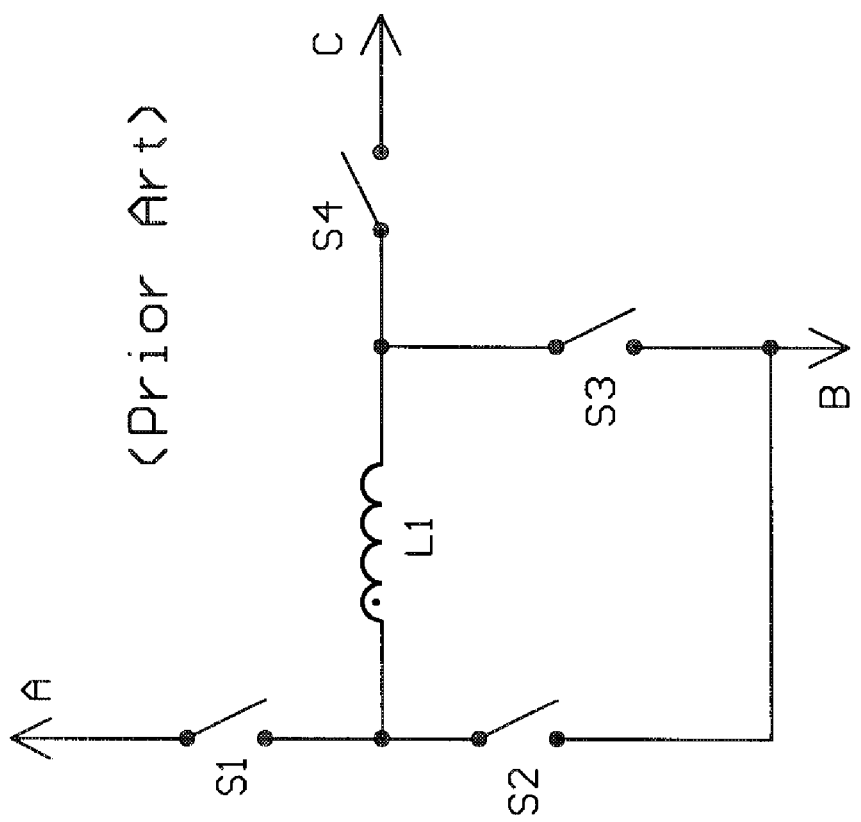
FIG. 41 illustrates a step up/down network according to the prior art.
Figure 42:
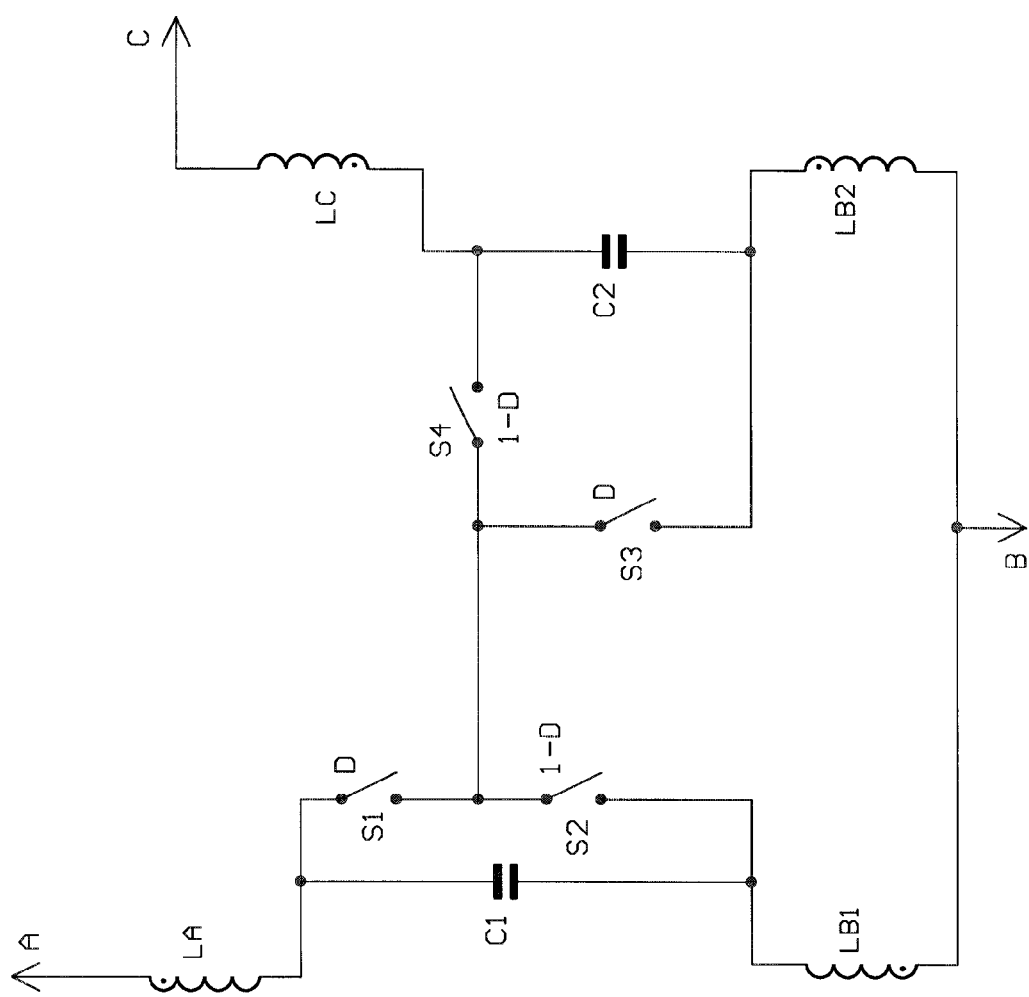
FIG. 42 illustrates a step up/down network with the inductor split then moved through the switches in a manner similar to that suggested by FIG. 1.
Figure 43:
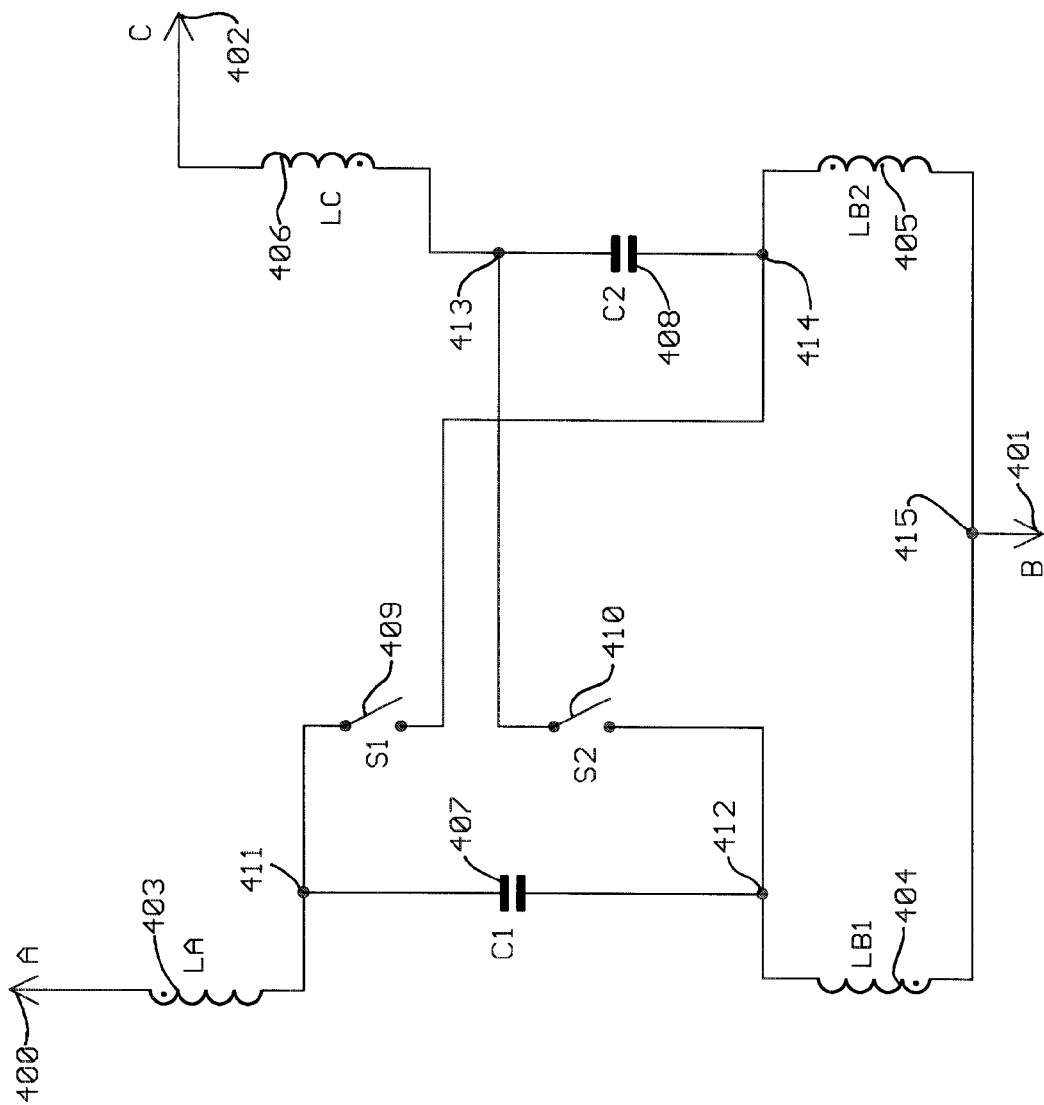
FIG. 43 illustrates a step up/down network with two of the four switches combined into the other two switches with ripple cancellation in the B terminal.

FIG. 41 illustrates a four switch single inductor conversion network which can be connected to sources and load to form a circuit with any of the complement transfer functions given by equation (3). By splitting the inductor into two series inductors and then applying a process similar to the process illustrated in FIG. 1 the two inductors can be split again and moved to the network terminals with the result that the network terminal currents are either non-pulsating or zero ripple, as illustrated in FIG. 42. Also, after the inductors have been moved to the network terminals the switches are found to be in series and two of the switches are redundant and can be removed, as illustrated in FIG. 43. The transfer function for the FIG. 43 network is identical to the transfer function for the FIG. 16 network, given by equation (3), but the FIG. 16 network has seven inductors and the FIG. 43 network only four inductors. The FIG. 16 network achieves zero ripple at all three network terminals and the FIG. 43 network achieves zero ripple at one terminal and non-pulsating current at the other two terminals. A six inductor form of the FIG. 43 network which accomplishes zero ripple at all three terminals will be revealed below.

Referring to FIG. 43 there is shown a three terminal PWM cross switch complement power conversion network in which input DC voltages are converted into an output DC voltage. The circuit requires two input sources, one of which may be ground, of substantially DC voltage, four inductors, two switches, and two capacitors coupling the inductors and the switches. For purposes of the operational state analysis, it is assumed that the capacitors are sufficiently large that the voltages developed across the capacitors are approximately constant over a switching interval and equal to the differences in voltage between two of the terminal voltages. We will also assume for purposes of analysis that the inductors are large so that the current in the inductors is invariant over a switching cycle. Also, for purposes of the operational state analysis, it is assumed that the input DC voltage sources have sufficiently low source impedance that the voltages developed between the input DC voltage sources are approximately constant over a switching interval. It will finally be assumed that the power switches are ideal, that is, lossless and able to carry current in either direction. We will also assume for purposes of the operational state analysis that all four inductors are equal in inductance value.

Structure

The structure of the circuit of the subject invention is shown in FIG. 43. A first network terminal 400 is connected to a dotted terminal of an inductor 403. An undotted terminal of inductor 403 is connected to a node 411. The node 411 is connected to a first terminal of a switch 409 and to a first terminal of a capacitor 407. A second terminal of switch 409 is connected to a node 414. A second terminal of capacitor 407 is connected to a node 412. The node 412 is connected to an undotted terminal of an inductor 404 and to a first terminal of a switch 410. The node 414 is connected to a first terminal of a capacitor 408 and to a dotted terminal of an inductor 405. A dotted terminal of inductor 404 is connected to a node 415. An undotted terminal of inductor 405 is connected to node 415. A second network terminal 401 is connected to node 415. A second terminal of switch 410 is connected to a node 413. A second terminal of capacitor 408 is connected to node 413. A dotted terminal of an inductor 406 is connected to node 413. An undotted terminal of inductor 406 is connected to a third network terminal 402.

Operation

Figure 44:
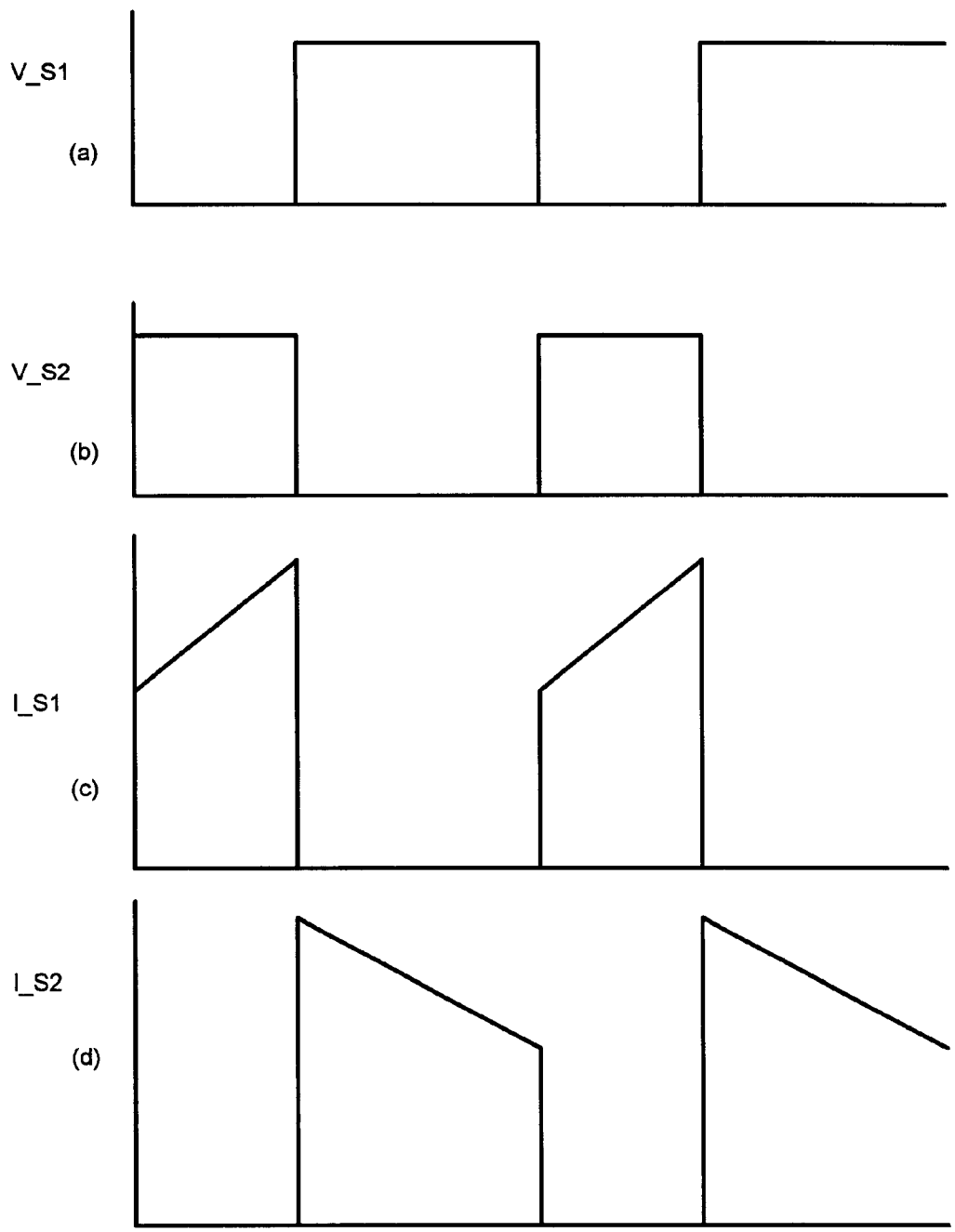
FIG. 44 illustrates voltage and current wave forms of the FIG. 43 network.
Figure 45:
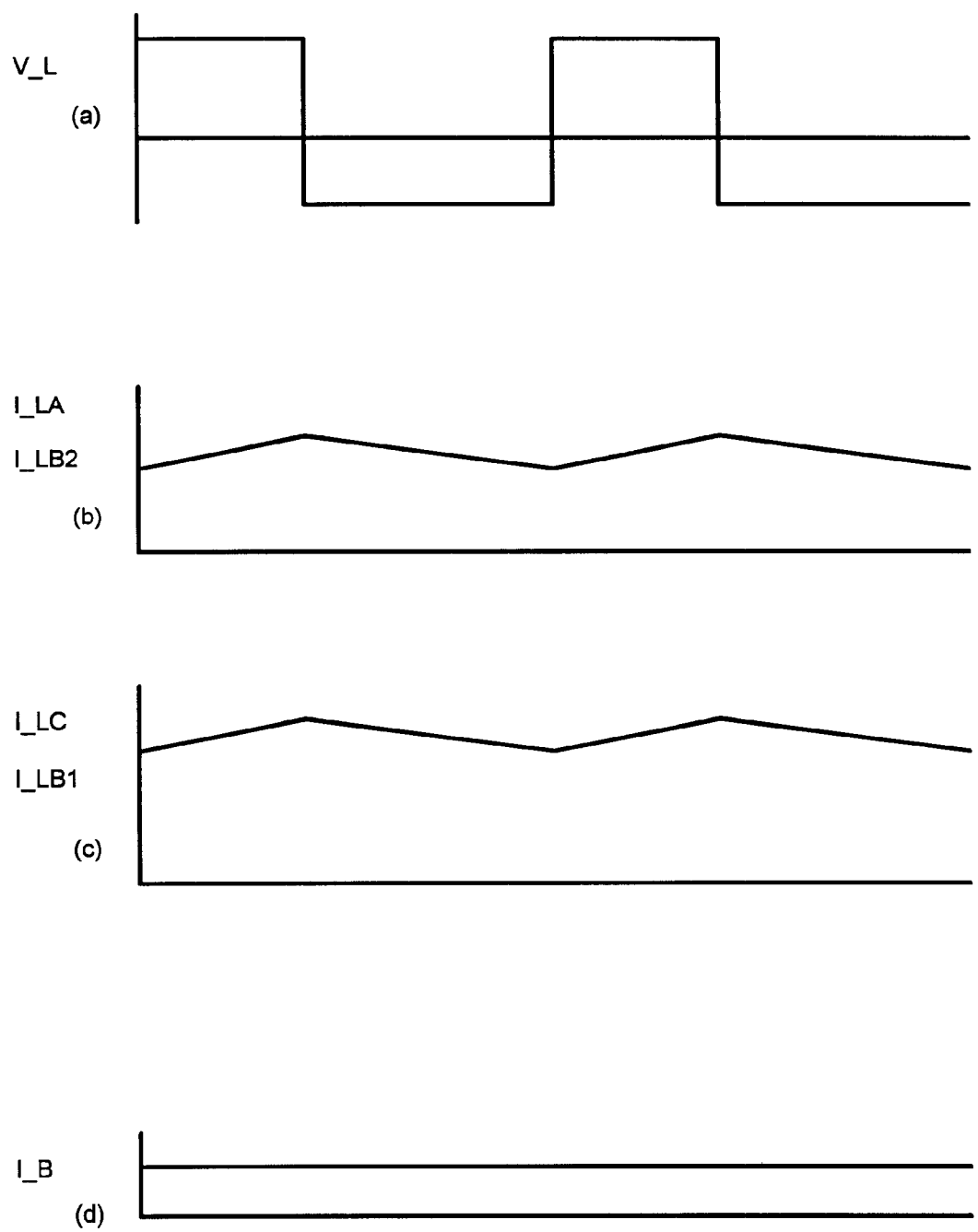
FIG. 45 illustrates more voltage and current wave forms of the FIG. 43 network.
Figure 46:
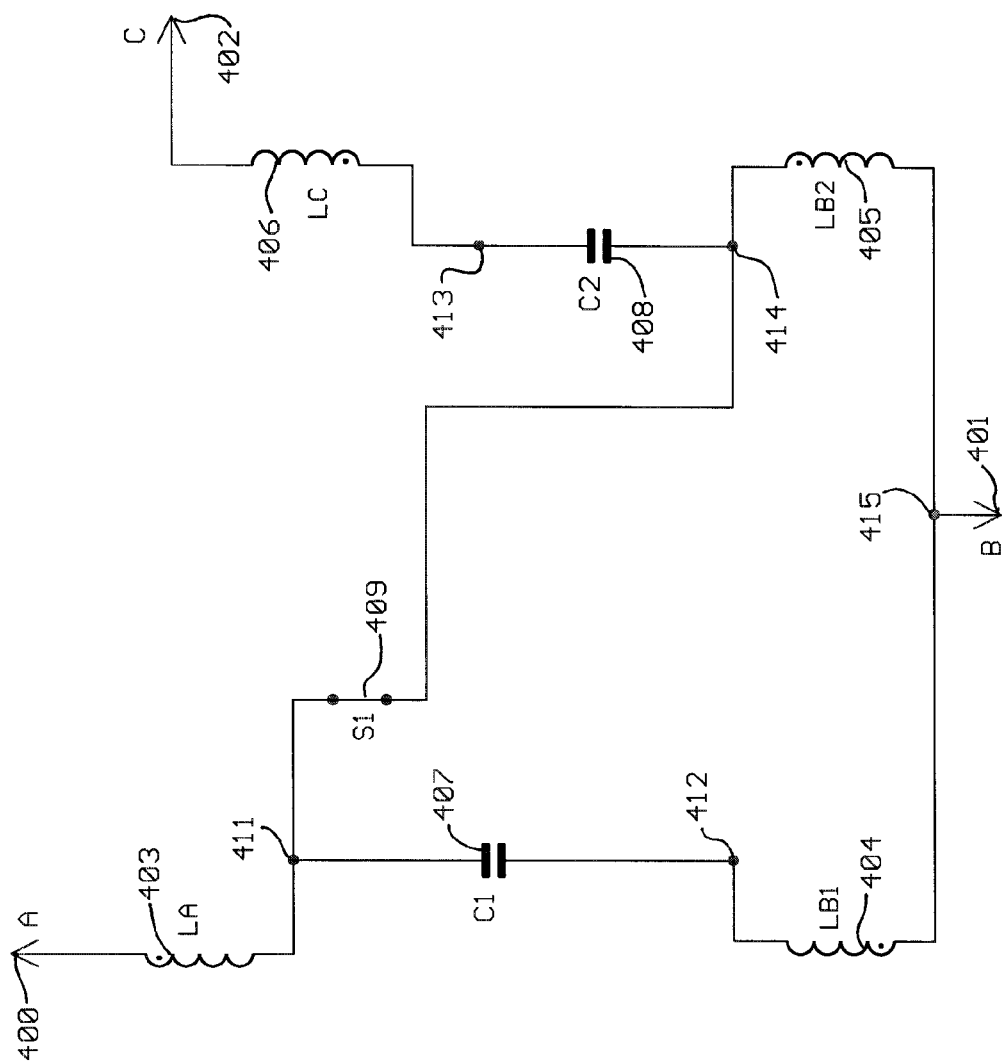
FIG. 46 illustrates an on state of the FIG. 43 network.

It is assumed in this analysis that the system has reached a settled operating condition. Except for the short, but finite, switching intervals there are two states of the circuit of FIG. 43, an on state and an off state. We will assume for the operational state analysis that the A first network terminal 400 voltage is more positive than the B second network terminal 401 voltage and that the C third network terminal 402 voltage is more positive than the B second network terminal 401 voltage. The applied voltage to the capacitor 407, $V_{C1}$, will be equal to the voltage difference between the A first network terminal 400 voltage, $V_A$, and the B second network terminal 401 voltage, $V_B$, or $V_{C1}=V_A-V_B$. This results from the fact that the first terminal of the capacitor 407 is connected to the A first network terminal 400 through an inductor 403 and the second terminal of the capacitor 407 is connected to the B second network terminal 401 through an inductor 404 and the average applied voltages to the inductors are zero. The applied voltage to the capacitor 408, $V_{C2}$, will be equal to the voltage difference between the C third network terminal 402 voltage, $V_C$, and the B second network terminal 401 voltage, $V_B$, or $V_{C2}=V_C-V_B$. This results from the fact that the terminals of the capacitor 213 are connected to the B second network terminal 401 through an inductor 405 and to the C third network terminal 402 through the inductor 406, whose average applied voltages are zero. Consider an initial condition as illustrated in FIG. 46. The initial condition represents the on state. During the initial condition the switch 409 is on (closed) and the switch 410 is off (open). The voltage and current wave forms are illustrated in FIGS. 44 and 45. The current in the inductor 403, $I_{LA}$, is flowing from top to bottom into the doffed terminal and out of the undotted terminal. The current in the inductor 404, $I_{LB1}$, is flowing from bottom to top into the dotted terminal and out of the undotted terminal. The current in the inductor 405, $I_{LB2}$, is flowing from top to bottom into the dotted terminal and out of the undotted terminal. The current in the inductor 406, $I_{LC}$, is flowing from bottom to top into the dotted terminal and out of the undotted terminal. The current in all four inductors, 403, 404, 405, and 406, will be becoming more positive in value during the on state, where the positive direction is into the undotted terminal and out of the dotted terminal. The rate of increasing current into the node 415 from the inductor 405 is equal to the rate of decreasing current into the node 415 from the inductor 404 so that the net current ramp slope into the node 415 is zero and the ripple current of the B second network terminal 401 is zero.

Figure 47:
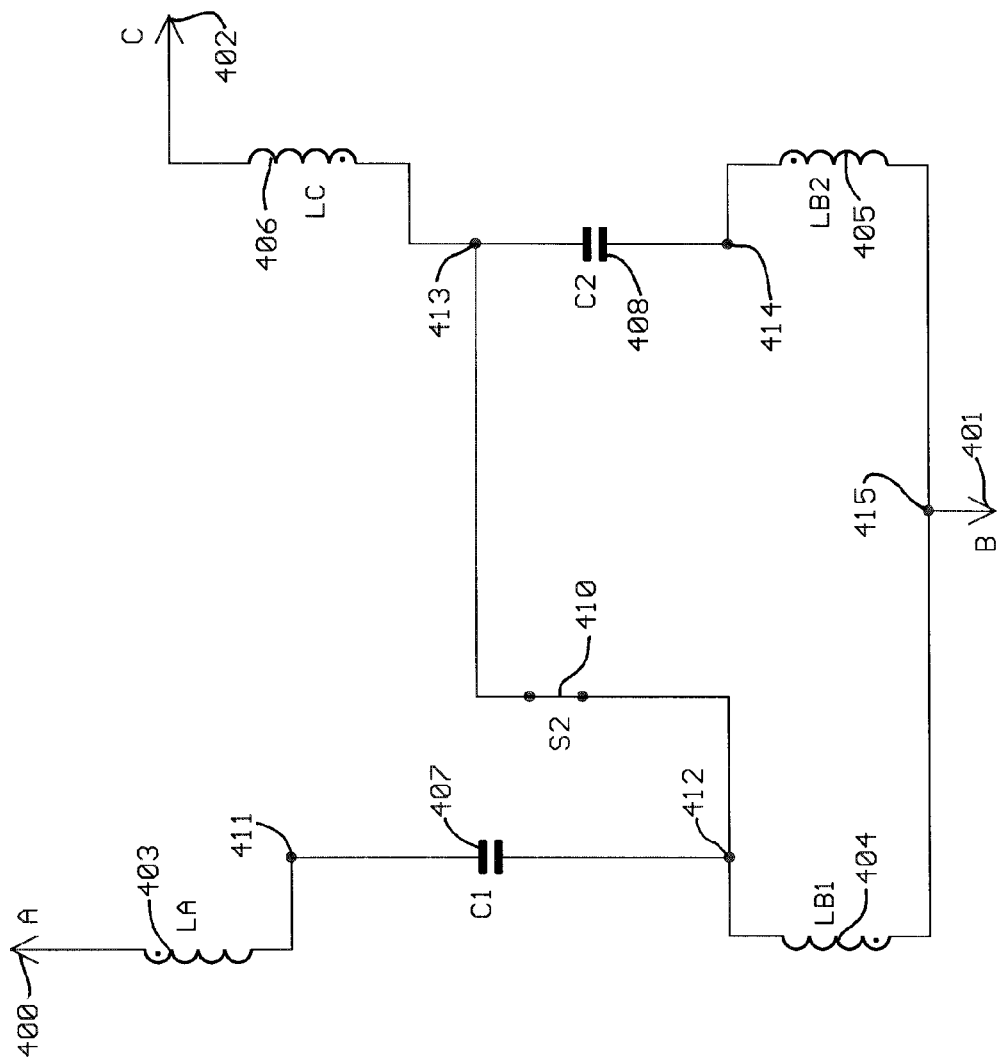
FIG. 47 illustrates an off state of the FIG. 43 network.

At a time determined by the control circuit the switch 409 is turned off (opened) and the switch 410 is turned on (closed) marking the beginning of the off state, illustrated in FIG. 47. During the off state the current in each inductor falls or becomes more negative. The inductor current slopes at the B second network terminal will cancel resulting in zero current slope for the net B network terminal 401 current. During both the off state and the on state the B second network terminal 401 current is DC with zero AC component. Since the B second network terminal current cannot change significantly during the brief switching transitions the current at the B network terminal 401 is constant or DC for the entire switching cycle. When the inductors currents have ramped down to their values at the beginning of the on state the switches 409 and 410 change state again and the cycle repeats.

Related Embodiments

Figure 48:
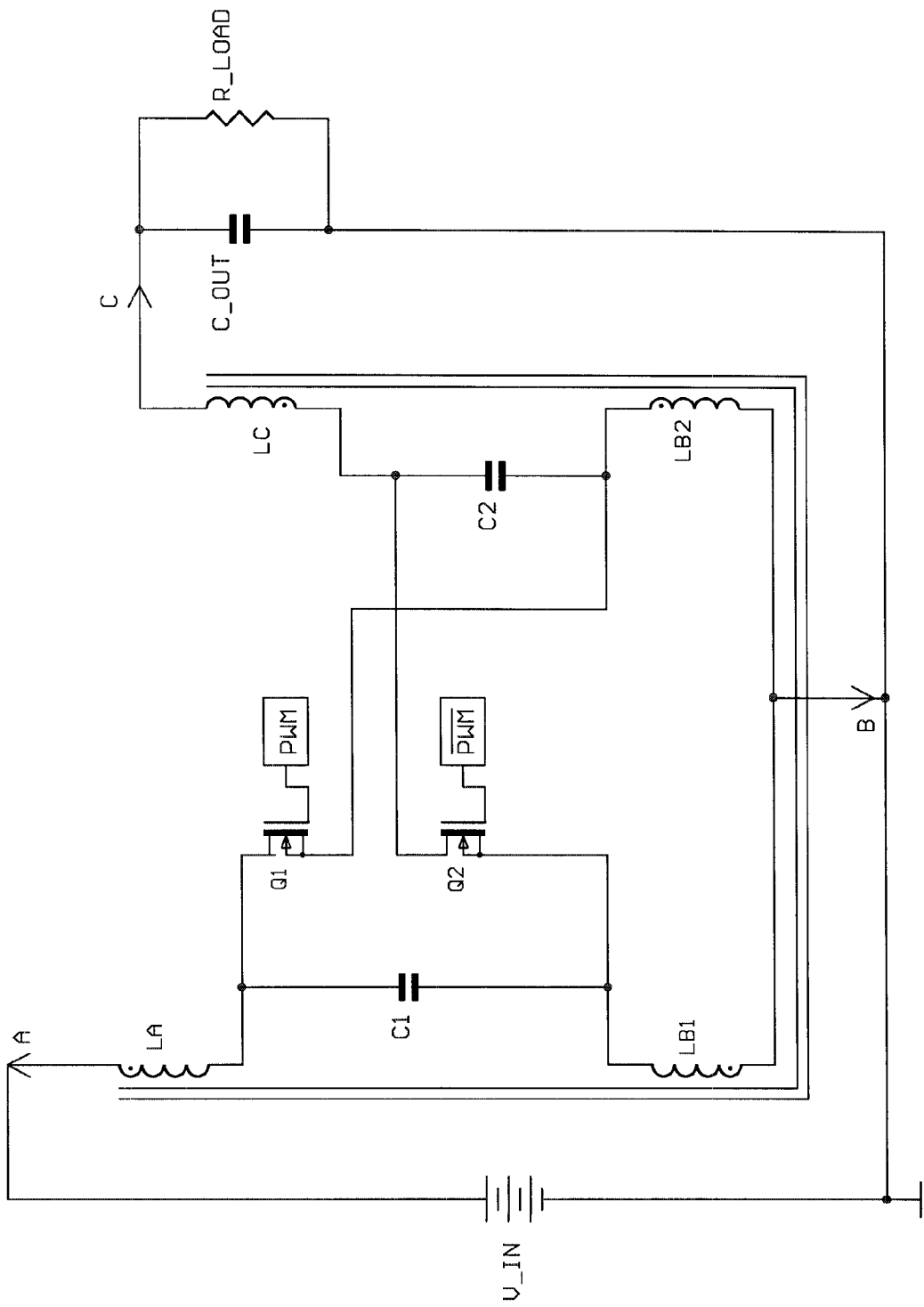
FIG. 48 illustrates a flyback complement form of the subject network with all windings coupled on a single common core.

FIG. 48 illustrates the FIG. 43 circuit with all four inductors loosely coupled together on a single common core with the switches implemented with mosfets. The transfer function for the FIG. 48 circuit is that of a flyback complement which is given by equation (4).

Figure 49:
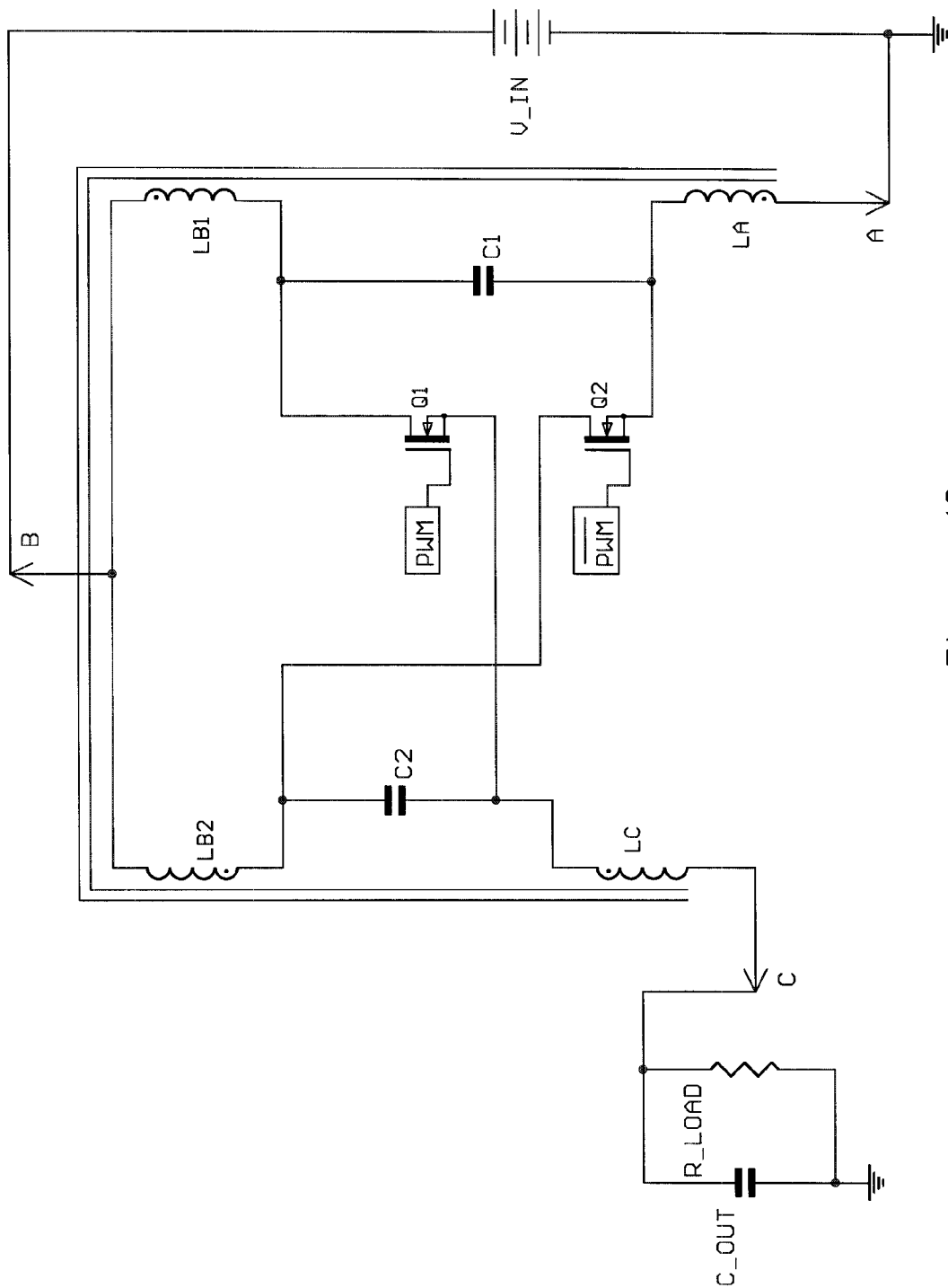
FIG. 49 illustrates a boost complement form of the FIG. 43 network with all windings coupled on a common core.

FIG. 49 illustrates the network of FIG. 43 with all four inductors loosely coupled on a single common core and the switches implemented with mosfets connected to form a boost complement converter. The transfer function for the FIG. 49 converter is given by equation (5). The FIG. 49 converter has zero ripple input current and non-pulsating output current.

Figure 50:
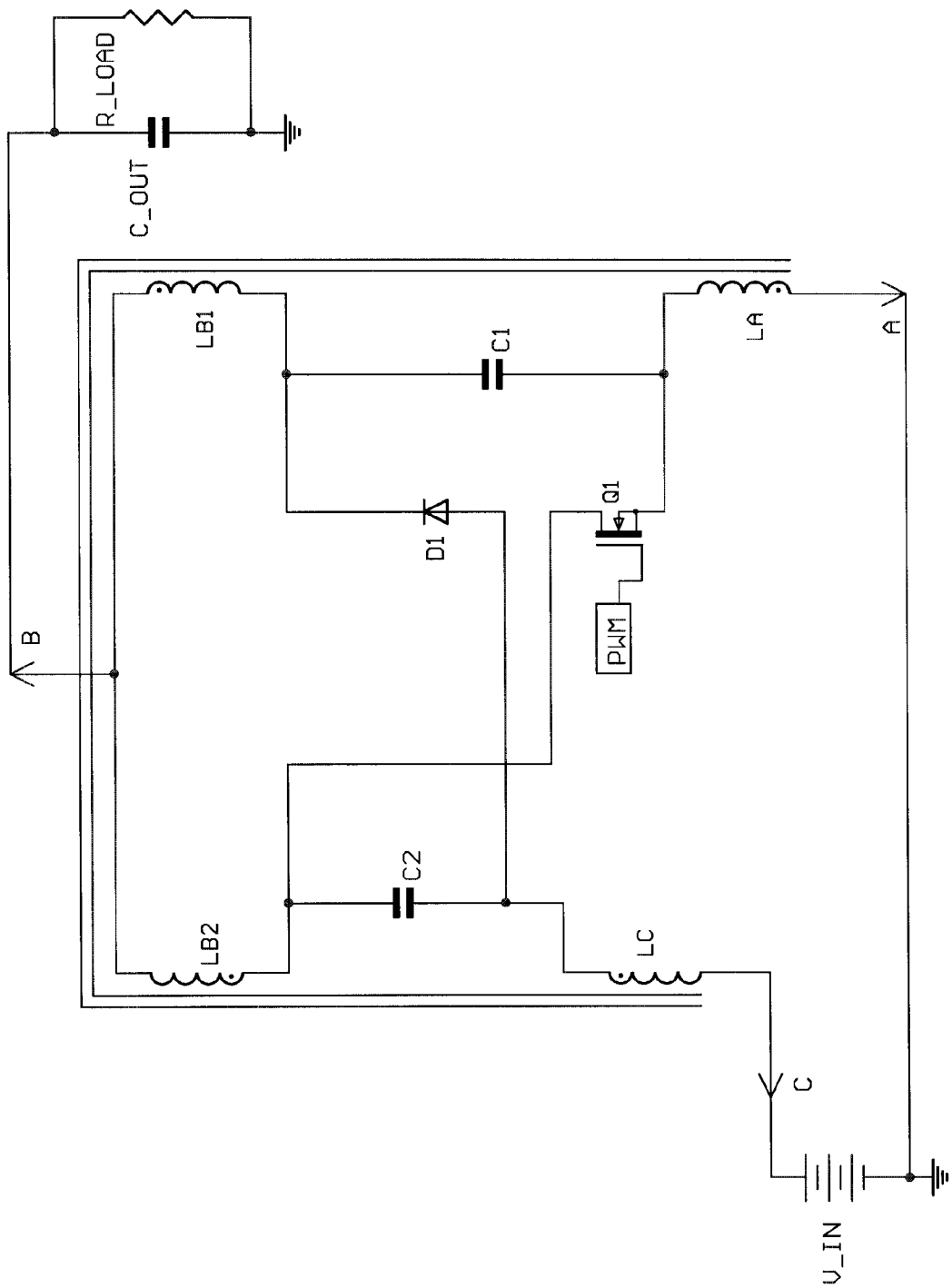
FIG. 50 illustrates a positive output buck complement form of the FIG. 43 network with all windings coupled on a common core.

FIG. 50 illustrates the network of FIG. 43 with all four inductors loosely coupled on a single common core and with the S1 switch implemented with a mosfet and S2 implemented with a diode connected to form a positive output buck complement converter. The transfer function for the FIG. 50 converter is given by $$V_{OUT} = \frac{1-D}{1-2 \cdot D} \cdot V_{IN}. \qquad (11)$$

FIG. 50 converter has zero ripple output current and non-pulsating input current.

Figure 51:
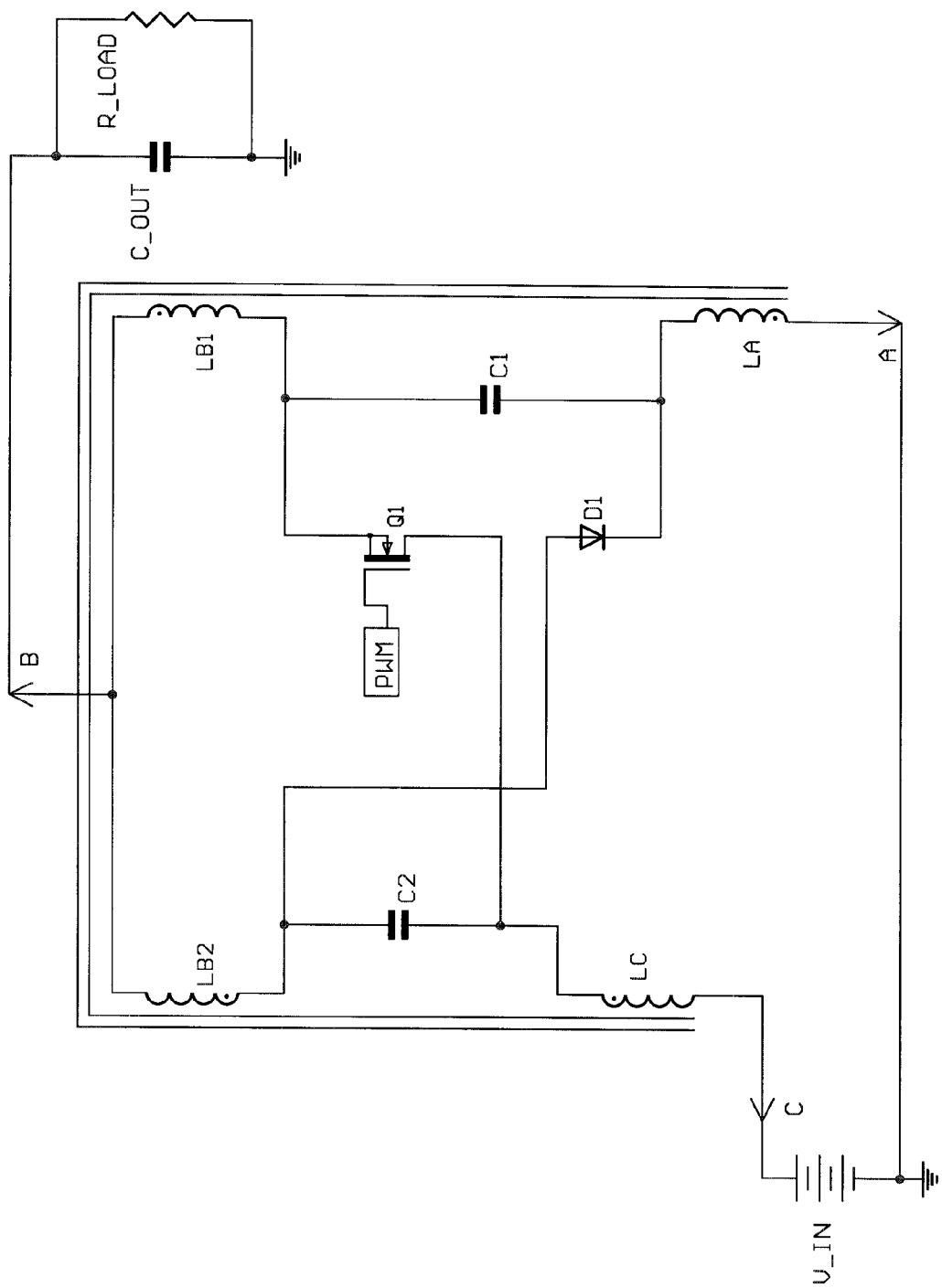
FIG. 51 illustrates a negative output buck complement form of the FIG. 43 network with all windings coupled on a common core.

FIG. 51 illustrates a converter similar to the FIG. 50 converter except that the switch and diode are reversed in position and polarity to form a negative output buck complement converter. The transfer function is given by equation (7). The FIG. 51 converter has zero ripple output current and non-pulsating input current.

Figure 52:
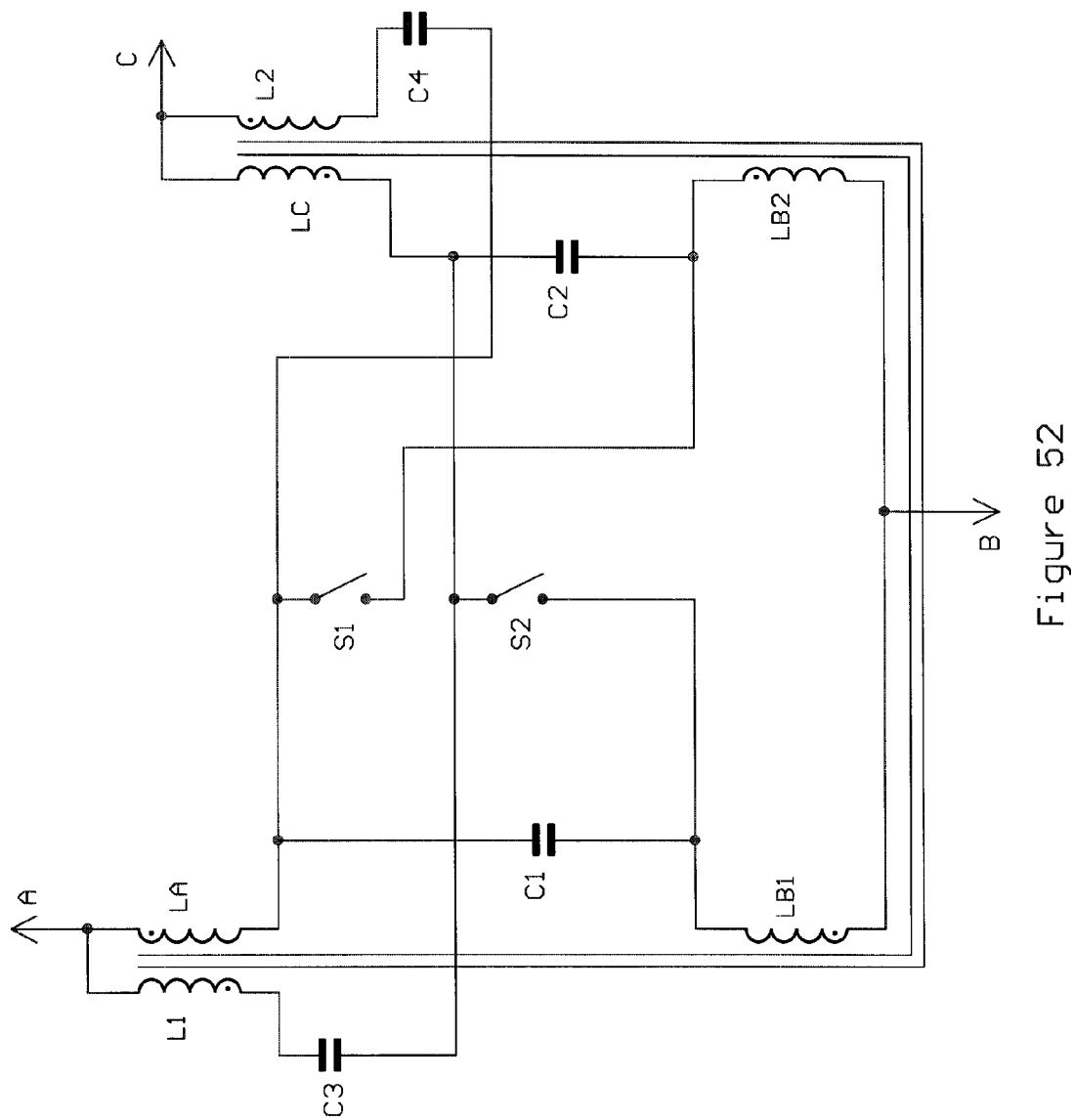
FIG. 52 illustrates the network of FIG. 43 with two additional windings and capacitors which accomplishes ripple cancellation at all three terminals.

FIG. 52 illustrates an embodiment of the FIG. 43 network in which two additional inductors and capacitors are added to form a network with zero ripple at all three terminals. One inductor and capacitor are added at the A terminal and one inductor and capacitor are added at the C terminal. The network is shown with all six inductors coupled on a single common core although the common coupling illustrated is not a requirement. The inductors and capacitors are added in a way that causes cancellation of the ripple currents at the A and C network terminals. The FIG. 52 network is preferred over the FIG. 16 network because there is one less inductor, one less capacitor, and the transfer function and performance are the same.

Figure 53:
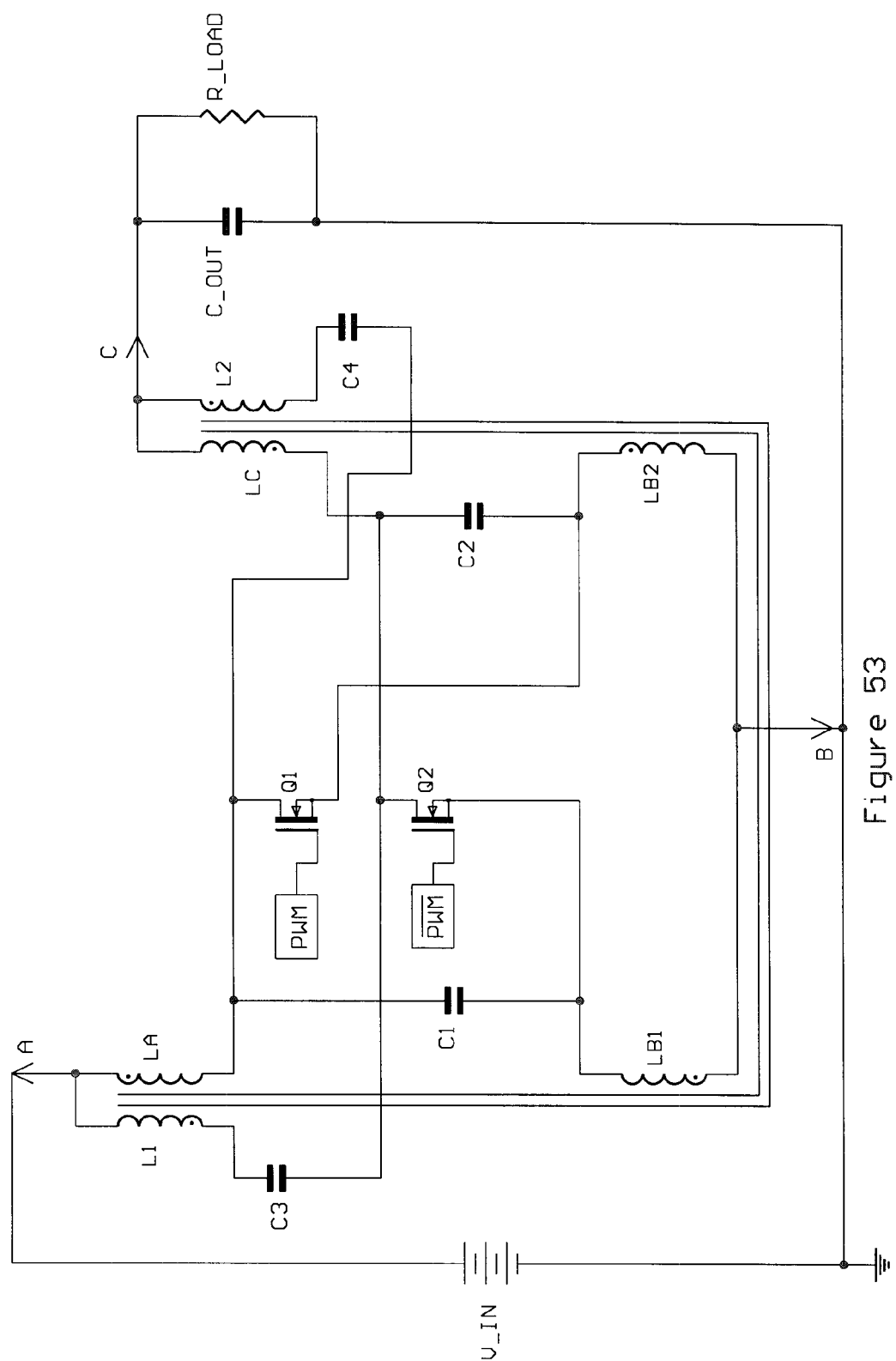
FIG. 53 illustrates a flyback complement form of the FIG. 52 network.

FIG. 53 illustrates a flyback complement implementation of the FIG. 52 network with both switches implemented with mosfets. The FIG. 53 converter is the same as the FIG. 48 implementation except that the FIG. 53 implementation provides ripple cancellation at all three network terminals.

Figure 54:
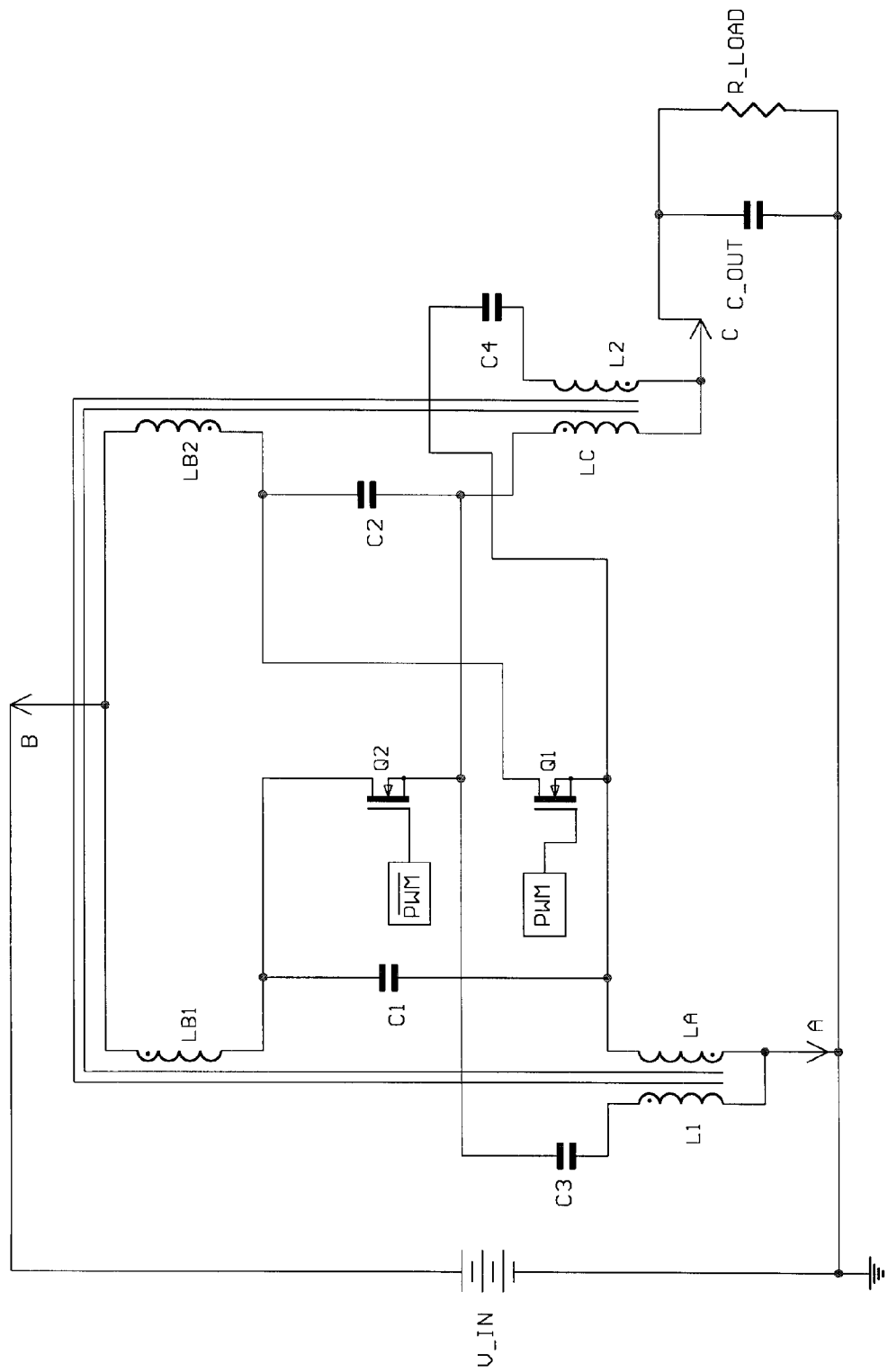
FIG. 54 illustrates a boost complement form of the FIG. 52 network.

FIG. 54 illustrates a boost complement implementation of the FIG. 52 network similar to the FIG. 49 implementation of the FIG. 43 network except that the FIG. 54 converter provides ripple cancellation at all three network terminals.

Figure 55:
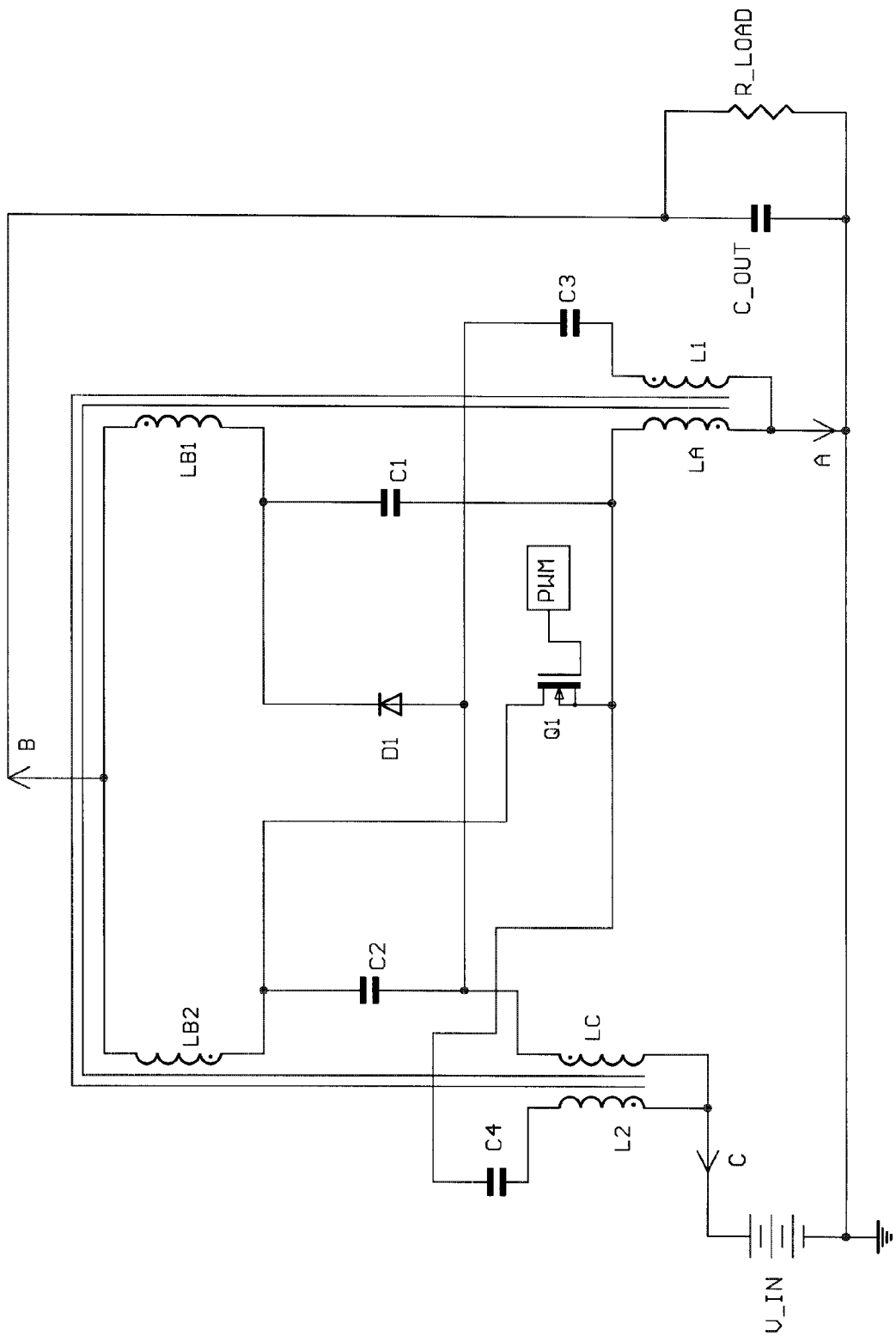
FIG. 55 illustrates a positive output buck complement form of the FIG. 52 network.

FIG. 55 illustrates a positive output buck complement implementation of the FIG. 52 network similar to the FIG. 50 implementation of the FIG. 43 network except that the FIG. 55 converter provides ripple cancellation at all three network terminals.

Figure 56:
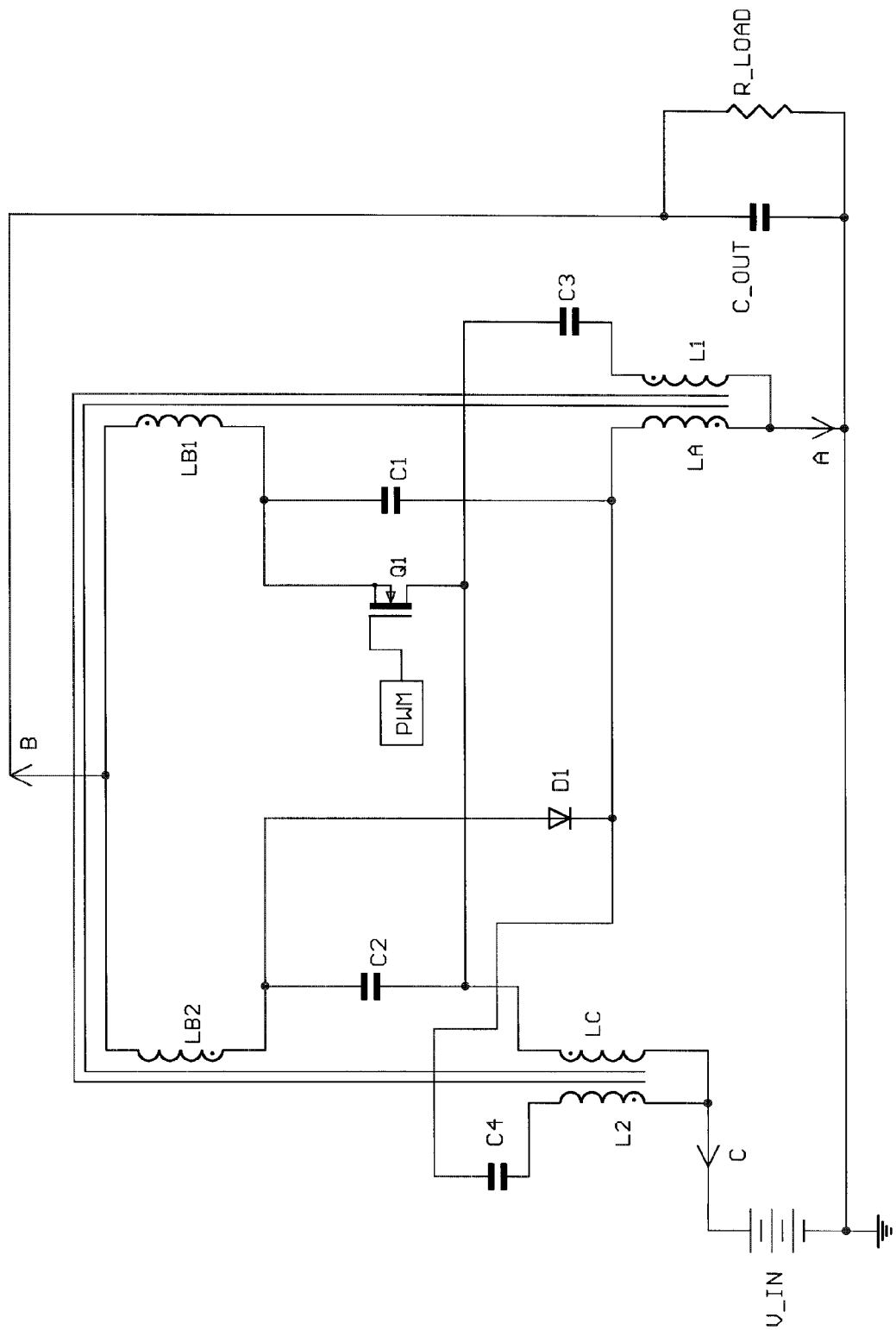
FIG. 56 illustrates a negative output buck complement form of the FIG. 52 network.

FIG. 56 illustrates a negative output buck complement implementation of the FIG. 52 network similar to the FIG. 51 implementation of the FIG. 43 network except that the FIG. 56 converter provides ripple cancellation at all three network terminals.

Active Reset Flyback Converter with Input Ripple Cancellation

Figure 57:
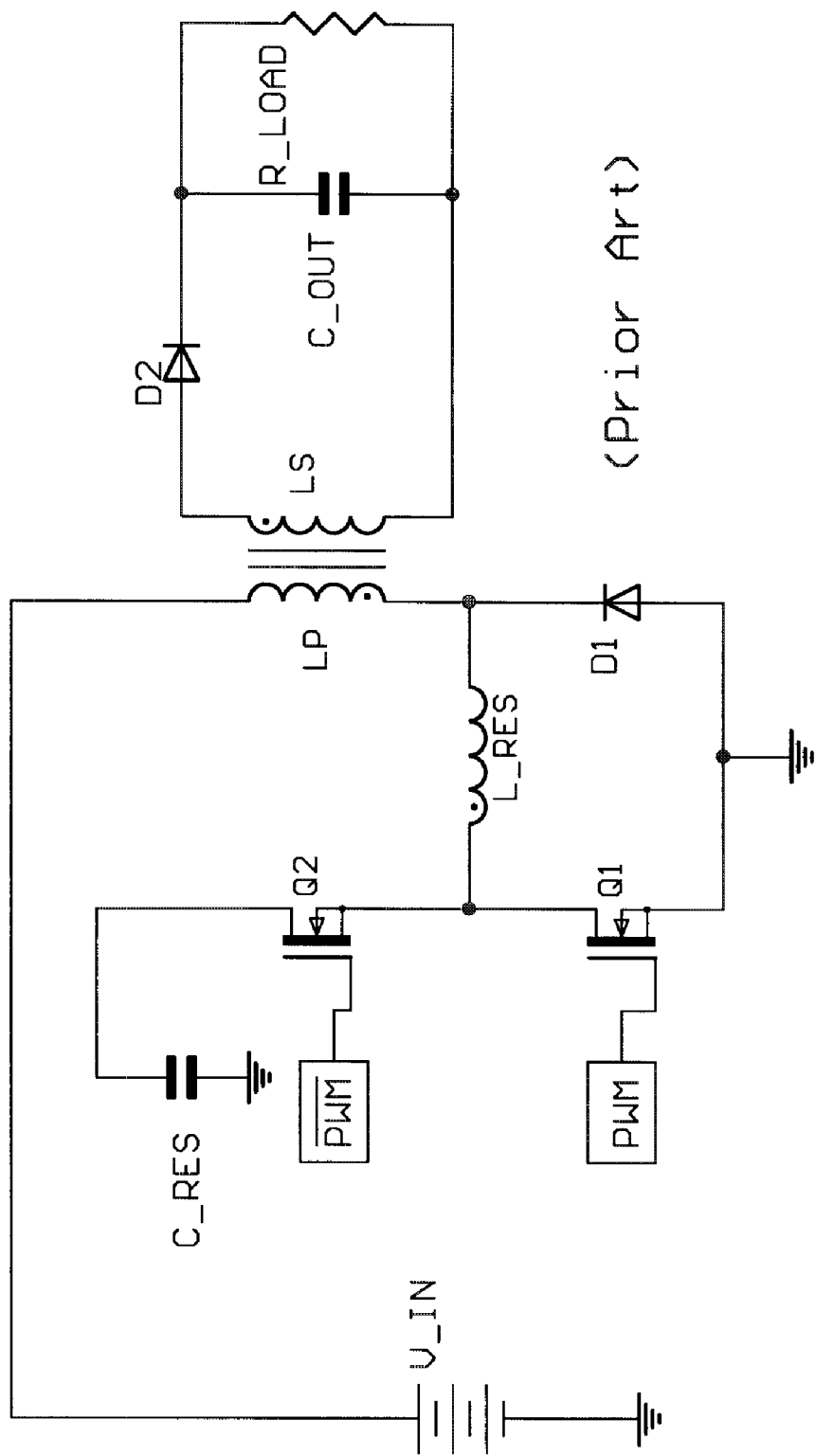
FIG. 57 illustrates a ZVS active reset isolated flyback converter according to the prior art, U.S. Pat. No. 5,402,329.

FIG. 57 illustrates an active reset flyback converter as practiced by the prior art and originally revealed as U.S. Pat. No. 5,402,329. The FIG. 57 converter can provide non-pulsating input current but by splitting the small series choke into four smaller chokes and repositioning the chokes one can obtain an arrangement that achieves ripple cancellation at the input terminals. Such a converter is revealed in FIG. 58. The FIG. 58 converter achieves zero voltage switching for all switches and all transitions, zero ripple input current, and continuous output current.

Figure 58:
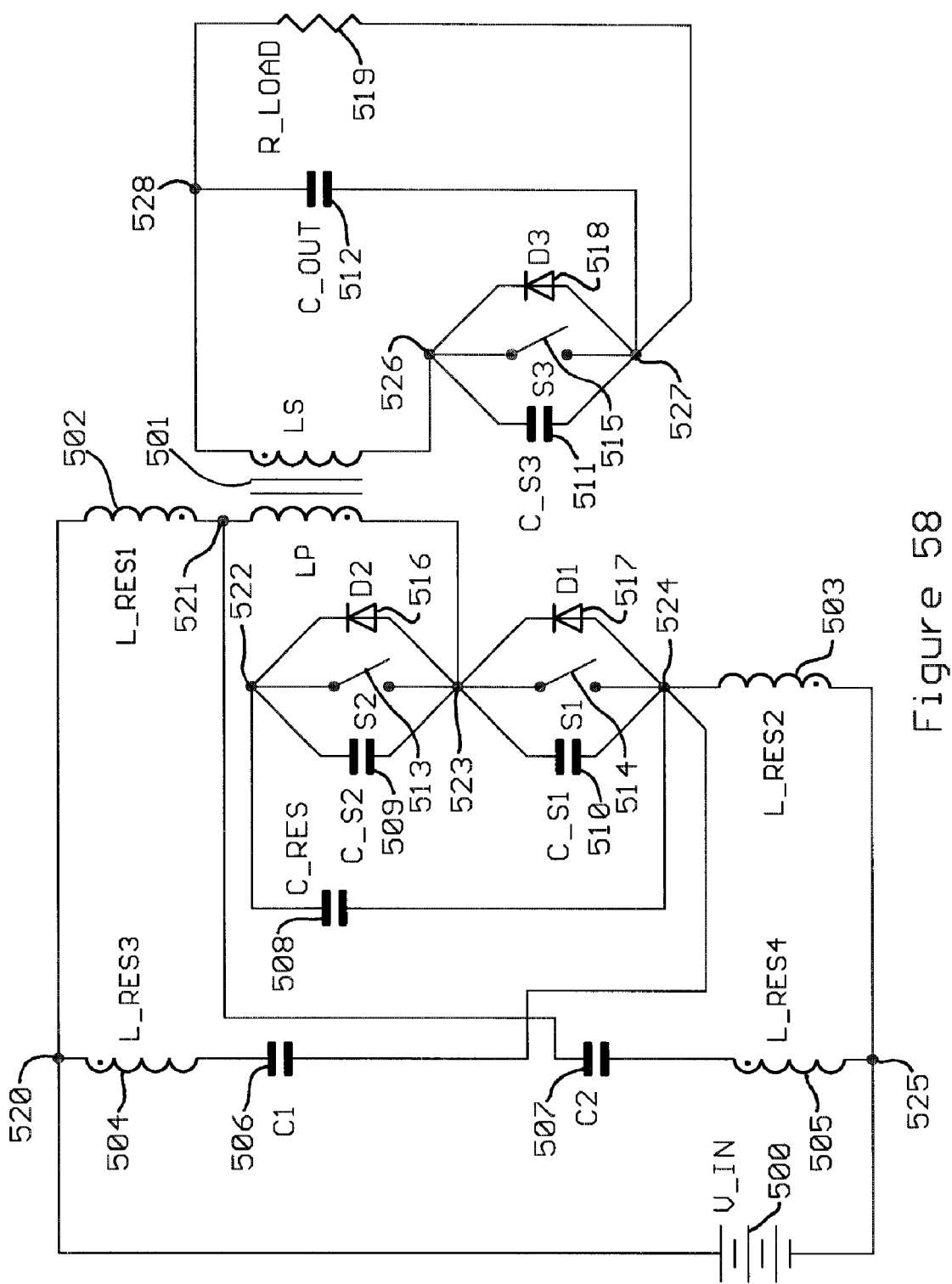
FIG. 58 illustrates a ZVS active reset isolated flyback converter with input ripple cancellation according to the subject invention.

Referring to FIG. 58 there is shown an active reset flyback converter in which input DC voltages are converted into an isolated output DC voltage. The circuit requires an input source of substantially DC voltage, four inductors, two switches, and four capacitors for output filtering, providing transformer reset, and coupling the inductors and the switches. For purposes of the operational state analysis, it is assumed that the capacitors are sufficiently large that the voltages developed across the capacitors are approximately constant over a switching interval. Also, for purposes of the operational state analysis, it is assumed that the input DC voltage sources have sufficiently low source impedance that the voltages developed across the input DC voltage sources are approximately constant over a switching interval. It will finally be assumed that the power switches are ideal, that is, lossless and able to carry current in either direction. We will also assume for purposes of the operational state analysis that all four inductors are equal in inductance value.

Structure

The structure of the circuit of the subject invention is shown in FIG. 58. A positive terminal of a source 500 of substantially DC voltage is connected to a node 520. A negative terminal of source 500 is connected to a node 525. A dotted terminal of an inductor 504 is connected to the node 520. An undotted terminal of an inductor 502 is also connected to node 520. An undotted terminal of an inductor 505 is connected to node 525. A dotted terminal of an inductor 503 is also connected to node 525. An undotted terminal of inductor 504 is connected to a first terminal of a capacitor 506. A second terminal of capacitor 506 is connected to a node 524. A dotted terminal of inductor 502 is connected to a node 521. A dotted terminal of inductor 505 is connected to a first terminal of a capacitor 507. A second terminal of capacitor 507 is connected to node 521. An undotted terminal of inductor 503 is connected to node 524. An undotted terminal of a primary winding of a flyback transformer 501 is connected to node 521. A dotted terminal of the primary winding of flyback transformer 501 is connected to a node 523. A first terminal of a switch 514 is connected to node 523. A second terminal of switch 514 is connected to node 524. A first terminal of a capacitor 510 is connected to node 523. A second terminal of capacitor 510 is connected to node 524. A cathode terminal of a diode 517 is connected to node 523. An anode terminal of diode 517 is connected to node 524. A first terminal of a switch 513 is connected to node 523. A second terminal of switch 513 is connected to a node 522. A first terminal of a capacitor 509 is connected to node 523. A second terminal of capacitor 509 is connected to node 522. An anode terminal of a diode 516 is connected to node 523. A cathode terminal of diode 516 is connected to node 522. A first terminal of a capacitor 508 is connected to node 522. A second terminal of capacitor 508 is connected to node 524. An undotted terminal of a secondary winding of transformer 501 is connected to a node 526. A dotted terminal of the secondary winding of transformer 501 is connected to a node 528. A first terminal of a switch 515 is connected to node 526. A second terminal of switch 515 is connected to a node 527. A first terminal of a capacitor 511 is connected to node 526. A second terminal of capacitor 511 is connected to node 527. A cathode terminal of a diode 518 is connected to node 526. An anode terminal of diode 518 is connected to node 527. A first terminal of a capacitor 512 is connected to node 528. A second terminal of capacitor 512 is connected to node 527. A first terminal of a load 519 is connected to node 528. A second terminal of load 519 is connected to node 527.

Operation

It is assumed in this analysis that the system has reached a settled operating condition. Except for the short, but finite, switching intervals there are two states of the circuit of FIG.

Figure 59:
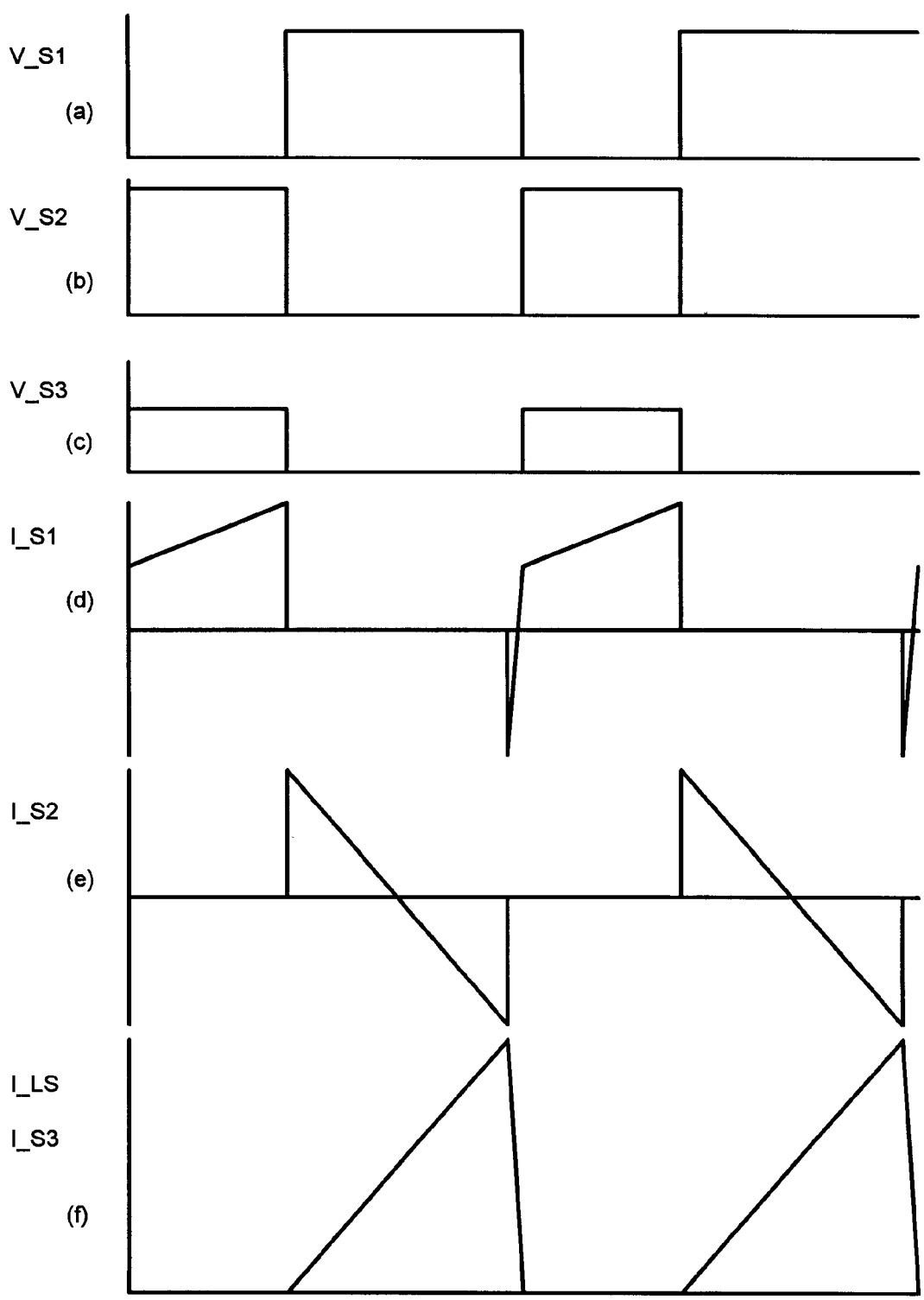
FIG. 59 illustrates voltage and current wave forms of the FIG. 58 circuit.
Figure 60:
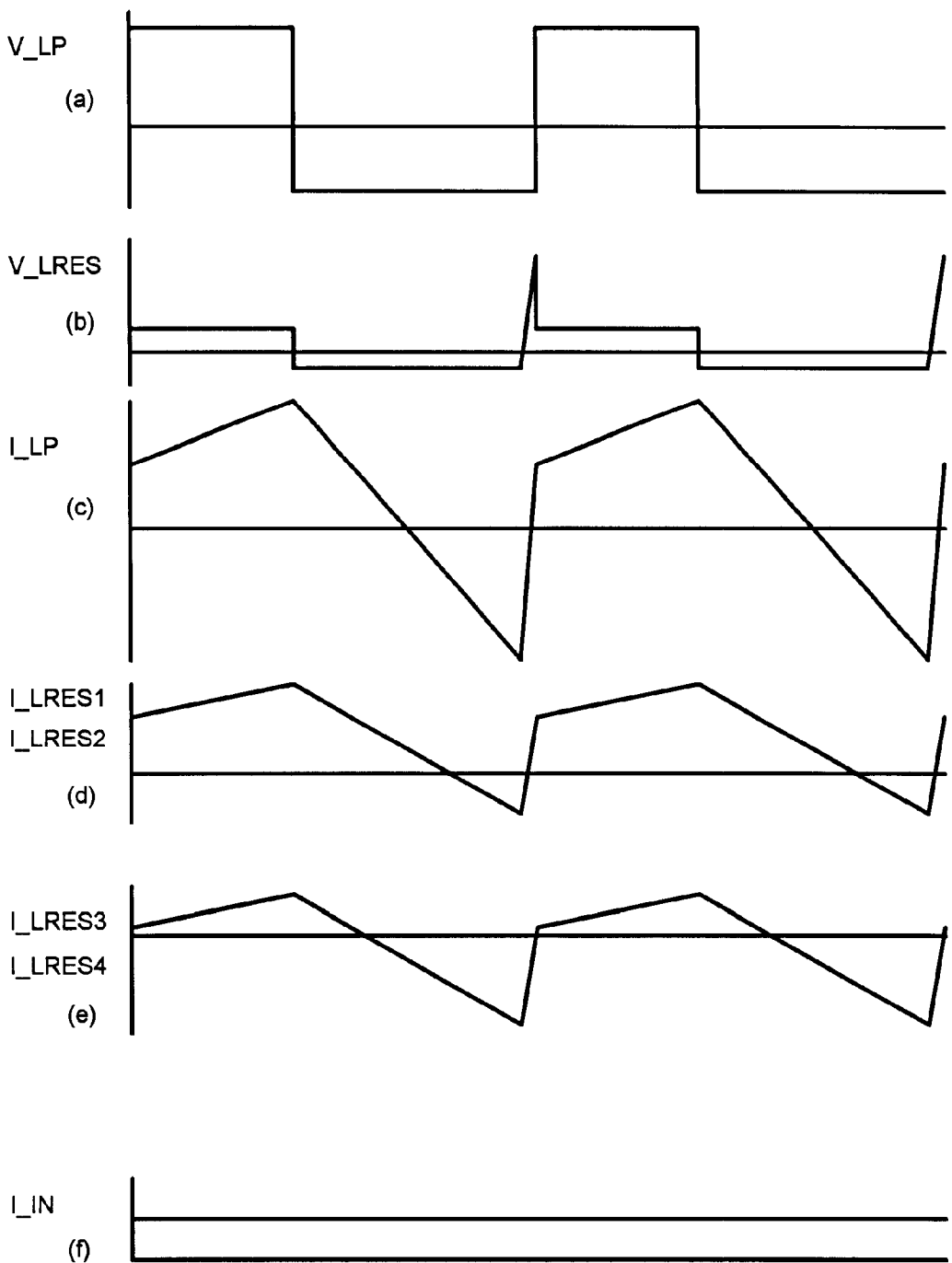
FIG. 60 illustrates additional voltage and current wave forms of the FIG. 58 circuit.
Figure 61:
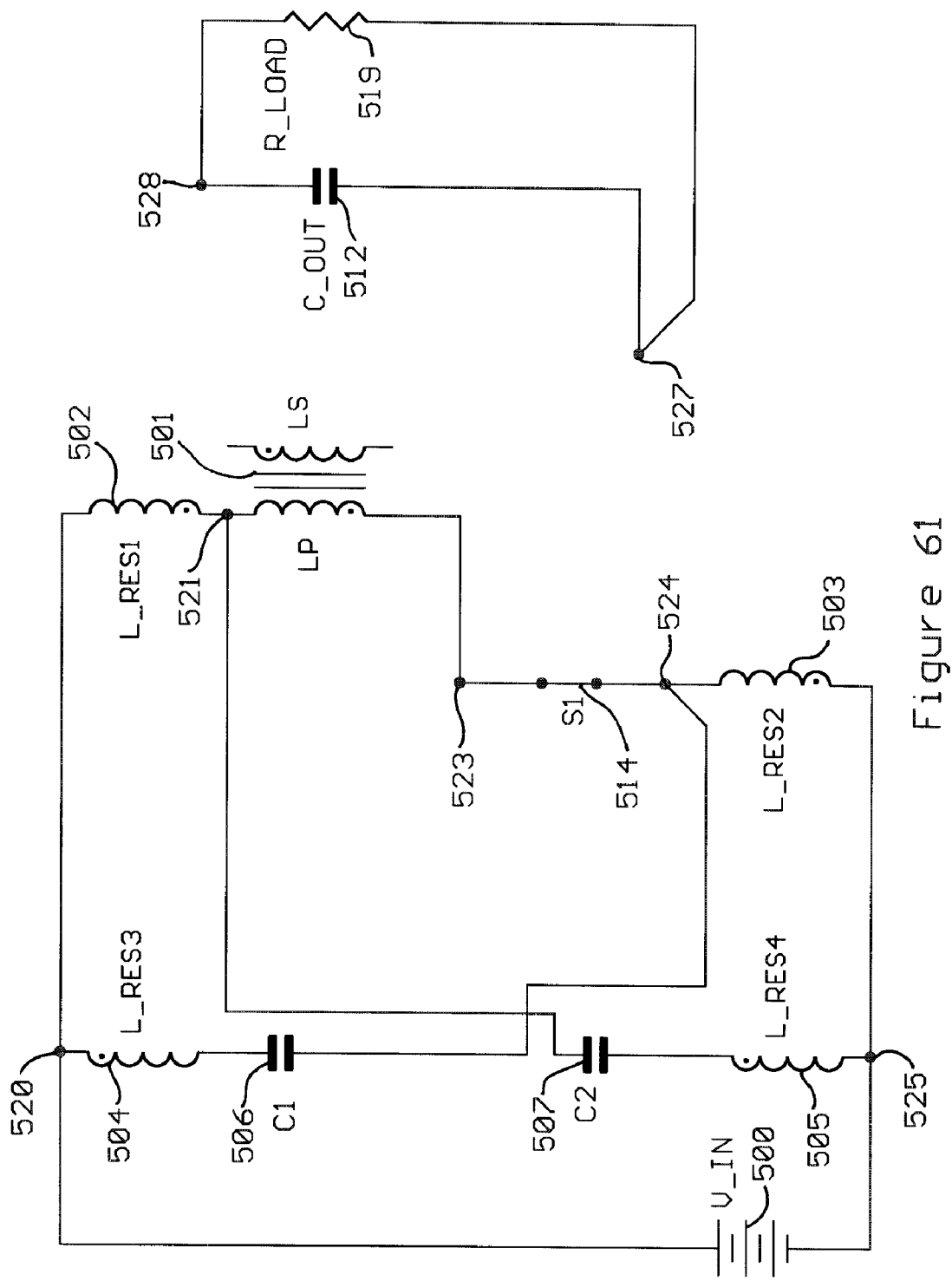
FIG. 61 illustrates an on state of the FIG. 58 circuit.

58, an on state and an off state. The applied voltage to the capacitor 506, $V_{C1}$, will be equal to the input DC source 500 voltage. This results from the fact that the first terminal of the capacitor 506 is connected to the positive terminal of the source 500 through an inductor 504 and a second terminal of the capacitor 506 is connected to the negative terminal of source 500 through an inductor 505 and the average applied voltages to the inductors are zero. The applied voltage to the capacitor 507, $V_{C2}$, will also be equal to the input DC source 500 voltage. This results from the fact that the terminals of the capacitor 507 are connected to the positive terminal of source 500 through an inductor 502 and to the negative terminal of source 500 through the inductor 505, whose average applied voltages are zero. Consider an initial condition as illustrated in FIG. 61. The initial condition represents the on state. During the initial condition the switch 514 is on (closed) and the switches 513 and 515 are off (open). The voltage and current wave forms are illustrated in FIGS. 59 and 60. During the on state, as illustrated in FIG. 61, current is increasing at the same rate in each of the four primary inductors with the current out of the dotted terminal of each winding becoming more positive with the passage of time. For each winding the dotted terminal is more negative than the undotted terminal during the on state. During the on state magnetizing current and stored energy ramp up in the flyback transformer 501. During the on state energy is delivered to the load from capacitor 512. It can be seen that the input source 500 current is constant during the on state since the current ramps in the inductors connected to the source 500 terminals cancel each other so that the net current ramp into the circuit from the source 500 is zero.

Figure 62:
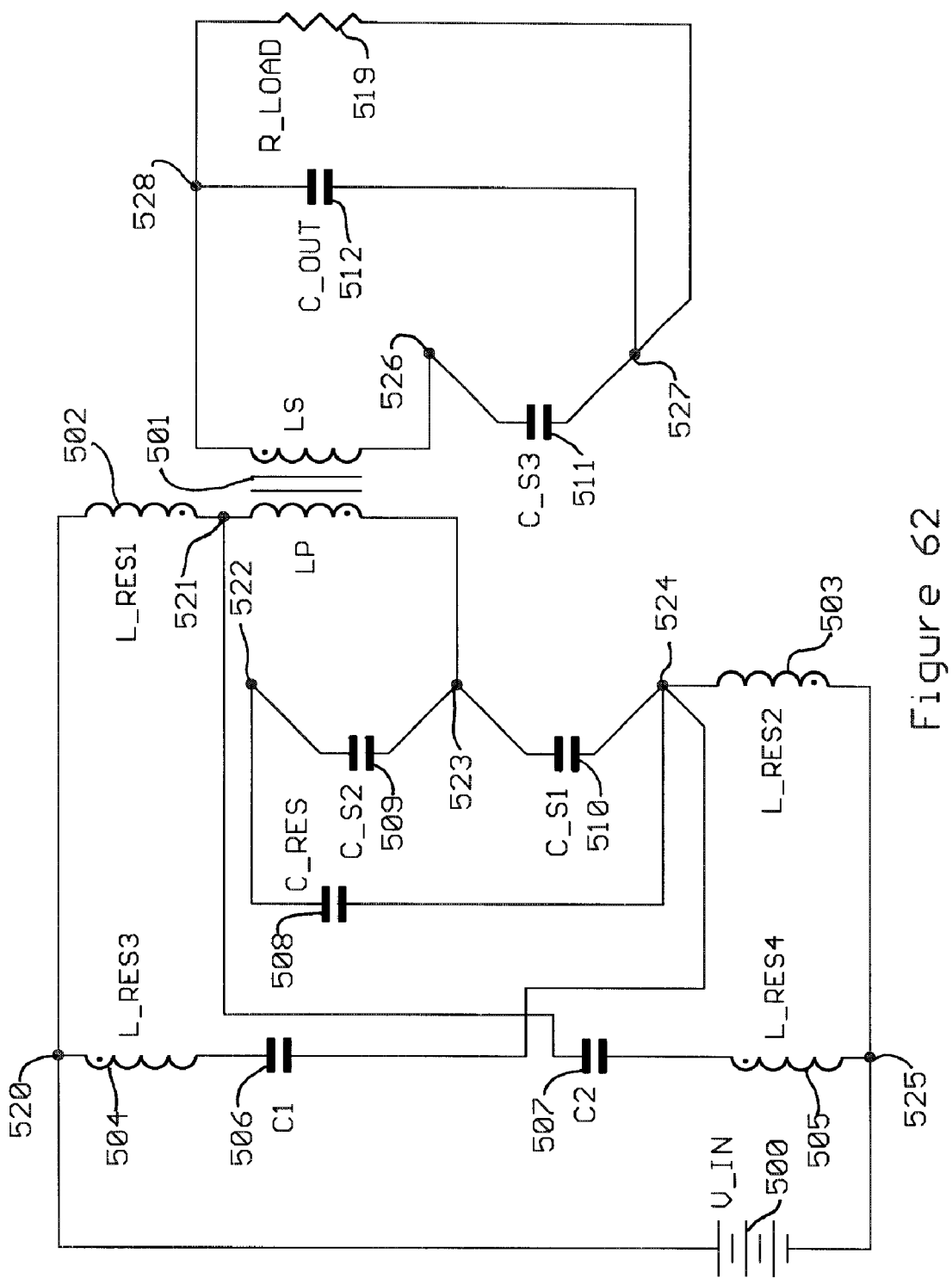
FIG. 62 illustrates a first phase of a turn off transition of the FIG. 58 circuit.
Figure 63:
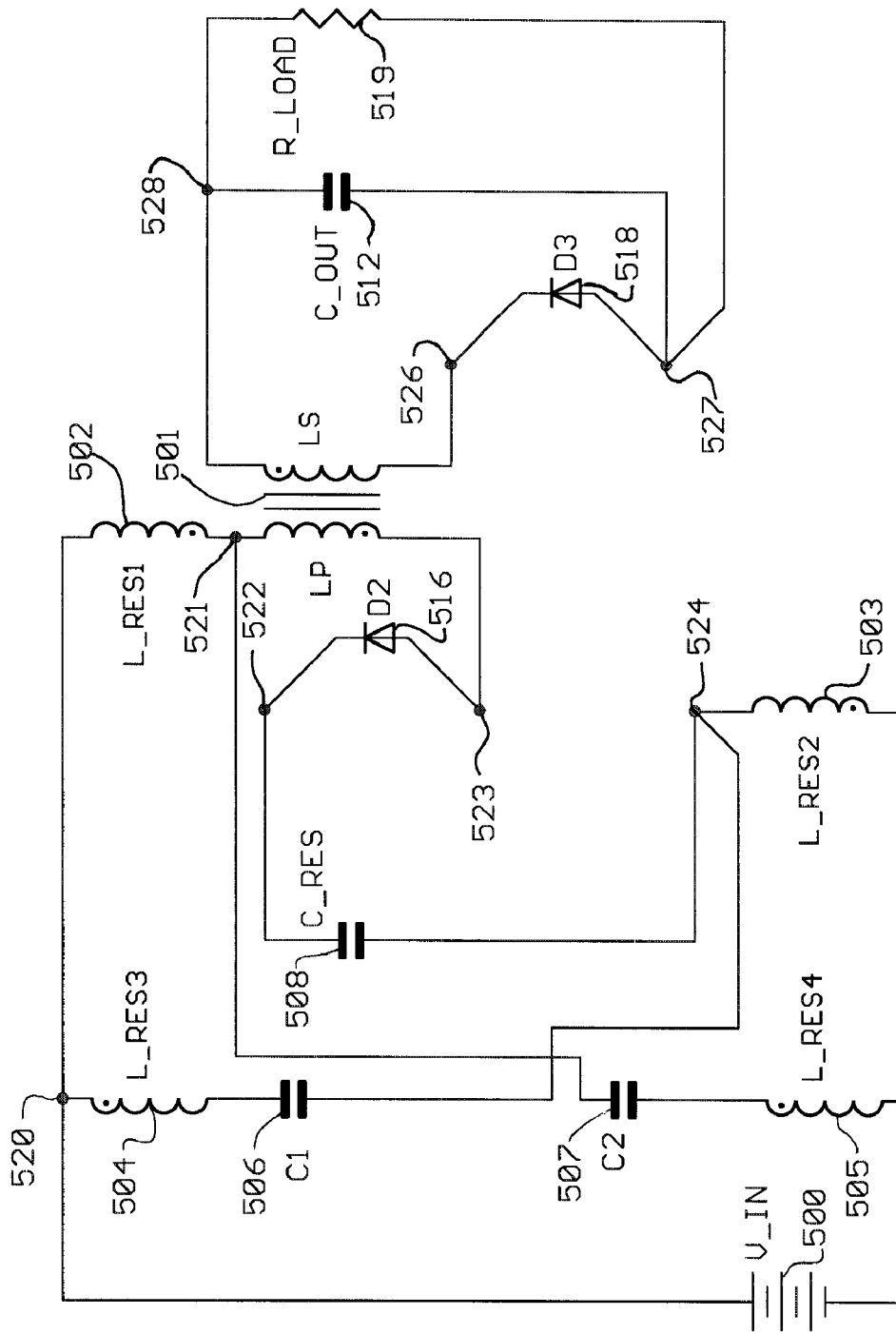
FIG. 63 illustrates a second phase of a turn off transition of the FIG. 58 circuit.
Figure 64:
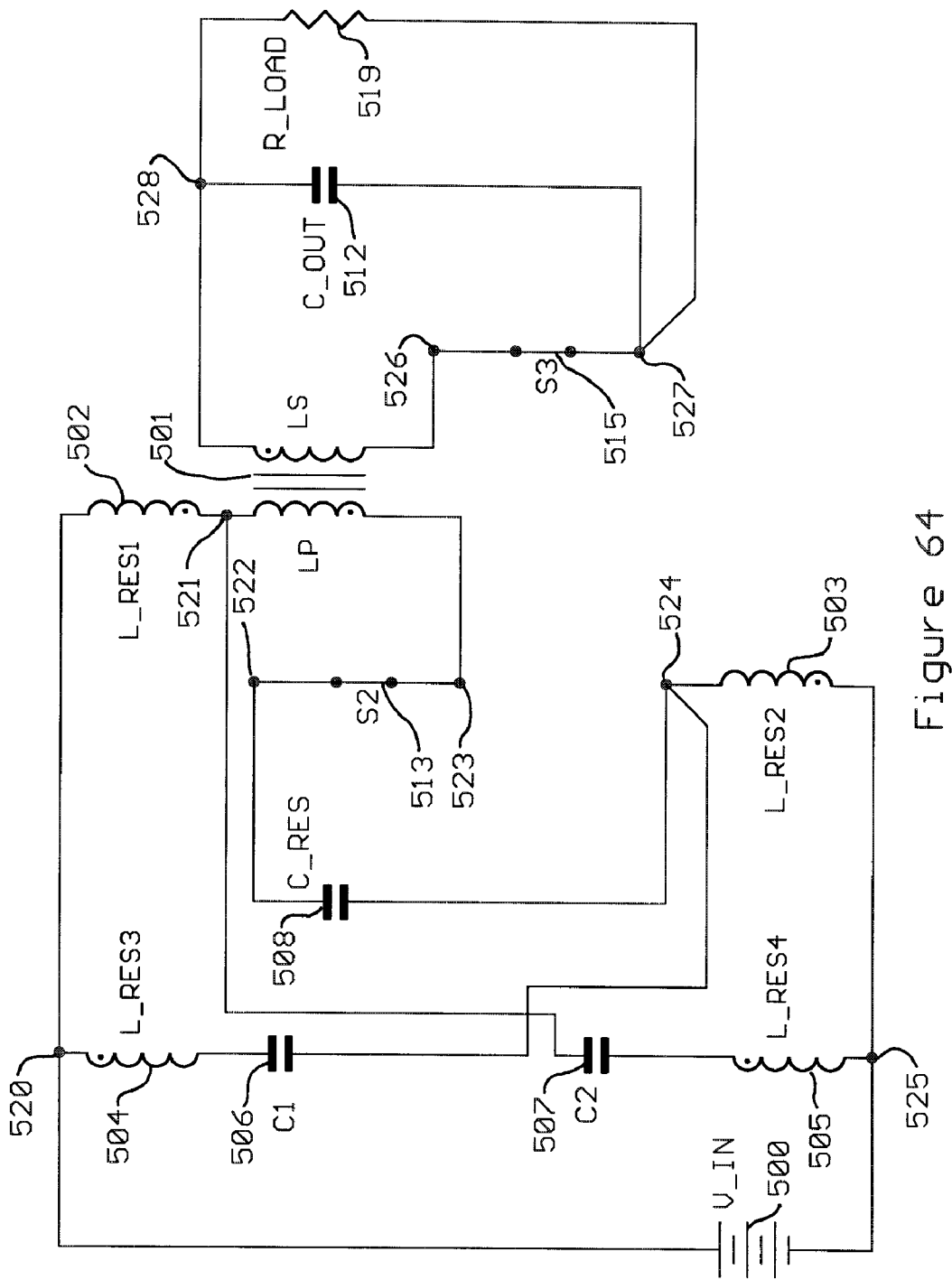
FIG. 64 illustrates an off state of the FIG. 58 circuit.

At a time determined by the control circuit the switch 514 is turned off (opened). The first phase of a turn off transition is illustrated in FIG. 62. Stored energy from the four primary inductors and the flyback transformer 501 force current into the capacitors 509, 510, and 511, charging capacitor 510 and discharging capacitors 509 and 511 until the diodes 516 and 518 become forward biased, as illustrated in FIG. 63. The dotted terminals of the primary inductors and the transformer 501 windings are now positive with respect to the undotted terminals. Soon after the diodes 516 and 518 begin to conduct the switches 513 and 515 are turned on at zero voltage marking the beginning of the off state, as illustrated in FIG. 64. During the off state the current in each primary inductor and in the primary winding of the transformer 501 decrease as the current in the secondary winding of the transformer 501 increases. As in the case of the on state the current ramps of the inductors cancel at the terminals of the source 500 so that the input source 500 current remains constant during the off state at the same value of the source 500 current during the on state. During the off state current initially flows into capacitor 508 and during the off state the current in the capacitor 508 reverses so that the net current during the off state into the capacitor 508 is zero. At the end of the off state the current in the capacitor 508 and in the primary inductors and the primary winding of the transformer 501 is equal but opposite in sign to the current at the beginning of the off state.

Figure 65:
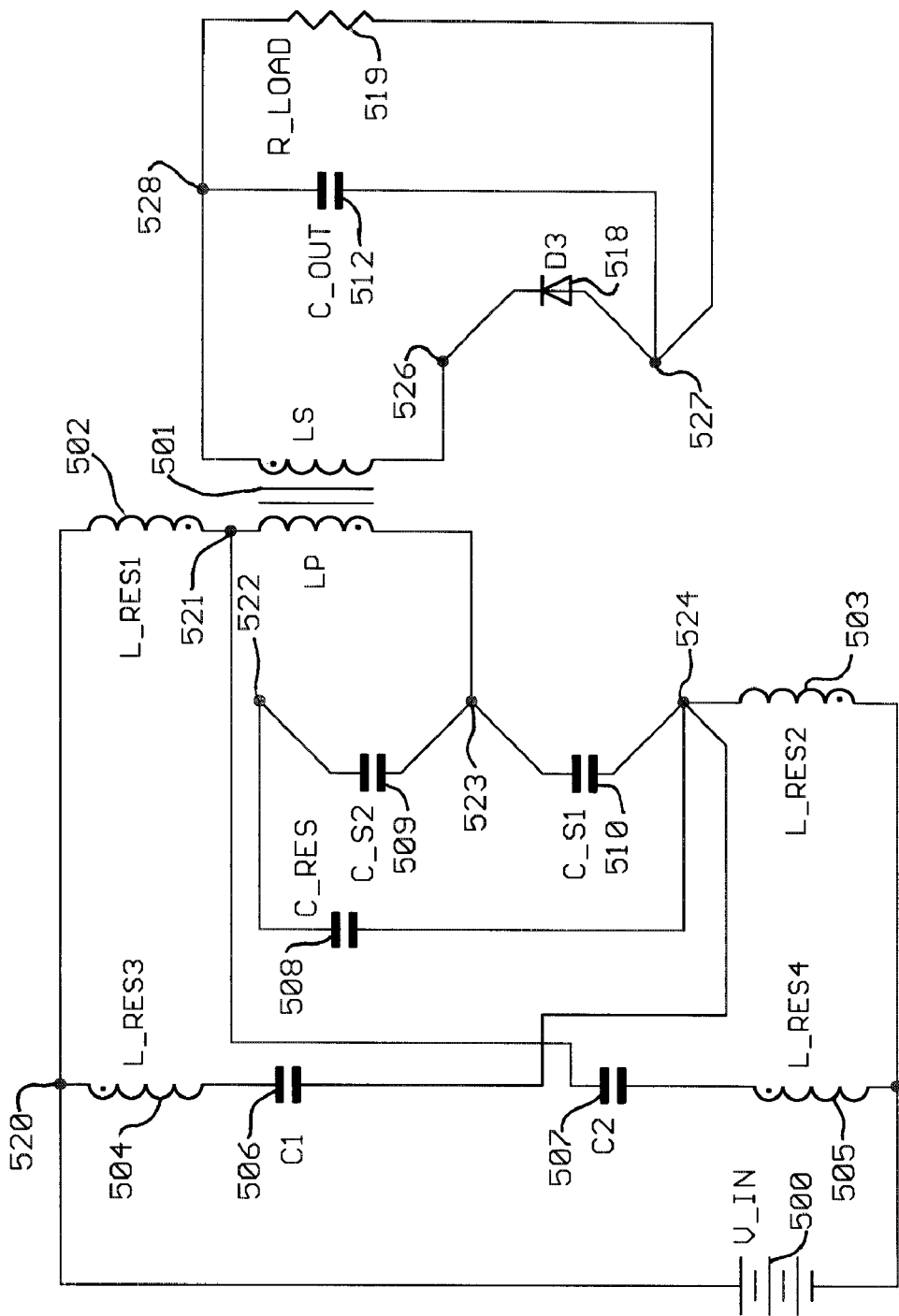
FIG. 65 illustrates a first phase of a turn on transition of the FIG. 58 circuit.
Figure 66:
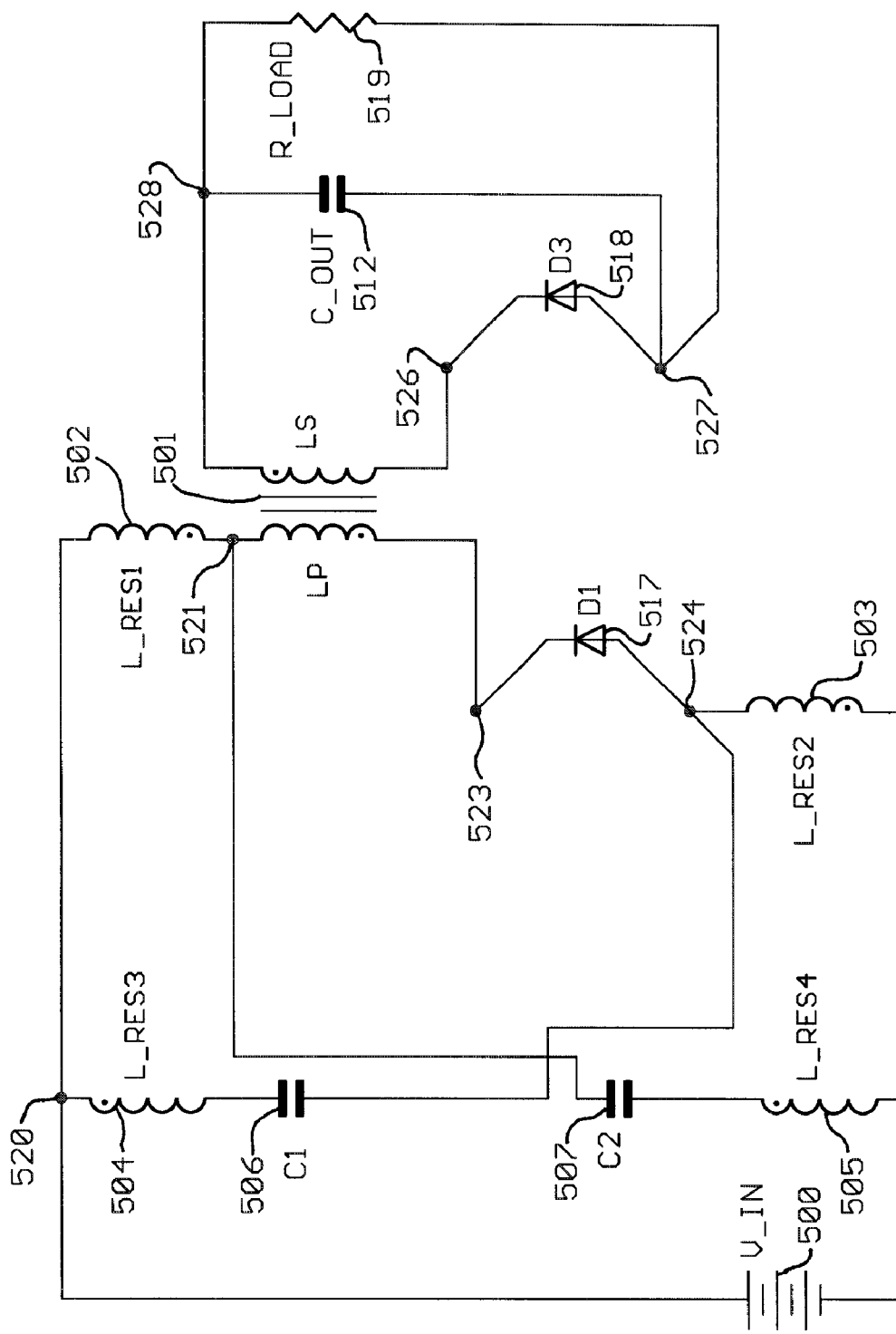
FIG. 66 illustrates a second phase of a turn on transition of the FIG. 58 circuit.
Figure 67:
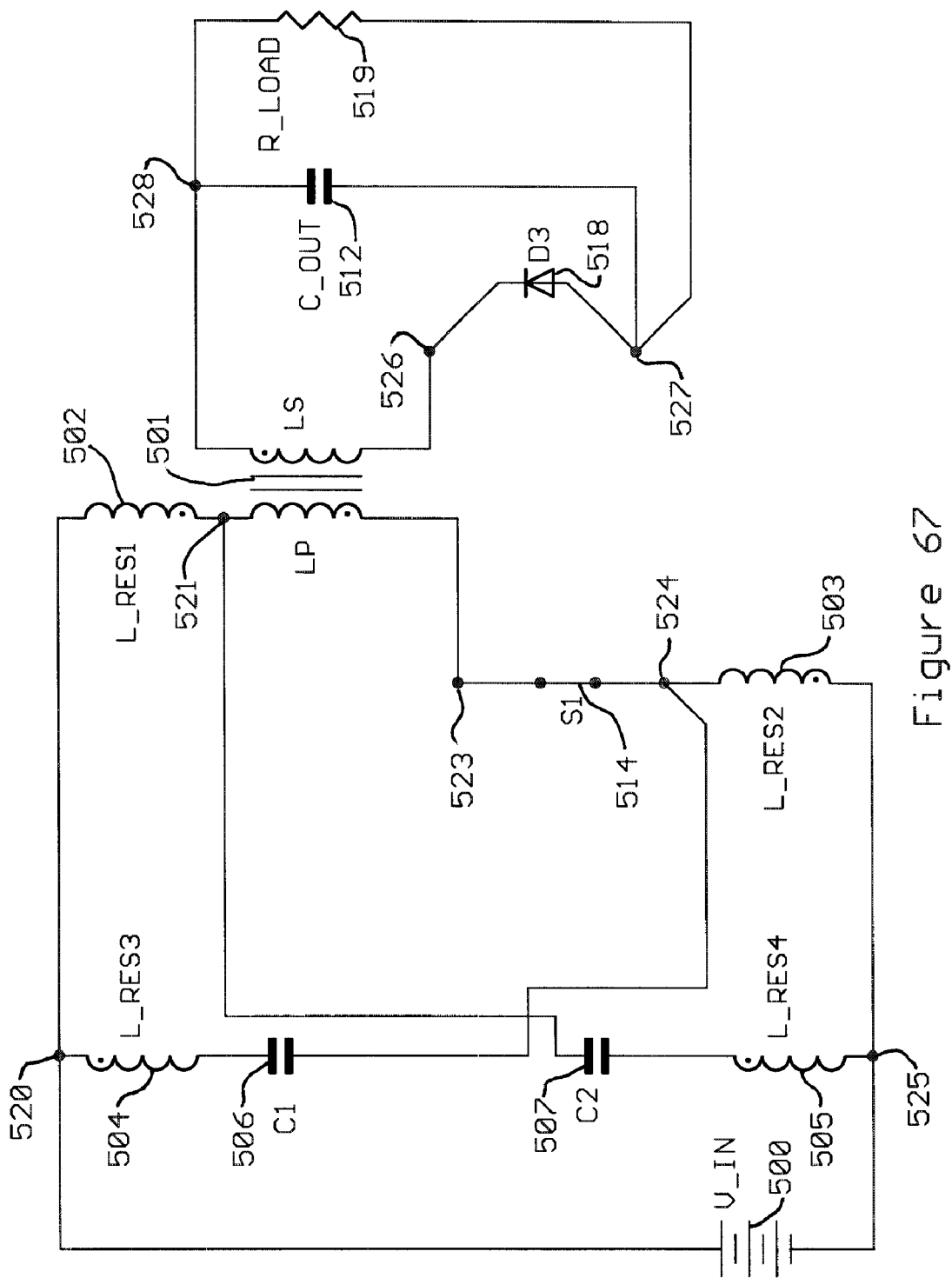
FIG. 67 illustrates a third phase of a turn on transition of the FIG. 58 circuit.

At a time determined by the control circuit the switches 513 and 515 are turned off (opened). FIG. 65 illustrates the first phase of a turn off transition. Stored energy in the four primary inductors forces current out of the capacitors 509 and 510 discharging capacitor 510 and charging capacitor 509. The secondary winding current of transformer 501 forward biases diode 518. The voltage at the node 523 drops until the diode 517 becomes forward biased, as illustrated in FIG. 66. The applied voltage to the primary inductors is now large so that the primary inductor currents and the secondary winding current decrease rapidly. Shortly after diode 517 turns on the switch 514 is turned on at zero voltage, as illustrated in figure 67. The secondary winding current of transformer 501 continues to decrease rapidly until it reaches zero and the system once again enters the on state of the initial condition and the cycle repeats.

Related Embodiments

Figure 68:
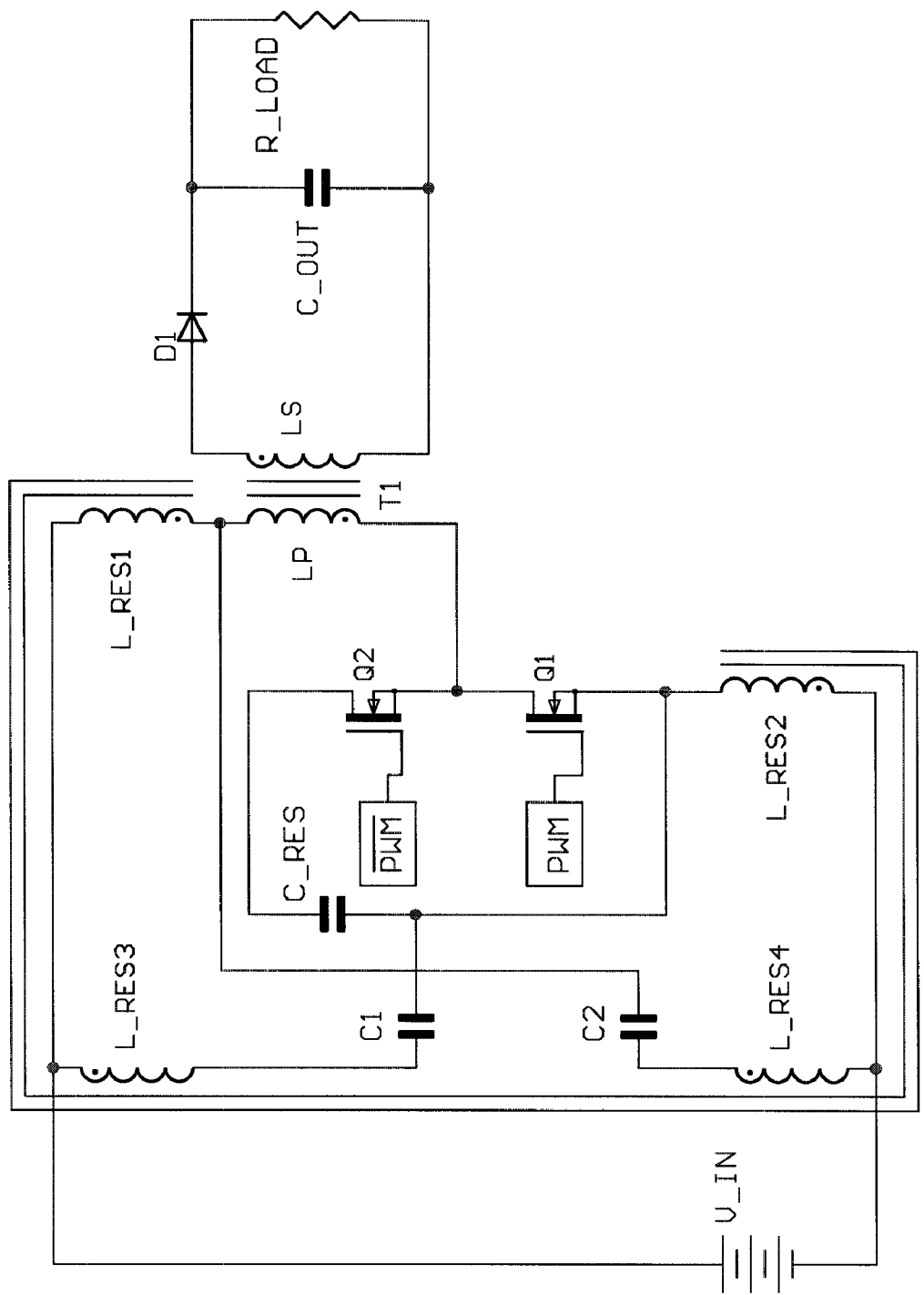
FIG. 68 illustrates the FIG. 58 circuit with all four primary inductors coupled on a common core and with the two primary switches implemented with mosfets and the secondary switch implemented with a diode.

FIG. 68 illustrates the circuit of FIG. 58 with the primary switches implemented with mosfets and with the secondary switch implemented with a diode. All four primary inductors are loosely coupled onto a single common core. The capacitors and diodes shown in the FIG. 58 circuit in parallel with the switches are an intrinsic part of the mosfets.

Figure 69:
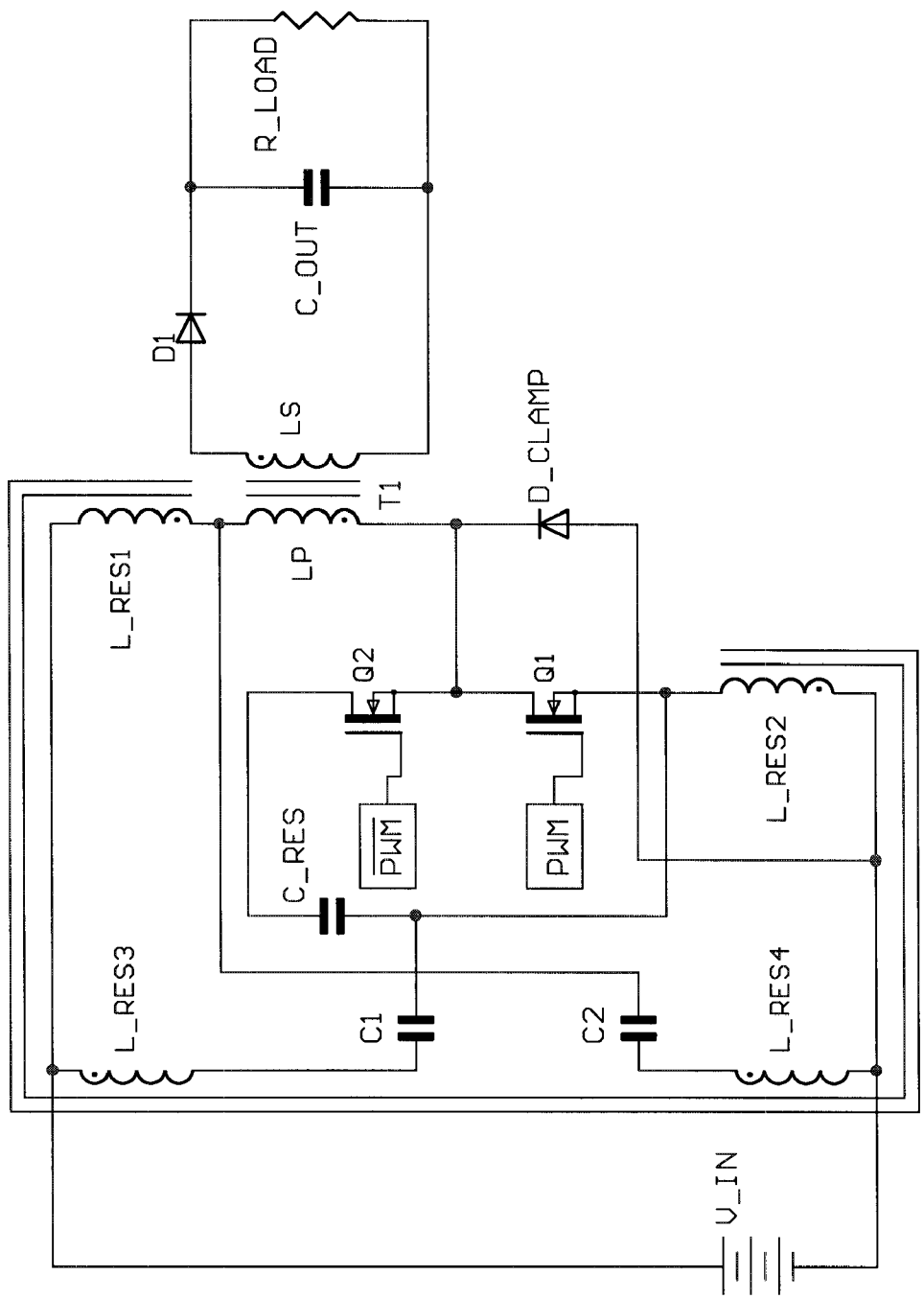
FIG. 69 illustrates the FIG. 68 circuit with a diode added to clamp ringing associated with the primary coupled inductor and the circuit's parasitic capacitances.

FIG. 69 illustrates the FIG. 68 circuit with an additional diode in the primary circuit to clamp ringing associated with circuit parasitic capacitances and the primary inductors during the on state.

Figure 70:
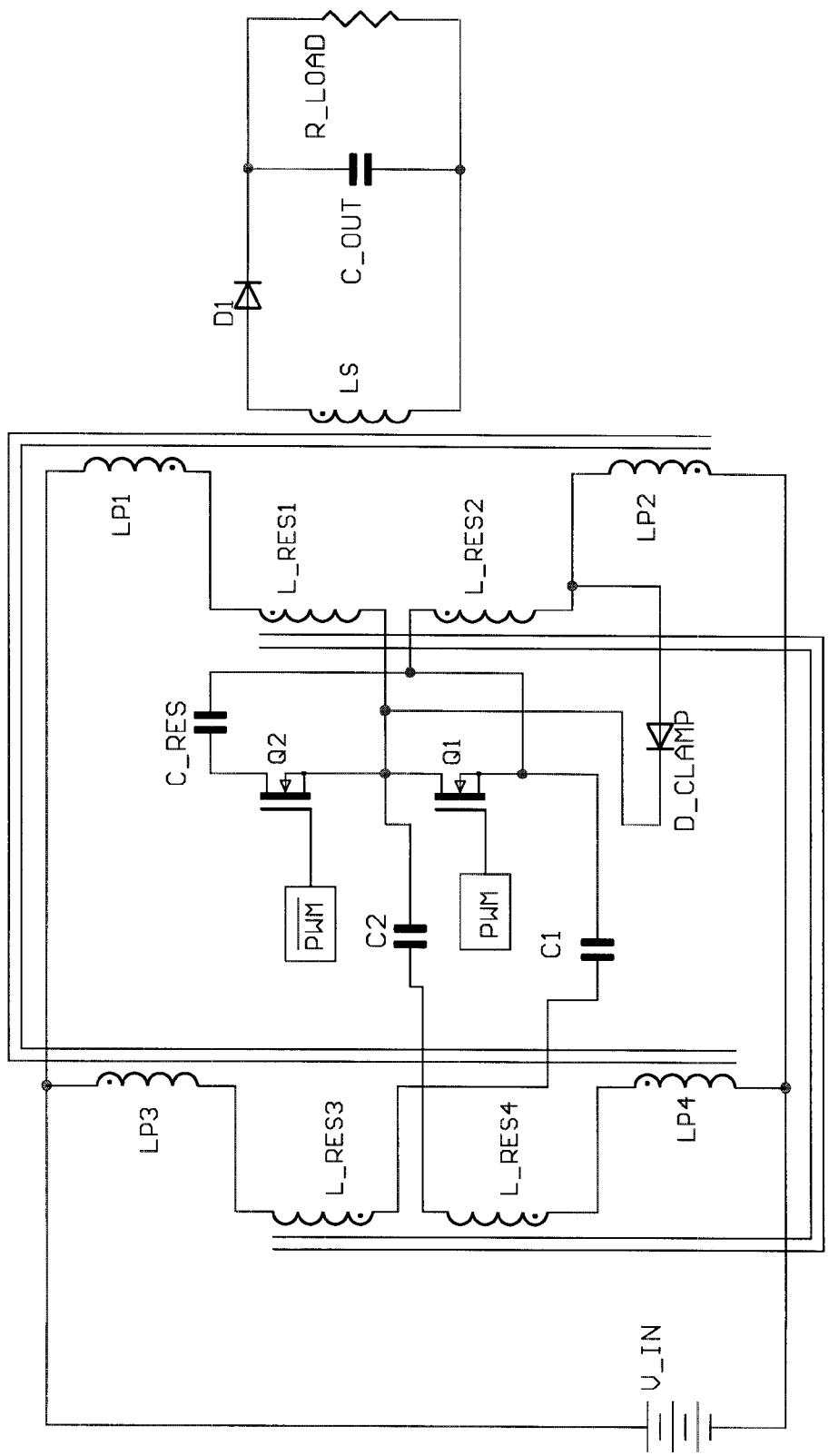
FIG. 70 illustrates the FIG. 69 circuit with the isolation transformer primary winding split into four primary windings and relocated to enhance the input current ripple performance.

FIG. 70 illustrates another embodiment similar to the FIG. 69 embodiment but with the primary winding of the transformer split into four equal windings and repositioned to enhance the ripple cancellation. The ripple cancellation is enhanced due to the uncoupled inductance in each of the four primary windings. The uncoupled or leakage inductance is ideally zero so that the amount of enhancement realized is small but not zero.

Figure 71:
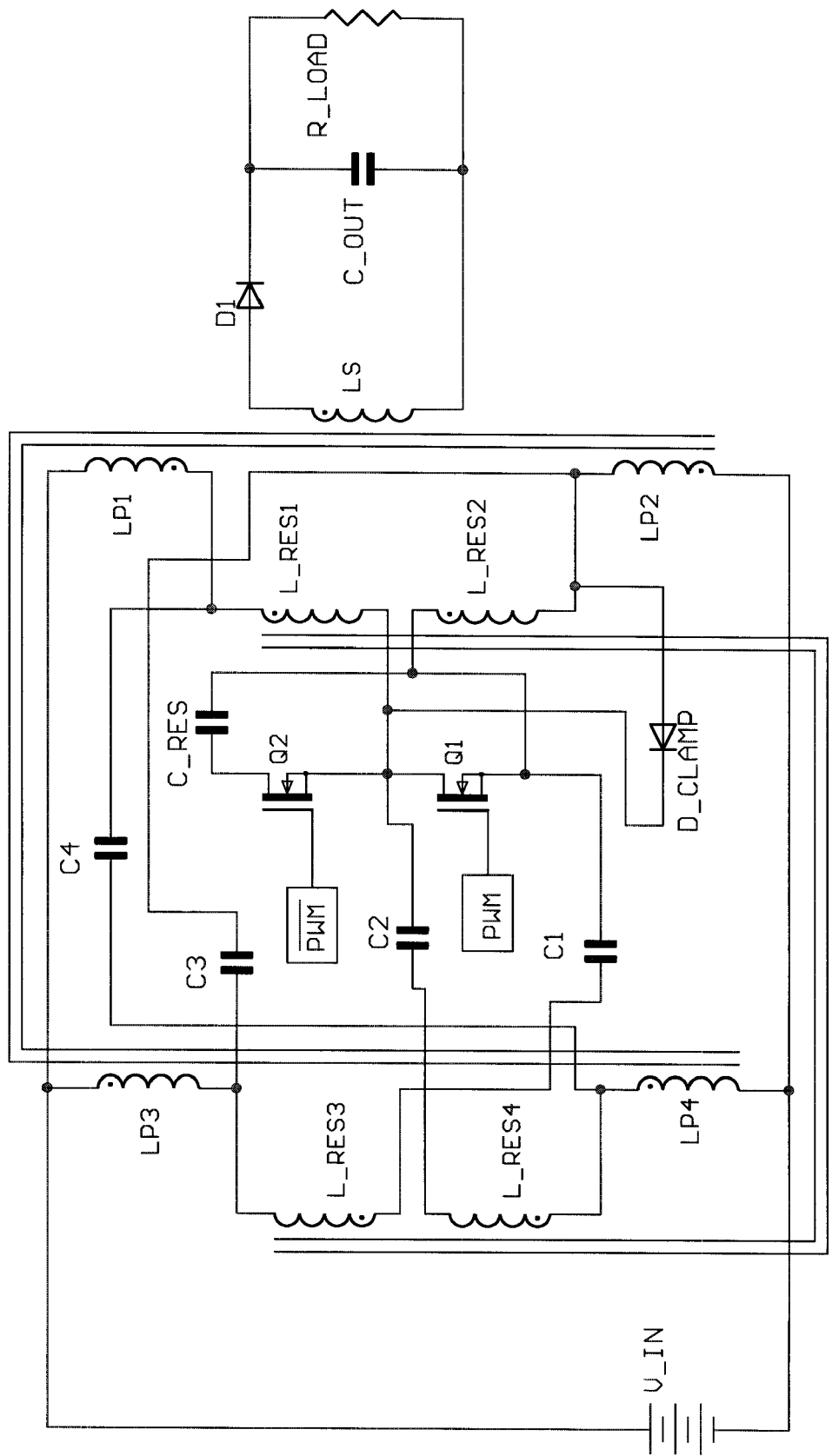
FIG. 71 illustrates the FIG. 70 circuit enhanced with clamp capacitors connecting the primary windings.

FIG. 71 illustrates another embodiment similar to the FIG. 70 embodiment but with two additional capacitors which further improve the ripple cancellation properties. The two added capacitors combined with the leakage inductances of the four primary winding sections and the four primary inductors effectively form a higher order filter to help eliminate input source ripple current.

Figure 72:
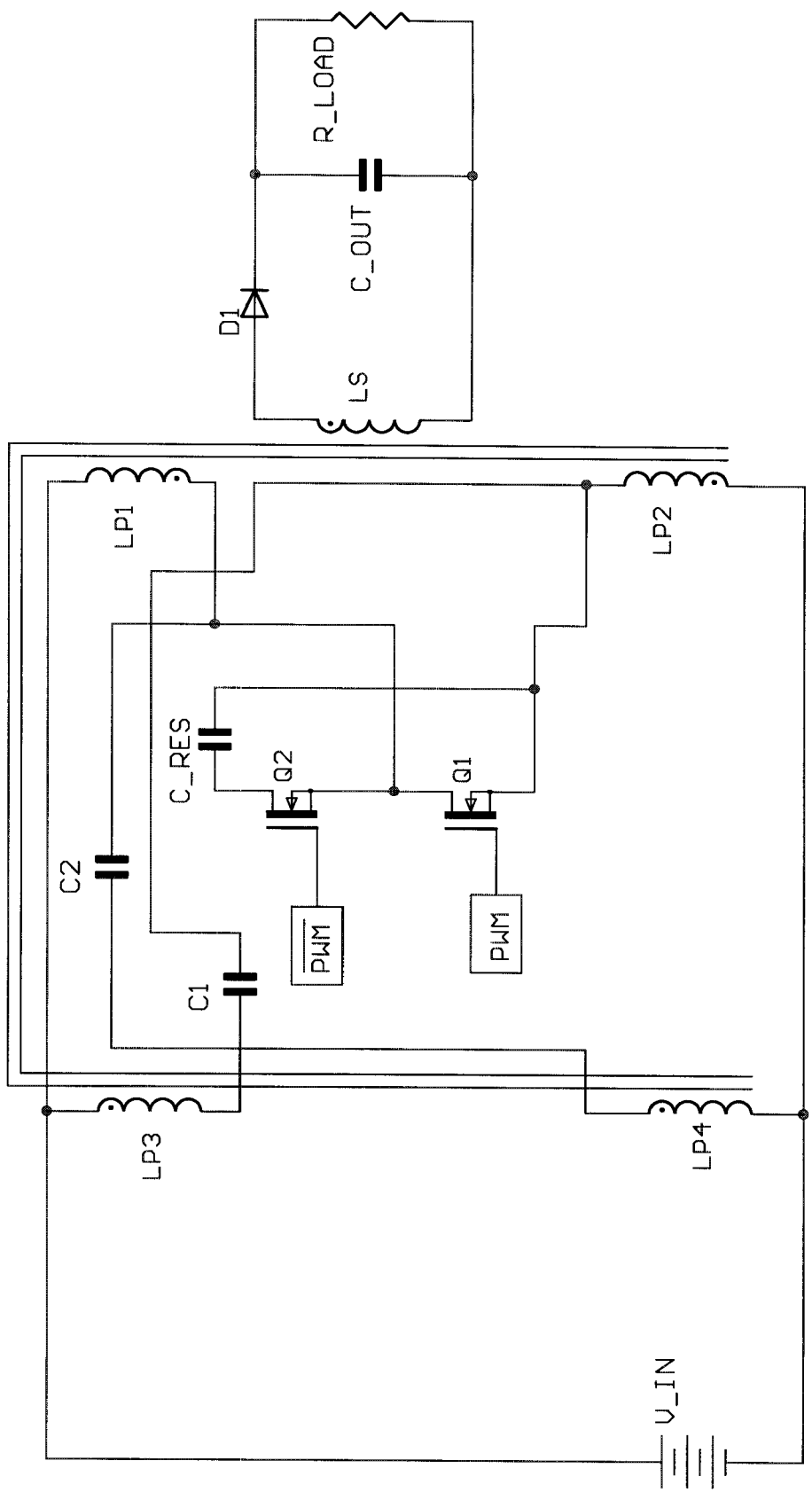
FIG. 72 illustrates an active reset flyback without a primary side choke to drive the resonant transitions. In this case the resonant transitions are driven by either the leakage inductance or the magnetizing inductance of the isolation transformer or both.

FIG. 72 illustrates another embodiment similar to the FIG. 70 embodiment but with the four primary inductors removed and replaced by the leakage inductance of transformer 501, not explicitly shown in FIG. 72. Although the FIG. 72 circuit can achieve zero voltage switching and ripple current cancellation to a lesser degree it relies on the leakage inductance which may be difficult to control in manufacture and there is no mechanism to clamp ringing associated with the leakage inductance and circuit parasitic capacitances. The uncontrolled ringing associated with the unclamped leakage inductance can lead to secondary diode voltage breakdown and severe EMI. Also, it is generally desirable to reduce leakage inductance to a minimum, but a minimum leakage inductance may not provide sufficient energy to drive the critical zero voltage turn on transition over a wide load range or to provide a significant amount of ripple current cancellation.

Coupled Inductor Buck Converter with Input Ripple Cancellation

Figure 73:
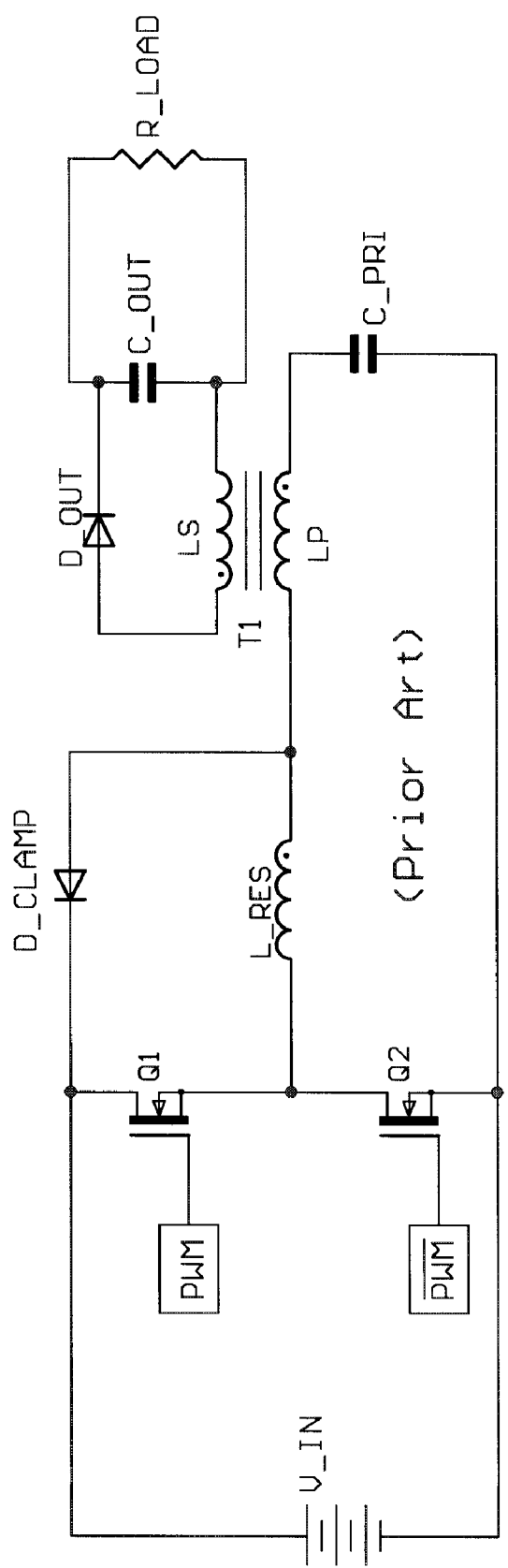
FIG. 73 illustrates a ZVS coupled inductor buck converter according to U.S. Pat. No. 5,402,329.

FIG. 73 illustrates a coupled inductor buck converter as practiced by the prior art and originally revealed as U.S. Pat. No. 5,402,329. The FIG. 73 converter does not provide non-pulsating input current but by splitting the small series choke into four smaller chokes and repositioning the chokes one can obtain an arrangement that achieves ripple cancellation at the input source terminals. Such a converter is revealed in FIG. 74. The FIG. 74 converter achieves zero voltage switching for all switches and all transitions, zero ripple input current, and continuous output current.

Figure 74:
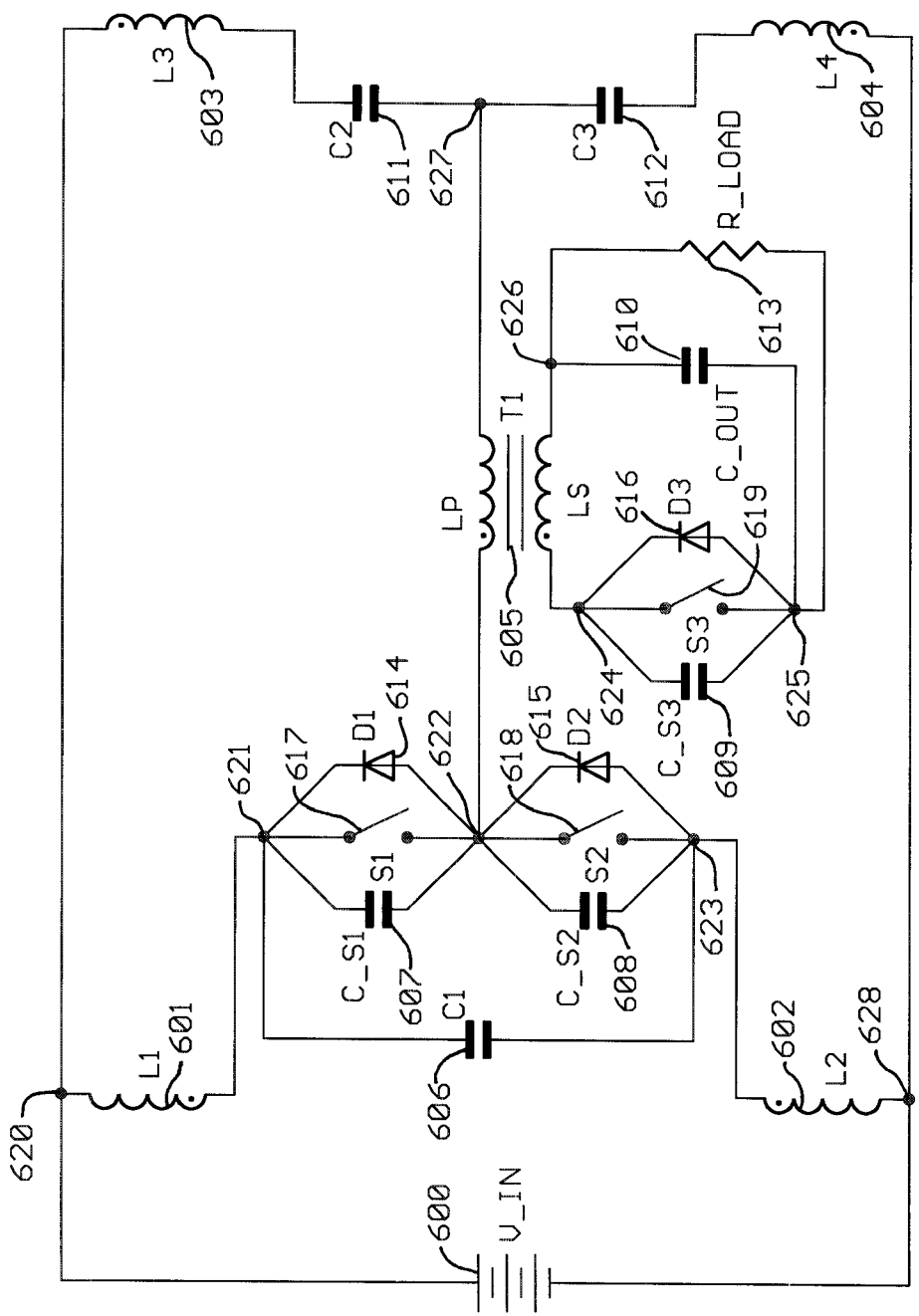
FIG. 74 illustrates a ZVS coupled inductor buck converter with input ripple current cancellation according to the subject invention.

Referring to FIG. 74 there is shown a coupled inductor buck converter in which input DC voltages are converted into an isolated output DC voltage. The circuit requires an input source of substantially DC voltage, four inductors, a flyback transformer, three switches, and four capacitors for output filtering, providing transformer reset, and coupling the inductors and the switches. For purposes of the operational state analysis, it is assumed that the capacitors are sufficiently large that the voltages developed across the capacitors are approximately constant over a switching interval. Also, for purposes of the operational state analysis, it is assumed that the input DC voltage sources have sufficiently low source impedance that the voltages developed across the input DC voltage sources are approximately constant over a switching interval. It will finally be assumed that the power switches are ideal, that is, lossless and able to carry current in either direction. We will also assume for purposes of the operational state analysis that all four inductors are equal in inductance value.

Structure

The structure of the circuit of the subject invention is shown in FIG. 74. A positive terminal of a source 600 of substantially DC voltage is connected to a node 620. A negative terminal of source 600 is connected to a node 628. An undotted terminal of an inductor 601 is connected to the node 620. A dotted terminal of an inductor 603 is also connected to node 620. A dotted terminal of inductor 601 is connected to a node 621. An undotted terminal of inductor 603 is connected to a first terminal of a capacitor 611. A second terminal of capacitor 611 is connected to a node 627. An undotted terminal of an inductor 602 is connected to node 628. A dotted terminal of an inductor 604 is also connected to node 628. A dotted terminal of inductor 602 is connected to a node 623. An undotted terminal of inductor 604 is connected to a first terminal of a capacitor 612. A second terminal of capacitor 612 is connected to node 627. A first terminal of a capacitor 606 is connected to node 621. A second terminal of capacitor 606 is connected to node 623. A first terminal of a switch 617 is connected to node 621. A second terminal of switch 617 is connected to a node 622. A first terminal of a capacitor 607 is connected to node 621. A second terminal of capacitor 607 is connected to node 622. A cathode terminal of a diode 614 is connected to node 621. An anode terminal of diode 614 is connected to node 622. A first terminal of a switch 618 is connected to node 622. A second terminal of switch 618 is connected to node 623. A first terminal of a capacitor 608 is connected to node 622. A second terminal of capacitor 608 is connected to node 623. A cathode terminal of a diode 615 is connected to node 622. An anode terminal of diode 615 is connected to node 623. A dotted terminal of a primary winding of a flyback transformer 605 is connected to node 622. An undotted terminal of the primary winding of transformer 605 is connected to node 627. A dotted terminal of a secondary winding of transformer 605 is connected to a node 624. An undotted terminal of the secondary winding of transformer 605 is connected to a node 626. A first terminal of a switch 619 is connected to node 624. A second terminal of switch 619 is connected to a node 625. A first terminal of a capacitor 609 is connected to node 624. A second terminal of capacitor 609 is connected to node 625. A cathode terminal of a diode 616 is connected to node 624. An anode terminal of diode 616 is connected to node 625. A first terminal of a capacitor 610 is connected to node 626. A second terminal of capacitor 610 is connected to node 625. A first terminal of a load 613 is connected to node 626. A second terminal of load 613 is connected to node 625.

Operation

Figure 75:
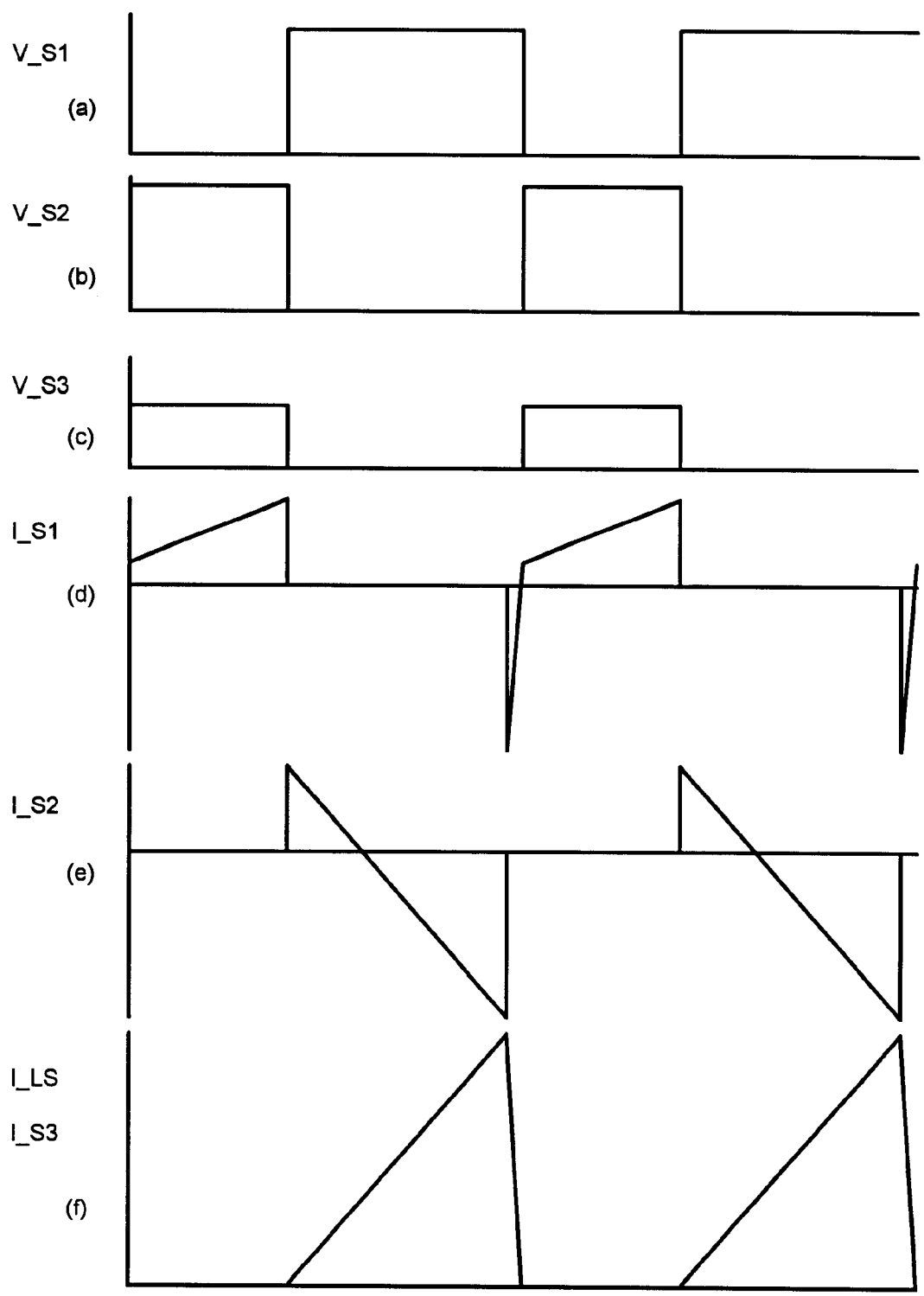
FIG. 75 illustrates voltage and current wave forms of the FIG. 74 circuit.
Figure 76:
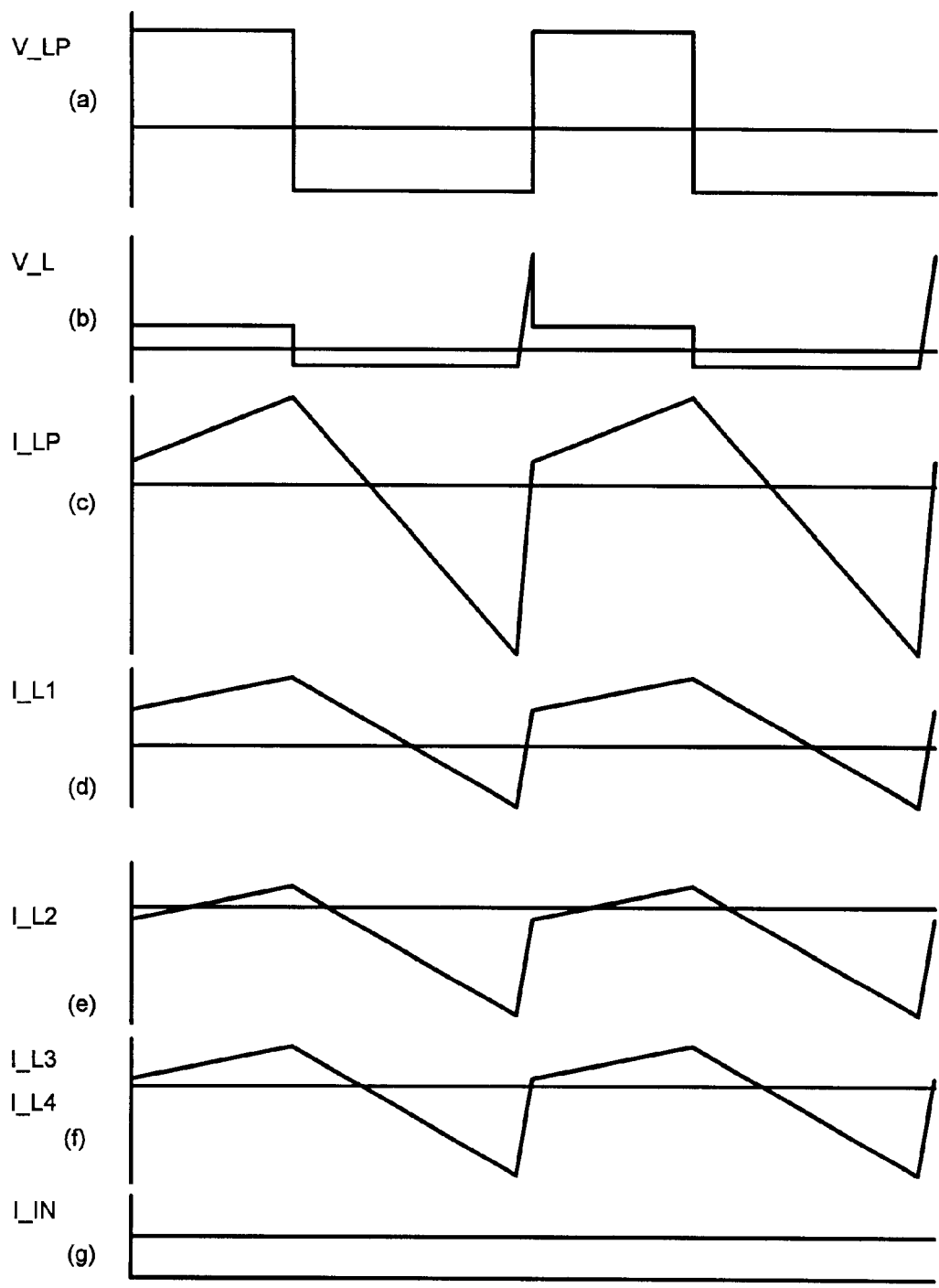
FIG. 76 illustrates additional current and voltage wave forms of the FIG. 74 circuit.
Figure 77:
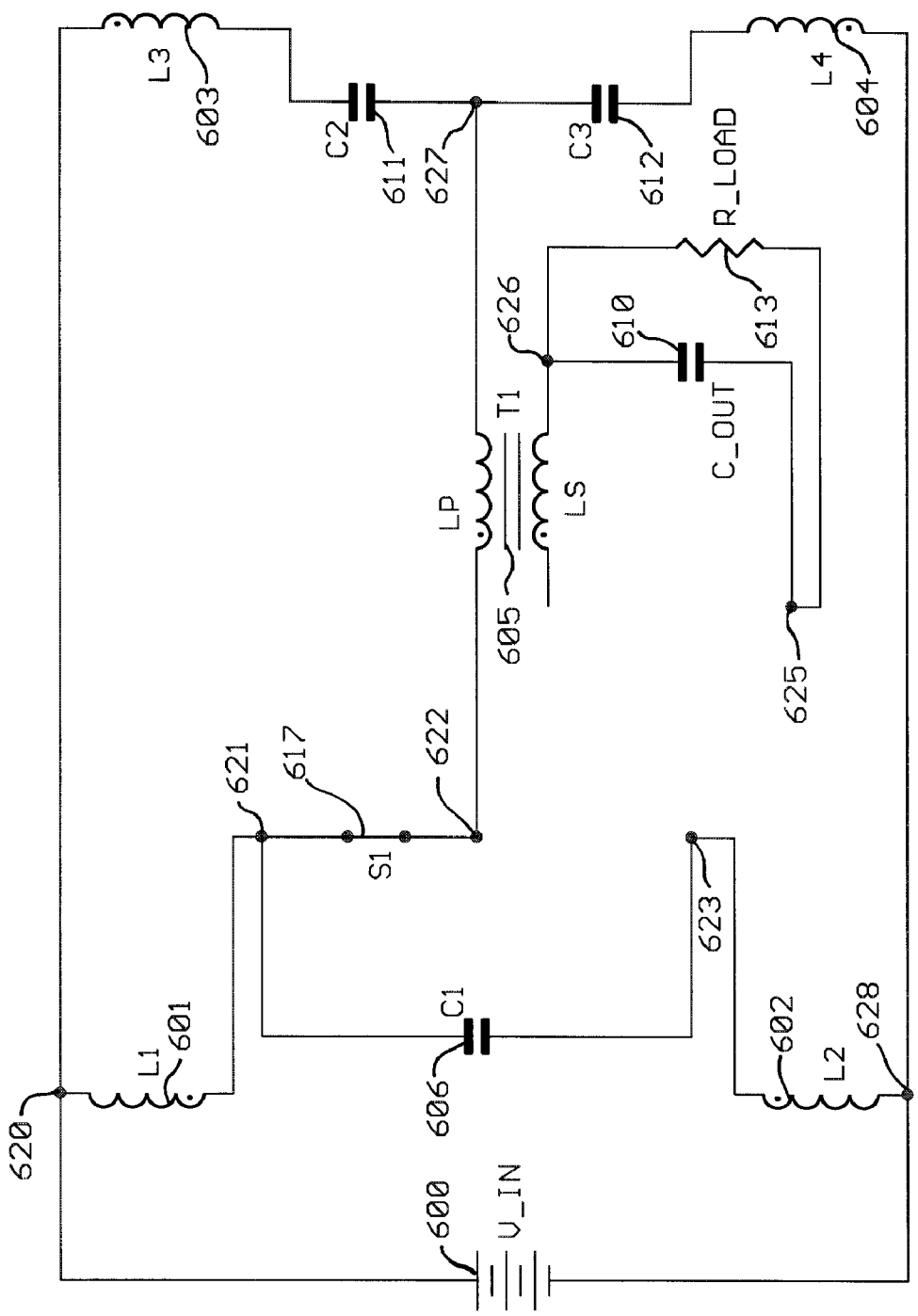
FIG. 77 illustrates an on state of the FIG. 74 circuit.
Figure 78:
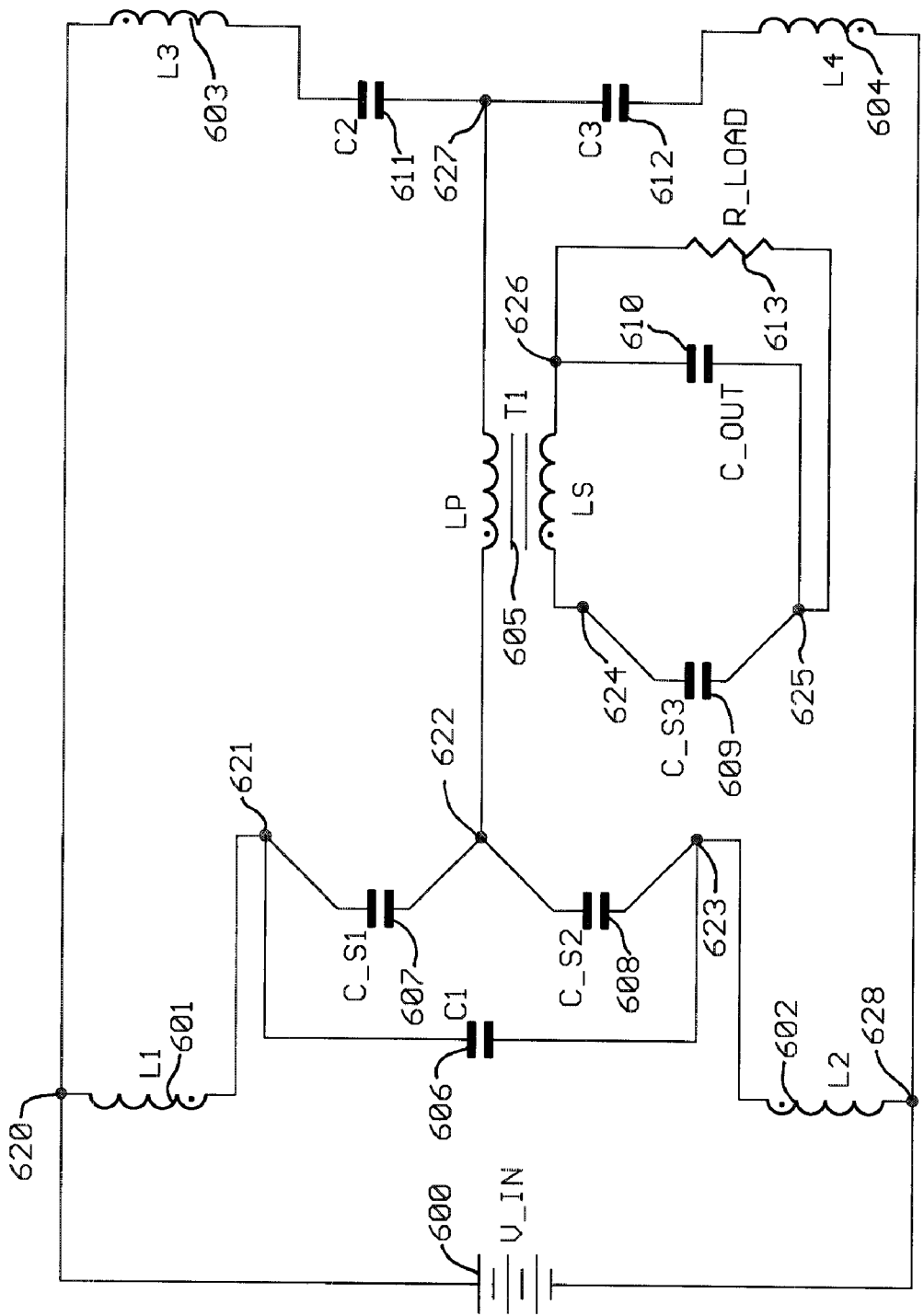
FIG. 78 illustrates a first phase of a turn off transition of the FIG. 74 circuit.

It is assumed in this analysis that the system has reached a settled operating condition. Except for the short, but finite, switching intervals there are two states of the circuit of FIG. 74, an on state and an off state. The applied voltage to the capacitor 606, $V_{C1}$, will be equal to the input DC source 600 voltage. This results from the fact that the first terminal of the capacitor 606 is connected to the positive terminal of the source 600 through an inductor 601 and a second terminal of the capacitor 606 is connected to the negative terminal of source 600 through an inductor 602 and the average applied voltages to the inductors are zero. The applied voltage to the capacitor 611, $VC_2$, will be equal to the input DC source 600 voltage times 1−D, or $V_{C2}=V_{IN}\cdot(1-D)$, where D is the duty cycle of the S1 switch 617. This results from the fact that the average voltage at nodes 622 and 627 is $D\cdot V_{IN}$. The voltage applied to the capacitor 612, $V_{C3}$, is $V_{C3}=D\cdot V_{IN}$. Voltage and current wave forms are illustrated in FIGS. 75 and 76. An initial condition that represents an on state of the converter is illustrated in FIG. 77. In the on state the switch 617 is on (closed) and the switches 618 and 619 are off (open). During the on state the current flowing into the undotted terminals and out of the dotted terminals of the four primary inductors is increasing at the same rate. As a result the current flowing from the source 600 is constant. The current flowing in the primary winding of the transformer 605 is flowing into the dotted terminal and out of the undotted terminal and is increasing. The current in the secondary winding of the transformer 605 is zero. Load current flows in the load from the capacitor 610.

Figure 79:
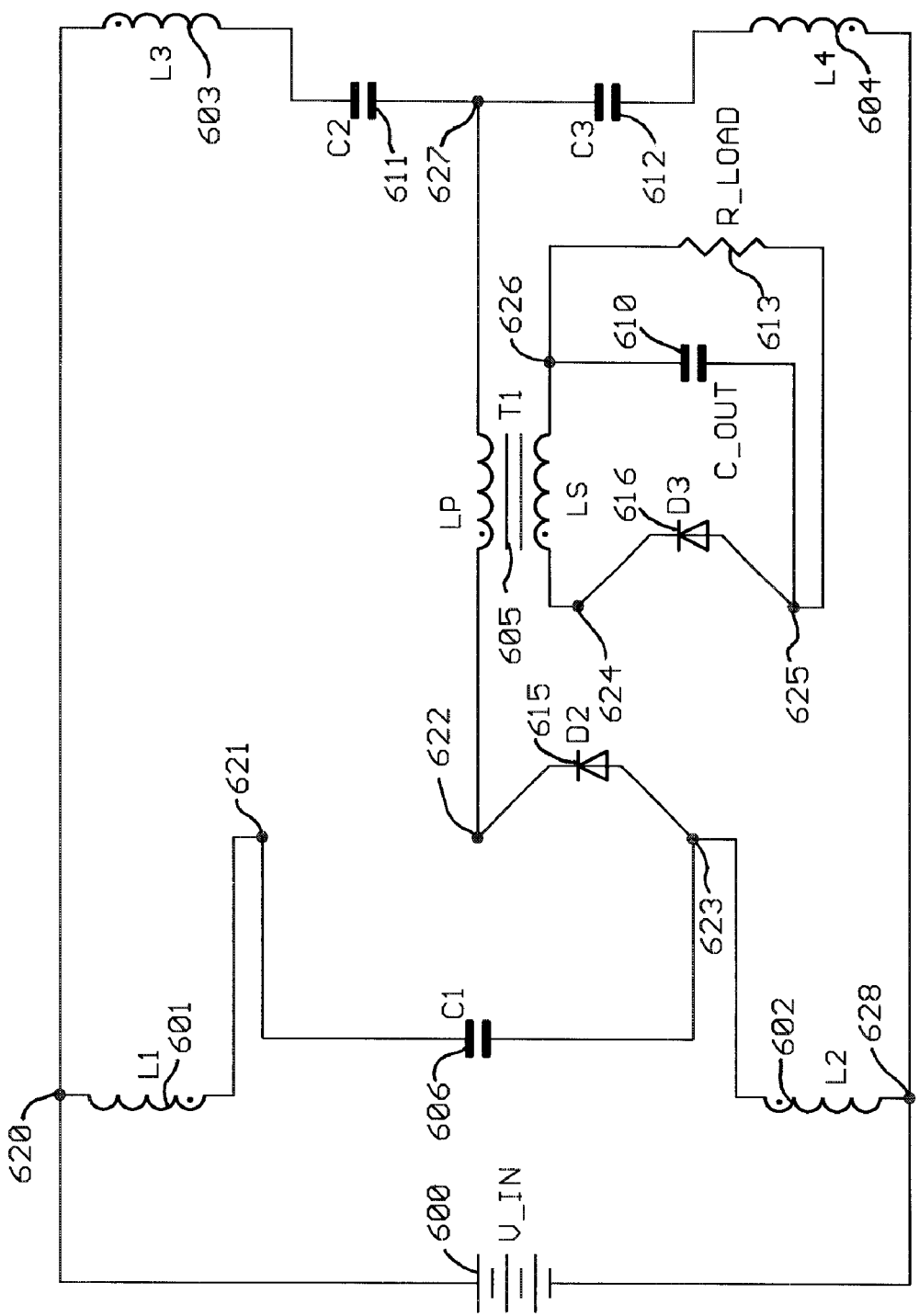
FIG. 79 illustrates a second phase of a turn off transition of the FIG. 74 circuit.
Figure 80:
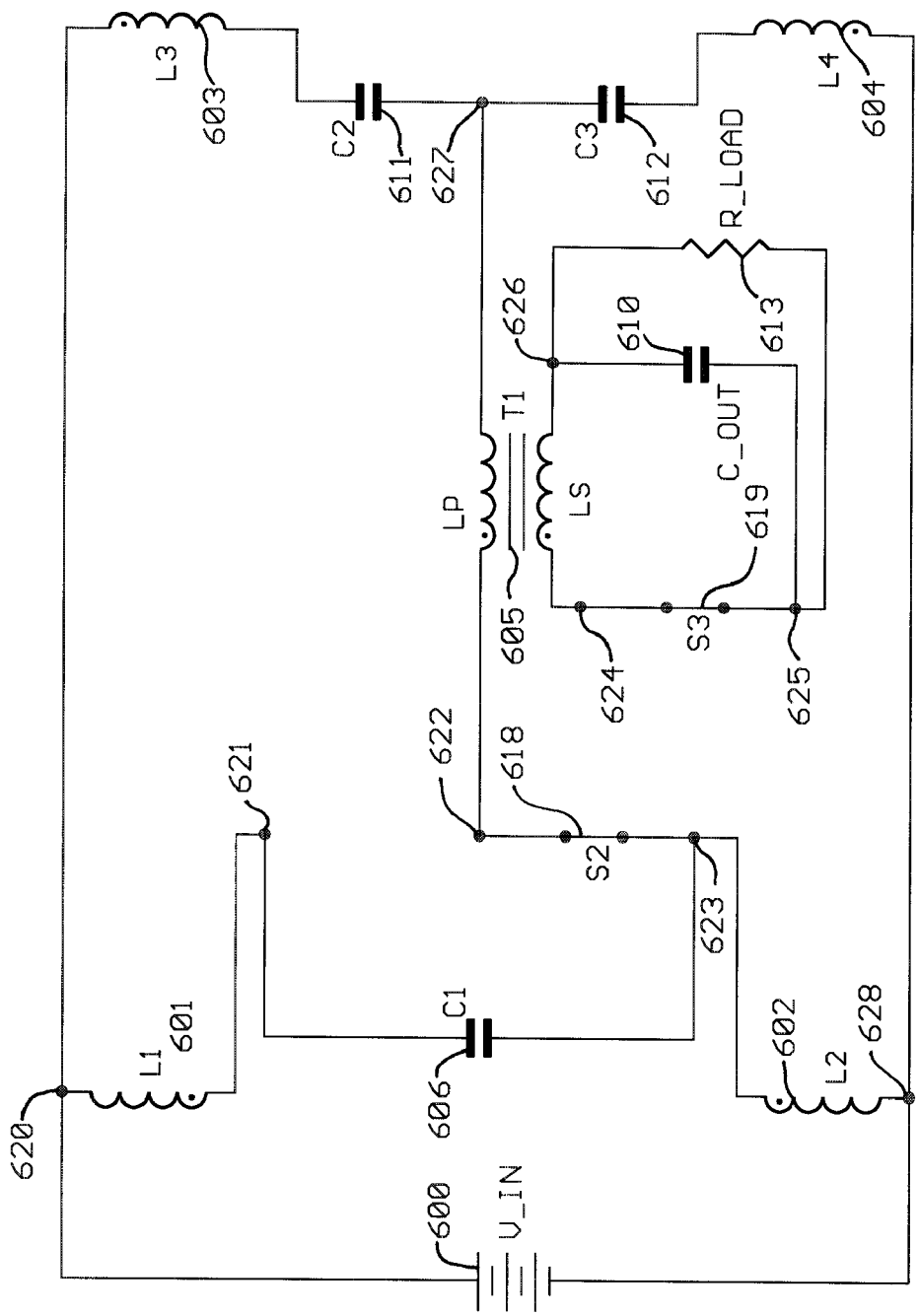
FIG. 80 illustrates an off state of the FIG. 74 circuit.

At a time determined by the control circuit the switch 617 is turned off and the switch current is diverted into capacitors 607 and 608. At the same time the winding voltages of all of the inductors and the transformer begin to swing as the voltages at nodes 622 and 624 fall. As the voltage at node 624 falls the capacitors 609 and 608 discharge and capacitor 607 charges. When the voltage at node 622 reaches the voltage at node 623 diodes 615 and 616 become forward biased, as illustrated in FIG. 79. Shortly after diodes 615 and 616 turn on switches 618 and 619 are turned on at zero voltage, as illustrated in FIG. 80, which illustrates the off state of the converter. During the off state the current in the four primary inductors and the primary winding of transformer 605 ramp down and change sign as the current ramps up in the secondary winding of transformer 605. During the off time the amount of charge flowing from right to left in the transformer 605 transformer primary winding is equal to the charge flowing from left to right in the transformer 605 primary winding during the on state.

Figure 81:
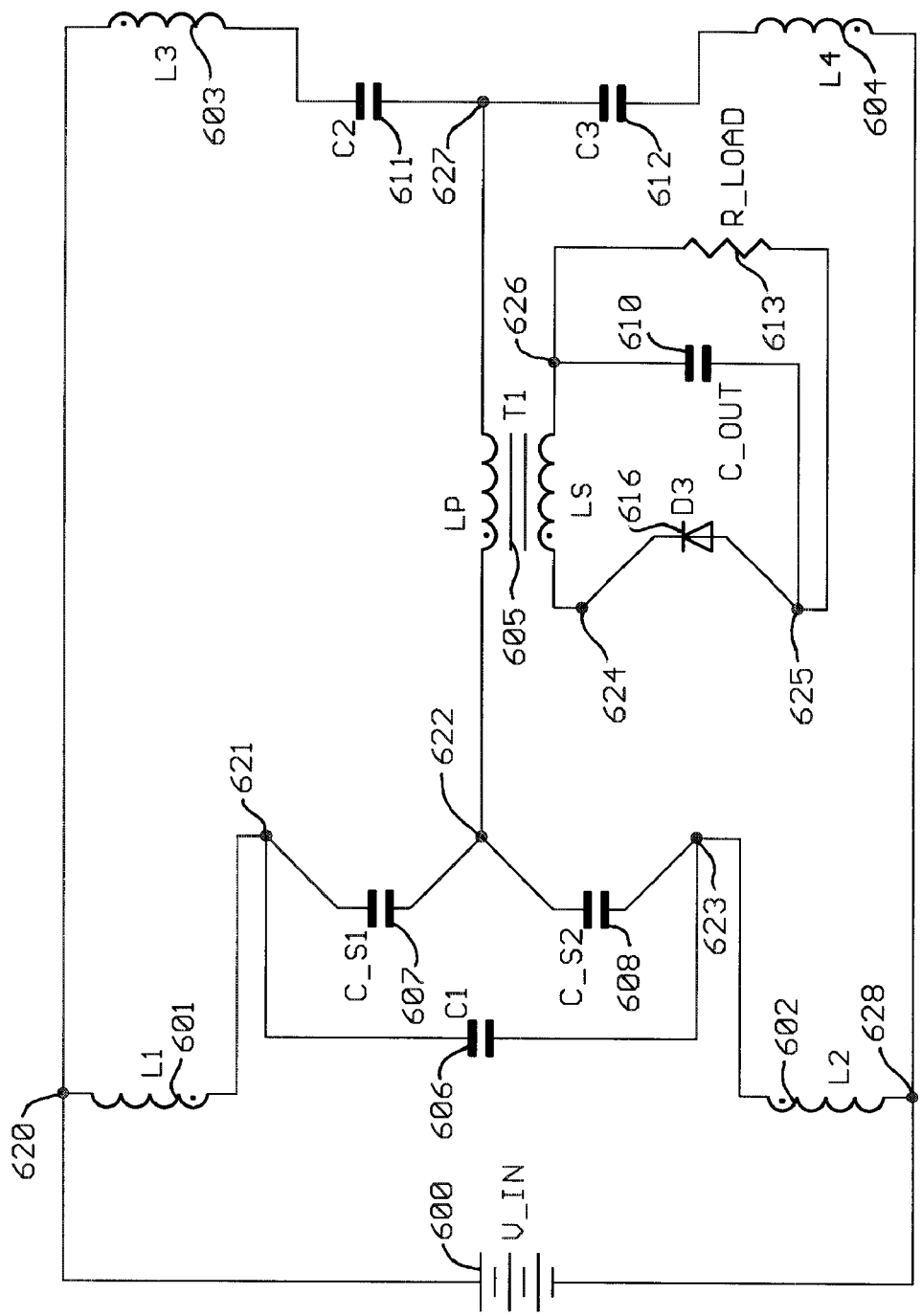
FIG. 81 illustrates a first phase of a turn on transition of the FIG. 74 circuit.
Figure 82:
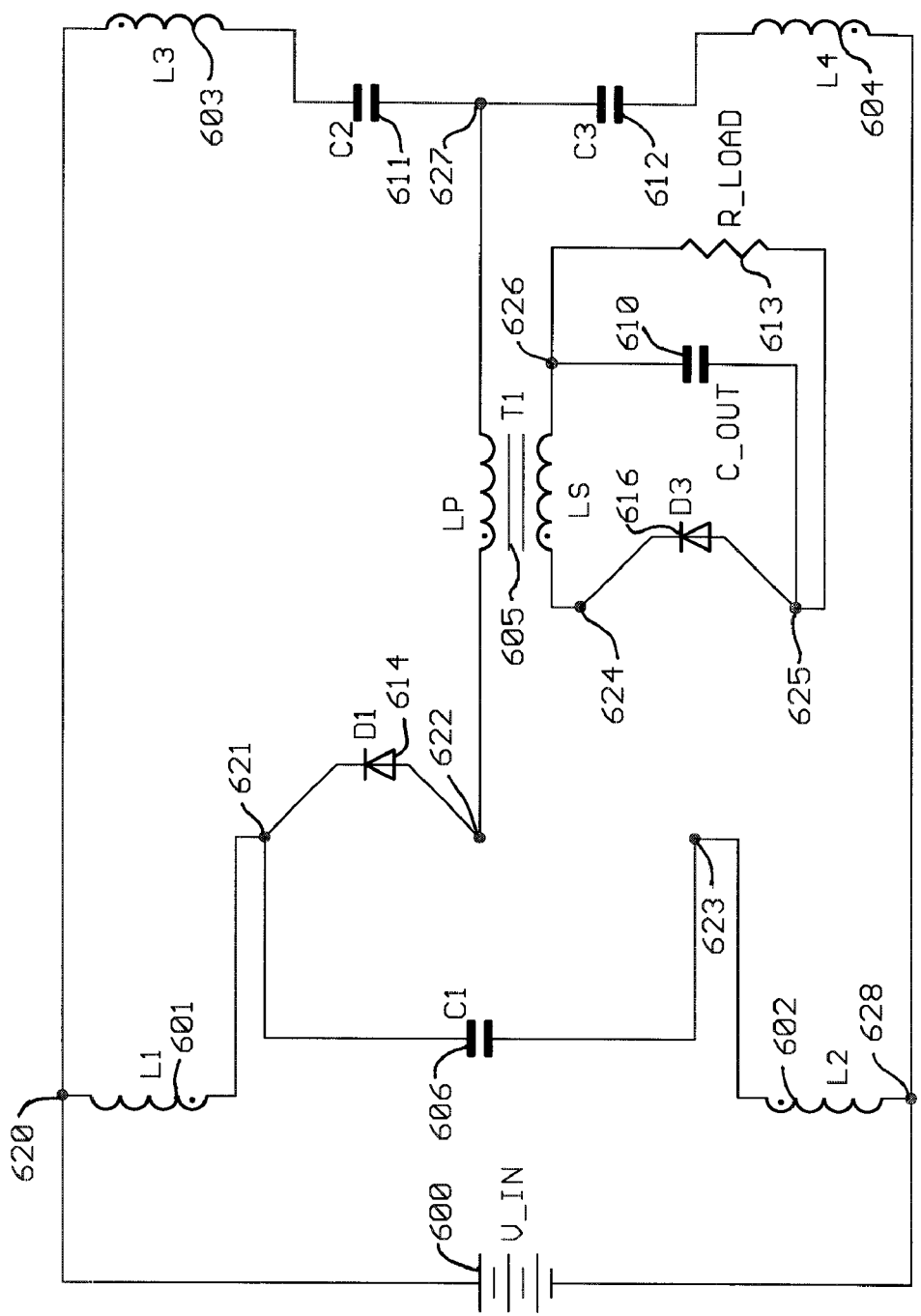
FIG. 82 illustrates a second phase of a turn on transition of the FIG. 74 circuit.
Figure 83:
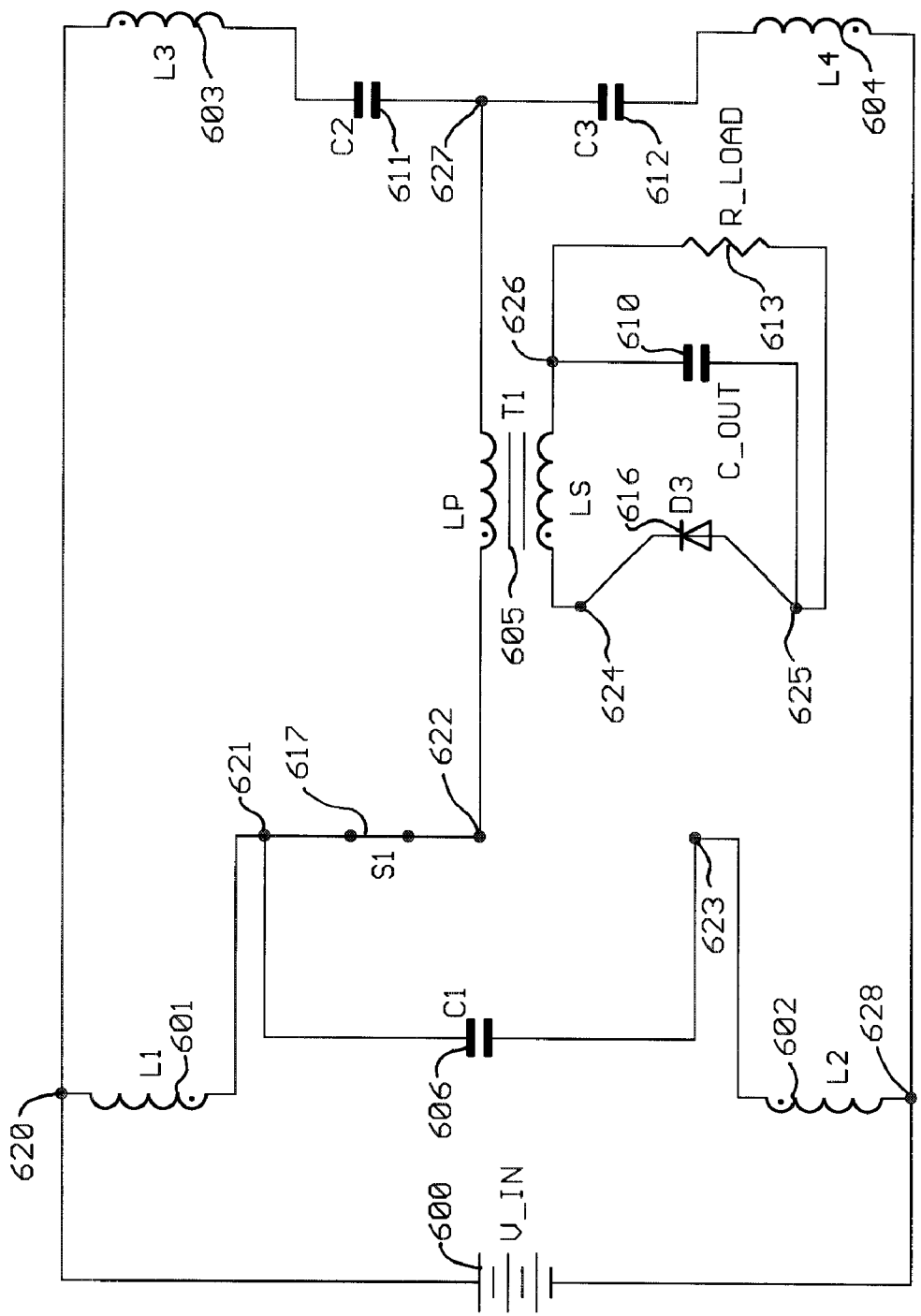
FIG. 83 illustrates a third phase of a turn on transition of the FIG. 74 circuit.

At the end of the off state the current flowing from right to left is larger than the current at the beginning of the off state. At a time determined by the control circuit the switches 618 and 619 are turned off (opened). Stored energy in the four primary inductors forces current into the diode 616 and into capacitors 607 and 608 as the voltage at node 622 rises, as illustrated in FIG. 81. The voltage at node 622 will continue to rise until the diode 614 becomes forward biased, as illustrated in FIG. 82. Shortly after diode 614 turns on switch 617 is turned on, as illustrated in FIG. 83. The applied voltage to the four primary inductors is now relatively large so that the current in the four primary windings ramps down rapidly as the secondary winding current of transformer 605 ramps down rapidly until the diode 616 becomes reverse biased and the converter enters the on state again and the cycle repeats.

Related Embodiments

Figure 84:
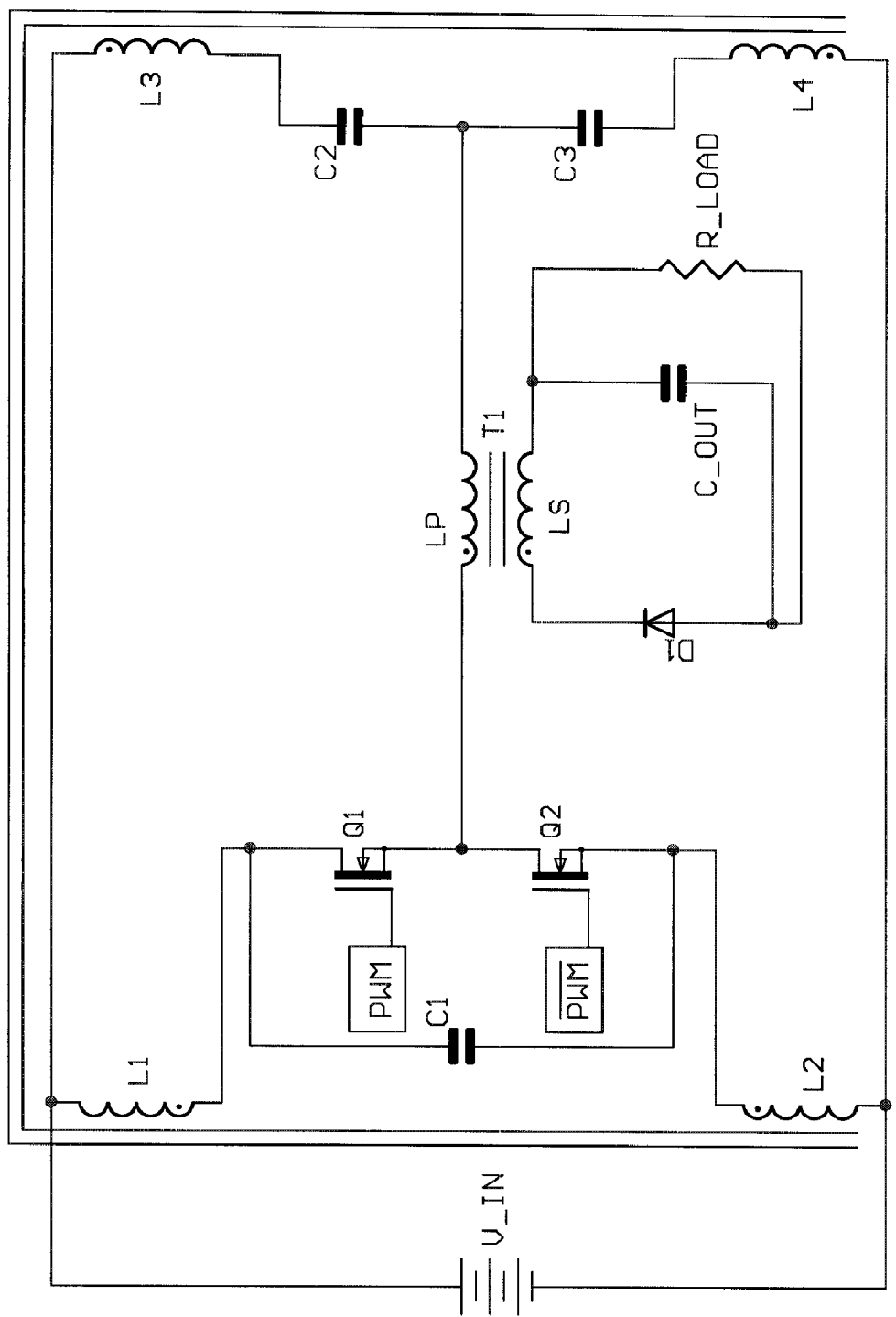
FIG. 84 illustrates the FIG. 74 circuit with the four primary inductors coupled on a single common core with the primary switches implemented using mosfets and the secondary switch implemented with a diode.

FIG. 84 illustrates the FIG. 74 circuit with all four primary inductors loosely coupled on a single common core. The primary switches in the FIG. 84 circuit are implemented with mosfets and the secondary switch is implemented with a diode.

Figure 85:
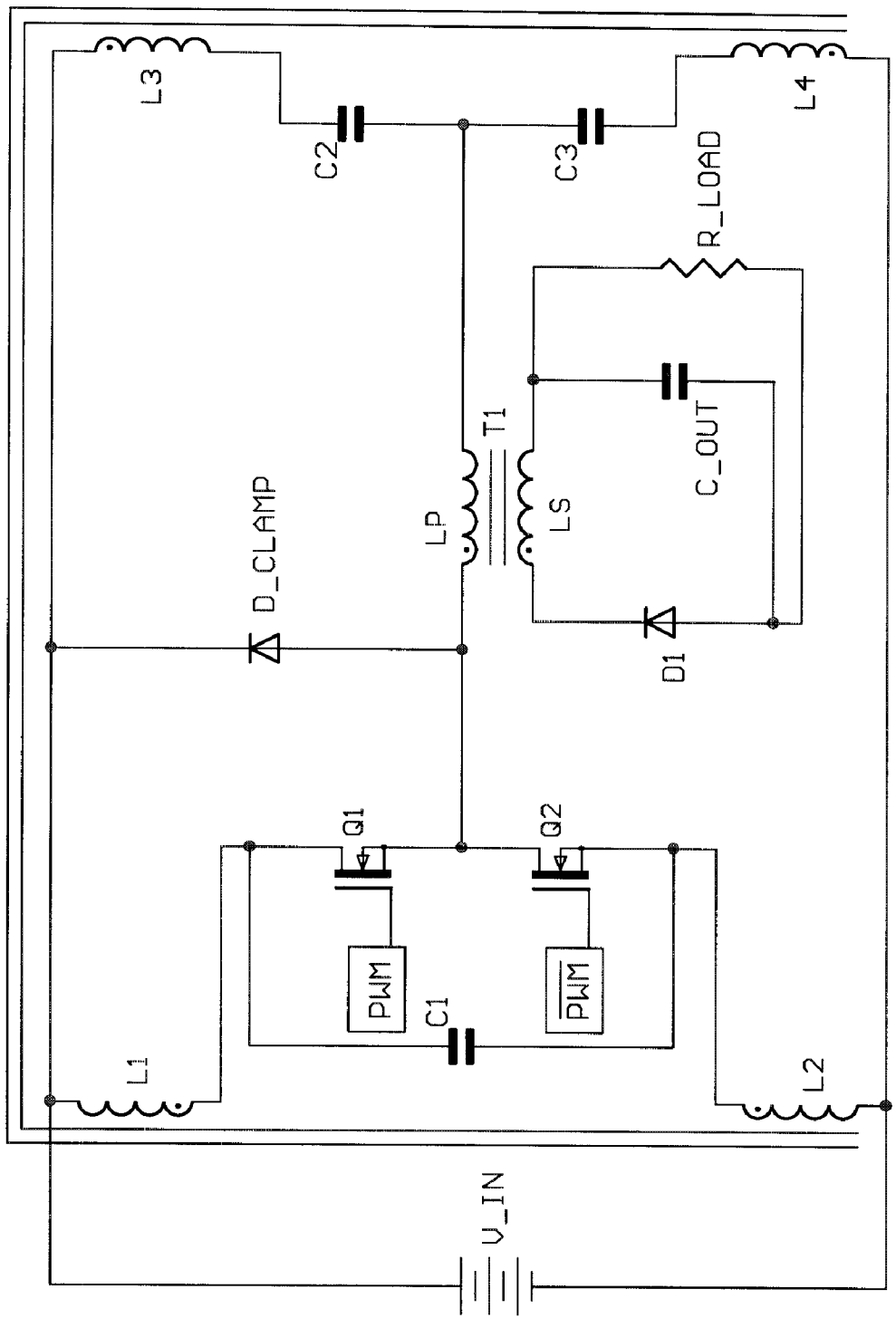
FIG. 85 illustrates the FIG. 84 circuit with a diode added to clamp ringing associated with the primary choke and the circuit's parasitic capacitances.

FIG. 85 illustrates the FIG. 84 circuit with the addition of a diode used to clamp ringing associated with the primary inductors and the circuit's parasitic capacitances.

Figure 86:
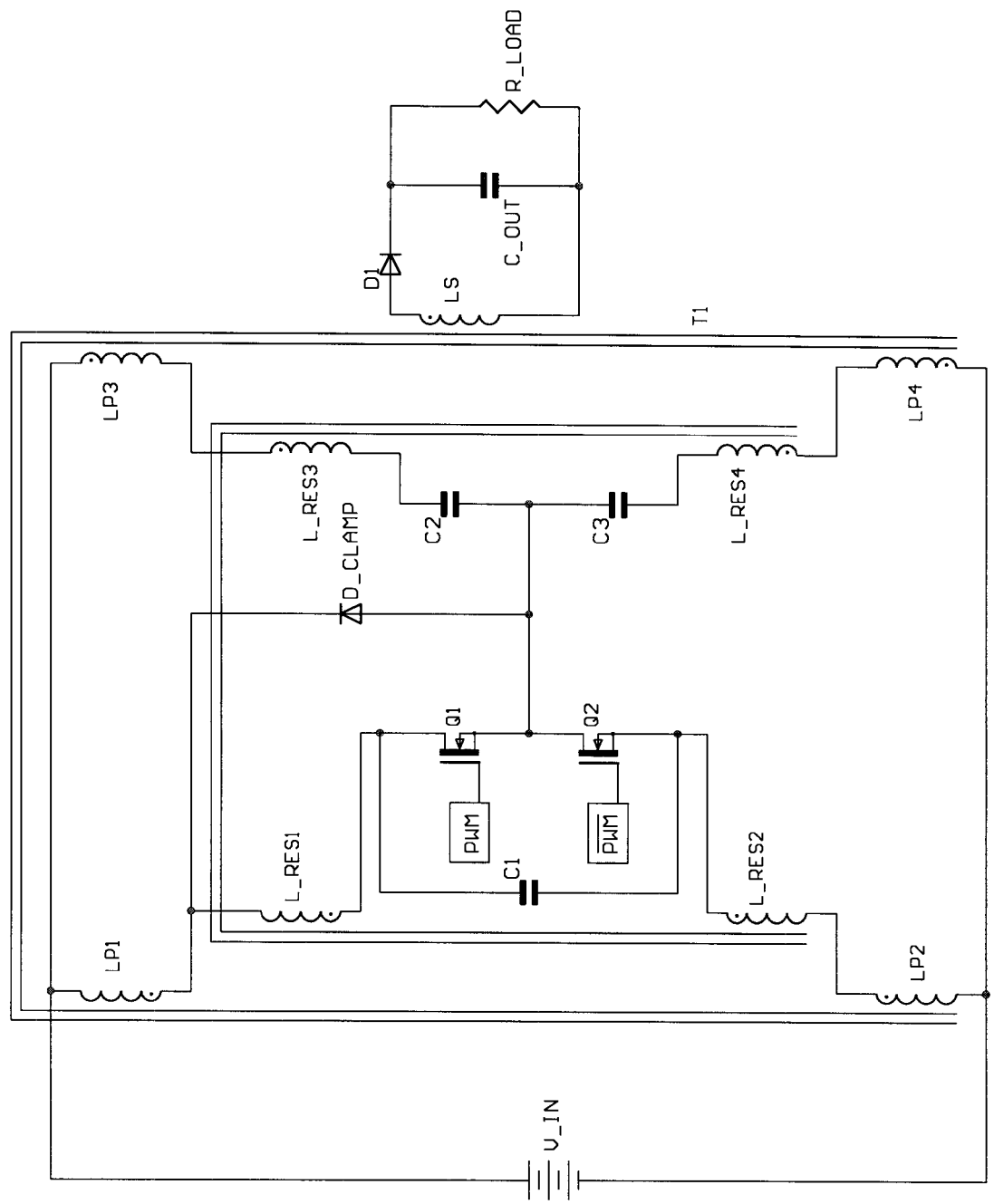
FIG. 86 illustrates the FIG. 85 circuit with the isolation transformer's primary winding split into four and relocated to enhance the input terminal ripple current cancellation.

FIG. 86 illustrates the FIG. 85 circuit with the primary winding of the transformer split into four windings and repositioned so that the ripple current cancellation is enhanced.

Figure 87:
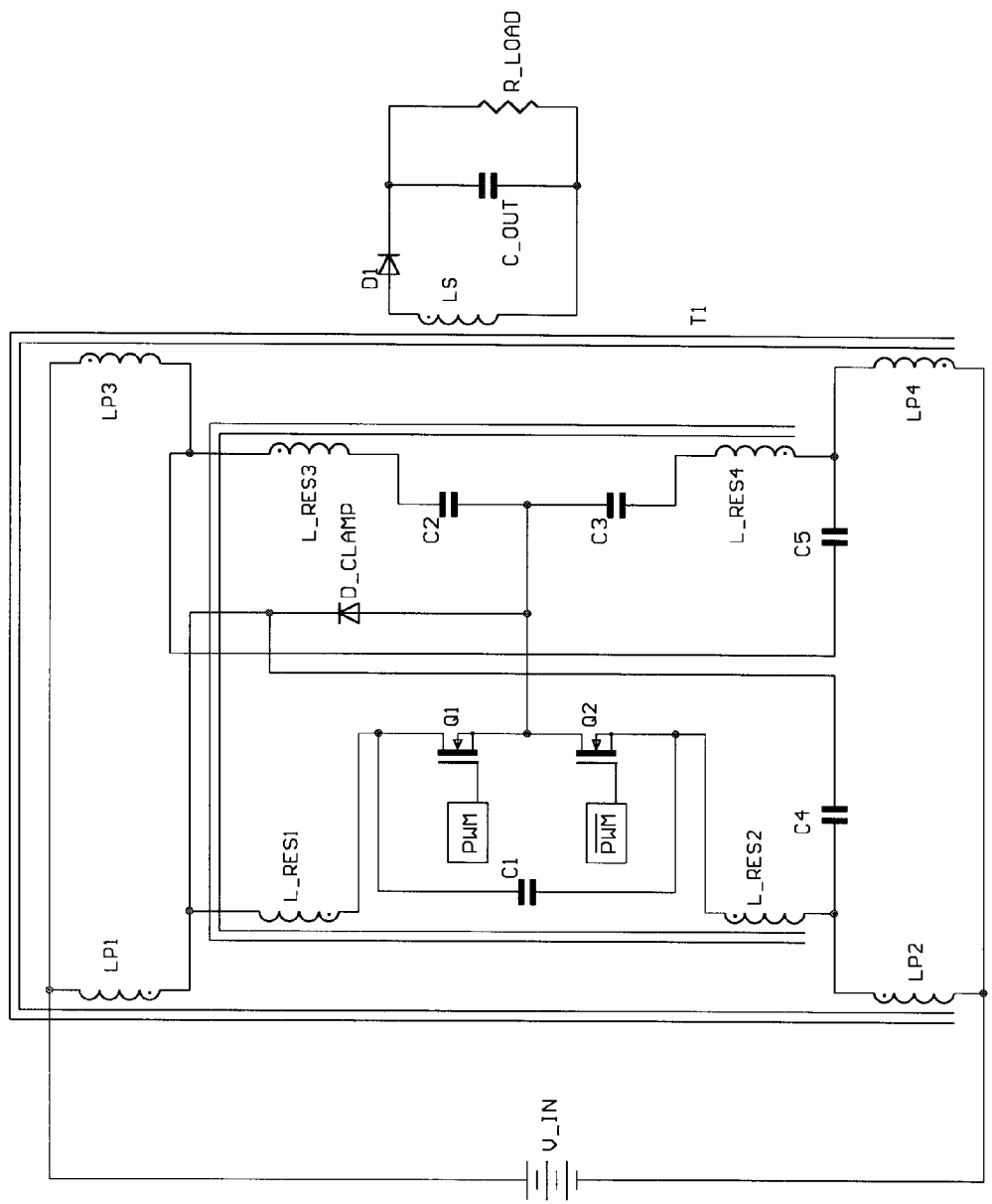
FIG. 87 illustrates the FIG. 86 circuit with capacitors added to enhance the ripple current cancellation.

FIG. 87 illustrates the FIG. 86 circuit with two additional capacitors used to enhance the ripple current cancellation properties.

Figure 88:
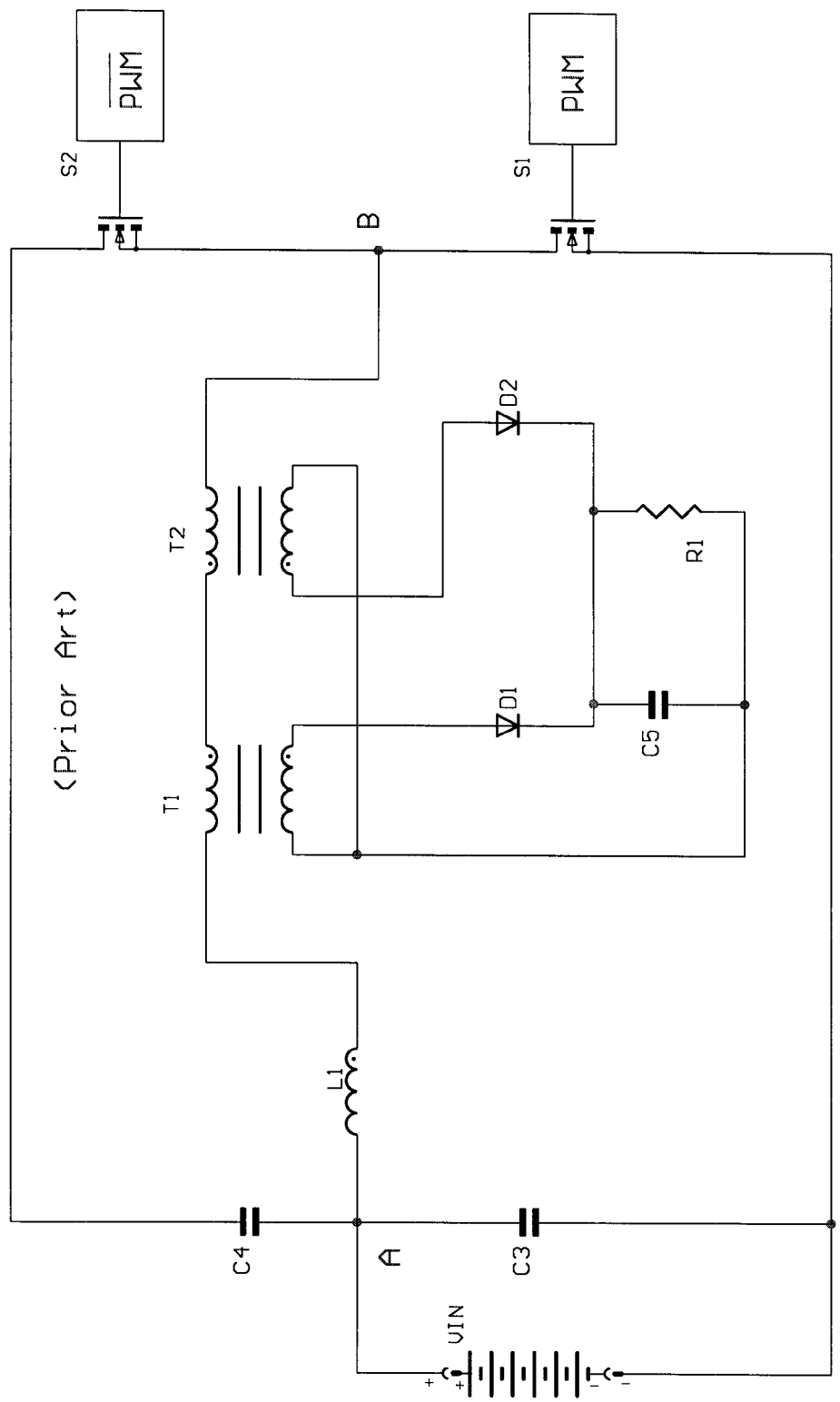
FIG. 88 illustrates a ZVS active reset interleaved coupled inductor buck converter according to the prior art.

Active Reset Interleaved Coupled Inductor Buck Converter with Input Ripple Current Cancellation FIG. 88 illustrates an interleaved coupled inductor buck converter as practiced by the prior art and originally revealed as Ser. No. 09/571,961. The FIG. 88 converter does not provide non-pulsating input current but by splitting the small series choke into four smaller chokes and repositioning the chokes one can obtain an arrangement that achieves ripple cancellation at the input source terminals. Such a converter is revealed in FIG. 89. The FIG. 89 converter achieves zero voltage switching for all switches and all transitions, zero ripple input current, and continuous output current. For nominal line voltage the FIG. 89 converter can be designed to have zero ripple output current.

Referring to FIG. 88 there is shown an active reset interleaved coupled inductor buck converter in which input DC voltages are converted into an isolated output DC voltage. The circuit requires an input source of substantially DC voltage, two flyback transformers, four inductors, four switches, and four capacitors for output filtering, providing transformer reset, and coupling the inductors and the switches. For purposes of the operational state analysis, it is assumed that the capacitors are sufficiently large that the voltages developed across the capacitors are approximately constant over a switching interval. Also, for purposes of the operational state analysis, it is assumed that the input DC voltage sources have sufficiently low source impedance that the voltages developed across the input DC voltage sources are approximately constant over a switching interval. It will finally be assumed that the power switches are ideal, that is, lossless and able to carry current in either direction. We will also assume for purposes of the operational state analysis that all four inductors are equal in inductance value.

Structure

Figure 89:
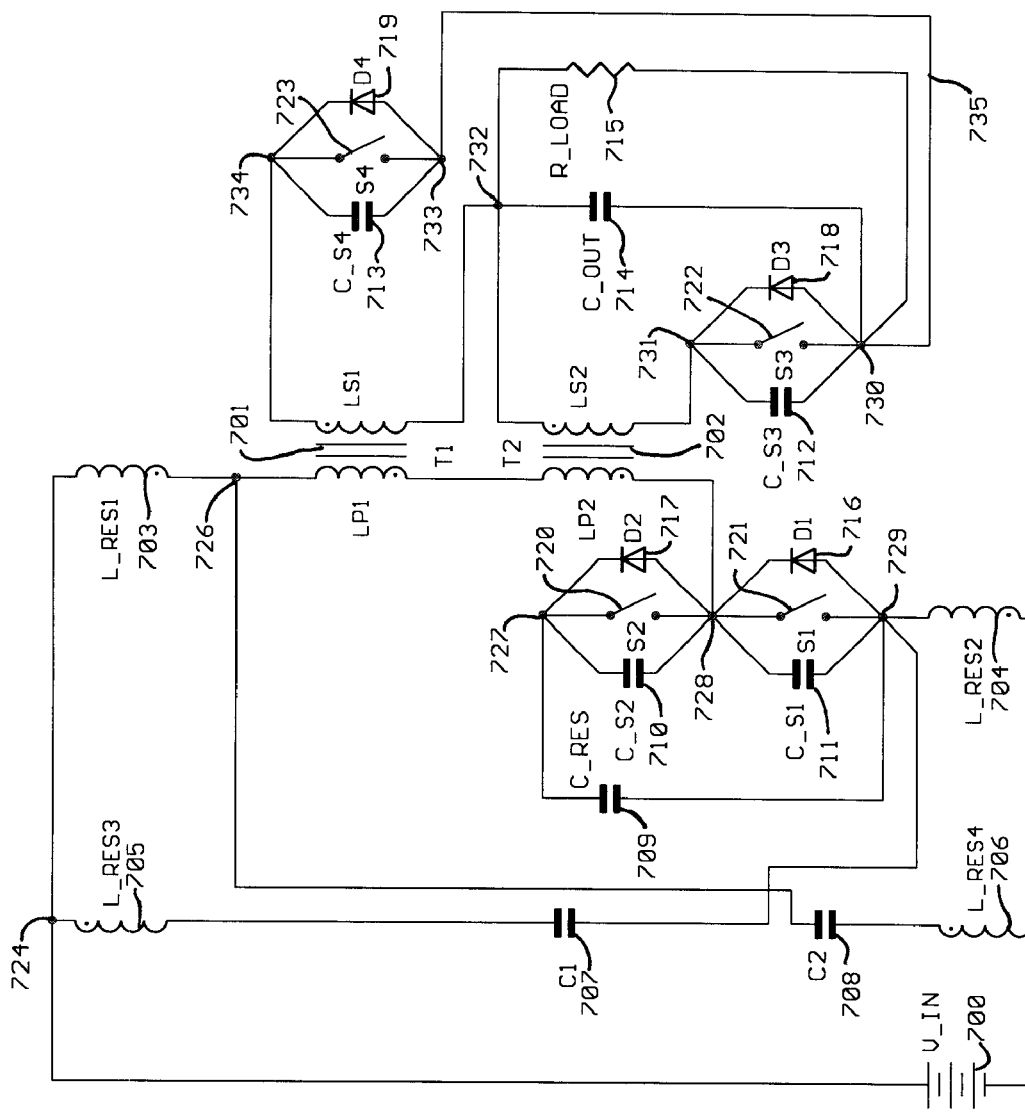
FIG. 89 illustrates a ZVS active reset interleaved coupled inductor buck converter with input terminal ripple current cancellation.

The structure of the circuit of the subject invention is shown in FIG. 89. A positive terminal of a source 700 of substantially DC voltage is connected to a node 724. A negative terminal of source 700 is connected to a node 725. An undotted terminal of an inductor 703 is connected to the node 724. A dotted terminal of an inductor 705 is also connected to node 724. A dotted terminal of inductor 703 is connected to a node 726. An undotted terminal of inductor 705 is connected to a first terminal of a capacitor 707. A second terminal of capacitor 707 is connected to a node 729. An undotted terminal of an inductor 706 is connected to node 725. A dotted terminal of an inductor 704 is also connected to node 725. An undotted terminal of inductor 704 is connected to node 729. A dotted terminal of inductor 706 is connected to a first terminal of a capacitor 708. A second terminal of capacitor 708 is connected to node 726. An undotted terminal of a primary winding of a flyback transformer 701 is connected to node 726. A dotted terminal of the primary winding of flyback transformer 701 is connected to an undotted terminal of a primary winding of a flyback transformer 702. A dotted terminal of the primary winding of transformer 702 is connected to a node 728. A first terminal of a switch 721 is connected to node 728. A second terminal of switch 721 is connected to node 729. A first terminal of a capacitor 711 is connected to node 728. A second terminal of capacitor 711 is connected to node 729. A cathode terminal of a diode 716 is connected to node 728. An anode terminal of diode 716 is connected to node 729. A first terminal of a switch 720 is connected to node 728. A second terminal of s witch 720 is connected to a node 727. A first terminal of a capacitor 710 is connected to node 728. A second terminal of capacitor 710 is connected to node 727. An anode terminal of a diode 717 is connected to node 728. A cathode terminal of diode 717 is connected to node 727. A first terminal of a capacitor 709 is connected to node 727. A second terminal of capacitor 709 is connected to node 729. An undotted terminal of a secondary winding of transformer 701 is connected to a node 732. A dotted terminal of the secondary winding of the transformer 701 is connected to a node 734. An undotted terminal of a secondary winding of transformer 702 is connected to a node 731. A dotted terminal of the secondary winding of the transformer 702 is connected to the node 732. A first terminal of a switch 722 is connected to node 731. A second terminal of switch 722 is connected to a node 730. A first terminal of a capacitor 712 is connected to node 731. A second terminal of capacitor 712 is connected to node 730. A cathode terminal of a diode 718 is connected to node 731. An anode terminal of diode 718 is connected to node 730. A first terminal of a switch 723 is connected to node 734. A second terminal of switch 723 is connected to a node 733. A first terminal of a capacitor 713 is connected to node 734. A second terminal of capacitor 713 is connected to node 733. A cathode terminal of a diode 719 is connected to node 734. An anode terminal of diode 719 is connected to node 733. A lead 735 is connected to node 733 and to node 730. A first terminal of a capacitor 714 is connected to node 732. A second terminal of capacitor 714 is connected to node 730. A first terminal of a load 715 is connected to node 732. A second terminal of load 715 is connected to node 730.

Operation

Figure 90:
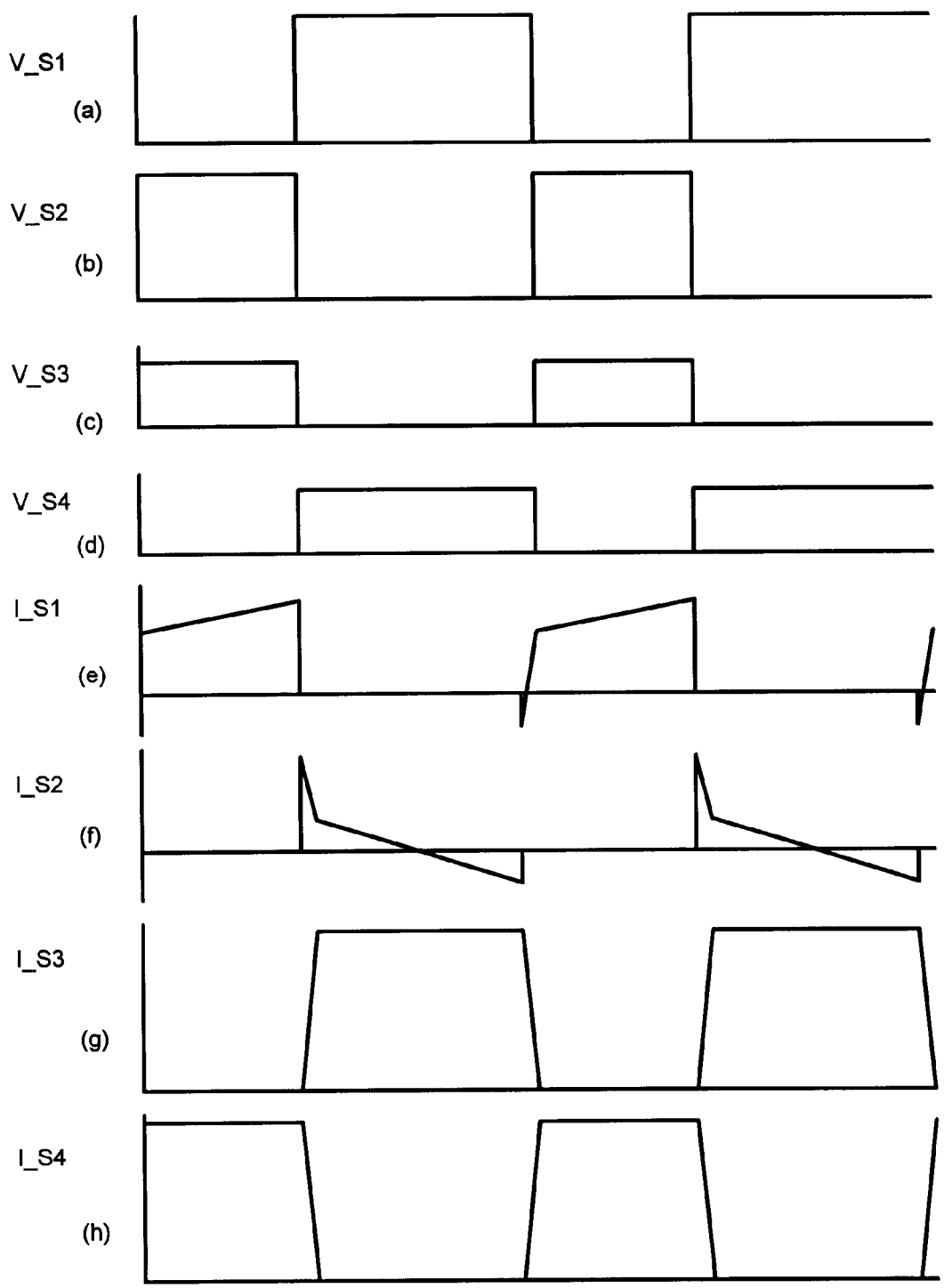
FIG. 90 illustrates voltage and current wave forms of the FIG. 89 circuit.
Figure 91:
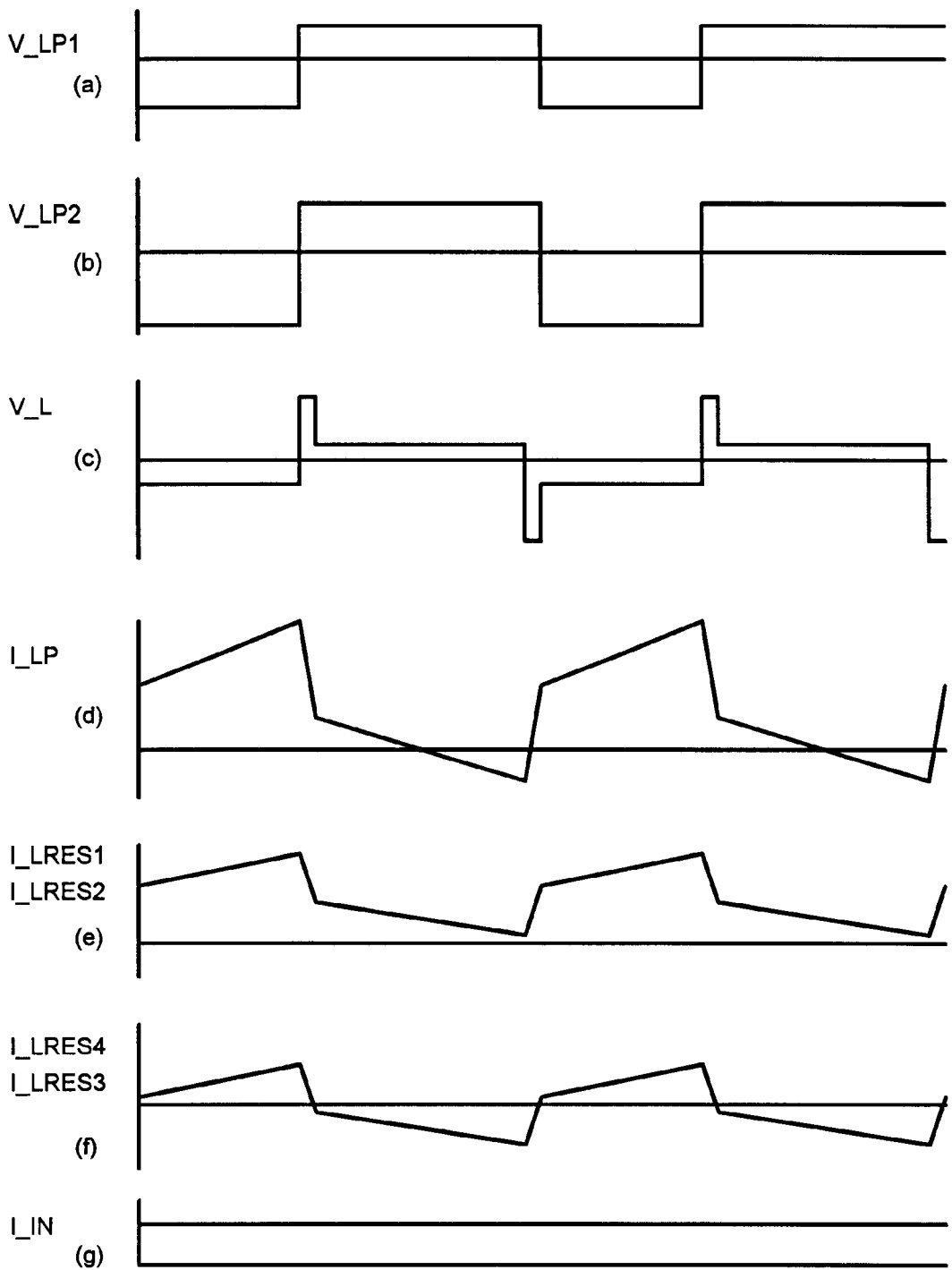
FIG. 91 illustrates additional voltage and current wave forms of the FIG. 89 circuit.
Figure 92:
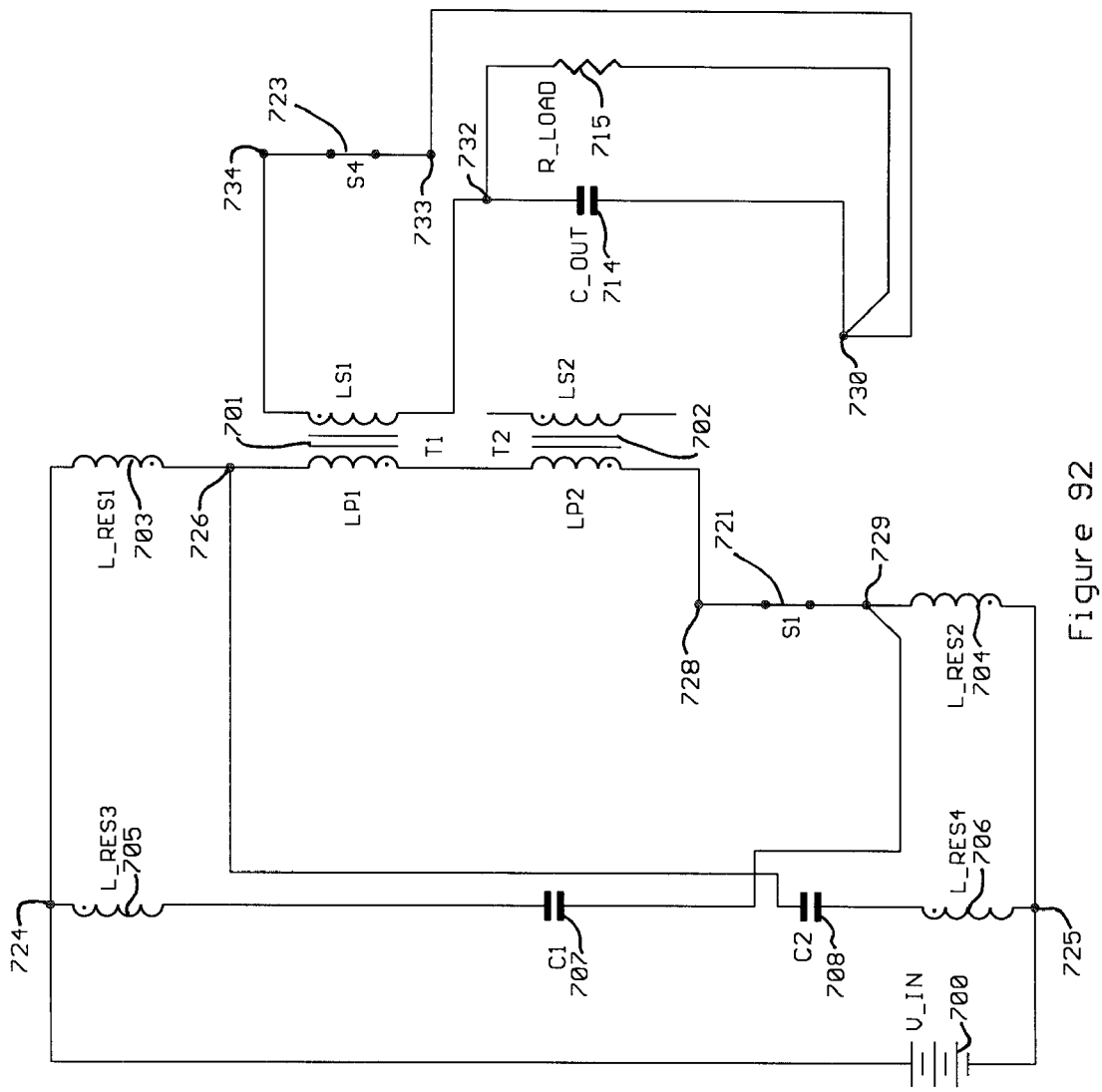
FIG. 92 illustrates an on state of the FIG. 89 circuit.

It is assumed in this analysis that the system has reached a settled operating condition. Except for the short, but finite, switching intervals there are two states of the circuit of FIG. 89, an on state and an off state. The applied voltage to the capacitor 707, $V_{C1}$, will be equal to the input DC source 700 voltage. This results from the fact that the first terminal of the capacitor 707 is connected to the positive terminal of the source 700 through an inductor 705 and a second terminal of the capacitor 707 is connected to the negative terminal of source 700 through an inductor 704 and the average applied voltages to the inductors are zero. The applied voltage to the capacitor 708, $V_{C2}$, will also be equal to the input DC source 700 voltage. This results from the fact that one terminal of the capacitor 708 is connected to the positive terminal of the source 700 through an inductor 703 and the other terminal of the capacitor 708 is connected to the negative terminal of source 700 through an inductor 706 and the average applied voltages to the inductors are zero. Voltage and current wave forms are illustrated in FIGS. 90 and 91. An initial condition that represents an on state of the converter is illustrated in FIG. 92. In the on state the switches 721 and 723 are on (closed) and the switches 720 and 722 are off (open). During the on state the current is flowing into the undotted terminals and out of the dotted terminals of the four primary inductors and the two transformer's primary windings and is increasing at the same rate in the four primary inductors. As a result the current flowing from the source 700 is constant. The current in the secondary winding of the transformer 702 is zero. The current in the secondary winding of transformer 701 is very nearly equal to the load current.

Figure 93:
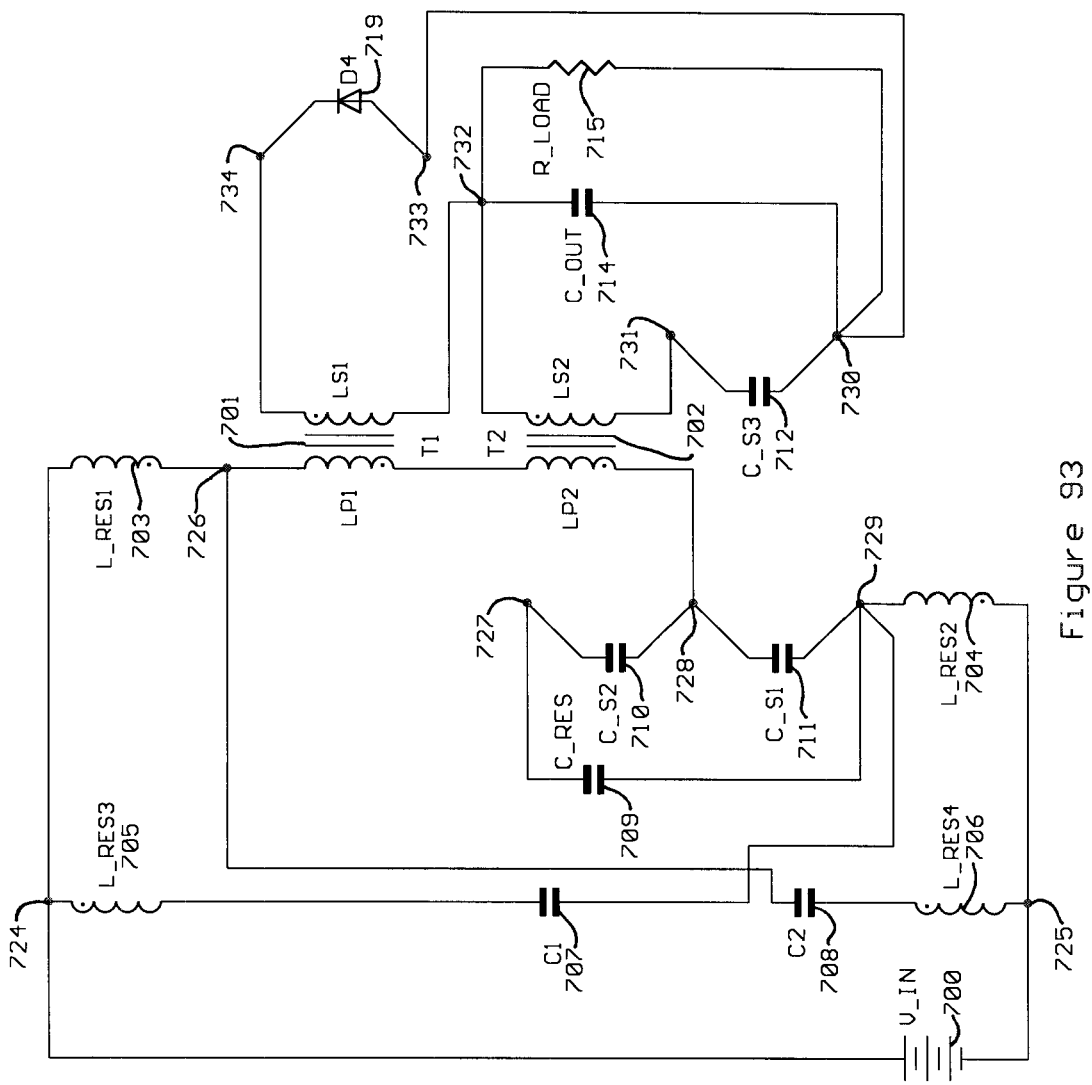
FIG. 93 illustrates a first phase of a turn off transition of the FIG. 89 circuit.
Figure 94:
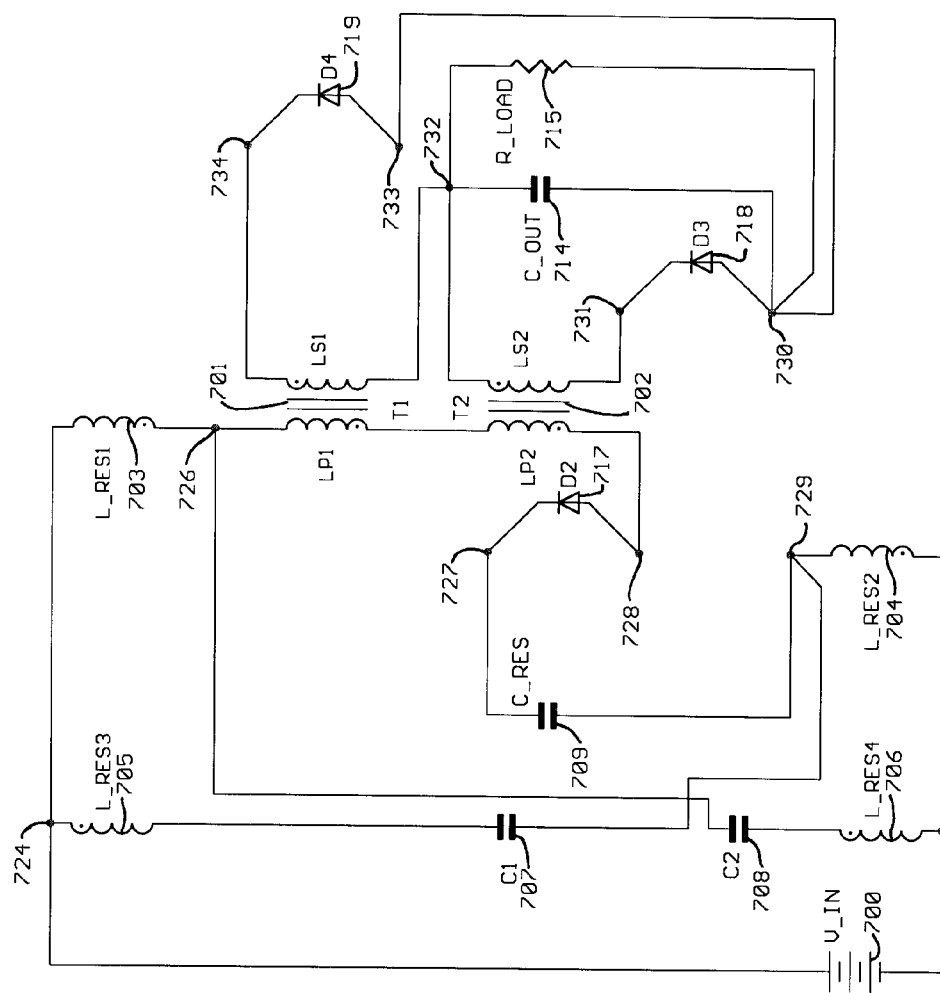
FIG. 94 illustrates a second phase of the turn off transition of the FIG. 89 circuit.
Figure 95:
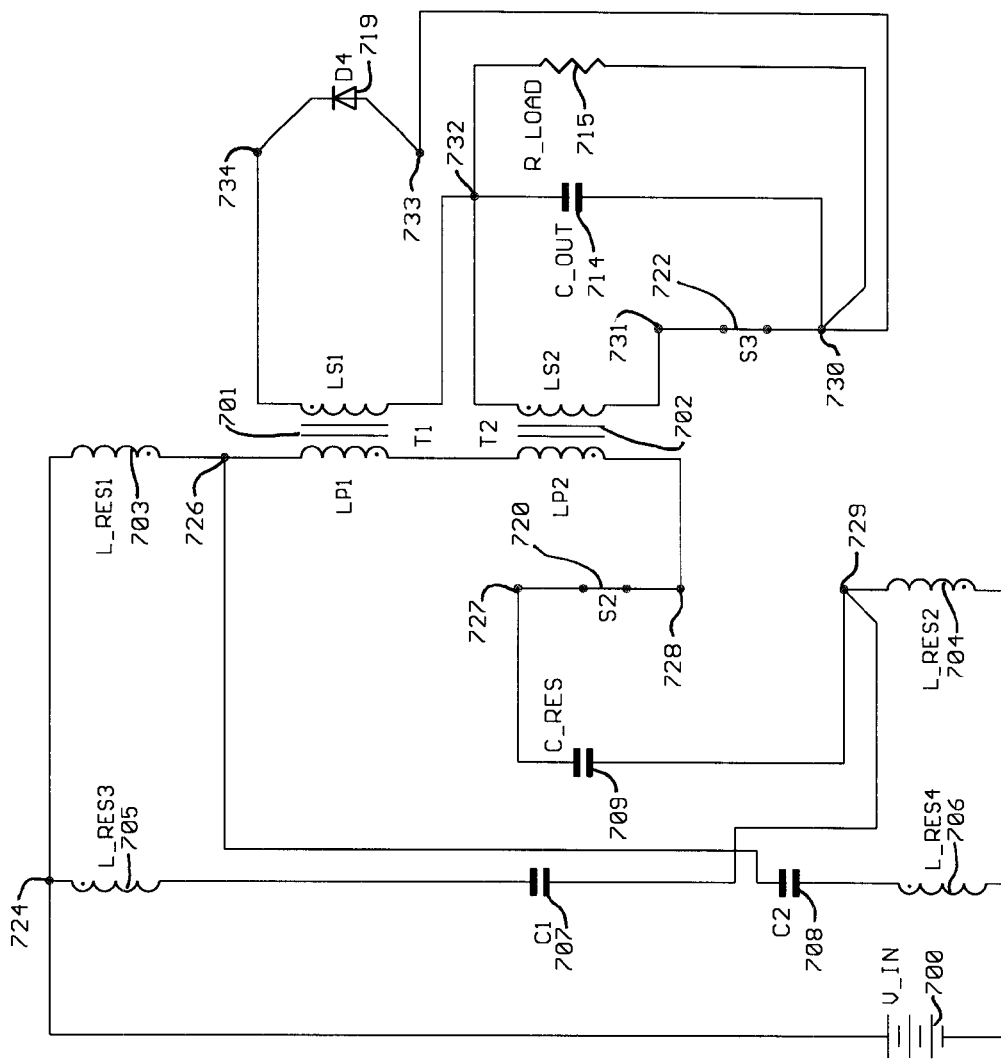
FIG. 95 illustrates a third phase of the turn off transition of the FIG. 89 circuit.
Figure 96:
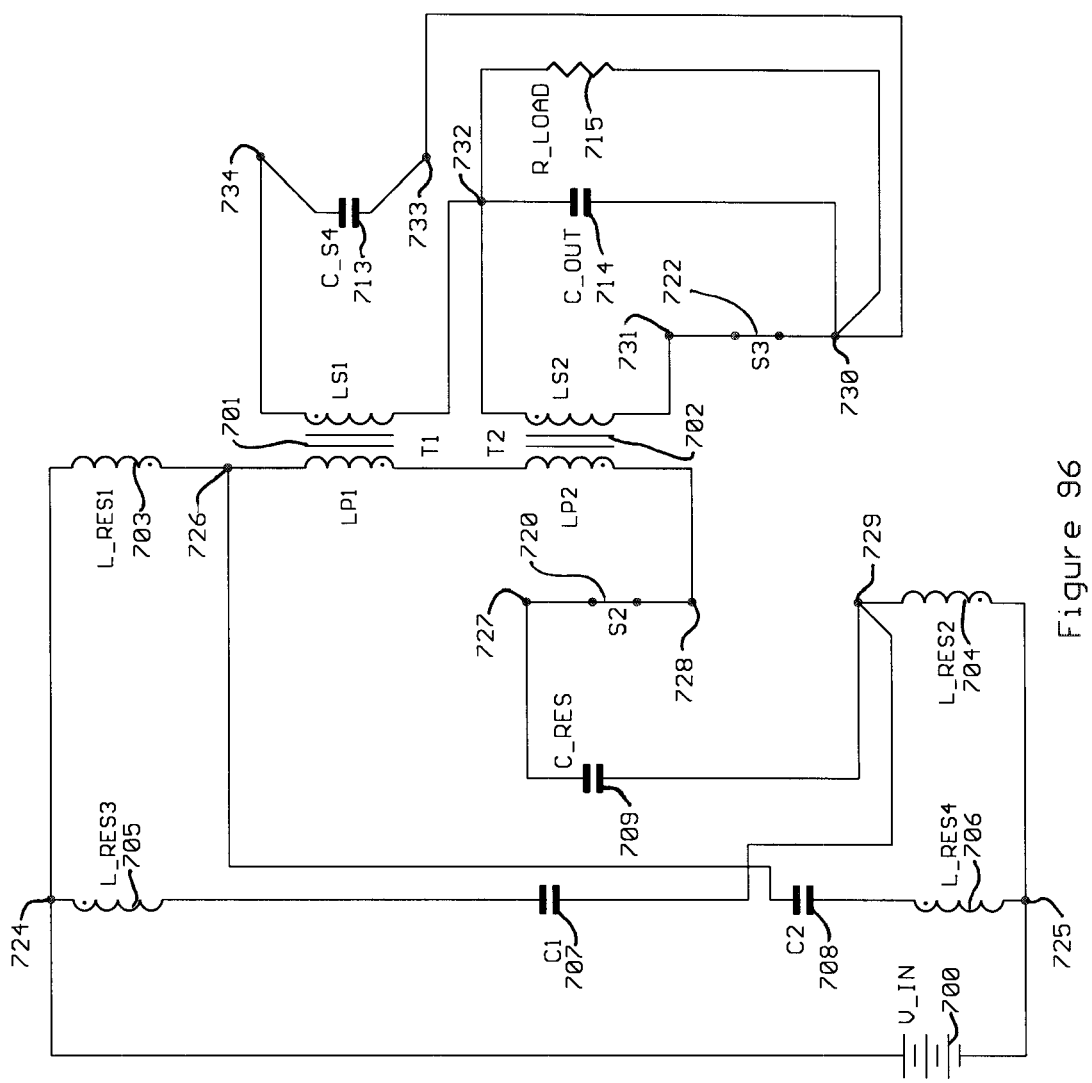
FIG. 96 illustrates a fourth phase of a turn off transition of the FIG. 89 circuit.
Figure 97:
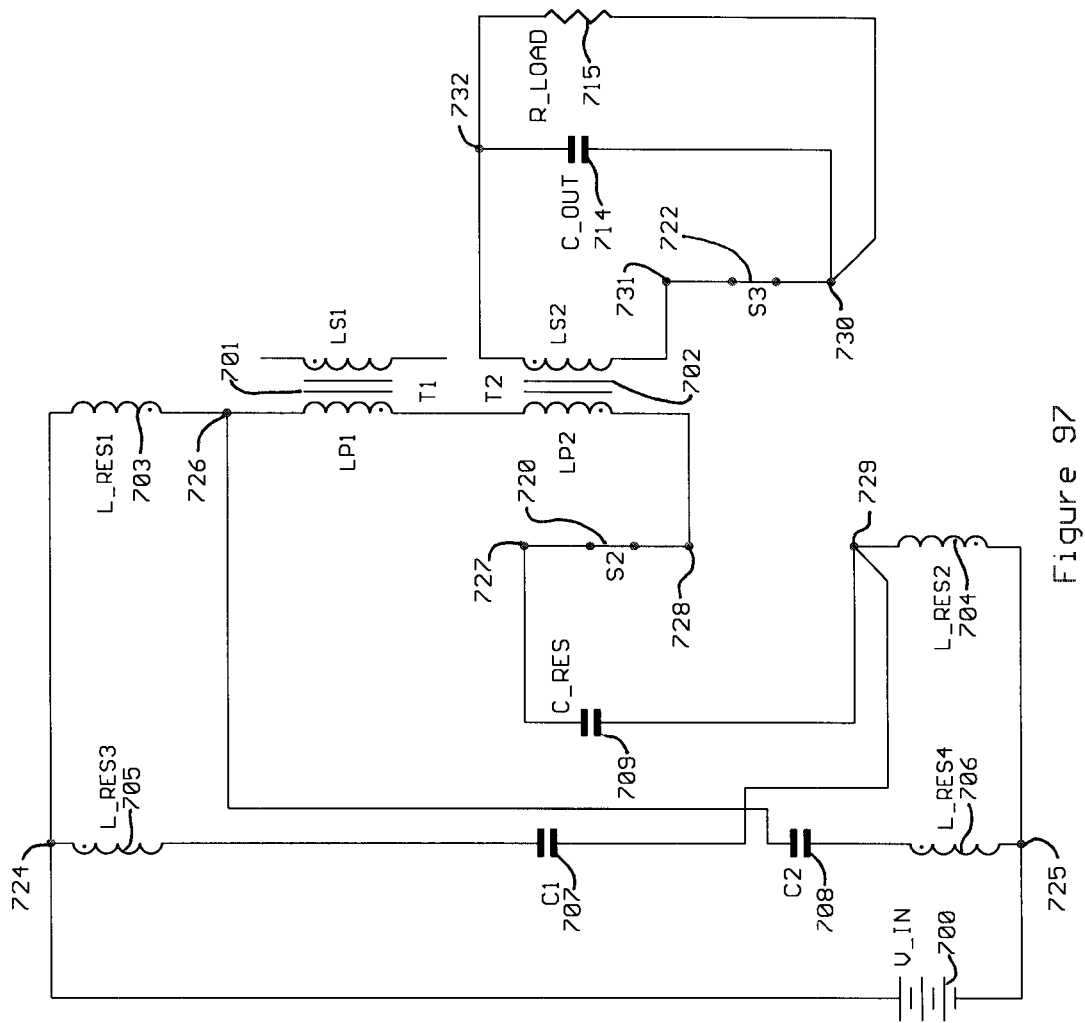
FIG. 97 illustrates an off state of the FIG. 89 circuit.

At a time determined by the control circuit the switches 721 and 723 are turned off and the switch current is diverted into diode 719 and capacitors 710, 711, and 712, as illustrated in FIG. 93. At the same time the winding voltages of all of the inductors and the transformer 702 begin to swing as the voltage at node 728 rises and the voltage at node 731 falls. As the voltage at node 728 rises the capacitors 710 and 712 discharge and capacitor 711 charges. When the voltage at node 728 reaches the voltage at node 727 diodes 717 and 718 become forward biased, as illustrated in FIG. 94. Shortly after diodes 717 and 718 turn on, switches 720 and 722 are turned on at zero voltage, as illustrated in FIG. 95. At this point in time the applied voltages to the primary inductors are relatively large and the currents in these inductors are falling rapidly as the transformer primary winding currents fall rapidly and the secondary winding current of transformer 701 falls rapidly and the current in the secondary of transformer 702 rises rapidly. Very shortly after the switches 720 and 722 turn on the current in the diode 719 falls to zero and the diode 719 turns off, as illustrated in FIG. 96, and the capacitor 713 begins to charge. When the capacitor 713 has charged completely the circuit enters the off state, as illustrated in FIG. 97. During the off state the current in the four primary inductors and the primary windings of transformers 701 and 702 ramp down and change sign. During the off time the amount of charge flowing into capacitor 709 is equal to the charge flowing out of capacitor 709 so that during the off state the current in the primary circuit changes sign.

Figure 98:
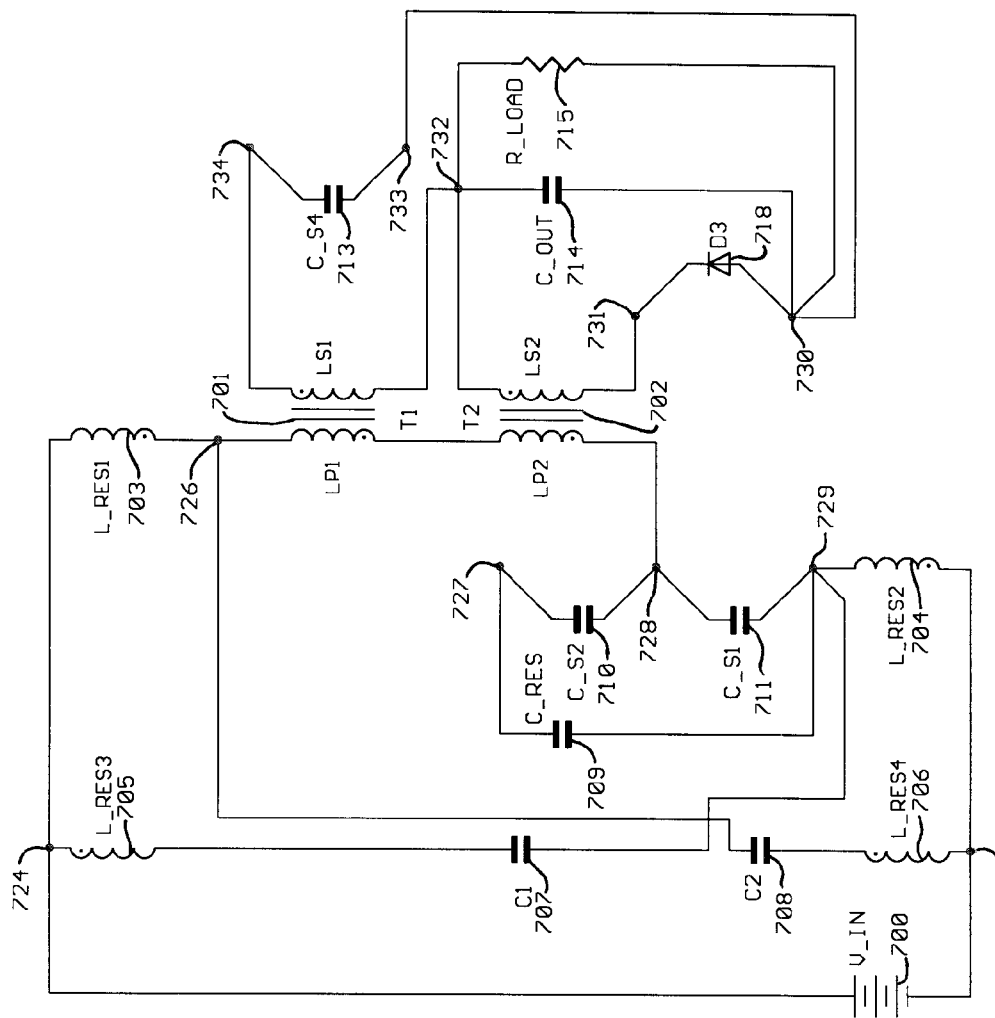
FIG. 98 illustrates a first phase of a turn on transition of the FIG. 89 circuit.
Figure 99:
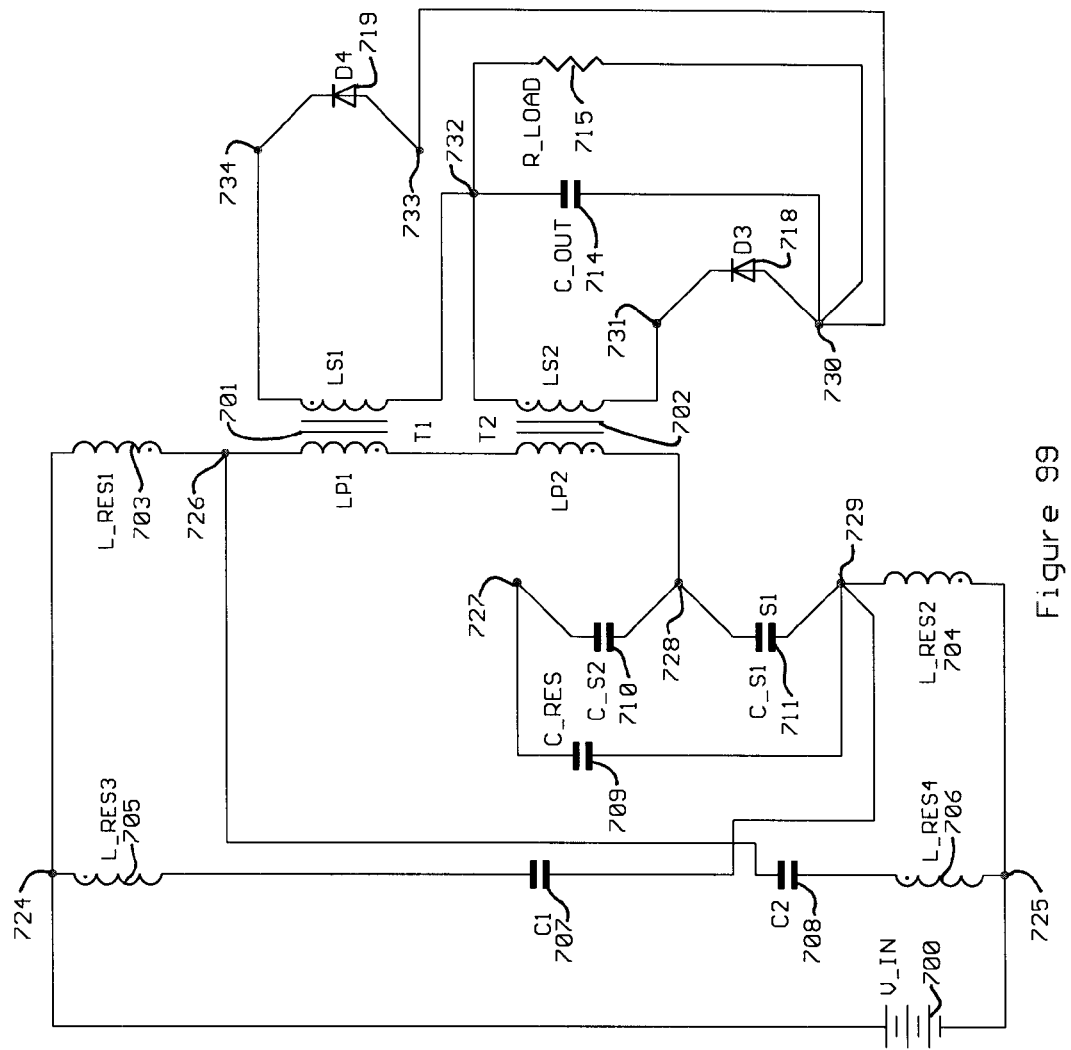
FIG. 99 illustrates a second phase of a turn on transition of the FIG. 89 circuit.
Figure 100:
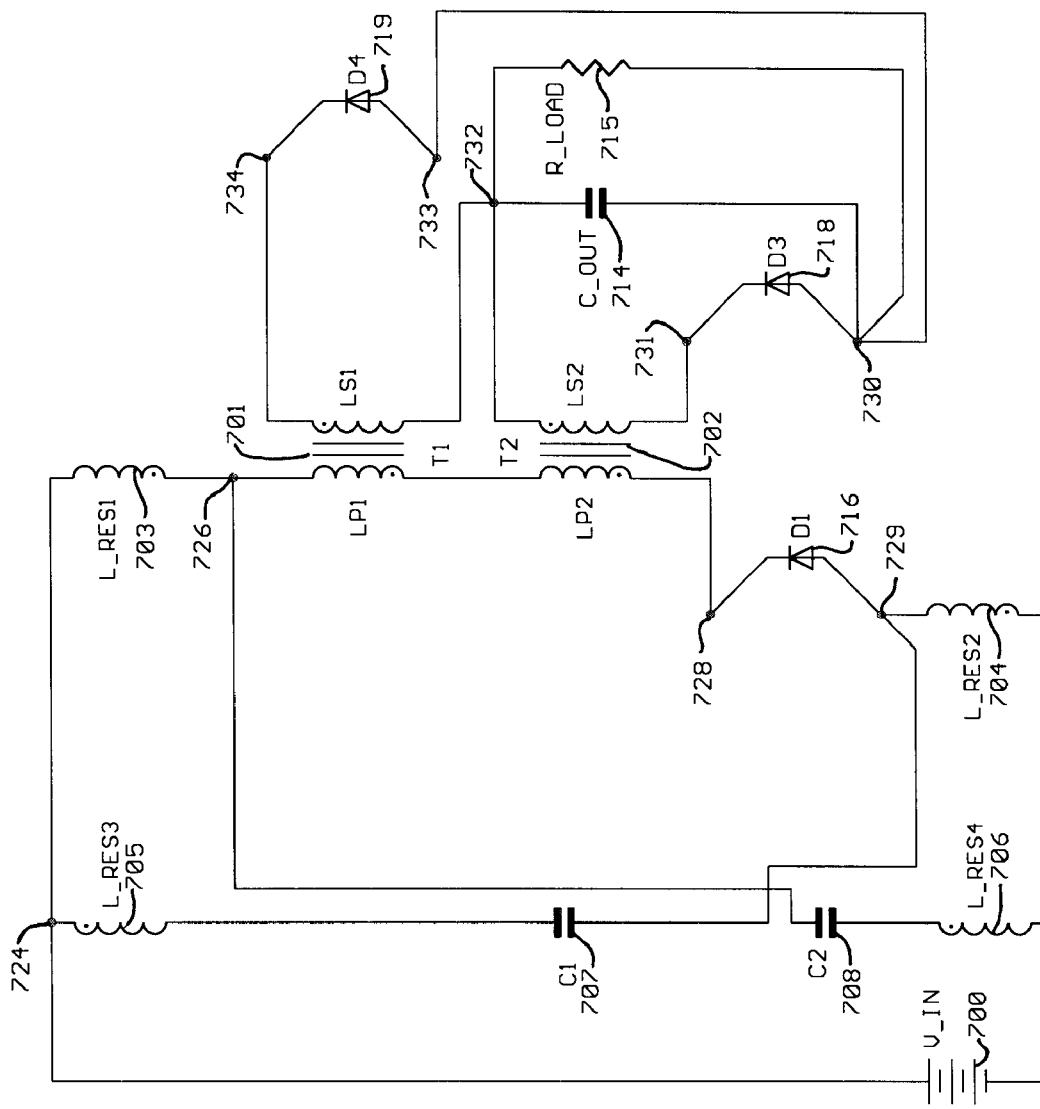
FIG. 100 illustrates a third phase of a turn on transition of the FIG. 89 circuit.
Figure 101:
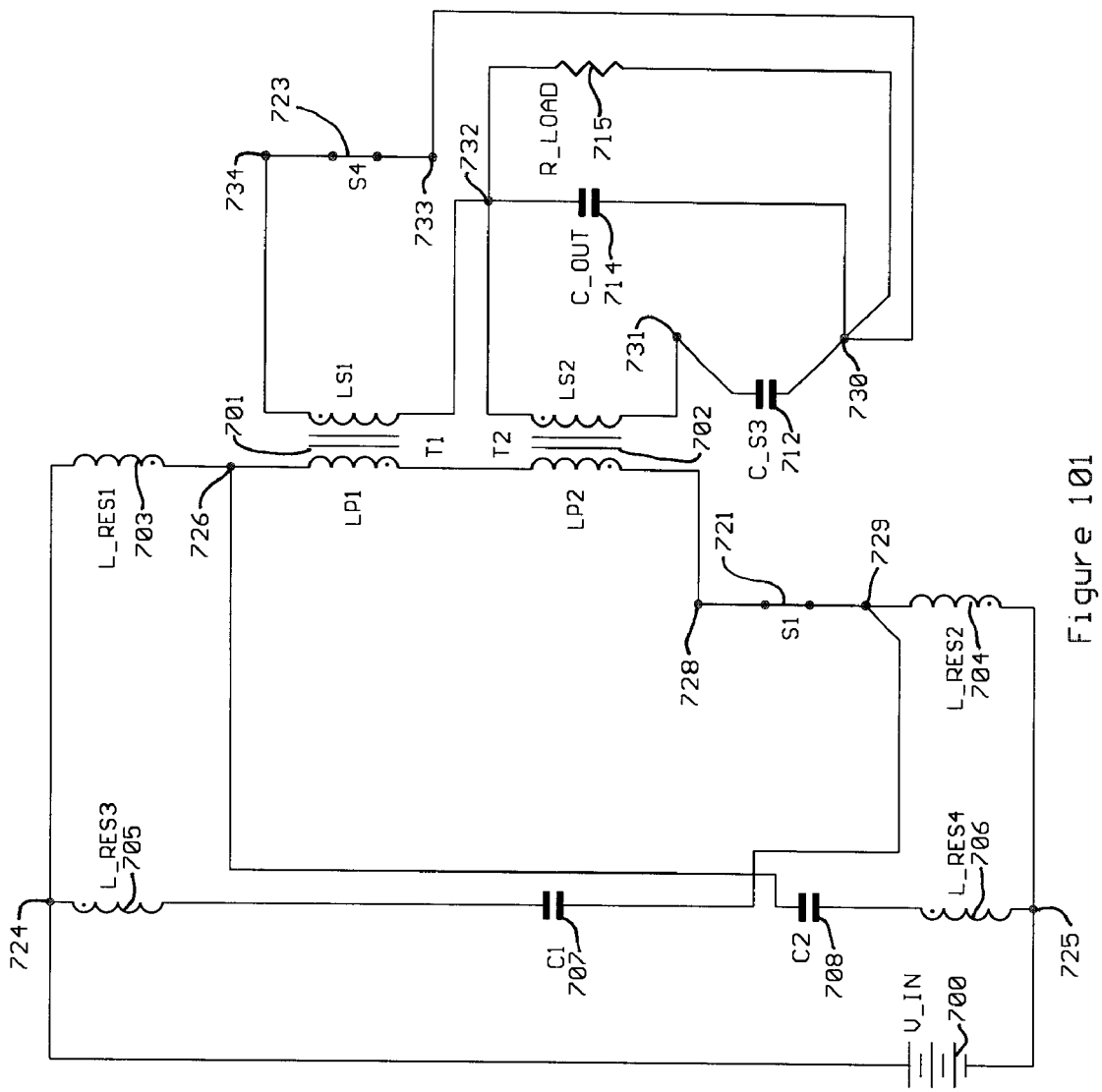
FIG. 101 illustrates a fourth phase of a turn on transition of the FIG. 89 circuit.

At a time determined by the control circuit the switches 720 and 722 are turned off (opened), as illustrated in FIG. 98. Stored energy in the four primary inductors forces current into the diode 718 and into capacitors 710, 711, and 713 as the voltage at nodes 728 and 734 fall. The voltage at nodes 728 and 734 will continue to fall until the diode 719 becomes forward biased, as illustrated in FIG. 99, and then the diode 716 becomes forward biased, as illustrated in FIG. 100. Shortly after diode 716 turns on, switches 721 and 723 are turned on at zero voltage, as illustrated in FIG. 101. The applied voltage to the four primary inductors is now very large so that the current in the four primary windings ramps down rapidly as the secondary winding current of transformer 702 ramps down rapidly until the diode 718 becomes reverse biased and the capacitor 712 begins to charge. When the capacitor 712 is fully charged the converter enters the on state, as illustrated in FIG. 92, again, and the cycle repeats.

During both on state and off state the input source 700 currents have zero ripple current slope since the current slope of one of the inductors connected to an input source 700 terminal will always be equal and opposite in sign to the current slope of the other inductor connected to the same input source 700 terminal.

The transfer function is the same as the transfer function for a forward converter. During the on state the secondary winding current has two components, one component is the induced primary current due to the magnetic coupling of transformer 701 and the other component is the magnetizing current proportional to the stored magnetic energy in transformer 701. The induced current component, which is nearly proportional to the stored energy in transformer 702, increases during the on time and the magnetizing current component decreases during the on time. If the two components ramp up and down with the same slope the secondary current slope will be zero. This effect is described in detail in U.S. Pat. No. 6,147,886. The zero secondary current slope will occur at only one line voltage, which will most likely be chosen to be the nominal line voltage. If this is the case then the output ripple current slope will have one sign above the nominal line voltage and the opposite sign below the nominal line voltage.

Related Embodiments

Figure 102:
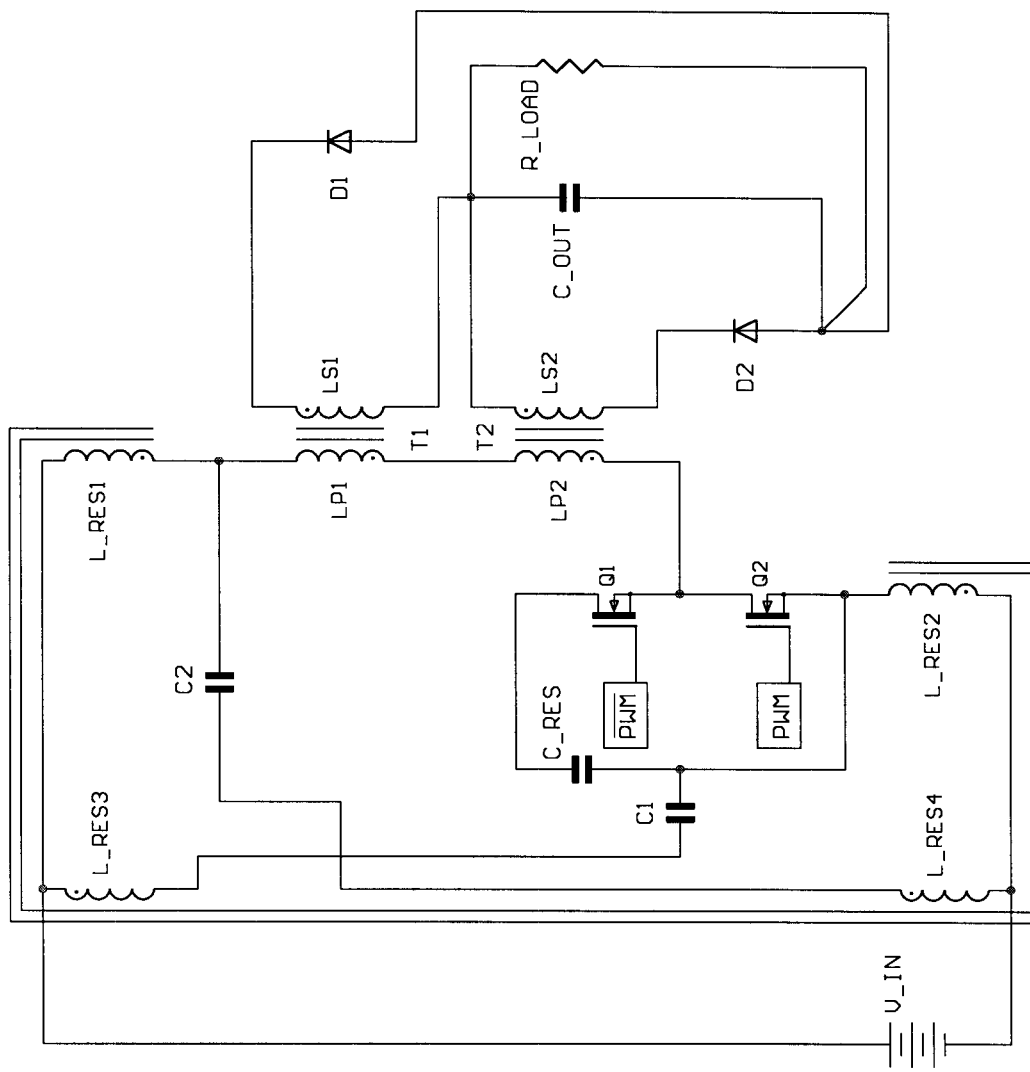
FIG. 102 illustrates the FIG. 89 circuit with all four primary inductors coupled on a single common core and with the primary switches implemented with power mosfets and the secondary switches implemented with diodes.

FIG. 102 illustrates the FIG. 89 circuit with all four primary inductors loosely coupled on a single common core. The two primary switches are implemented using mosfets and the two secondary switches are implemented using diodes.

Figure 103:
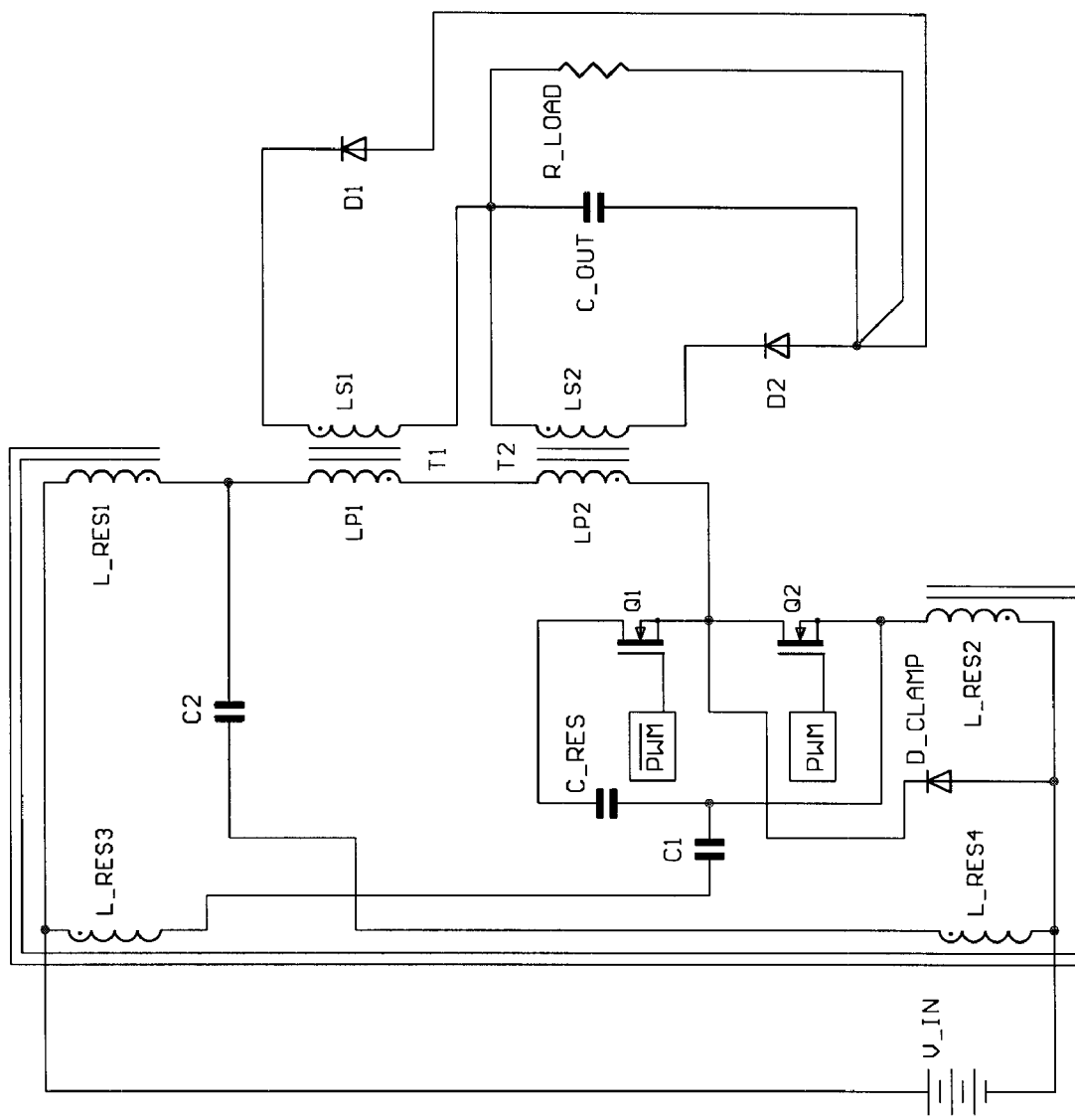
FIG. 103 illustrates the FIG. 102 circuit with a diode added to clamp ringing associated with the primary inductor and the circuit's parasitic capacitances.

FIG. 103 illustrates the FIG. 102 circuit with the addition of a diode used to clamp ringing associated with the primary inductors and the circuit's parasitic capacitances.

Figure 104:
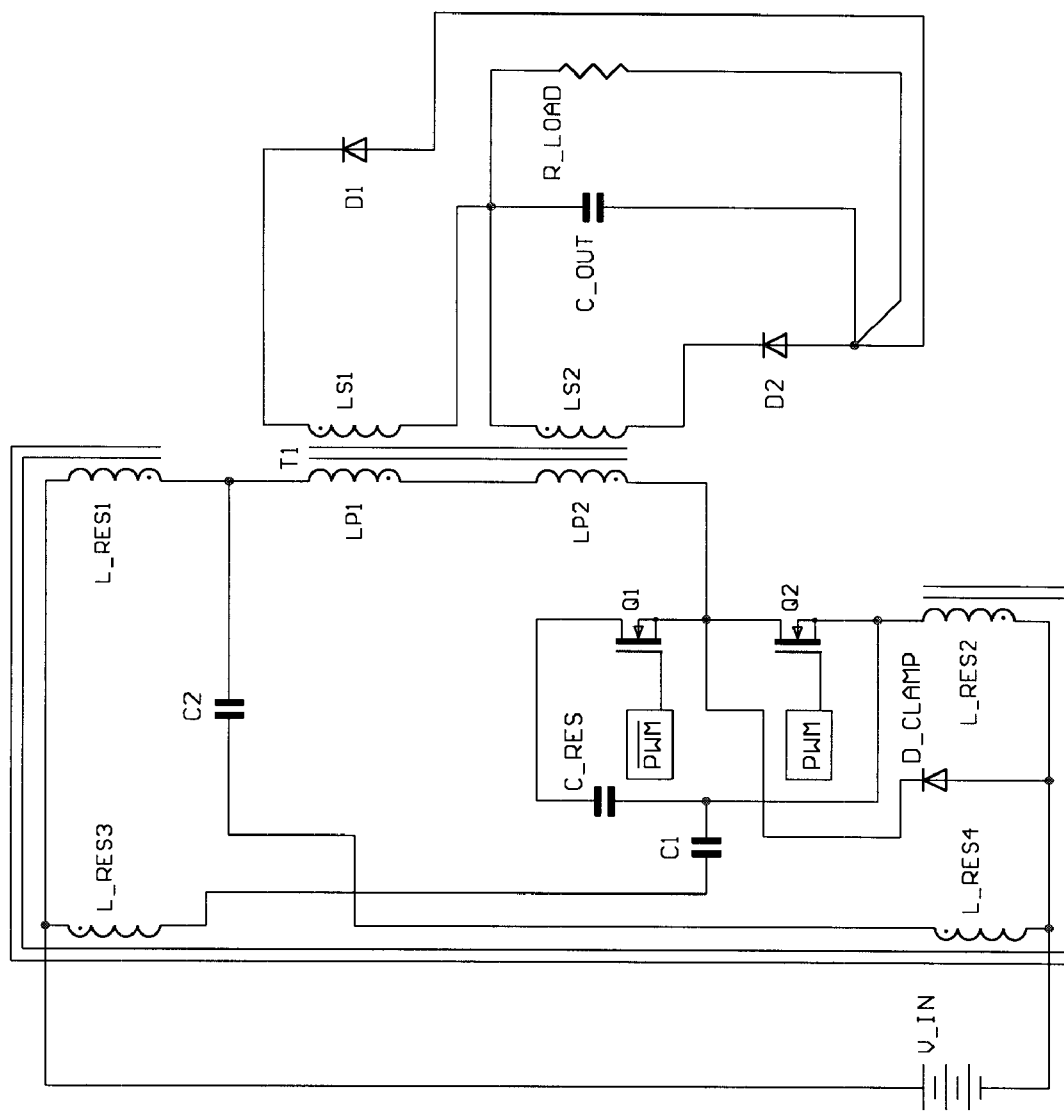
FIG. 104 illustrates the FIG. 103 circuit with the two isolation transformers coupled on a single common core.

FIG. 104 illustrates the FIG. 103 circuit with the two transformers integrated on a single common core. This is easily accomplished by winding one transformer on the outer leg of an E core and winding the other transformer on the other outer leg of the same E core and providing all three legs with the same gap or spacer.

Figure 105:
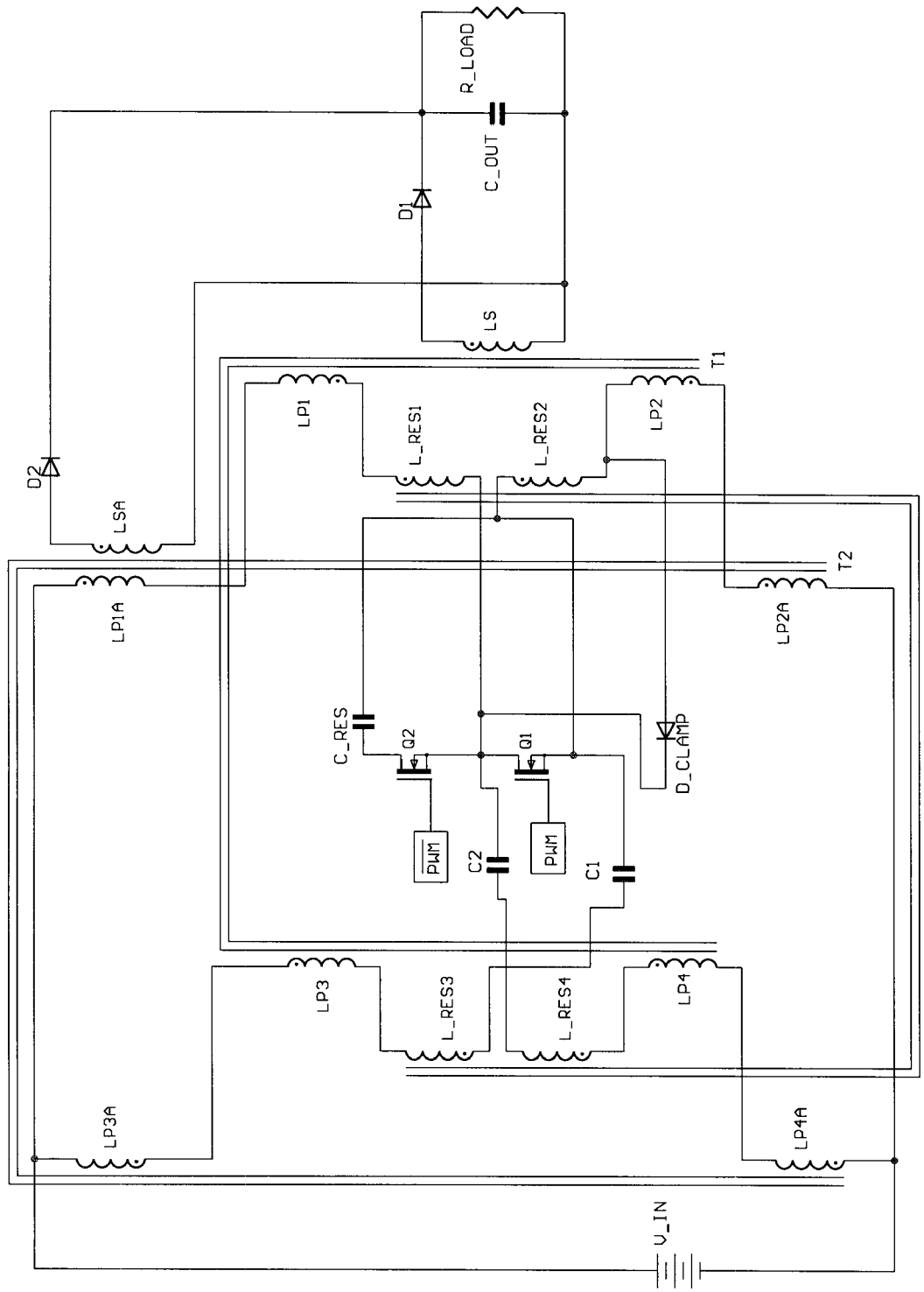
FIG. 105 illustrates the FIG. 103 circuit with the isolation transformers primary windings split into four and relocated to enhance the ripple cancellation.

FIG. 105 illustrates the FIG. 103 circuit with the primary windings of the two transformers split into four windings each and repositioned in the same manner as the primary inductors to enhance the ripple cancellation properties of the converter.

Figure 106:
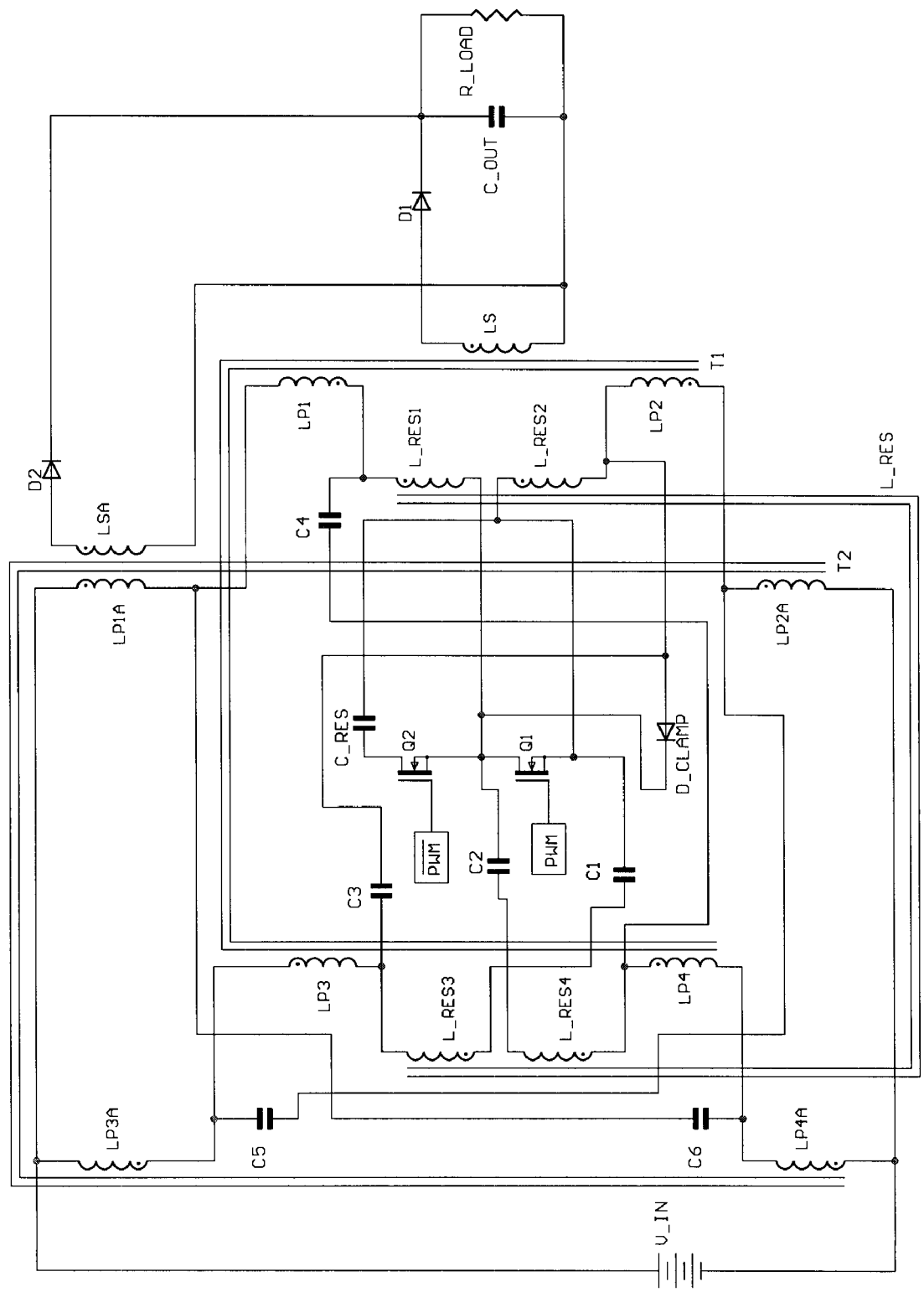
FIG. 106 illustrates the FIG. 105 circuit with capacitors added to enhance the ripple cancellation.

FIG. 106 illustrates the FIG. 105 circuit with four capacitors added to enhance the ripple current cancellation properties of the converter.

Active Reset Forward Converter with Input Ripple Current Cancellation

Figure 107:
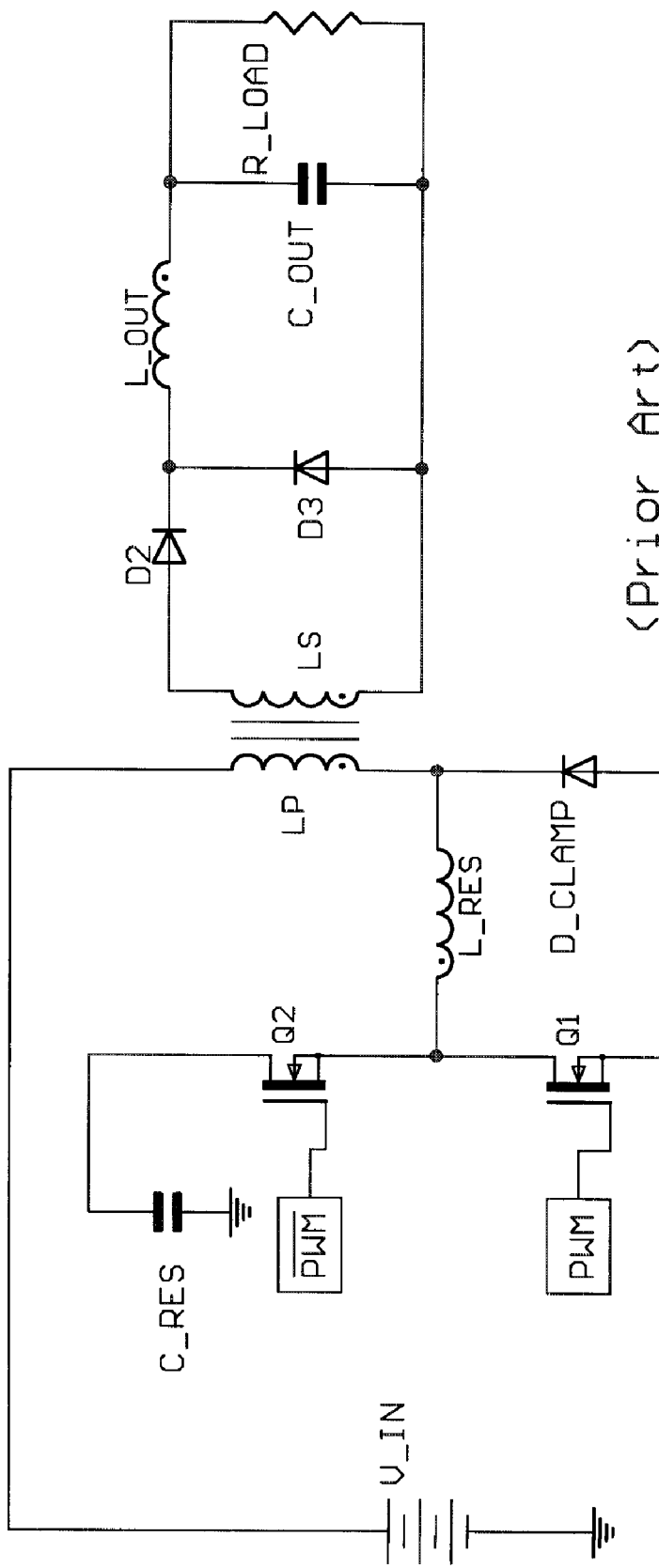
FIG. 107 illustrates a ZVS active clamp forward converter according to the prior art.

FIG. 107 illustrates an active clamp single ended forward converter with two improvements over the patented circuit, U.S. Pat. No. 4,441,146. A small primary choke is added to the patented forward converter to accomplish zero voltage switching over a wide load range. Another difference is the capacitor connection of the reset capacitor which provides for non-pulsating input current for the improved circuit, i.e. the current flow from input positive to input negative is not interrupted when the main primary switch is opened. The circuit of FIG. 107 is further improved by splitting the primary inductor into four inductors and repositioning the inductors at the two input source terminals in a way that the current slopes cancel, as shown in FIG. 108, which illustrates the subject invention.

Figure 108:
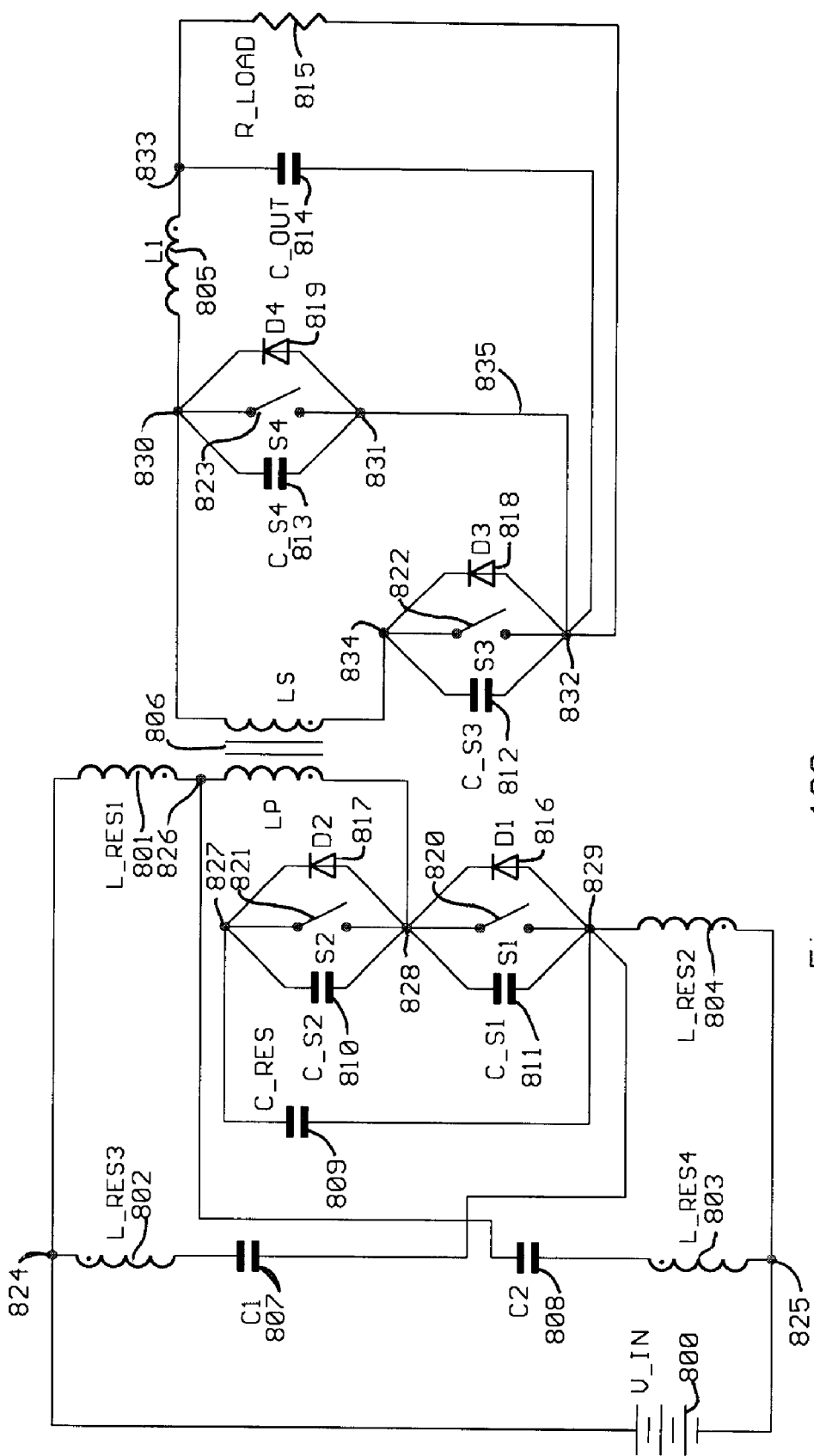
FIG. 108 illustrates a ZVS active clamp forward converter according to the subject invention.

Referring to FIG. 108 there is shown an active reset forward converter in which input DC voltages are converted into an isolated output DC voltage. The circuit requires an input source of substantially DC voltage, a transformer, five inductors, four switches, and four capacitors for output filtering, providing transformer reset, and coupling the inductors and the switches. For purposes of the operational state analysis, it is assumed that the capacitors are sufficiently large that the voltages developed across the capacitors are approximately constant over a switching interval. Also, for purposes of the operational state analysis, it is assumed that the input DC voltage sources have sufficiently low source impedance that the voltages developed across the input DC voltage sources are approximately constant over a switching interval. It will finally be assumed that the power switches are ideal, that is, lossless and able to carry current in either direction. We will also assume for purposes of the operational state analysis that all four primary inductors are equal in inductance value.

Structure

The structure of the circuit of the subject invention is shown in FIG. 108. A positive terminal of a source 800 of substantially DC voltage is connected to a node 824. A negative terminal of source 800 is connected to a node 825. An undotted terminal of an inductor 801 is connected to the node 824. A dotted terminal of an inductor 802 is also connected to node 824. A dotted terminal of inductor 801 is connected to a node 826. An undotted terminal of inductor 802 is connected to a first terminal of a capacitor 807. A second terminal of capacitor 807 is connected to a node 829. An undotted terminal of an inductor 803 is connected to node 825. A dotted terminal of an inductor 804 is also connected to node 825. An undotted terminal of inductor 804 is connected to node 829. A dotted terminal of inductor 803 is connected to a first terminal of a capacitor 808. A second terminal of capacitor 808 is connected to node 826. An undotted terminal of a primary winding of a transformer 806 is connected to node 826. A dotted terminal of the primary winding of transformer 806 is connected to a node 828. A first terminal of a switch 820 is connected to node 828. A second terminal of switch 820 is connected to node 829. A first terminal of a capacitor 811 is connected to node 828. A second terminal of capacitor 811 is connected to node 829. A cathode terminal of a diode 816 is connected to node 828. An anode terminal of diode 816 is connected to node 829. A first terminal of a switch 821 is connected to node 828. A second terminal of switch 821 is connected to a node 827. A first terminal of a capacitor 810 is connected to node 828. A second terminal of capacitor 810 is connected to node 827. An anode terminal of a diode 817 is connected to node 828. A cathode terminal of diode 817 is connected to node 827. A first terminal of a capacitor 809 is connected to node 827. A second terminal of capacitor 809 is connected to node 829. An undotted terminal of a secondary winding of transformer 806 is connected to a node 830. A dotted terminal of the secondary winding of the transformer 806 is connected to a node 834. A first terminal of a switch 822 is connected to node 834. A second terminal of switch 822 is connected to a node 832. A first terminal of a capacitor 812 is connected to node 834. A second terminal of capacitor 812 is connected to node 832. A cathode terminal of a diode 818 is connected to node 834. An anode terminal of diode 818 is connected to node 832. A first terminal of a switch 823 is connected to node 830. A second terminal of switch 823 is connected to a node 831. A first terminal of a capacitor 813 is connected to node 830. A second terminal of capacitor 813 is connected to node 831. A cathode terminal of a diode 819 is connected to node 830. An anode terminal of diode 819 is connected to node 831. A lead 835 is connected to node 831 and to node 832. A first terminal of a capacitor 814 is connected to node 832. A second terminal of capacitor 814 is connected to a node 833. A dotted terminal of an inductor 805 is connected to node 833. An undotted terminal of inductor 805 is connected to node 830. A first terminal of a load 815 is connected to node 832. A second terminal of load 815 is connected to node 833.

Operation

Figure 109:
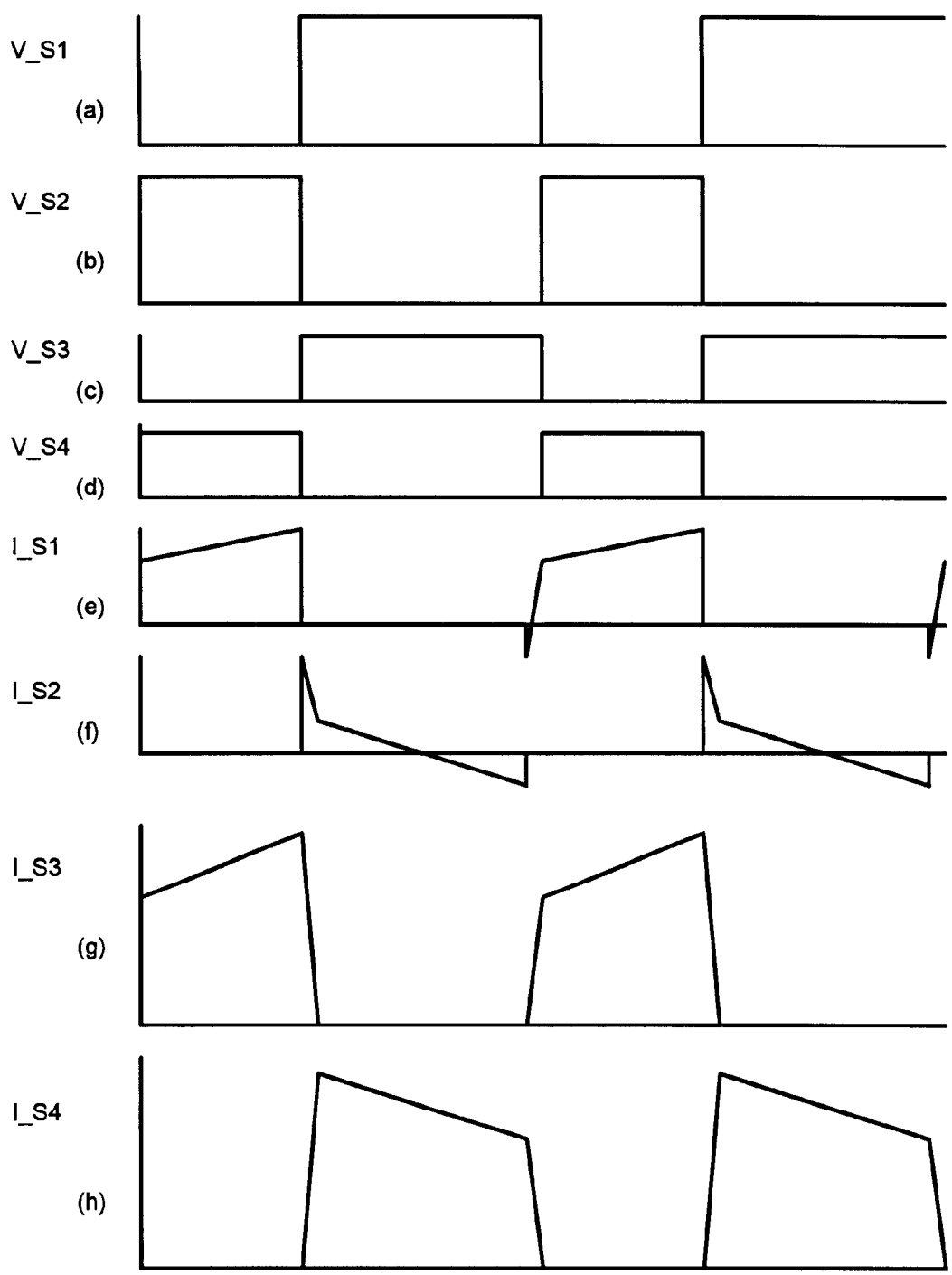
FIG. 109 illustrates voltage and current wave forms of the FIG. 108 circuit.
Figure 110:
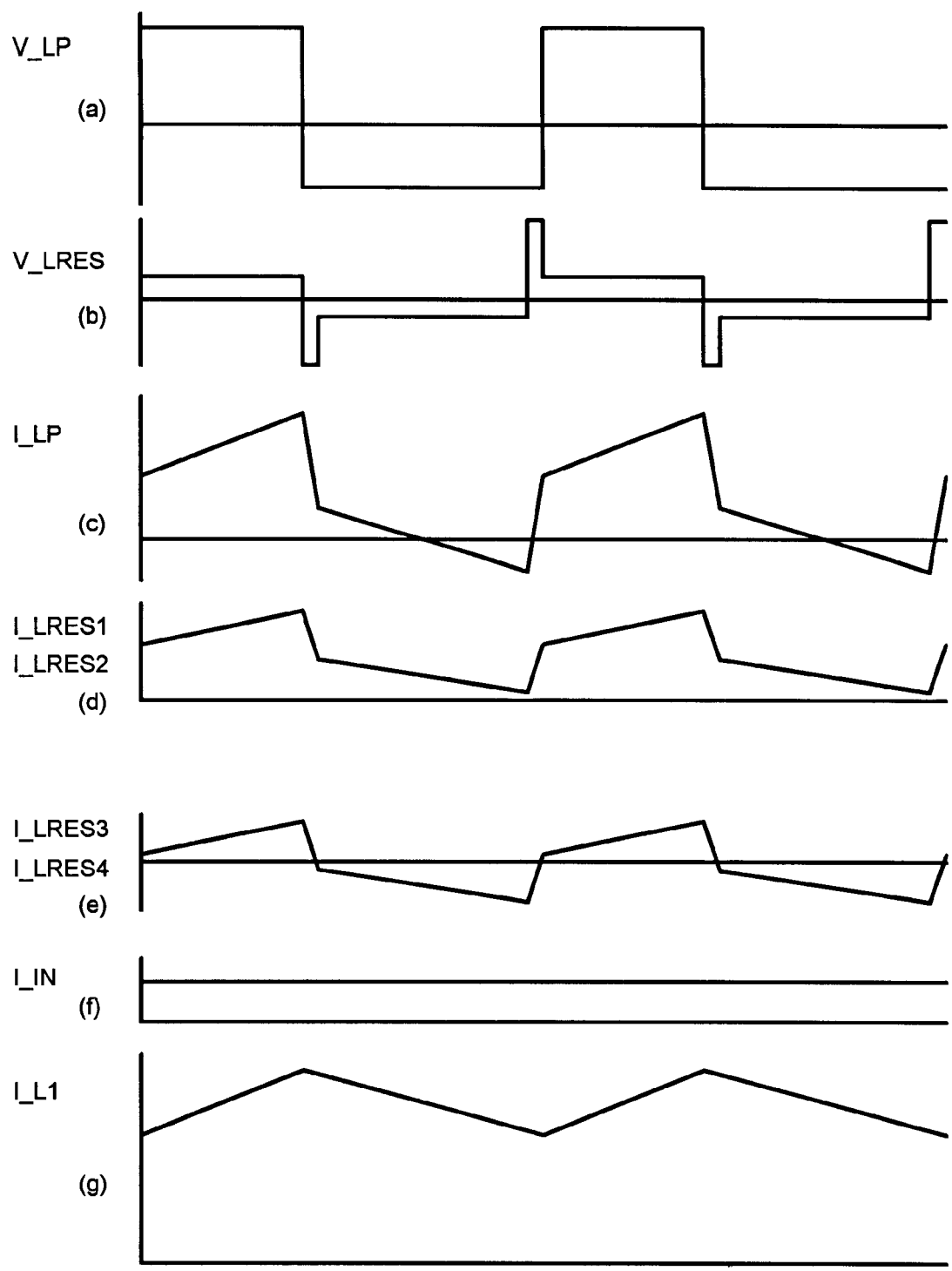
FIG. 110 illustrates additional current and voltage wave forms of the FIG. 108 circuit.
Figure 111:
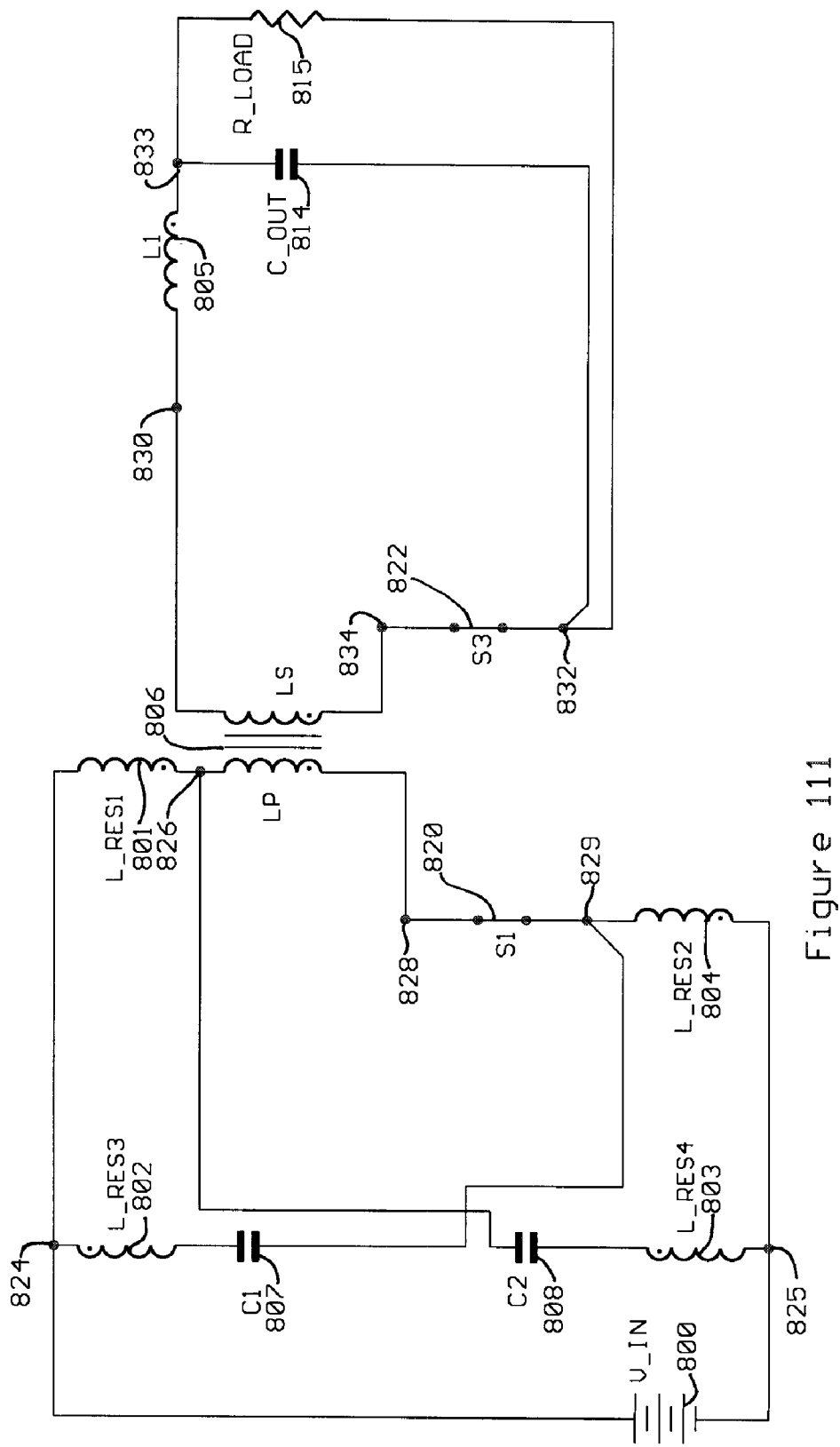
FIG. 111 illustrates an on state of the FIG. 108 circuit.

It is assumed in this analysis that the system has reached a settled operating condition. Except for the short, but finite, switching intervals there are two states of the circuit of FIG. 108, an on state and an off state. The applied voltage to the capacitor 807, $V_{C1}$, will be equal to the input DC source 800 voltage. This results from the fact that the first terminal of the capacitor 807 is connected to the positive terminal of the source 800 through an inductor 802 and the second terminal of the capacitor 807 is connected to the negative terminal of source 800 through an inductor 804 and the average applied voltages to the inductors are zero. The applied voltage to the capacitor 808, $V_{C2}$, will also be equal to the input DC source 800 voltage. This results from the fact that one terminal of the capacitor 808 is connected to the positive terminal of the source 800 through an inductor 801 and the other terminal of the capacitor 808 is connected to the negative terminal of source 800 through an inductor 803 and the average applied voltages to the inductors are zero. Voltage and current wave forms are illustrated in FIGS. 109 and 110. An initial condition that represents an on state of the converter is illustrated in figure 111. In the on state the switches 820 and 822 are on (closed) and the switches 821 and 823 are off (open). During the on state the current is flowing into the undotted terminals and out of the dotted terminals of the four primary inductors and the transformer's primary winding and is increasing at the same rate in the four primary inductors. As a result the current flowing from the source 800 is constant during the on state since the current slopes from the pair of inductors connected to each input terminal cancel each other. Current is also flowing in the transformer 806 secondary winding and in the secondary inductor 805 and these currents are increasing during the on state at the same rate.

Figure 112:
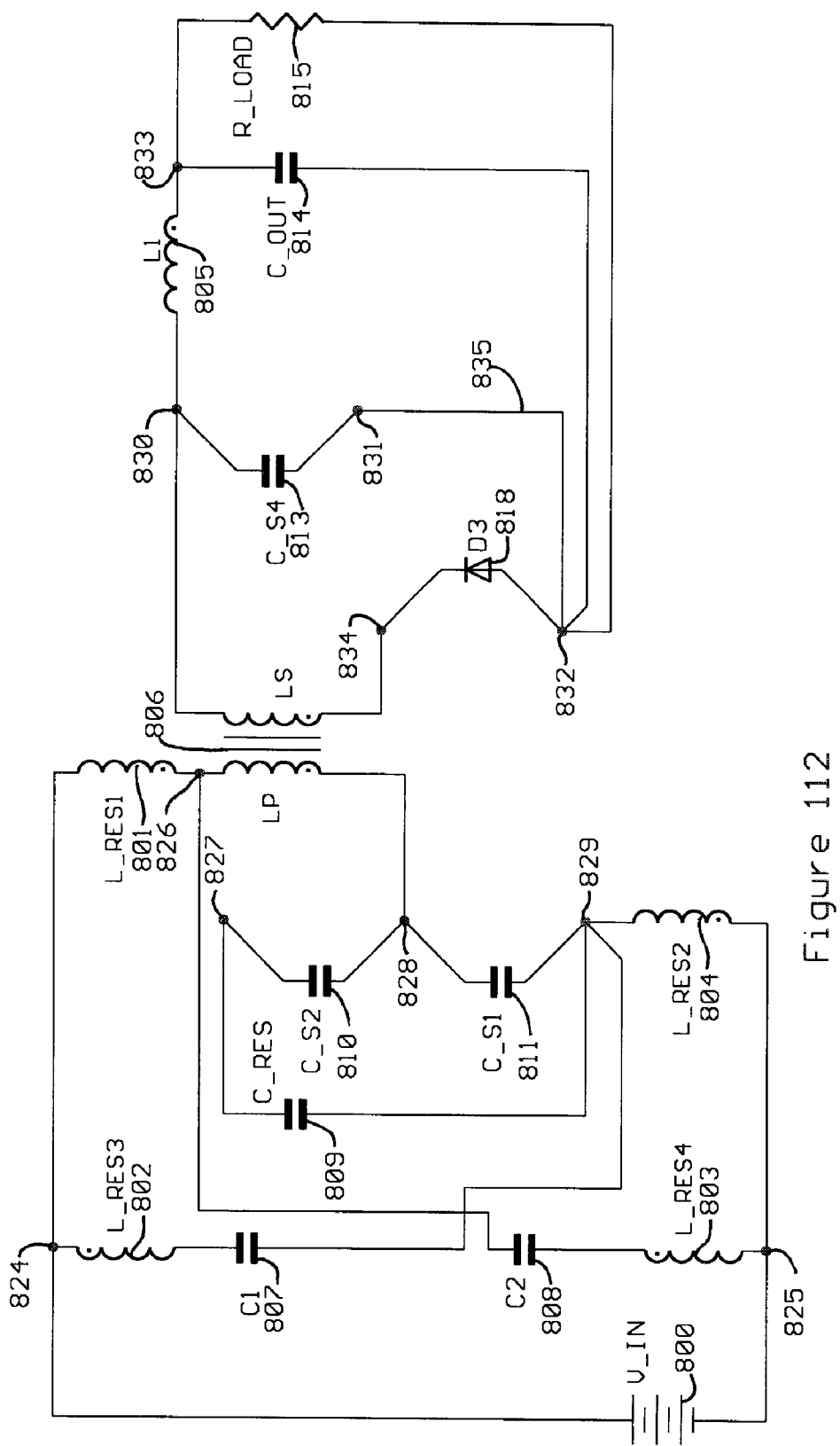
FIG. 112 illustrates a first phase of a turn off transition of the FIG. 108 circuit.
Figure 113:
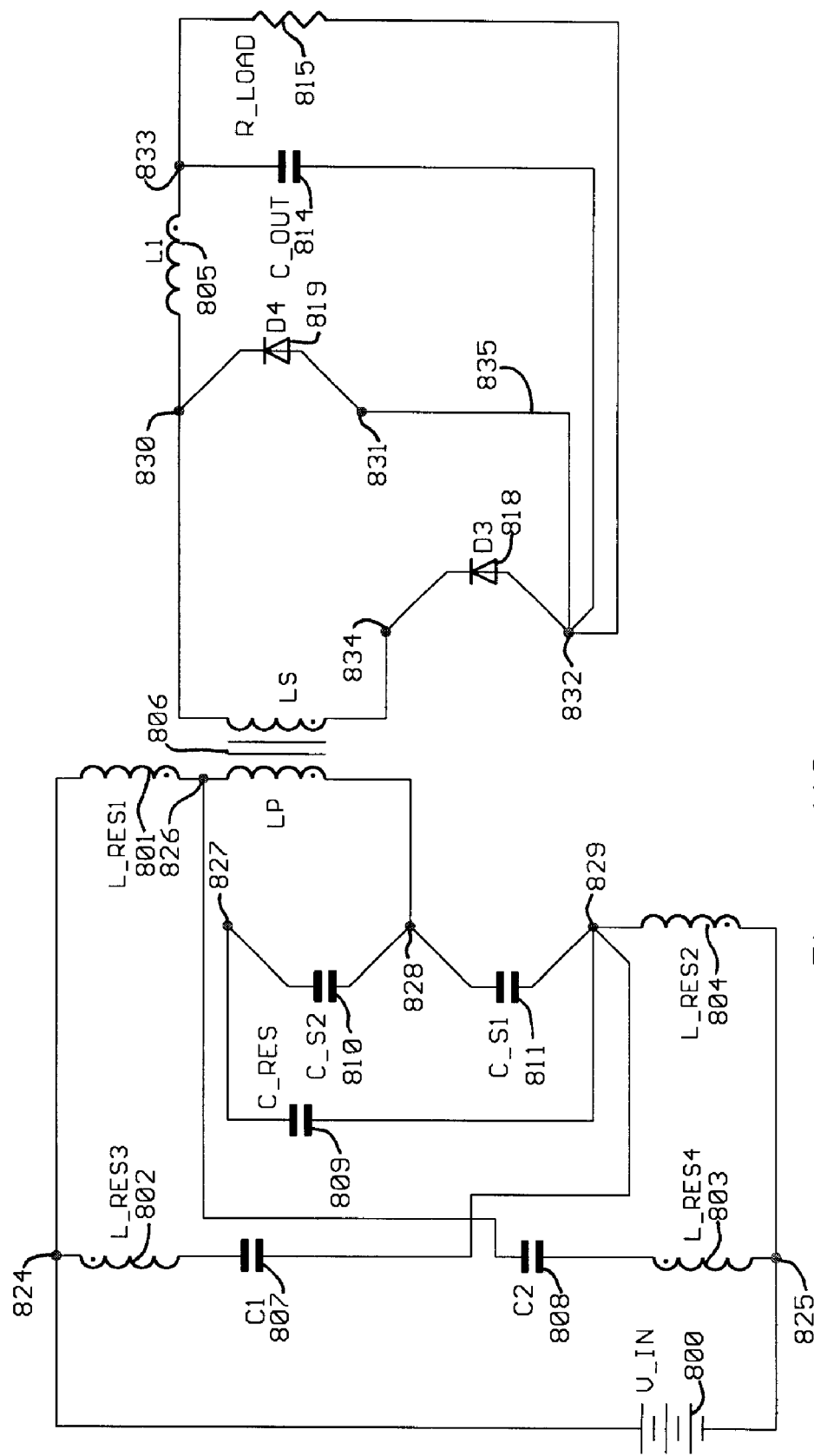
FIG. 113 illustrates a second phase of a turn off transition of the FIG. 108 circuit.
Figure 114:
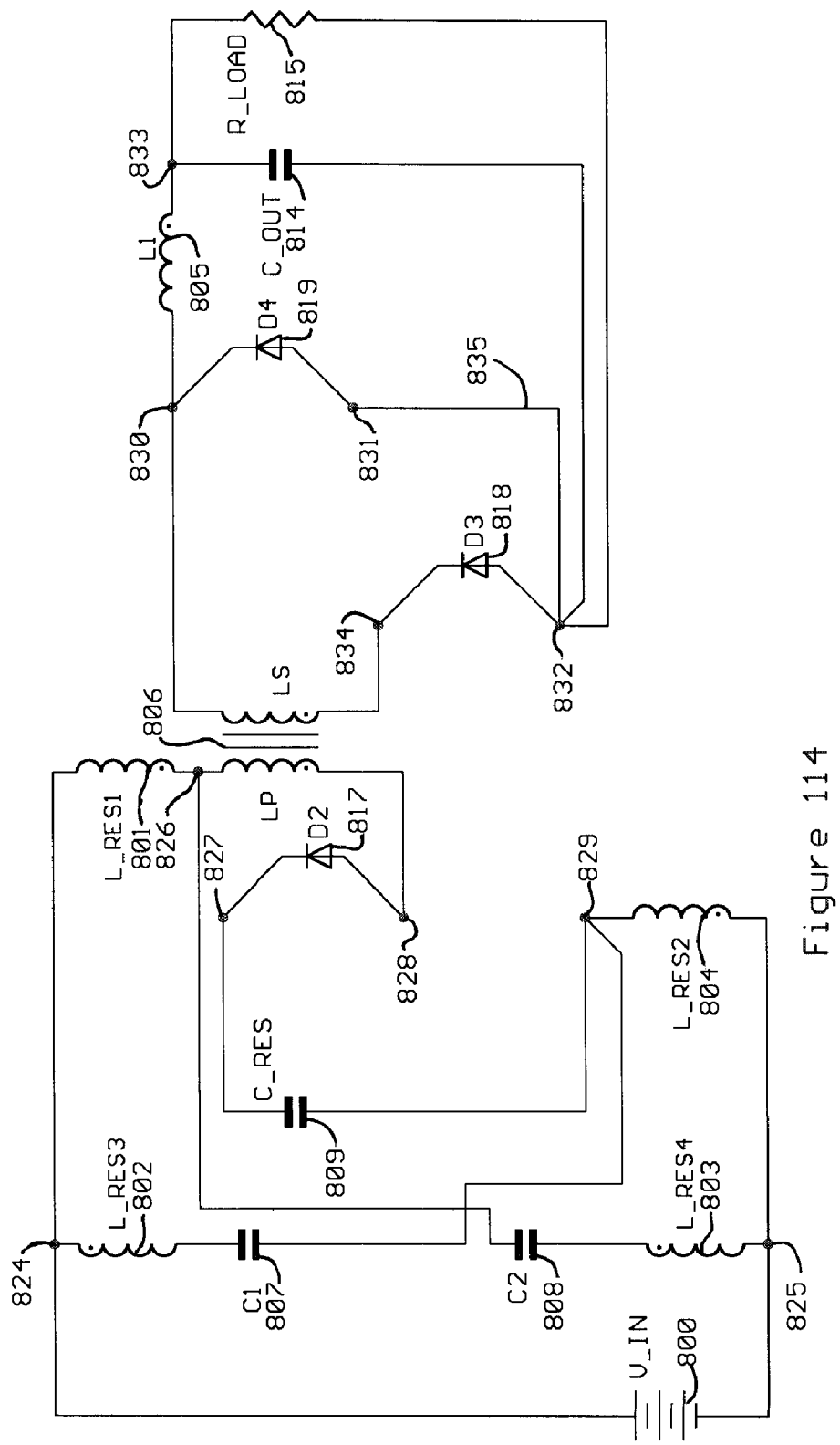
FIG. 114 illustrates a third phase of a turn off transition of the FIG. 108 circuit.
Figure 115:
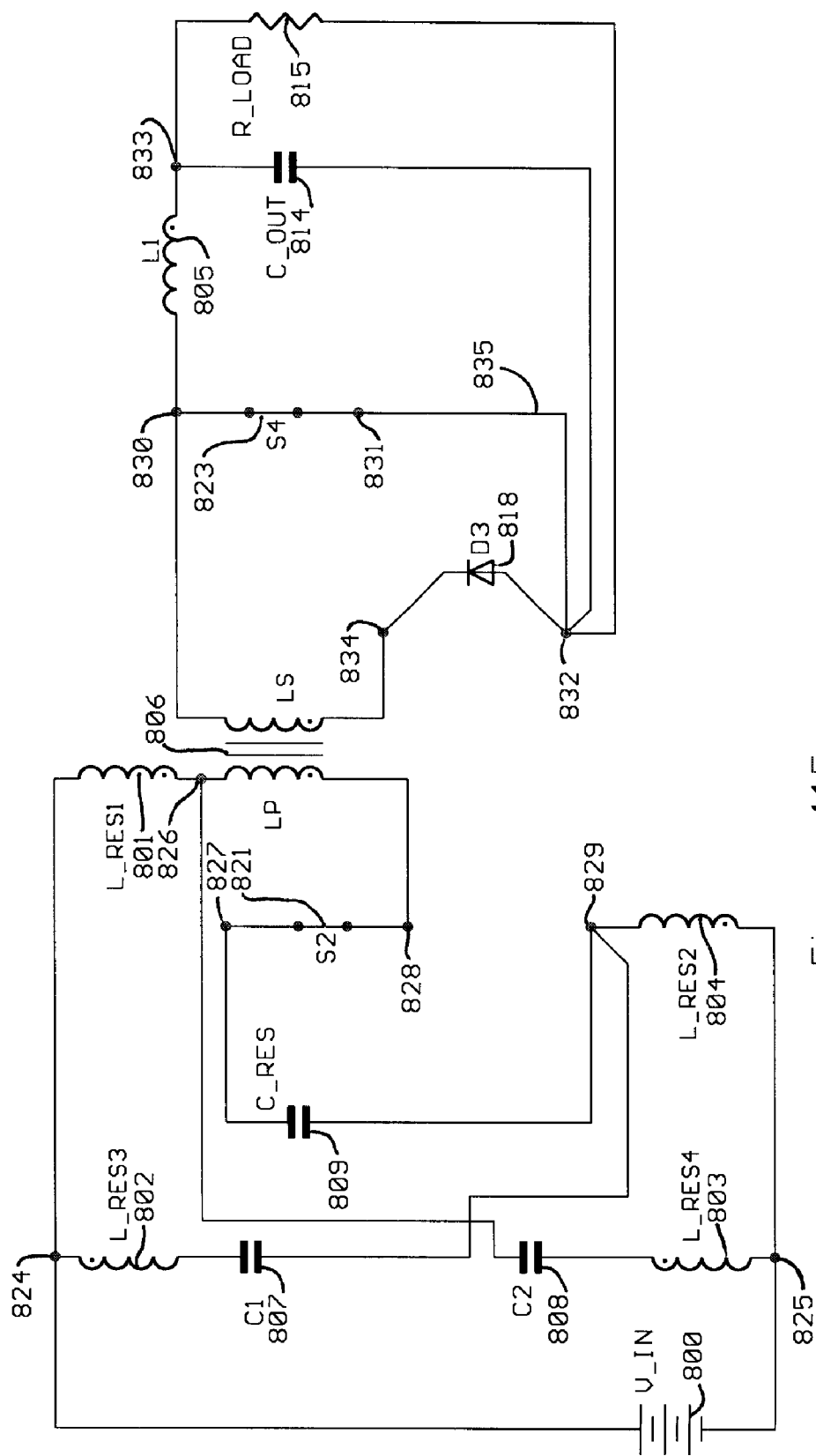
FIG. 115 illustrates a fourth phase of a turn off transition of the FIG. 108 circuit.
Figure 116:
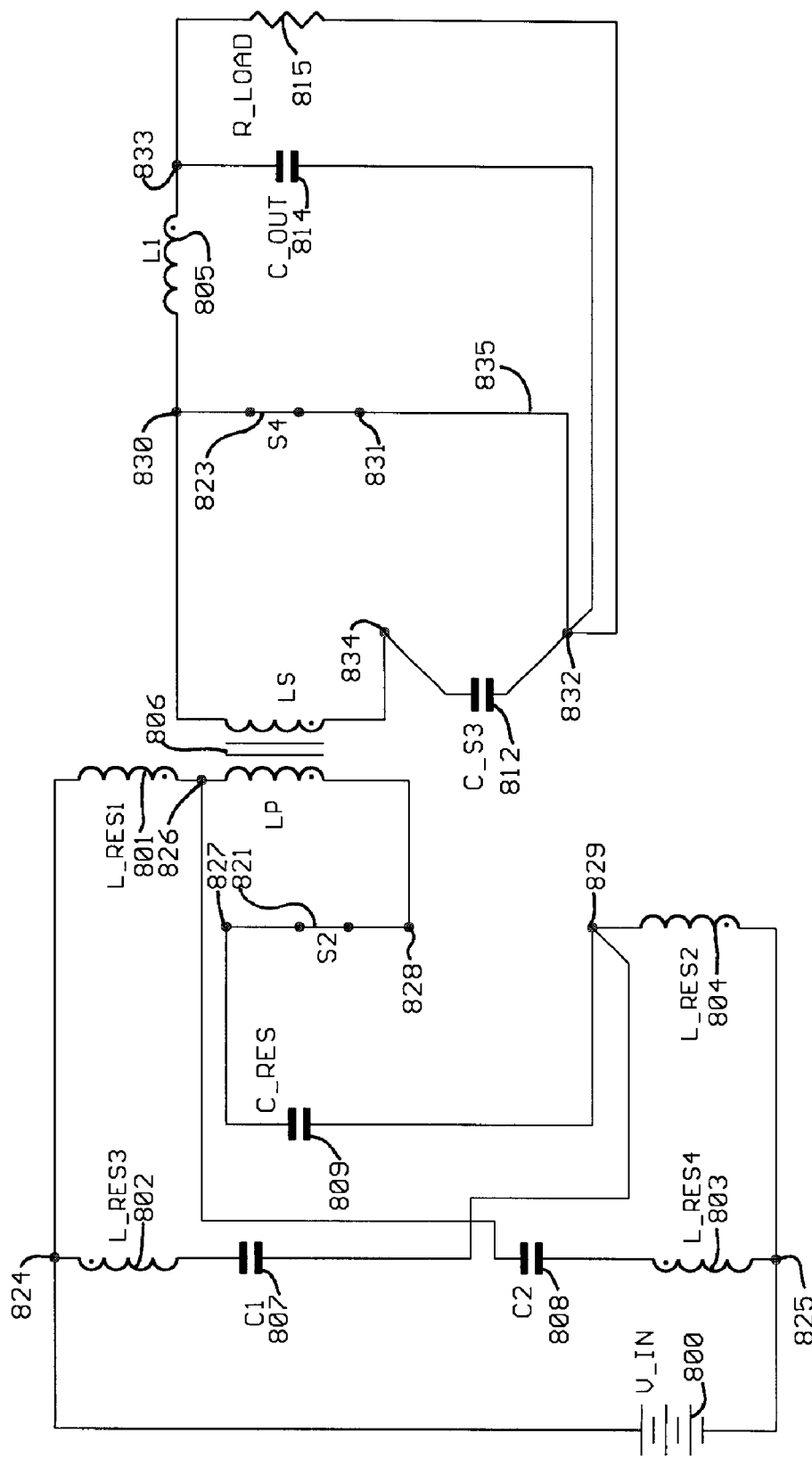
FIG. 116 illustrates a fifth phase of the turn off transition of the FIG. 108 circuit.
Figure 117:
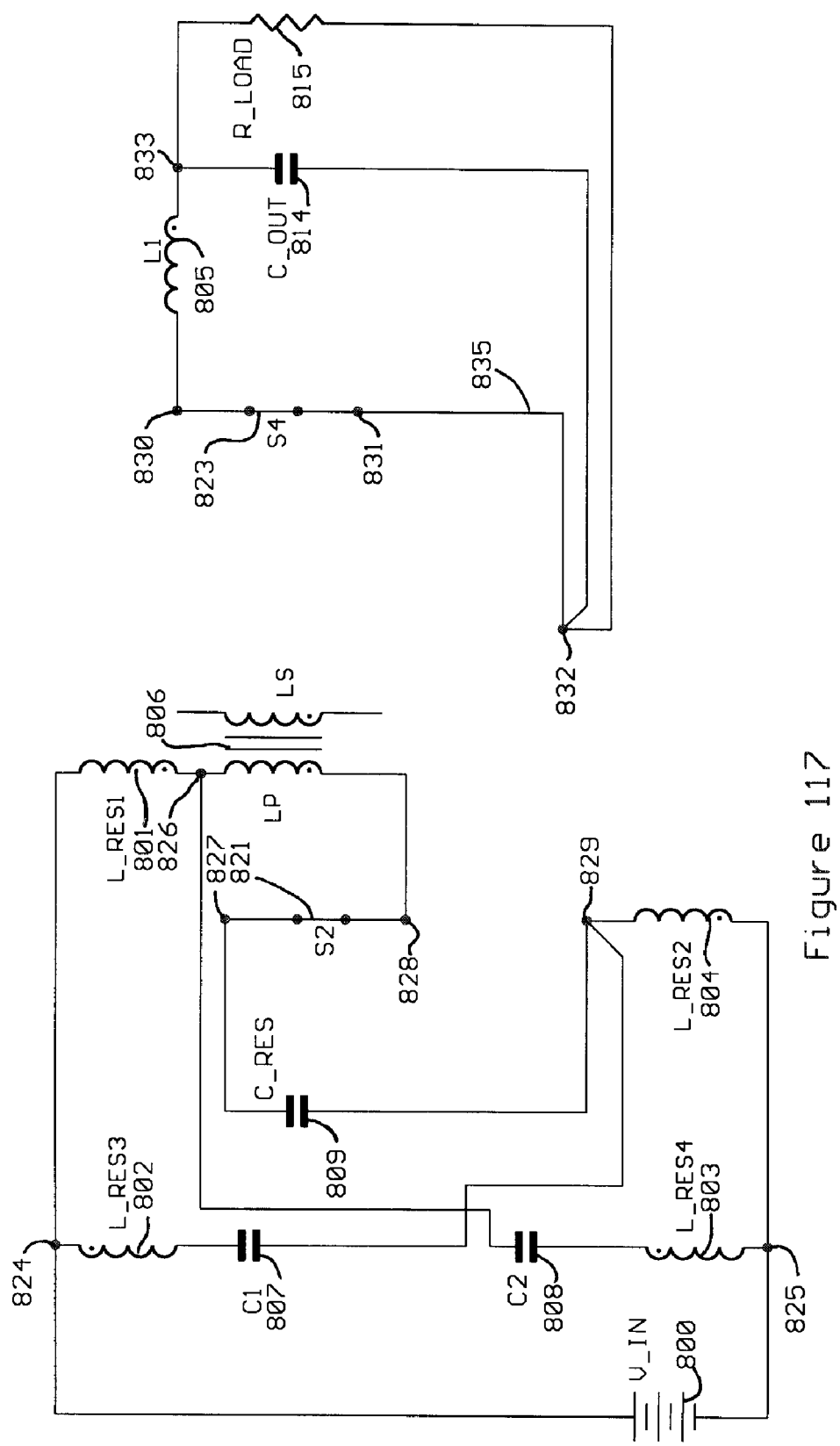
FIG. 117 illustrates an off state of the FIG. 108 circuit.

At a time determined by the control circuit the switches 820 and 822 are turned off and the switch current is diverted into diode 818 and capacitors 810, 811, and 813, as illustrated in FIG. 112. At the same time the winding voltages of all of the inductors and the transformer 806 begin to swing as the voltage at node 828 rises and the voltage at node 830 falls. As the voltage at node 828 rises the capacitors 810 and 813 discharge and capacitor 811 charges. As the voltage at node 830 falls below the voltage at node 831 diode 819 becomes forward biased, as illustrated in FIG. 113. When the voltage at node 828 reaches the voltage at node 827 diode 817 becomes forward biased, as illustrated in FIG. 114. Shortly after diodes 817 and 819 turn on switches 821 and 823 are turned on at zero voltage, as illustrated in FIG. 115. At this point in time the applied voltages to the primary inductors are relatively large and the currents in these inductors are falling rapidly as the transformer primary winding current falls rapidly and the secondary winding current of transformer 806 falls rapidly. Very shortly after the switches 821 and 823 turn on the current in the diode 818 falls to zero and the diode 818 turns off, as illustrated in FIG. 116, and the capacitor 812 begins to charge. When the capacitor 812 has charged completely the circuit enters the off state, as illustrated in FIG. 117. During the off state the current in the four primary inductors and the primary winding of transformer 806 ramp down and change sign. During the off time the amount of charge flowing into capacitor 809 is equal to the charge flowing out of capacitor 809. During the off time the current in the inductor 805 also ramps down as current from inductor 805 and charge from capacitor 814 power the load 815.

Figure 118:
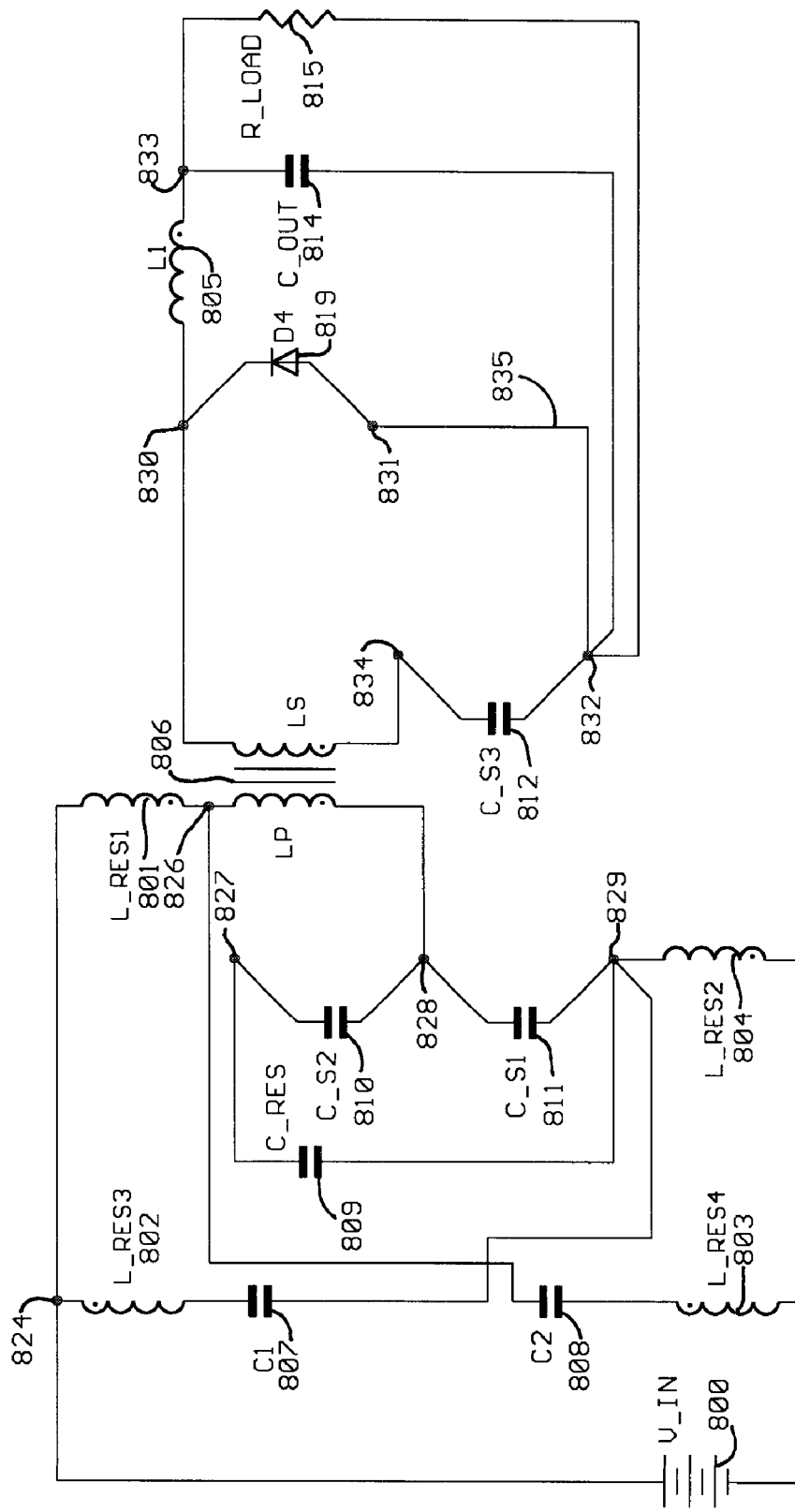
FIG. 118 illustrates a first phase of a turn on transition of the FIG. 108 circuit.
Figure 119:
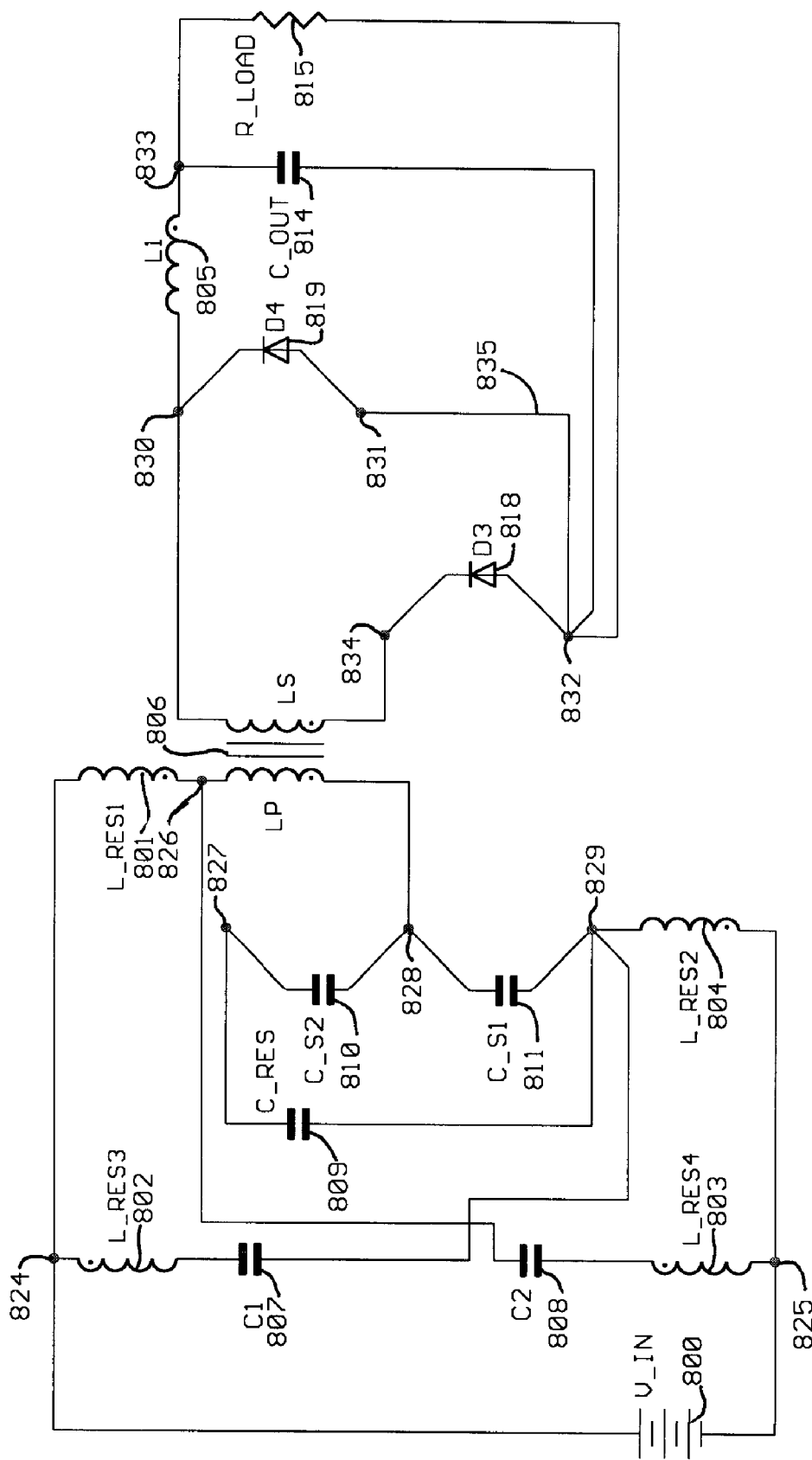
Figure 120:
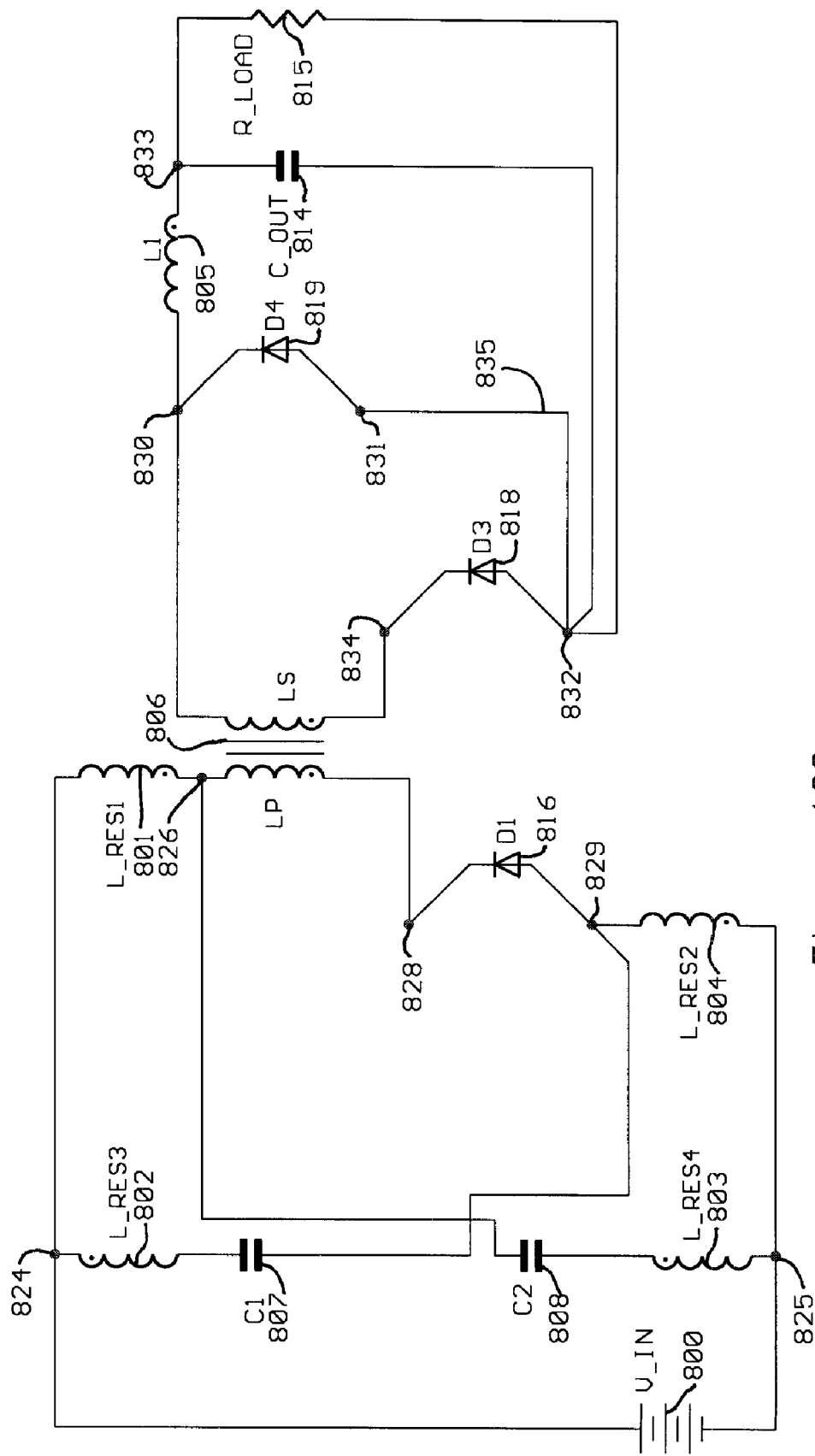
Figure 121:
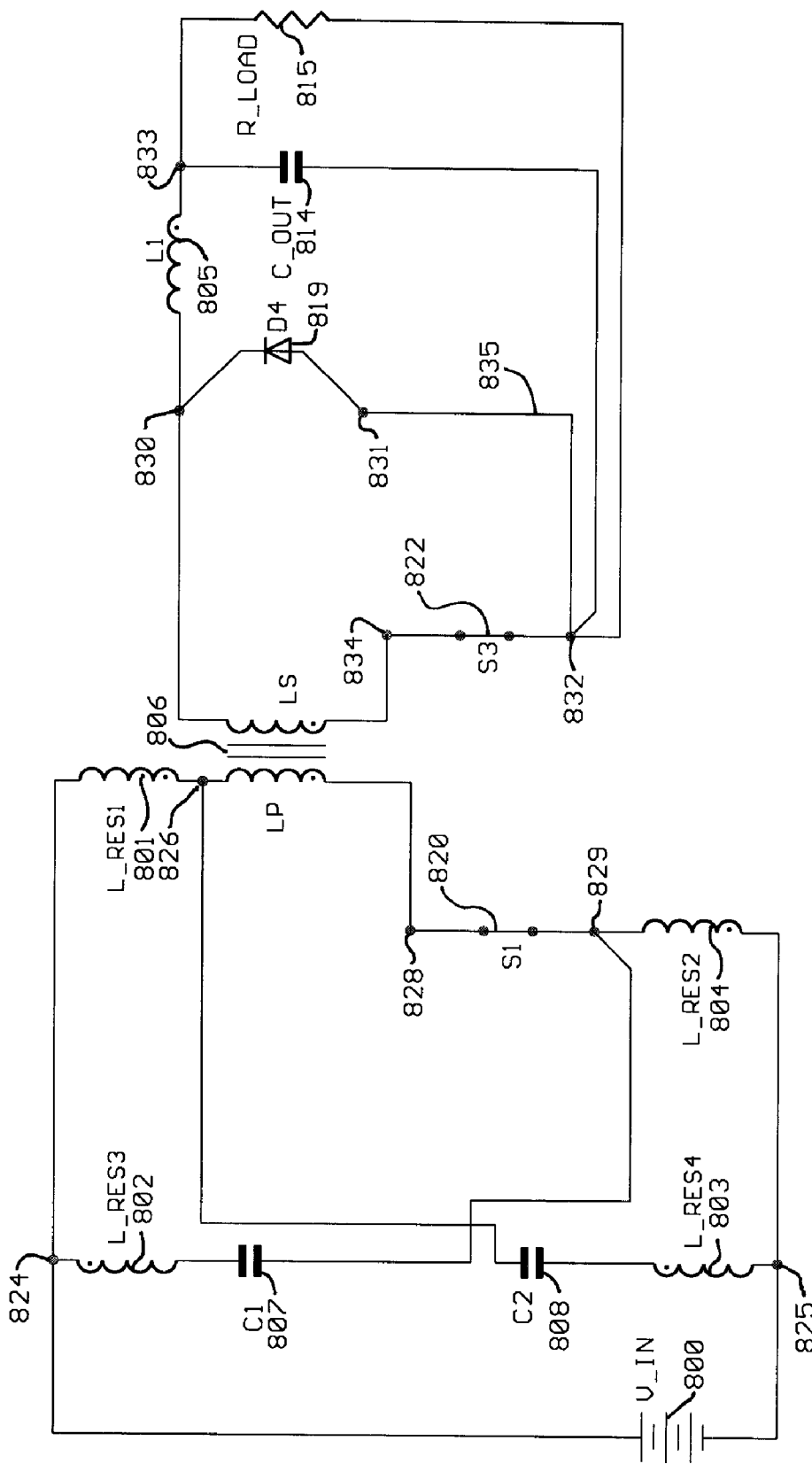
Figure 122:
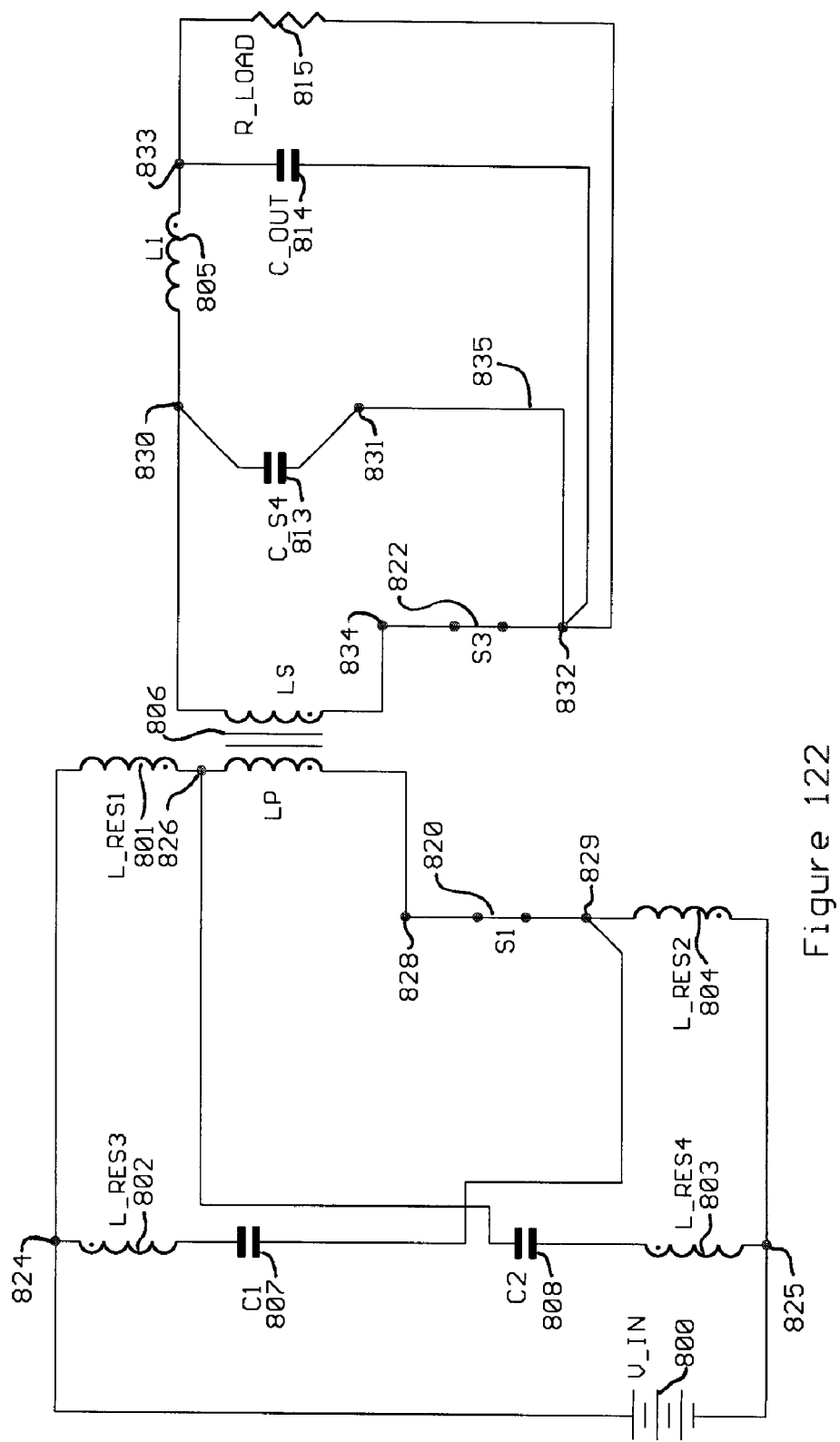

At a time determined by the control circuit the switches 821 and 823 are turned off (opened), as illustrated in FIG. 118. Stored energy from the inductor 805 forces current into the diode 819 and stored energy from the four primary inductors forces current into capacitors 810, 811, and 812 as the voltages at nodes 828 and 834 fall. The voltage at nodes 828 and 834 will continue to fall until the diode 818 becomes forward biased, as illustrated in FIG. 119, and then the diode 816 becomes forward biased, as illustrated in FIG. 120. Shortly after diode 816 turns on switches 820 and 822 are turned on at zero voltage, as illustrated in FIG. 121. The applied voltage to the four primary inductors is now very large so that the current in the four primary windings ramps down rapidly as the secondary winding current of transformer 806 ramps up rapidly until the diode 819 becomes reverse biased and the capacitor 813 begins to charge, as illustrated in FIG. 122. When the capacitor 813 is fully charged the converter enters the on state, as illustrated in FIG. 123, again, and the cycle repeats.

During both on state and off state the input source 800 currents have zero ripple current slope since the current slope of one of the inductors connected to an input source 800 terminal will always be equal and opposite in sign to the current slope of the other inductor connected to the same input source 800 terminal.

The transfer function is well known and is simply the duty cycle times the turns ratio of the transformer 806.

Related Embodiments

Figure 123:
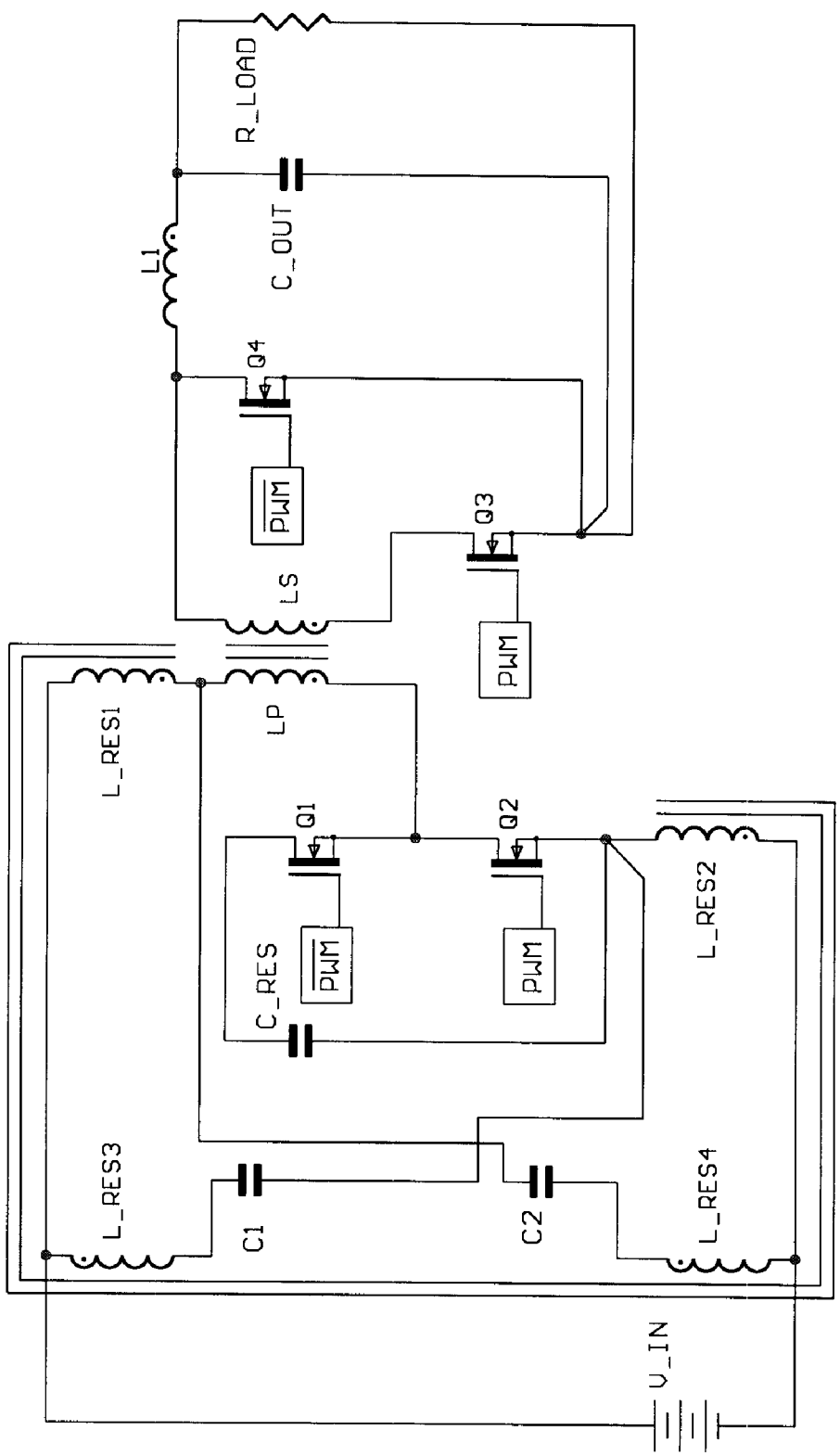

FIG. 123 illustrates the converter of FIG. 108 with the four primary inductors loosely coupled onto a single common core. The four switches are all implemented with mosfets. This converter will have non-pulsating output current due to the inductor 805 and the input current will have zero ripple.

Figure 124:
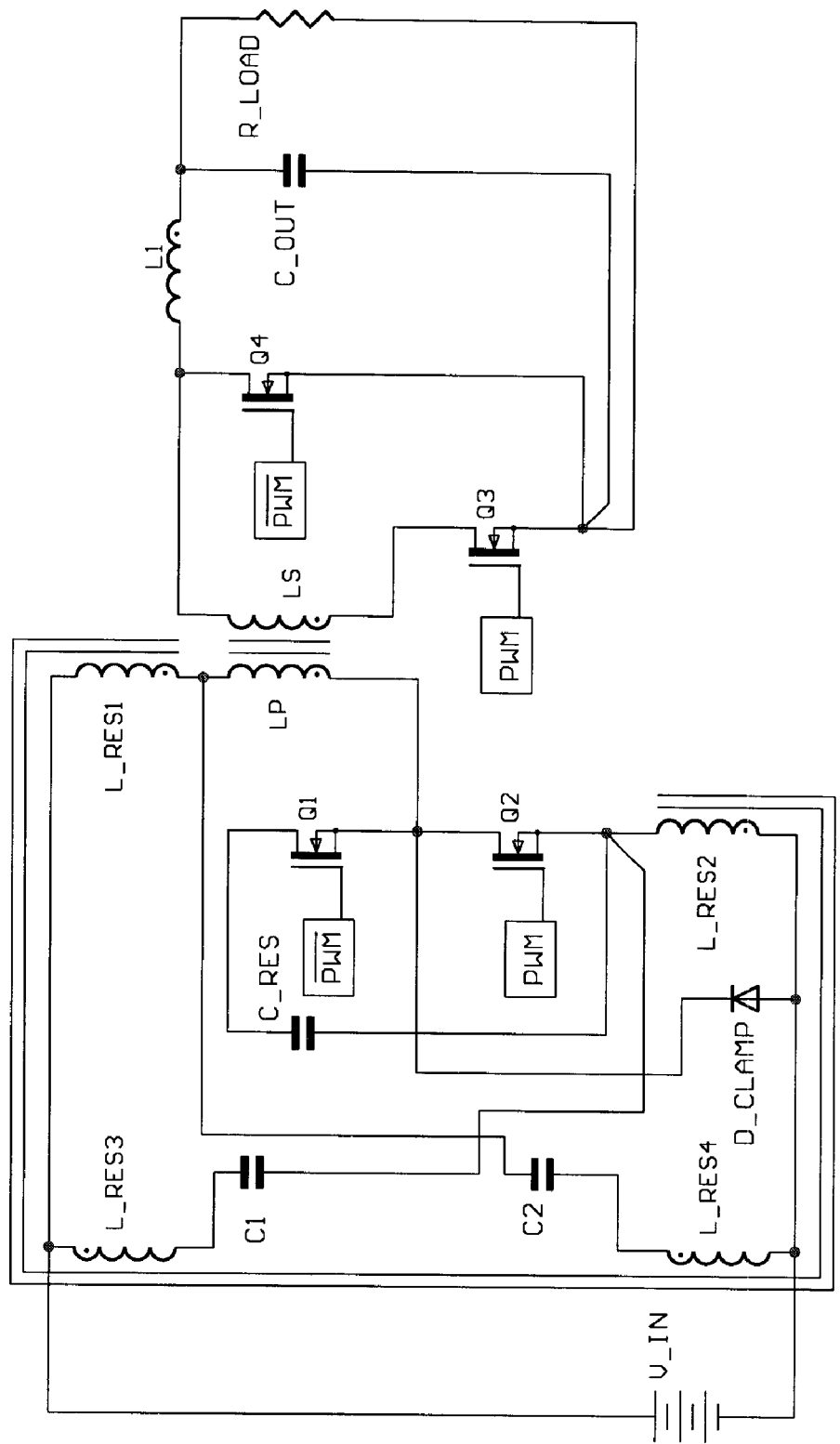

FIG. 124 illustrates the FIG. 123 circuit with a diode added to clamp ringing associated with the four primary chokes and the circuit's parasitic capacitances.

Figure 125:
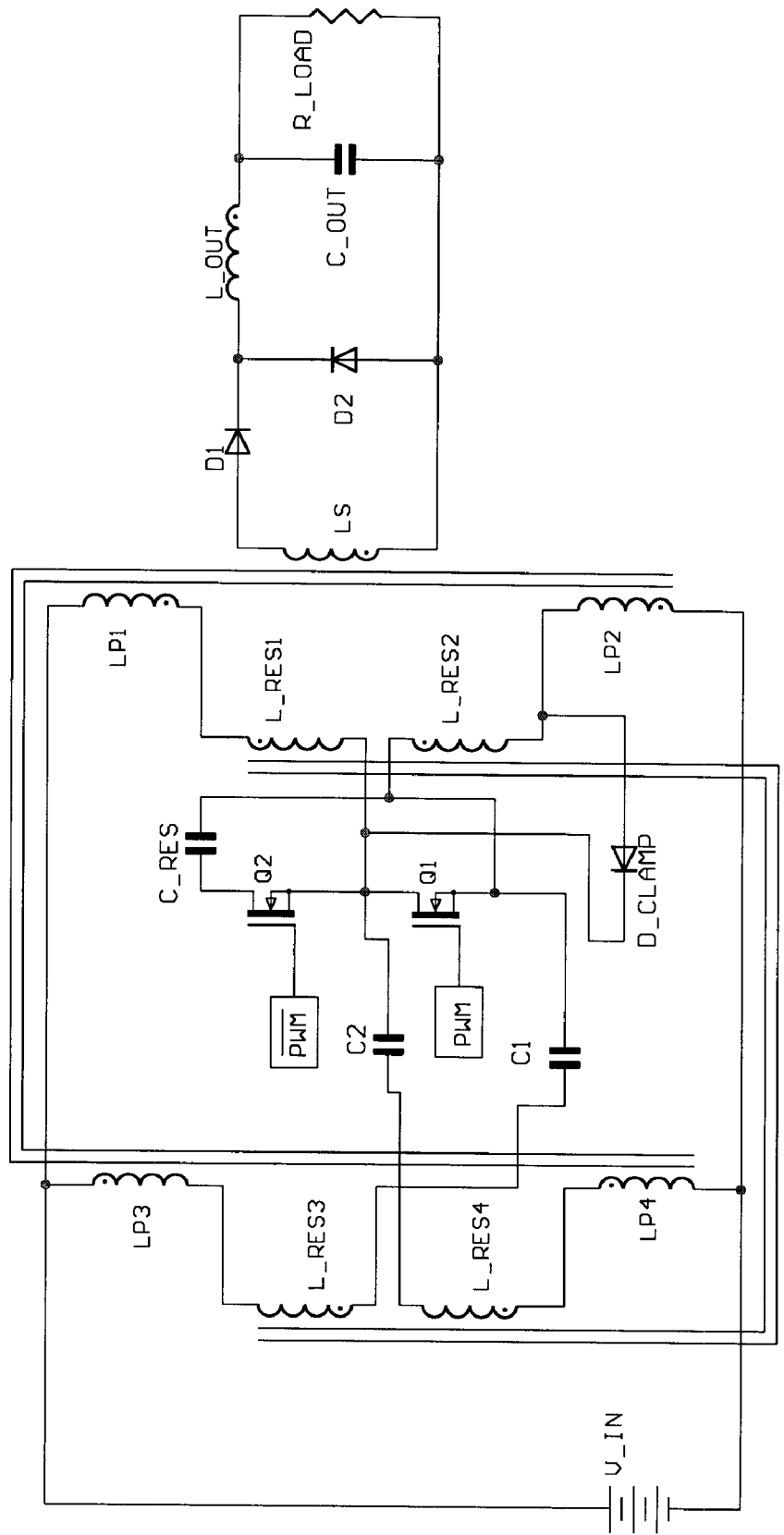

FIG. 125 illustrates the FIG. 124 circuit with the primary winding of the transformer 806 split into four equal windings with half the number of turns of the original transformer and repositioned to enhance the ripple cancellation properties of the converter.

Figure 126:
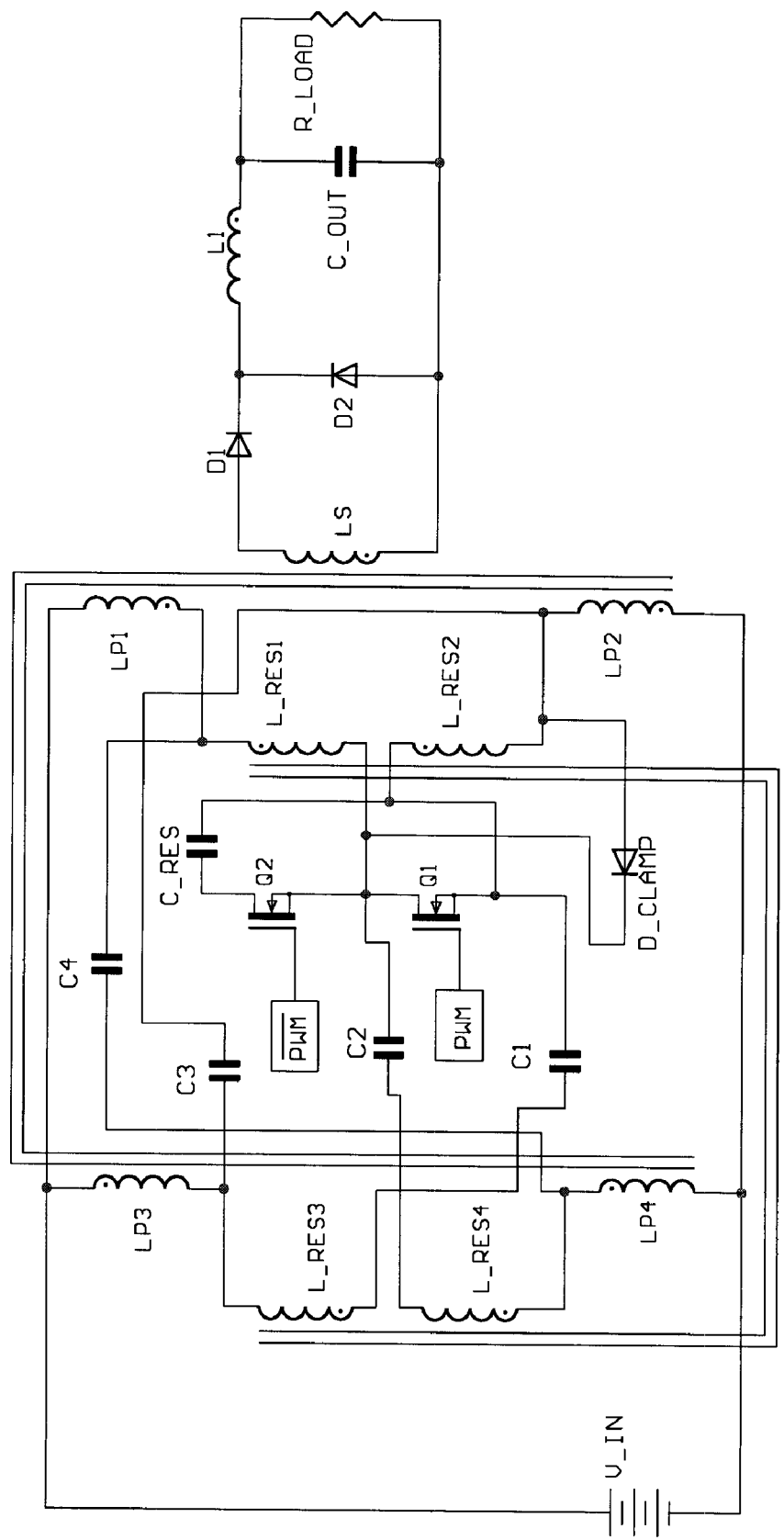

FIG. 126 illustrates the FIG. 125 circuit with two additional capacitors provided to enhance the ripple cancellation properties of the converter.

Primary Inductor Active Reset Single Ended Forward Converter with Input Current Ripple Cancellation Referring to FIG. 127 there is shown an active reset forward converter in which input DC voltages are converted into an isolated output DC voltage. The circuit requires an input source of substantially DC voltage, a transformer, four inductors, three switches, and four capacitors for output filtering, providing transformer reset, and coupling the inductors and the switches. For purposes of the operational state analysis, it is assumed that the capacitors are sufficiently large that the voltages developed across the capacitors are approximately constant over a switching interval. Also, for purposes of the operational state analysis, it is assumed that the input DC voltage sources have sufficiently low source impedance that the voltages developed across the input DC voltage sources are approximately constant over a switching interval. It will finally be assumed that the power switches are ideal, that is, lossless and able to carry current in either direction. We will also assume for purposes of the operational state analysis that all four inductors are equal in inductance value.

Structure

The structure of the circuit of the subject invention is shown in FIG. 127. A positive terminal of a source 900 of substantially DC voltage is connected to a node 919. A negative terminal of source 900 is connected to a node 920. An undotted terminal of an inductor 902 is connected to the node 919. A dotted terminal of an inductor 901 is also connected to node 919. A dotted terminal of inductor 902 is connected to a node 921. An undotted terminal of inductor 901 is connected to a first terminal of a capacitor 906. A second terminal of capacitor 906 is connected to a node 924. An undotted terminal of an inductor 903 is connected to node 920. A dotted terminal of an inductor 904 is also connected to node 920. An undotted terminal of inductor 904 is connected to node 924. A dotted terminal of inductor 903 is connected to a first terminal of a capacitor 907. A second terminal of capacitor 907 is connected to node 921. An undotted terminal of a primary winding of a transformer 905 is connected to node 921. A dotted terminal of the primary winding of transformer 905 is connected to a node 923. A first terminal of a switch 917 is connected to node 923. A second terminal of switch 917 is connected to node 924. A first terminal of a capacitor 910 is connected to node 923. A second terminal of capacitor 910 is connected to node 924. A cathode terminal of a diode 914 is connected to node 923. An anode terminal of diode 914 is connected to node 924. A first terminal of a switch 916 is connected to node 923. A second terminal of switch 916 is connected to a node 922. A first terminal of a capacitor 909 is connected to node 923. A second terminal of capacitor 909 is connected to node 922. An anode terminal of a diode 913 is connected to node 923. A cathode terminal of diode 913 is connected to node 922. A first terminal of a capacitor 908 is connected to node 922. A second terminal of capacitor 908 is connected to node 924. An undotted terminal of the secondary winding of transformer 905 is connected to a node 927. A dotted terminal of the secondary winding of the transformer 905 is connected to a node 925. A first terminal of a switch 918 is connected to node 925. A second terminal of switch 918 is connected to a node 926. A first terminal of a capacitor 911 is connected to node 925. A second terminal of capacitor 911 is connected to node 926. A cathode terminal of a diode 915 is connected to node 925. An anode terminal of diode 915 is connected to node 926. A first terminal of a capacitor 912 is connected to node 926. A second terminal of capacitor 912 is connected to node 927. A first terminal of a load 928 is connected to node 926. A second terminal of load 928 is connected to node 927.

Operation

Figure 128:
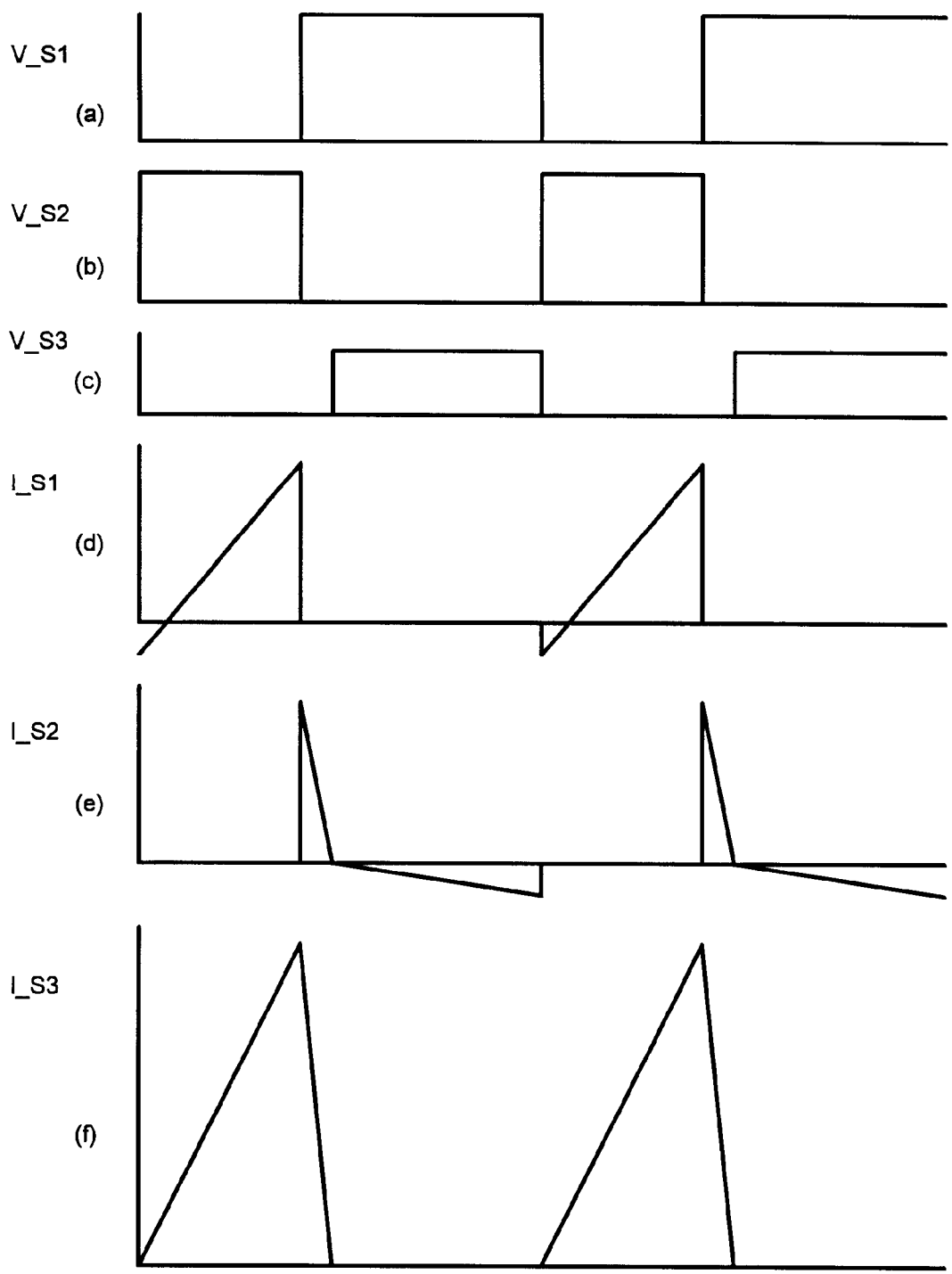
Figure 129:
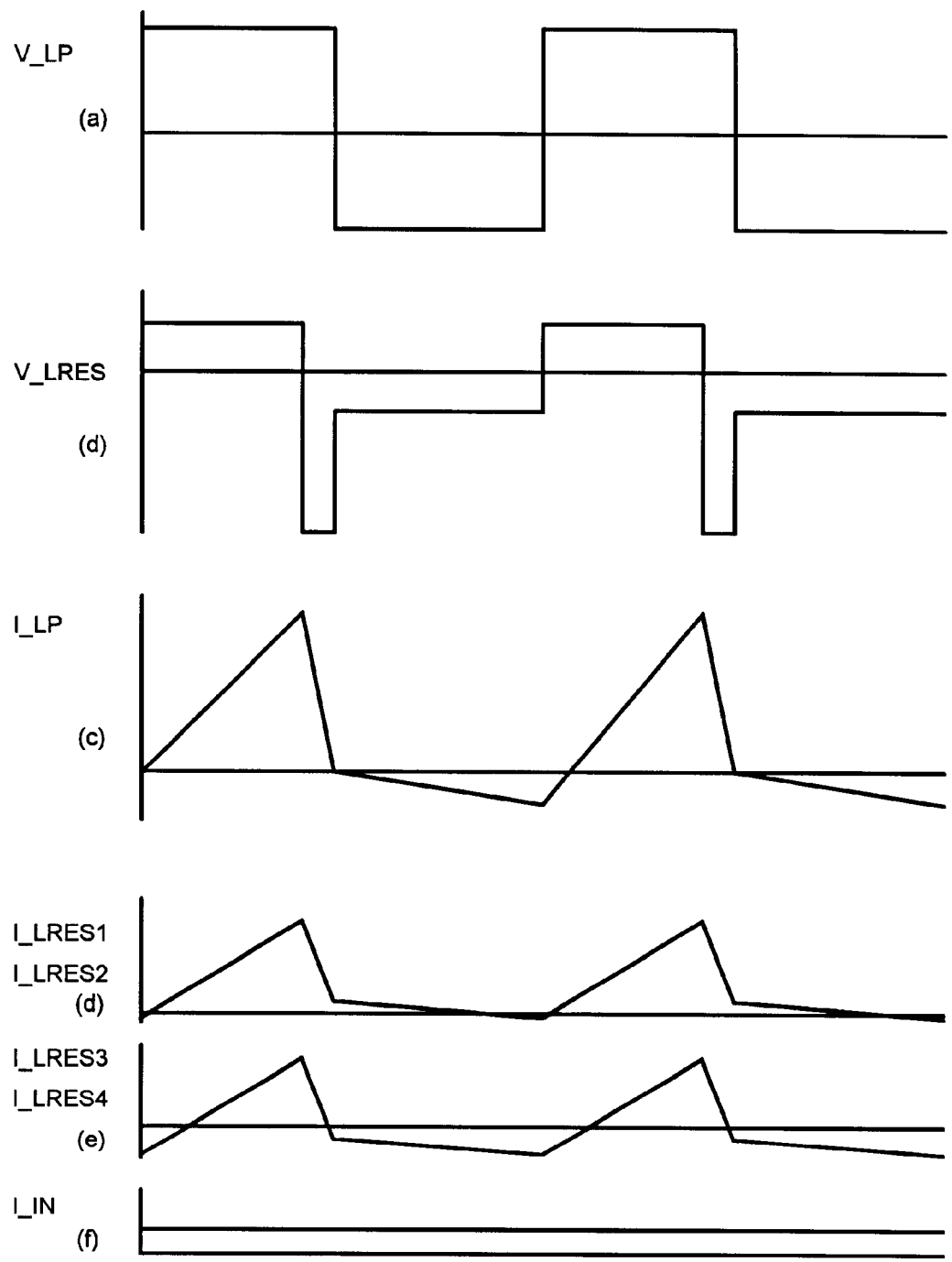
Figure 130:
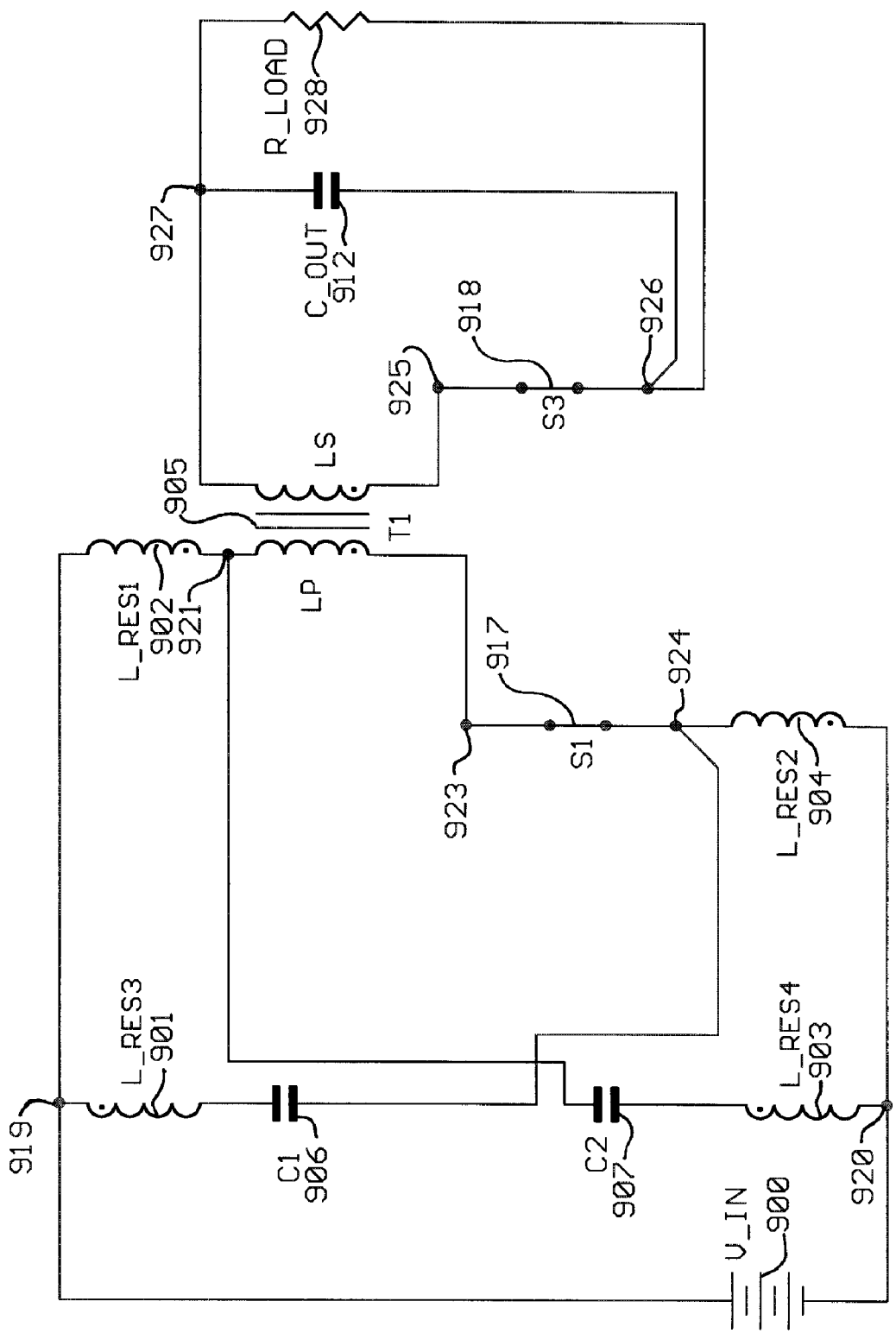

It is assumed in this analysis that the system has reached a settled operating condition. Except for the short, but finite, switching intervals there are two states of the circuit of FIG. 127, an on state and an off state. The applied voltage to the capacitor 906, $V_{C1}$, will be equal to the input DC source 900 voltage. This results from the fact that the first terminal of the capacitor 906 is connected to the positive terminal of the source 900 through an inductor 901 and a second terminal of the capacitor 906 is connected to the negative terminal of source 900 through an inductor 904 and the average applied voltages to the inductors are zero. The applied voltage to the capacitor 907, $V_{C2}$, will also be equal to the input DC source 900 voltage. This results from the fact that one terminal of the capacitor 907 is connected to the positive terminal of the source 900 through an inductor 902 and the other terminal of the capacitor 907 is connected to the negative terminal of source 900 through an inductor 903 and the average applied voltages to the inductors are zero. Voltage and current wave forms are illustrated in FIGS. 128 and 129. An initial condition that represents an on state of the converter is illustrated in FIG. 130. In the on state the switches 917 and 918 are on (closed) and the switch 916 is off (open). During the on state the current is flowing into the undotted terminals and out of the dotted terminals of the four primary inductors and the transformer's primary winding and is increasing at the same rate in the four primary inductors. Current is also flowing in the transformer 905 secondary winding and this current is increasing during the on state at a rate dependent on the turns ratio of transformer 905 and the rate of current increase in the primary winding of transformer 905. As a result of equal current ramp in the four primary inductors the current flowing from the source 900 is constant.

At a time determined by the control circuit the switches 917 and 918 are turned off and the switch current is diverted into diode 915 and capacitors 909 and 910, as illustrated in FIG. 131. At the same time the winding voltages of all of the inductors and the transformer 905 begin to swing as the voltage at node 923 rises. As the voltage at node 923 rises the capacitor 909 discharges and capacitor 910 charges. When the voltage at node 923 reaches the voltage at node 922 diode 913 becomes forward biased, as illustrated in FIG. 132. Shortly after diode 913 turns on switch 916 is turned on at zero voltage, as illustrated in FIG. 133. At this point in time the applied voltages to the primary inductors are relatively large and the currents in these inductors are falling rapidly as the transformer primary winding current falls rapidly and the secondary winding current of transformer 905 falls rapidly. Very shortly after the switch 916 turns on the current in the diode 915 falls to zero and the diode 915 turns off, as illustrated in FIG. 134, and the capacitor 911 begins to charge. When the capacitor 911 has charged completely the circuit enters the off state, as illustrated in FIG. 135. During the off state the current in the four primary inductors and the primary winding of transformer 905 ramp down and change sign. During the off time the amount of charge flowing into capacitor 908 is equal to the charge flowing out of capacitor 908. During the off time charge from capacitor 912 powers the load 928.

At a time determined by the control circuit the switch 916 is turned off (opened), as illustrated in FIG. 136. Stored energy from the four primary inductors forces current into capacitors 909, 910, and 911 as the voltages at nodes 923 and 925 fall. The voltage at nodes 923 and 925 will continue to fall until the diodes 914 and 915 become forward biased, as illustrated in FIG. 137. Shortly after diodes 914 and 915 turn on switches 917 and 918 are turned on at zero voltage, as illustrated in FIG. 130, and the converter is in the on state again and the cycle repeats.

During both on state and off state the input source 900 currents have zero ripple current slope since the current slope of one of the inductors connected to an input source 900 terminal will always be equal and opposite in sign to the current slope of the other inductor connected to the same input source 900 terminal.

Related Embodiments

FIG. 138 illustrates the converter of FIG. 127 with all four primary inductors loosely coupled on a single common core. The three switches are all implemented with mosfets.

FIG. 139 illustrates the FIG. 138 circuit with the transformer primary split into four windings each with half the number of turns of the original primary winding and repositioned at the source positive and negative terminals such that the current ramps from the two windings connected to the same terminal are oppositely directed and cancel. The splitting and repositioning of the windings at the source terminals slightly enhances the ripple current cancellation properties of the converter.

FIG. 140 illustrates the FIG. 139 circuit with a diode added to clamp ringing associated with the primary inductors and the circuits parasitic capacitances.

FIG. 141 illustrates the FIG. 140 circuit with two capacitors added to enhance the ripple current cancellation properties.

CONCLUSIONs, RAMIFICATIONS, AND SCOPE OF INVENTION

Thus the reader will see that the networks and converter circuits of the subject invention provide relatively simple mechanisms for improving the terminal current properties of those networks and converter circuits. In addition, in many cases, these results can be achieved without adding magnetic components.

While my above description contains many specificities, these should not be construed as limitations on the scope of the invention, but rather as exemplifications of preferred embodiments thereof. Many other variations are possible. For example, interleaved, parallel DC to DC converters with two or more parallel DC to DC converter sections using common input and output filter capacitors, DC to DC converters similar to those shown but which have alternate capacitor connections yielding similar converters with equivalent AC wave forms but different DC capacitor voltages, DC to DC converters similar to those shown but which have instead high AC ripple voltages on input filter capacitors, DC to DC converters, similar to those shown in the drawings, but where the DC input source is instead a varying rectified AC signal, converters with multiple isolated outputs, cascaded converters containing multiple connected conversion networks of the type revealed here, converters in which the output is an AC voltage with a frequency less than the switching frequency of the converter network, converters similar to those described here but with one or both of the switches replaced by zero voltage transition switching cells. Accordingly, the scope of the invention should be determined not by the embodiments illustrated, but by the appended claims and their legal equivalents.

I claim:

1. A three terminal power conversion network comprising, a first network terminal, a first inductor having first and second terminals with said first terminal of said first inductor connected to said first network terminal, first switch means having first and second terminals with said first terminal of said first switch means connected to said second terminal of said first inductor, a first capacitor having first and second terminals with said first terminal of said first capacitor connected to said first terminal of said first switch means and to said second terminal of said first inductor, a second capacitor having first and second terminals with said first terminal of said second capacitor connected to said second terminal of said first capacitor, second switch means having first and second terminals with said first terminal of said second switch means connected to said second terminal of said first switch means and with said second terminal of said second switch means connected to said second terminal of said second capacitor, operable substantially in anti-synchronization to said first switch means, a second inductor having first and second terminals with said second terminal of said second inductor connected to said second terminal of said second capacitor and to said second terminal of said second switch means, a second network terminal connected to said first terminal of said second inductor, a third inductor having first and second terminals with said first terminal of said third inductor connected to said second terminal of said first switch means and to said first terminal of said second switch means, a third network terminal connected to said second terminal of said third inductor, a fourth inductor having first and second terminals with said second terminal of said fourth inductor connected to said first network terminal and to said first terminal of said first inductor, a third capacitor having first and second terminals with said first terminal of said third capacitor connected to said first terminal of said fourth inductor and with said second terminal of said third capacitor connected to said second terminal of said first switch means, to said first terminal of said second switch means, and to said first terminal of said third inductor, a fifth inductor having first and second terminals with said second terminal of said fifth switch means connected to said second network terminal and to said first terminal of said second inductor, a fourth capacitor having first and second terminals with said first terminal of said fourth capacitor connected to said second terminal of said first switch means, to said first terminal of said second switch means, to said second terminal of said third capacitor, and to said first terminal of said third inductor and with said second terminal of said fourth capacitor connected to said first terminal of said fifth inductor, a sixth inductor having first and second terminals with said first terminal of said sixth inductor connected to said third network terminal and to said second terminal of said third inductor and with said second terminal of said sixth inductor connected to said second terminal of said first capacitor and to said first terminal of said second capacitor, whereby one of said first, said second, or said third network terminals is connected to a load and the remaining two of said first, said second, and said third network terminals are connected to substantially DC voltage sources, one of which sources may be ground or common, thereby forming a complete power converter circuit in which two inductors are connected at each network terminal such that the ripple current of an inductor connected to a network terminal substantially cancels the ripple current of the other inductor connected to the same network terminal.

2. The network of claim 1 wherein said switch means comprise semiconductor switch means.

3. The network of claim 2 wherein said first, said second, said third, said fourth, said fifth, and said sixth inductors are integrated on a single common core.

4. A three terminal power conversion network comprising,
a first network terminal,
a first inductor having first and second terminals with said first terminal of said first inductor connected to said first network terminal,
first switch means having first and second terminals with said first terminal of said first switch means connected to said second terminal of said first inductor,
a first capacitor having first and second terminals with said first terminal of said first capacitor connected to said second terminal of said first inductor and to said first terminal of said first switch means,
a second inductor having first and second terminals with said first terminal of said second inductor connected to said second terminal of said first switch means and with said second terminal of said second inductor connected to said second terminal of said first capacitor,
a third inductor having first and second terminals with said first terminal of said third inductor connected to said second terminal of said first switch means and to said first terminal of said second inductor,
a second network terminal connected to said second terminal of said third inductor, second switch means having first and second terminals with said first terminal of said second switch means connected to said second terminal of said first capacitor and to said second terminal of said second inductor, operable substantially in anti-synchronization to said first switch means, a second capacitor having first and second terminals with said first terminal of said second capacitor connected to said second terminal of said first switch means, to said first terminal of said second inductor, and to said first terminal of said third inductor and with said second terminal of said second capacitor connected to said second terminal of said second switch means, a fourth inductor having first and second terminals with said first terminal of said fourth inductor connected to said second terminal of said second switch means and to said second terminal of said second capacitor, a third network terminal connected to said second terminal of said fourth inductor, a fifth inductor having first and second terminals with said second terminal of said fifth inductor connected to said first network terminal and to said first terminal of said first inductor, a third capacitor having first and second terminals with said first terminal of said third capacitor connected to said first terminal of said fifth inductor and with said second terminal of said third capacitor connected to said first terminal of said fourth inductor, to said second terminal of said second switch means, and to said second terminal of said second capacitor, a sixth inductor having first and second terminals with said first terminal of said sixth inductor connected to said second network terminal and to said second terminal of said third inductor, a fourth capacitor having first and second terminals with said first terminal of said fourth capacitor connected to said second terminal of said sixth inductor and with said second terminal of said fourth capacitor connected to said second terminal of said second inductor, to said second terminal of said first capacitor, and to said first terminal of said second switch means, a seventh inductor having first and second terminals with said first terminal of said seventh inductor connected to said third network terminal and to said second terminal of said fourth inductor, a fifth capacitor having first and second terminals with said first terminal of said fifth capacitor connected to said second terminal of said seventh inductor and with said second terminal of said fifth capacitor connected to said second terminal of said first inductor, to said first terminal of said first switch means, and to said first terminal of said first capacitor, whereby one of said first, said second, or said third network terminals is connected to a load and the remaining two of said first, said second, and said third network terminals are connected to substantially DC voltage sources, one of which sources may be ground or common, thereby forming a complete power converter circuit in which two inductors are connected at each network terminal such that the ripple current of an inductor connected to a network terminal substantially cancels the ripple current of the other inductor connected to the same network terminal.

5. The network of claim 4 wherein said switch means comprise semiconductor switch means.

6. The network of claim 5 wherein said first, said second, said third, said fourth, said fifth, said sixth, and said seventh inductors are integrated on a single common core.

7. A three terminal power conversion network comprising,
- a first network terminal,
- a coupled inductor comprising,
    - a first winding having first and second terminals with said first terminal of said first winding connected to said first network terminal,
    - a second winding having first and second terminals,
    - a third winding having first and second terminals,
    - a fourth winding having first and second terminals with said second terminal of said fourth winding connected to said first terminal of said third winding,
    - a fifth winding having first and second terminals with said second terminal of said fifth winding connected to said first network terminal and to said first terminal of said first winding,
    - a sixth winding having first and second terminals with said second terminal of said sixth winding connected to said first terminal of said second winding,
    - a seventh winding having first and second terminals with said first terminal of said seventh winding connected to said second terminal of said third winding,
- first switch means having first and second terminals with said first terminal of said first switch means connected to said second terminal of said first winding of said coupled inductor and with said second terminal of said first switch means connected to said first terminal of said fourth winding of said coupled inductor,
- second switch means having first and second terminals with said first terminal of said second switch means connected to said first terminal of said third winding of said coupled inductor and to said second terminal of said fourth winding of said coupled inductor and with said second terminal of said second switch means connected to said second terminal of said second winding of said coupled inductor, operable substantially in anti-synchronization to said first switch means,
- a first capacitor having first and second terminals with said first terminal of said first capacitor connected to said second terminal of said first winding of said coupled inductor and to said first terminal of said first switch means and with said second terminal of said first capacitor connected to said second terminal of said seventh winding of said coupled inductor,
- a second capacitor having first and second terminals with said first terminal of said second capacitor connected to said second terminal of said first capacitor and to said second terminal of said seventh winding of said coupled inductor and with said second terminal of said second capacitor connected to said second terminal of said second winding of said coupled inductor and to said second terminal of said second switch means,
- third capacitor having first and second terminals with said first terminal of said third capacitor connected to said first terminal of said fifth winding of said coupled inductor and with said second terminal of said third capacitor connected to said first terminal of said second switch means, to said first terminal of said third winding of said coupled inductor, and to said second terminal of said fourth winding of said coupled inductor,
- a fourth capacitor having first and second terminals with said first terminal of said fourth capacitor connected to said first terminal of said second switch means, to said first terminal of said third winding of said coupled inductor, to said second terminal of said fourth winding of said coupled inductor, and to said second terminal of said third capacitor and with said second terminal of said fourth capacitor connected to said first terminal of said sixth winding of said coupled inductor, whereby one of said first, said second, or said third network terminals is connected to a load and the remaining two of said first, said second, and said third network terminals are connected to substantially DC voltage sources, one of which sources may be ground or common, thereby forming a complete power converter circuit in which two coupled inductor windings are connected at each network terminal such that the ripple current of a winding connected to a network terminal substantially cancels the ripple current of the other winding connected to the same network terminal.

8. The network of claim 7 wherein said switch means comprise semiconductor switch means.

9. The network of claim 8 further comprising,
- a second inductor connected in series with said first switch means,
- an active reset network connected to said first switch means and to said second inductor comprising,
    - a fifth capacitor,
    - third switch means connected in series with said fifth capacitor operable substantially in anti-synchronization to said first switch means, whereby said active reset network provides a means to reverse the current in said second inductor during the off time of said first switch means such that energy is available and current in said second inductor is directed to provide a zero voltage turn on transition for said first switch means.

10. A three terminal power conversion network comprising,
- a first network terminal,
- a first inductor having first and second network terminals with said first terminal of said first inductor connected to said first network terminal,
- first switch means having first and second terminals with said first terminal of said first switch means connected to said second terminal of said first inductor,
- a first capacitor having first and second terminals with said first terminal of said first capacitor connected to said second terminal of said first inductor and to said first terminal of said first switch means,
- a second inductor having first and second terminals with said second terminal of said second inductor connected to said second terminal of said first capacitor,
- a second network terminal connected to said first terminal of said second inductor,
- second switch means having first and second terminals with said first terminal of said second switch means connected to said second terminal of said first capacitor and to said second terminal of said second inductor,
- a second capacitor having first and second terminals with said first terminal of said second capacitor connected to said second terminal of said second switch means and with said second terminal of said second capacitor connected to said second terminal of said first switch means,
- a third inductor having first and second terminals with said first terminal of said third inductor connected to said second terminal of said first switch means and to said second terminal of said second capacitor and with said second terminal of said third inductor connected to said first terminal of said second inductor and to said second network terminal, a fourth inductor having first and second terminals with said first terminal of said fourth inductor connected to said first terminal of said second capacitor and to said second terminal of said second switch means, a third network terminal connected to said second terminal of said fourth inductor, whereby one of said first, said second, or said third network terminals is connected to a load and the remaining two of said first, said second, and said third network terminals are connected to substantially DC voltage sources, one of which sources may be ground or common, thereby forming a complete power converter circuit in which two inductors are connected at said second network terminal such that the ripple current of said second inductor substantially cancels the ripple current of said third inductor at said second network terminal.

11. The network of claim 10 wherein said switch means comprise semiconductor switch means.

12. The network of claim 10 in which all four inductors are coupled on a single common magnetic core.

13. The network of claim 10 further comprising, a fifth inductor having first and second terminals with said second terminal of said fifth inductor connected to said first network terminal and to said first terminal of said first inductor, a third capacitor having first and second terminals with said first terminal of said third capacitor connected to said first terminal of said fifth inductor and with said second terminal of said third capacitor connected to said first terminal of said second capacitor and to said second terminal of said second switch means, a sixth inductor having first and second terminals with said first terminal of said sixth inductor connected to said third network terminal and to said second terminal of said fourth inductor, a fourth capacitor having first and second terminals with said first terminal of said fourth capacitor connected to said second terminal of said sixth inductor and with said second terminal of said fourth capacitor connected to said first terminal of said first switch means, to said first terminal of said first capacitor, and to said second terminal of said first inductor, whereby one of said first, said second, or said third network terminals is connected to a load and the remaining two of said first, said second, and said third network terminals are connected to substantially DC voltage sources, one of which sources may be ground or common, thereby forming a complete power converter circuit in which two inductors are connected at each network terminal such that the ripple current of an inductor connected to a network terminal substantially cancels the ripple current of the other inductor connected to the same network terminal.

14. An active reset flyback converter comprising, an input having first and second terminals coupleable to a source of substantially DC potential, a first inductor having first and second terminals with said first terminal of said first inductor connected to said first terminal of said input, a second inductor having first and second terminals with said second terminal of said second inductor connected to said first terminal of said input, a third inductor having first and second terminals with said first terminal of said third inductor connected to said second terminal of said input, a fourth inductor having first and second terminals with said second terminal of said fourth inductor connected to said second terminal of said input, a first capacitor having first and second terminals with said first terminal of said first capacitor connected to said second terminal of said first inductor and with said second terminal of said first capacitor connected to said second terminal of said third inductor, a second capacitor having first and second terminals with said first terminal of said second capacitor connected to said first terminal of said second inductor and with said second terminal of said second capacitor connected to said second terminal of said fourth inductor, a coupled inductor having a primary winding with first and second terminals and a secondary winding having first and second terminals with said second terminal of said primary winding of said coupled inductor connected to said first terminal of said second inductor and to said first terminal of said second capacitor, first switch means having first and second terminals with said first terminal of said first switch means connected to said first terminal of said primary winding of said coupled inductor and with said second terminal connected to said second terminal of said third inductor and to said second terminal of said first capacitor, second switch means having first and second terminals with said first terminal of said second switch means connected to said first terminal of said first switch means and to said first terminal of said primary winding of said coupled inductor, operable substantially in anti-synchronization to said first switch means, a third capacitor having first and second terminals with said first terminal of said third capacitor connected to said second terminal of said second switch means and with said second terminal of said third capacitor connected to said second terminal of said first switch means, to said second terminal of said first capacitor, and to said second terminal of said third inductor, third switch means having first and second terminals, operable substantially in anti-synchronization to said first switch means, with said first terminal of said third switch means connected to said second terminal of said secondary winding of said coupled inductor, an output, coupleable to a load, having first and second terminals with said first terminal of said output connected to said first terminal of said secondary winding of said coupled inductor and with said second terminal of said output connected to said second terminal of said third switch means, whereby the AC current component of said first inductor is substantially equal in magnitude and opposite in sign to said AC current component of said second inductor thereby substantially canceling said AC current components of said first and said second inductors at said first terminal of said input and thereby providing substantially DC current load to said input, whereby the AC current component of said third inductor is substantially equal in magnitude and opposite in sign to said AC current component of said fourth inductor thereby substantially canceling said AC current components of said third and said fourth inductors at said second input terminal and thereby providing substantially DC current load to said input, and whereby the energy in said first, said second, said third, and said fourth inductors is used to drive a zero voltage turn on transition of said first switch means.

15. The converter of claim 14 wherein said switch means comprise semiconductor switch means.

16. The converter of claim 14 in which all four inductors are coupled on a single common magnetic core.

17. The converter of claim 16 further comprising,
a first diode having a cathode terminal and an anode terminal with said cathode terminal connected to said first terminal of said first switch means and with said anode terminal of said diode connected to said first terminal of said third inductor,
whereby said first diode clamps ringing associated with said first, said second, said third, and said fourth inductors and circuit parasitic capacitances such as intrinsic capacitance of said third switch means and inter-winding and intra-winding capacitance of said coupled inductor.

18. An active reset coupled inductor buck converter comprising,
an input having first and second terminals coupleable to a source of substantially DC potential,
a first inductor having first and second terminals with said first terminal of said first inductor connected to said first terminal of said input,
a second inductor having first and second terminals with said second terminal of said second inductor connected to said first terminal of said input,
a third inductor having first and second terminals with said first terminal of said third inductor connected to said second terminal of said input,
a fourth inductor having first and second terminals with said second terminal of said fourth inductor connected to said second terminal of said input,
a first capacitor having first and second terminals with said first terminal of said first capacitor connected to said second terminal of said first inductor,
a second capacitor having first and second terminals with said first terminal of said second capacitor connected to said first terminal of said second inductor and with said second terminal of said second capacitor connected to said second terminal of said fourth inductor,
a third capacitor having first and second terminals with said first terminal of said third capacitor connected to said second terminal of said third inductor and with said second terminal of said third capacitor connected to said second terminal of said first capacitor,
a coupled inductor having a primary winding with first and second terminals and a secondary winding having first and second terminals with said second terminal of said primary winding of said coupled inductor connected to said second terminal of said third capacitor and to said second terminal of said first capacitor,
first switch means having first and second terminals with said first terminal of said first switch means connected to said first terminal of said primary winding of said coupled inductor and with said second terminal connected to said first terminal of said second inductor and to said first terminal of said second capacitor,
second switch means having first and second terminals with said first terminal of said second switch means connected to said first terminal of said first switch means and to said first terminal of said primary winding of said coupled inductor and with said second terminal of said second switch means connected to said second terminal of said second capacitor and to said first terminal of said fourth inductor, operable substantially in anti-synchronization to said first switch means,
third switch means having first and second terminals, operable substantially in anti-synchronization to said first switch means, with said first terminal of said third switch means connected to said first terminal of said secondary winding of said coupled inductor,
an output, coupleable to a load, having first and second terminals with said first terminal of said output connected to said second terminal of said secondary winding of said coupled inductor and with said second terminal of said output connected to said second terminal of said third switch means,
whereby the AC current component of said first inductor is substantially equal in magnitude and opposite in sign to said AC current component of said second inductor thereby substantially canceling said AC current components of said first and said second inductors at said first terminal of said input and thereby providing substantially DC current load to said input, whereby the AC current component of said third inductor is substantially equal in magnitude and opposite in sign to said AC current component of said fourth inductor thereby substantially canceling said AC current components of said third and said fourth inductors at said second input terminal and thereby providing substantially DC current load to said input, and whereby the energy in said first, said second, said third, and said fourth inductors is used to drive a zero voltage turn on transition of said first switch means.

19. The converter of claim 18 wherein said switch means comprise semiconductor switch means.

20. The converter of claim 19 in which all four inductors are coupled on a single common magnetic core.

21. The converter of claim 20 further comprising,
a first diode having a cathode terminal and an anode terminal with said cathode terminal connected to said first terminal of said primary winding of said coupled inductor and with said anode terminal connected to said second terminal of said first switch means,
whereby said first diode clamps ringing associated with said first, said second, said third, and said fourth inductors and circuit parasitic capacitances such as intrinsic capacitance of said third switch means and inter-winding and intra-winding capacitance of said coupled inductor.

22. An active reset interleaved coupled inductor buck converter comprising,
an input having first and second terminals coupleable to a source of substantially DC potential,
a first inductor having first and second terminals with said first terminal of said first inductor connected to said first terminal of said input,
a second inductor having first and second terminals with said second terminal of said second inductor connected to said first terminal of said input,
a third inductor having first and second terminals with said first terminal of said third inductor connected to said second terminal of said input,
a fourth inductor having first and second terminals with said second terminal of said fourth inductor connected to said second terminal of said input,
a first capacitor having first and second terminals with said first terminal of said first capacitor connected to said second terminal of said first inductor and with said second terminal of said first capacitor connected to said second terminal of said third inductor,
a second capacitor having first and second terminals with said first terminal of said second capacitor connected to said first terminal of said second inductor and with said second terminal of said second capacitor connected to said first terminal of said fourth inductor,
a first coupled inductor having a primary winding with first and second terminals and a secondary winding having first and second terminals with said second terminal of said primary winding of said first coupled inductor connected to said first terminal of said second inductor and to said first terminal of said second capacitor, a second coupled inductor having a primary winding with first and second terminals and a secondary winding having first and second terminals with said second terminal of said primary winding of said second coupled inductor connected to said first terminal of said primary winding of said first coupled inductor and with said first terminal of said secondary winding of said second coupled inductor connected to said second terminal of said secondary winding of said first coupled inductor, first switch means having first and second terminals with said first terminal of said first switch means connected to said first terminal of said primary winding of said second coupled inductor and with said second terminal connected to said second terminal of said third inductor and to said second terminal of said first capacitor, second switch means having first and second terminals with said first terminal of said second switch means connected to said first terminal of said first switch means and to said first terminal of said primary winding of said second coupled inductor, operable substantially in anti-synchronization to said first switch means, a third capacitor having first and second terminals with said first terminal of said third capacitor connected to said second terminal of said second switch means and with said second terminal of said third capacitor connected to said second terminal of said first switch means, to said second terminal of said first capacitor, and to said second terminal of said third inductor, third switch means having first and second terminals, operable substantially in anti-synchronization to said first switch means, with said first terminal of said third switch means connected to said second terminal of said secondary winding of said second coupled inductor, fourth switch means having first and second terminals, operable substantially in synchronization with said first switch means, with said first terminal of said fourth switch means connected to said first terminal of said secondary winding of said first coupled inductor and with said second terminal of said fourth switch means connected to said second terminal of said third switch means, an output, coupleable to a load, having first and second terminals with said first terminal of said output connected to said first terminal of said secondary winding of said second coupled inductor and to said second terminal of said secondary winding of said first coupled inductor and with said second terminal of said output connected to said second terminal of said third switch means and to said second terminal of said fourth switch means, whereby the AC current component of said first inductor is substantially equal in magnitude and opposite in sign to said AC current component of said second inductor thereby substantially canceling said AC current components of said first and said second inductors at said first terminal of said input and thereby providing substantially DC current load to said input, whereby the AC current component of said third inductor is substantially equal in magnitude and opposite in sign to said AC current component of said fourth inductor thereby substantially canceling said AC current components of said third and said fourth inductors at said second input terminal and thereby providing substantially DC current load to said input, and whereby the energy in said first, said second, said third, and said fourth inductors is used to drive a zero voltage turn on transition of said first switch means.

23. The converter of claim 22 wherein said switch means comprise semiconductor switch means.

24. The converter of claim 22 in which all four inductors are coupled on a single common magnetic core.

25. The converter of claim 24 further comprising, a first diode having a cathode terminal and an anode terminal with said cathode terminal connected to said first terminal of said first switch means and with said anode terminal of said diode connected to said first terminal of said third inductor, whereby said first diode clamps ringing associated with said first, said second, said third, and s aid fourth inductors and circuit parasitic capacitances such as intrinsic capacitance of said third switch means and inter-winding and intra-winding capacitance of said coupled inductors.

26. An active reset forward converter comprising, an input having first and second terminals coupleable to a source of substantially DC potential, a first inductor having first and second terminals with said first terminal of said first inductor connected to said first terminal of said input, a second inductor having first and second terminals with said second terminal of said second inductor connected to said first terminal of said input, a third inductor having first and second terminals with said first terminal of said third inductor connected to said second terminal of said input, a fourth inductor having first and second terminals with said second terminal of said fourth inductor connected to said second terminal of said input, a first capacitor having first and second terminals with said first terminal of said first capacitor connected to said second terminal of said first inductor and with said second terminal of said first capacitor connected to said second terminal of said third inductor, a second capacitor having first and second terminals with said first terminal of said second capacitor connected to said first terminal of said second inductor and with said second terminal of said second capacitor connected to said first terminal of said fourth inductor, a transformer having a primary winding with first and second terminals and a secondary winding having first and second terminals with said second terminal of said primary winding of said transformer connected to said first terminal of said second inductor and to said first terminal of said second capacitor, first switch means having first and second terminals with said first terminal of said first switch means connected to said first terminal of said primary winding of said transformer and with said second terminal connected to said second terminal of said third inductor and to said second terminal of said first capacitor, second switch means having first and second terminals with said first terminal of said second switch means connected to said first terminal of said first switch means and to said first terminal of said primary winding of said transformer, operable substantially in anti-synchronization to said first switch means, a third capacitor having first and second terminals with said first terminal of said third capacitor connected to said second terminal of said second switch means and with said second terminal of said third capacitor connected to said second terminal of said first switch means, to said second terminal of said first capacitor, and to said second terminal of said third inductor, third switch means having first and second terminals, operable substantially in anti-synchronization to said first switch means, with said first terminal of said third switch means connected to said second terminal of said secondary winding of said transformer, fourth switch means having first and second terminals, operable substantially in synchronization with said first switch means, with said first terminal of said fourth switch means connected to said first terminal of said secondary winding of said transformer and with said second terminal of said fourth switch means connected to said second terminal of said third switch means, a fifth inductor having first and second terminals with said second terminal of said fifth inductor connected to said second terminal of said secondary winding of said transformer and to said first terminal of said third switch means, an output, coupleable to a load, having first and second terminals with said first terminal of said output connected to said first terminal of said fifth inductor and with said second terminal of said output connected to said second terminal of said third switch means and to said second terminal of said fourth switch means, whereby the AC current component of said first inductor is substantially equal in magnitude and opposite in sign to said AC current component of said second inductor thereby substantially canceling said AC current components of said first and said second inductors at said first terminal of said input and thereby providing substantially DC current load to said input, whereby the AC current component of said third inductor is substantially equal in magnitude and opposite in sign to said AC current component of said fourth inductor thereby substantially canceling said AC current components of said third and said fourth inductors at said second input terminal and thereby providing substantially DC current load to said input, and whereby the energy in said first, said second, said third, and said fourth inductors is used to drive a zero voltage turn on transition of said first switch means.

27. The converter of claim 26 wherein said switch means comprise semiconductor switch means.

28. The converter of claim 26 in which all four primary side inductors are coupled on a single common magnetic core.

29. The converter of claim 28 further comprising,
a first diode having a cathode terminal and an anode terminal with said cathode terminal connected to said first terminal of said first switch means and with said anode terminal of said diode connected to said first terminal of said third inductor, whereby said first diode clamps ringing associated with said first, said second, said third, and said fourth inductors and circuit parasitic capacitances such as intrinsic capacitance of said third switch means and inter-winding and intra-winding capacitance of said transformer.

30. An active reset discontinuous forward converter comprising,
an input having first and second terminals coupleable to a source of substantially DC potential,
a first inductor having first and second terminals with said first terminal of said first inductor connected to said first terminal of said input,
a second inductor having first and second terminals with said second terminal of said second inductor connected to said first terminal of said input,
a third inductor having first and second terminals with said first terminal of said third inductor connected to said second terminal of said input,
a fourth inductor having first and second terminals with said second terminal of said fourth inductor connected to said second terminal of said input,
a first capacitor having first and second terminals with said first terminal of said first capacitor connected to said second terminal of said first inductor and with said second terminal of said first capacitor connected to said second terminal of said third inductor,
a second capacitor having first and second terminals with said first terminal of said second capacitor connected to said first terminal of said second inductor and with said second terminal of said second capacitor connected to said first terminal of said fourth inductor,
a transformer having a primary winding with first and second terminals and a secondary winding with first and second terminals with said second terminal of said primary winding of said transformer connected to said first terminal of said second inductor and to said first terminal of said second capacitor,
first switch means having first and second terminals with said first terminal of said first switch means connected to said first terminal of said primary winding of said transformer and with said second terminal connected to said second terminal of said third inductor and to said second terminal of said first capacitor,
second switch means having first and second terminals with said first terminal of said second switch means connected to said first terminal of said first switch means and to said first terminal of said primary winding of said transformer, operable substantially in anti-synchronization to said first switch means,
a third capacitor having first and second terminals with said first terminal of said third capacitor connected to said second terminal of said second switch means and with said second terminal of said third capacitor connected to said second terminal of said first switch means, to said second terminal of said first capacitor, and to said second terminal of said third inductor,
third switch means having first and second terminals, operable substantially in synchronization with said first switch means, with said first terminal of said third switch means connected to said first terminal of said secondary winding of said transformer,
an output, coupleable to a load, having first and second terminals with said first terminal of said output connected to said second terminal of said secondary winding of said transformer and with said second terminal of said output connected to said second terminal of said third switch means, whereby the AC current component of said first inductor is substantially equal in magnitude and opposite in sign to said AC current component of said second inductor thereby substantially canceling said AC current components of said first and said second inductors at said first terminal of said input and thereby providing substantially DC current load to said input, whereby the AC current component of said third inductor is substantially equal in magnitude and opposite in sign to said AC current component of said fourth inductor thereby substantially canceling said AC current components of said third and said fourth inductors at said second input terminal and thereby providing substantially DC current load to said input, and whereby the energy in said first, said second, said third, and said fourth inductors is used to drive a zero voltage turn on transition of said first switch means.

31. The converter of claim 30 wherein said switch means comprise semiconductor switch means.

32. The converter of claim 30 in which all four inductors are coupled on a single common magnetic core.

* * * * *